US011154847B2

(12) United States Patent
Patchett et al.

(10) Patent No.: US 11,154,847 B2
(45) Date of Patent: Oct. 26, 2021

(54) CATALYTIC ARTICLE AND EXHAUST GAS TREATMENT SYSTEMS

(71) Applicant: BASF Corporation, Florham Park, NJ (US)

(72) Inventors: Joseph A. Patchett, Iselin, NJ (US); Kevin Beard, Hannover (DE); Edgar Viktor Huennekes, Hannover (DE); Robert Dorner, Hannover (DE); Kevin A Hallstrom, Iselin, NJ (US); Ansgar Wille, Hannover (DE); Kenneth E Voss, Iselin, NJ (US); Martin Kalwei, Hannover (DE)

(73) Assignee: BASF Corporation, Florham Park, NJ (US)

( * ) Notice: Subject to any disclaimer, the term of this patent is extended or adjusted under 35 U.S.C. 154(b) by 25 days.

(21) Appl. No.: 16/619,861

(22) PCT Filed: Jun. 8, 2018

(86) PCT No.: PCT/EP2018/065171
§ 371 (c)(1),
(2) Date: Dec. 5, 2019

(87) PCT Pub. No.: WO2018/224651
PCT Pub. Date: Dec. 13, 2018

(65) Prior Publication Data
US 2021/0069688 A1 Mar. 11, 2021

Related U.S. Application Data

(60) Provisional application No. 62/517,343, filed on Jun. 9, 2017.

(30) Foreign Application Priority Data

Jan. 3, 2018 (EP) .................................... 18150185
Jan. 3, 2018 (EP) .................................... 18150188

(51) Int. Cl.
| | |
|---|---|
| *B01D 53/94* | (2006.01) |
| *B01J 21/06* | (2006.01) |
| *B01J 23/10* | (2006.01) |
| *B01J 23/30* | (2006.01) |
| *B01J 23/44* | (2006.01) |

(Continued)

(52) U.S. Cl.
CPC ........ *B01J 35/0006* (2013.01); *B01D 53/944* (2013.01); *B01D 53/9418* (2013.01); *B01D 53/9436* (2013.01); *B01D 53/9468* (2013.01); *B01D 53/9472* (2013.01); *B01J 21/063* (2013.01); *B01J 23/10* (2013.01); *B01J 23/30* (2013.01); *B01J 23/44* (2013.01); *B01J 29/763* (2013.01); *B01J 35/04* (2013.01); *B01J 37/0228* (2013.01); *B01J 37/0236* (2013.01); *B01J 37/0244* (2013.01); *B01J 37/08* (2013.01); *F01N 3/2066* (2013.01); *F01N 3/2825* (2013.01); *B01D 2255/1023* (2013.01); *B01D 2255/20761* (2013.01); *B01D 2255/50* (2013.01); *B01D 2255/9022* (2013.01); *B01D 2255/9155* (2013.01); *F01N 2330/02* (2013.01); *F01N 2330/30* (2013.01); *F01N 2370/04* (2013.01); *F01N 2510/063* (2013.01)

(58) Field of Classification Search
CPC .. B01D 53/94; B01D 53/9413; B01D 53/944; B01D 53/9459; B01D 53/9463; B01D 53/9468; B01D 53/9472; B01D 2255/102; B01D 2255/20738; B01D 2255/20761; B01D 2255/902; B01D 2255/903; B01D 2257/402; B01D 2257/404; B01D 2257/702; B01D 2258/012; B01J 23/40; B01J 23/54; B01J 23/72; B01J 23/745; B01J 35/0006; B01J 37/00; F01N 3/2066; F01N 2240/00; F01N 2250/00; F01N 2570/12; F01N 2570/14
See application file for complete search history.

(56) References Cited

U.S. PATENT DOCUMENTS

| | | |
|---|---|---|
| 4,518,710 A | 5/1985 | Brennan |
| 5,000,929 A | 3/1991 | Horiuchi et al. |

(Continued)

FOREIGN PATENT DOCUMENTS

| | | |
|---|---|---|
| DE | 10 2016 110 999 A1 | 12/2016 |
| DE | 10 2015 015 260 A1 | 6/2017 |

(Continued)

OTHER PUBLICATIONS

U.S. Appl. No. 16/309,249, filed Jun. 8, 2017, Gary A. Gramiccioni.
U.S. Appl. No. 16/323,059, filed Feb. 4, 2019, US 2019/0186314 A1, Shiang Sung, et al.
U.S. Appl. No. 16/062,242, filed Jun. 14, 2018, US 2018-0304236 A1, Feng Zhao, et al.

(Continued)

*Primary Examiner* — Timothy C Vanoy
(74) *Attorney, Agent, or Firm* — Finnegan, Henderson, Farabow, Garrett & Dunner LLP

(57) ABSTRACT

The present invention relates to a catalytic article comprising a substrate having a catalyst composition disposed thereon, wherein the catalyst composition comprises a platinum group metal impregnated onto a porous support and a selective catalytic reduction catalyst, wherein the catalyst composition is substantially free of platinum; and wherein the catalytic article is effective in the abatement of nitrogen oxides (NOx) and hydrocarbons (HCs). The present invention further relates to exhaust gas treatment systems for treating an exhaust gas stream exiting a diesel engine.

17 Claims, 24 Drawing Sheets

(51) Int. Cl.
*B01J 29/76* (2006.01)
*B01J 35/00* (2006.01)
*B01J 35/04* (2006.01)
*B01J 37/02* (2006.01)
*B01J 37/08* (2006.01)
*F01N 3/20* (2006.01)
*F01N 3/28* (2006.01)

(56) References Cited

U.S. PATENT DOCUMENTS

| | | | |
|---|---|---|---|
| 5,137,855 A | | 8/1992 | Hegedus et al. |
| 5,476,828 A | | 12/1995 | Kapteijn et al. |
| 7,220,692 B2 | | 5/2007 | Marshall et al. |
| 8,101,146 B2 | | 1/2012 | Fedeyko et al. |
| 8,119,088 B2 | | 2/2012 | Boorse et al. |
| 8,148,295 B2 | * | 4/2012 | Augustine ............... B01J 37/03 502/350 |
| 8,293,182 B2 | | 10/2012 | Boorse et al. |
| 8,293,199 B2 | | 10/2012 | Beutel et al. |
| 8,329,127 B2 | * | 12/2012 | Cox ..................... B01D 53/565 423/213.2 |
| 8,685,882 B2 | | 4/2014 | Hong et al. |
| 8,715,618 B2 | | 5/2014 | Trukhan et al. |
| 9,011,807 B2 | | 4/2015 | Mohanan et al. |
| 9,101,908 B2 | | 8/2015 | Jurng et al. |
| 9,138,732 B2 | | 9/2015 | Bull et al. |
| 9,199,195 B2 | | 12/2015 | Andersen et al. |
| 9,321,009 B2 | | 4/2016 | Wan et al. |
| 9,352,307 B2 | | 5/2016 | Stiebels et al. |
| 9,480,976 B2 | | 11/2016 | Rivas-Cardona et al. |
| 2001/0049339 A1 | | 12/2001 | Schafer-Sindlinger et al. |
| 2005/0137079 A1 | | 6/2005 | Labarge |
| 2008/0247929 A1 | * | 10/2008 | Augustine ............... B01J 23/22 423/239.1 |
| 2010/0166628 A1 | | 7/2010 | Soeger et al. |
| 2011/0250114 A1 | * | 10/2011 | Augustine .......... B01D 53/8628 423/239.1 |
| 2011/0271664 A1 | | 11/2011 | Boorse et al. |
| 2012/0230899 A1 | * | 9/2012 | Chang ................ B01D 53/9427 423/239.1 |
| 2012/0321537 A1 | | 12/2012 | Mergner et al. |
| 2014/0212350 A1 | | 7/2014 | Andersen et al. |
| 2016/0045868 A1 | * | 2/2016 | Sonntag ................. B01J 21/06 423/213.2 |
| 2016/0136626 A1 | | 5/2016 | Phillips et al. |
| 2016/0367941 A1 | | 12/2016 | Gilbert et al. |
| 2018/0008964 A1 | | 1/2018 | Castellino et al. |
| 2018/0043334 A1 | | 2/2018 | Tanev et al. |
| 2018/0111088 A1 | | 4/2018 | Li et al. |
| 2018/0195425 A1 | | 7/2018 | Li et al. |
| 2020/0088080 A1 | * | 3/2020 | Malmberg ......... B01D 53/9418 |

FOREIGN PATENT DOCUMENTS

| | | | | |
|---|---|---|---|---|
| DE | 10 2015 016 986 A1 | 6/2017 | | |
| EP | 0 315 896 A1 | 5/1989 | | |
| EP | 0 488 347 A1 | 6/1992 | | |
| EP | 1 864 713 A1 | 12/2007 | | |
| EP | 3 127 612 A1 | 2/2017 | | |
| EP | 2 483 537 B1 | * | 8/2018 | ........... F01N 3/2066 |
| WO | WO 2011/041769 A2 | 4/2011 | | |
| WO | WO 2015/130216 A1 | 9/2015 | | |
| WO | WO 2016/139283 A1 | 9/2016 | | |
| WO | WO 2016/150465 A1 | 9/2016 | | |
| WO | WO 2016/160953 A1 | 10/2016 | | |
| WO | WO 2017/004414 A1 | 1/2017 | | |

OTHER PUBLICATIONS

U.S. Appl. No. 16/479,669, filed Jul. 22, 2019, Robert Dorner, et al.
U.S. Appl. No. 16/462,048, filed May 17, 2019, US 2019/0314795 A1, Robert Dorner, et al.
U.S. Appl. No. 16/323,145, filed Feb. 4, 2019, US 2019/0170042 A1, Wen-Mei Xue, et al.
U.S. Appl. No. 16/323,154, filed Feb. 4, 2019, US 2019/0168199 A1, Jeff H. Yang, et al.
U.S. Appl. No. 16/474,830, filed Jun. 28, 2019, US 2019/0344247 A1, Feng Zhao, et al.
U.S. Appl. No. 16/682,118, filed May 14, 2018, Joseph A. Patchett.
International Preliminary Report on Patentability and Written Opinion of the International Searching Authority dated Dec. 19, 2019 in PCT/EP2018/065171 filed Jun. 8, 2018, 16 pages.
International Search Report and Written Opinion dated Dec. 6, 2018 in PCT/EP2018/065171 filed Jun. 8, 2018.

* cited by examiner

CATALYTIC ARTICLE AND EXHAUST GAS TREATMENT SYSTEMS

The present invention relates generally to the fields of selective catalytic reduction catalysts and oxidation catalysts. In particular, the present invention relates to a catalytic article, exhaust gas treatment systems for treating an exhaust gas stream exiting a diesel engine and a catalyst for the selective catalytic reduction of NOx and the oxidation of a hydrocarbon. Further, the present invention relates to processes for the preparation of said article, catalyst and systems.

Harmful components of nitrogen oxides ($NO_x$) lead to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants. Various treatment methods are used to lower $NO_x$ in exhaust gases and thus decrease atmospheric pollution. One type of treatment involves catalytic reduction of nitrogen oxides. There are two processes: (1) a nonselective reduction process wherein carbon monoxide, hydrogen, or a lower hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent.

The selective reduction process is referred to as a SCR (Selective Catalytic Reduction) process. The SCR process uses catalytic reduction of nitrogen oxides with a reductant (e.g. ammonia or ammonia precursor) in the presence of atmospheric oxygen, resulting in the formation predominantly of nitrogen and steam:

$4NO+4NH_3+O_2 \rightarrow 4N_2+6H_2O$ (standard SCR reaction)

$2NO_2+4NH_3 \rightarrow 3N_2+6H_2O$ (slow SCR reaction)

$NO+NO_2+2NH_3 \rightarrow 2N_2+3H_2O$ (fast SCR reaction)

This process is considered one of the most viable techniques for the removal of nitrogen oxides from engine exhaust gas. In a typical exhaust gas, the nitrogen oxides are mainly composed of NO (>90%), which is converted by the SCR catalyst into nitrogen and water in the presence of ammonia (standard SCR reaction). $NH_3$ is one of the most effective reductants although urea can also be used as an ammonia precursor. Generally, catalysts employed in the SCR process should have good catalytic activity over a wide range of temperature, for example, from below 200° C. to 600° C. or higher. Higher temperatures are commonly encountered during the regeneration of soot filters and during the regeneration of SCR catalysts. For soot filters, regeneration refers to the periodic need to remove accumulated soot within the filter. Temperatures greater than 500° C. are needed for typically 20 minutes or more to effectively burn soot. Such temperatures are not encountered during normal engine operation.

Hydrocarbons, usually as fuel or partially combusted fuel, are typically present in the exhaust and oxidized across a dedicated oxidation catalyst to create the heat necessary to oxidize the soot collected in the filter. Depending on the location of the SCR catalyst relative to the filter, the SCR catalyst could be exposed to high hydrocarbon concentrations, e.g., if the SCR catalyst is positioned between the source of the hydrocarbons, such as the engine, and the DOC installed to oxidize these hydrocarbons for heat generation. Such an arrangement, with the SCR very close to the engine, is contemplated to take advantage of faster heating during cold starts. The term "close coupled" is often used and defined below. For SCR catalysts, regeneration does not have the same implication as with filters. In this case, minor components of the exhaust gas either collect or interact with the SCR catalyst, reducing the effectiveness of the catalyst over time. To maintain high efficiency, it is necessary to periodically remove these contaminants. For example, sulfur oxides can react with ammonia to form ammonium sulfates, which block active sites on the catalyst, leading to activity loss. Also, prolonged operation of SCR catalysts at temperature below about 300° C. can lead to the accumulation of HCs on the catalyst surface. Eventually these hydrocarbons also block active sites, leading to a loss in catalytic activity.

Like for filters, periodic higher temperatures are necessary to remove these and other contaminants to maintain high catalytic efficiency. Achieving temperatures to regenerate SCR catalysts requires hydrocarbon addition in combination with an oxidation catalyst to raise the exhaust temperature. With the addition of an oxidation function to an SCR, ammonia (which is added as part of the SCR reaction) may also be oxidized. As a result, the SCR catalytic activity may decline and, in some cases, can potentially increase $NO_x$ emissions rather than reduce $NO_x$ emissions. Thus, catalysts have been developed specifically to oxidize ammonia.

DE10 2015 015260 A1 discloses an exhaust gas treatment system for an internal combustion engine comprising a first SCR catalyst comprising vanadium oxide, a particulate filter located downstream of the first SCR catalyst, a second SCR catalyst, i.e. a Cu-SCR, located downstream of the particulate filter and an ammonia slip catalyst located downstream of the second catalyst. The first SCR catalyst has an effect comparable to a DOC to ensure the passive regeneration of the downstream particulate filter.

DE 10 2015 016986 A1 discloses an exhaust gas treatment system for an internal combustion engine comprising at least one first catalytic converter through which the exhaust gas from the internal combustion engine can flow and at least one particle filter which is directly downstream of the catalytic converter, wherein the first catalytic converter comprises a first part which is a selective catalytic reduction (SCR) catalyst (V-SCR) and a second part downstream of the first one being an ammonia slip catalyst and a third part downstream of the second one which is an oxidation catalyst and an SCR catalyst layer disposed on the second and third part.

WO 2015/130216 A1 discloses an exhaust treatment system comprising an oxidation catalyst, a first dosage device arranged downstream of the oxidation, a first reduction catalyst device arranged downstream of the dosage device, a particulate filter arranged downstream of the first reduction catalyst.

It is a known problem that close coupled selective catalytic reduction (SCR) catalysts based on copper containing zeolitic material having a framework structure of the type CHA, may be sulfated with time even though there is no upstream oxidation catalyst due to the sulfur trioxide exiting from engine and internally generated by SCR catalysts. Here, the term "close coupled" catalyst is used herein to define a catalyst which is the first catalyst receiving the exhaust gas stream exiting from an engine (the catalyst is installed close to—immediately adjacent to—the engine without any other catalytic component in between). Accordingly, it results that close coupled SCR catalysts are not able to provide sufficient DeNOx to meet the ultra-low nitrogen oxides (NOx) and nitrous oxide ($N_2O$) emissions, such as CARB after sulfation.

Therefore, it was an object of the present invention to provide exhaust gas treatment systems and catalytic articles for treating an exhaust gas stream exiting a diesel engine which are resistant to HC poisoning and prevent sulfating in order to maintain sufficient DeNOx to meet the environmental requirements, while being cost effective and avoiding engine measures such as raising exhaust gas temperatures.

I. Catalytic Article

Surprisingly, it was found that the catalytic article according to the present invention is resistant to HC poisoning and prevents sulfating in order to maintain sufficient DeNOx to meet the environmental requirements, while being cost effective and avoiding engine measures such as to raise exhaust gas temperatures.

Therefore, the present invention is directed to a catalytic article comprising a catalyst composition that is designed to oxidize hydrocarbons (HC) without oxidizing ammonia and also provide activity for the $NH_3$—SCR reaction. The catalyst composition comprises at least two different components: a $NO_x$ reduction component, such as an SCR catalyst, and an oxidation catalyst component, such as a platinum group metal impregnated onto a porous support material. This dual functioning catalyst composition is most useful in engine exhaust gas treatment systems employing hydrocarbons during the regeneration process of selective catalytic reduction (SCR) catalysts and soot filters. Hydrocarbons, such as fuel, can be either provided in the exhaust through engine management protocols or injected into the exhaust gas stream entering the catalytic article to raise the SCR catalyst temperature for the removal of contaminants on the SCR catalyst. The heat generated across the SCR catalyst by this dual functioning catalyst can also be useful in removing accumulated soot from a downstream filter. The hydrocarbon oxidation functionality is not accompanied by ammonia oxidation and thus the SCR catalyst can continue to provide $NO_x$ reduction while at the same time generating heat for regeneration. The flexibility to remove an upstream oxidation catalyst in certain embodiments, typically needed to generate heat to clean the SCR catalyst or the soot filter, reduces the thermal mass between the engine and the SCR catalyst. Reducing the thermal mass shortens the time required to heat the SCR catalyst to operating temperature. With shorter heating times, lower emissions are achieved faster during cold start drive cycles.

In applications in which the SCR catalyst is located downstream from the filter, the oxidation activity incorporated into the SCR catalyst promotes the reduction of any unreacted hydrocarbons from the filter during regeneration without affecting the performance of the SCR catalyst. Hence, the dual activity of the disclosed catalyst composition not only provides oxidation of HC, but also does not interfere with the SCR catalyst activity by, for example, causing oxidation of ammonia and/or ammonia precursor required for $NO_x$ conversion within an appropriate temperature window. As a result, efficient regeneration cycles are achieved using hydrocarbons to restore SCR catalytic activity in engine exhaust gas treatment systems comprising the catalytic article of the invention.

The present invention provides a catalytic article comprising: a substrate having a catalyst composition disposed thereon, wherein the catalyst composition comprises a platinum group metal (PGM) impregnated onto a porous support, and a selective catalytic reduction (SCR) catalyst; wherein the catalyst composition is substantially free of platinum (Pt); and wherein the catalytic article is effective in the abatement of nitrogen oxides ($NO_x$) and hydrocarbons (HCs).

Preferably, the PGM is palladium (Pd), rhodium (Rh), or a combination thereof. More preferably the PGM is palladium or rhodium. Exemplary PGM loading is about 5 g/ft$^3$ to about 25 g/ft$^3$, calculated as elemental PGM. The PGM is impregnated onto a porous support, preferably onto a refractory metal oxide material. For example, the metal oxide is ceria, zirconia, yttria, lanthana, neodymia, praseodymia, or a combination thereof.

Preferably, the metal oxide is a ceria-zirconia composite. More preferably, the ceria and zirconia of the ceria-zirconia composite are each present in an amount ranging from about 5 to about 75 weight-% (e.g., about 25 to about 60 weight-%) based on the total weight of the ceria-zirconia composite. Ceria is typically present in the ceria-zirconia composite in an amount ranging from about 30 to about 45 weight-% based on the total weight of the ceria-zirconia composite. Zirconia is typically present in an amount ranging from about 35 to about 55 weight-% based on the total weight of the ceria-zirconia composite. Alternatively, the refractory metal oxide material is preferably alumina.

The SCR catalyst can comprise a mixed metal oxide component or a metal ion-exchanged molecular sieve. Preferably, the mixed metal oxide component is selected from $FeTiO_3$, $FeAl_2O_3$, $MgTiO_3$, $MgAlO_3$, $MnO_x/TiO_2$, $CuTiO_3$, $CeZrO_2$, $TiZrO_2$, $V_2O_5/TiO_2$, and mixtures thereof. For example, the mixed metal oxide component can be titania and vanadia (and optionally tungsten), such as wherein vanadia is present in the mixed metal oxide component in an amount ranging from about 1% to about 10% by weight based on the total weight of the mixed metal oxide. Where the SCR catalyst is a metal ion-exchanged molecular sieve, the metal can be selected from Cu, Co, Ni, La, Mn, Fe, V, Ag, Ce, Nd, Mo, Hf, Y, W, and combinations thereof. Preferably, the metal is Cu, Fe, or a combination thereof. The metal is typically present in an amount of about 0.1% to about 10% by weight based on the weight of the ion-exchanged molecular sieve, calculated as metal oxide. More preferably, the metal is Cu.

Certain zeolites are particularly advantageous for use as the molecular sieve. For example, the zeolite can have a structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFI, and combinations thereof. In the context of the present invention, "zeolite" can be the "zeolitic material" as defined under paragraphs II and III below. In the context of the present invention, the term "structure type", the term "framework structure type" and the term "framework structure of the type" are used interchangeably.

In the context of the present invention, it is preferred that the zeolite comprised in the catalyst composition, more preferably which has a structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

The substrate is typically a honeycomb substrate, which can be made of metal or ceramic. Exemplary honeycomb substrates are either a flow-through substrate or a wall flow filter.

The catalyst composition may include multiple layers such as a first layer and a second layer, wherein the first layer comprises the SCR catalyst and the second layer comprises the PGM impregnated onto the porous support. The order of the layers can vary, including where the first layer is disposed directly on the substrate and the second layer is disposed on top of the first layer and where the second layer is disposed directly on the substrate and the first layer is disposed on top of the second layer.

Alternatively, the catalyst composition may include a single layer. Preferably, the catalyst composition consists of a single layer. For example, the catalytic article of the present invention may be the first catalyst according to (i) in the exhaust gas treatment system defined under paragraph II or may be the second catalyst according to (ii) in the exhaust gas treatment system defined under paragraph III.

As a further alternative, the first layer and the second layer may be disposed directly on the substrate in a zoned configuration. In this regard, it is preferred that the substrate of the catalytic article has an inlet end, an outlet end and a substrate length extending from the inlet end to the outlet end of the substrate and comprises a plurality of passages defined by the internal walls of the substrate. Preferably, the catalyst composition comprises a first layer and a second layer, wherein the first layer comprises PGM impregnated onto the porous support and the second layer comprises the SCR catalyst.

More preferably the first layer extends from the inlet end to the outlet end of the substrate over 5 to 95% of the substrate length and the second layer extends from the outlet end to the inlet end over 5 to 95% of the substrate length. More preferably the first layer extends from the inlet end to the outlet end of the substrate over 20 to 80%, more preferably 30 to 70%, more preferably 40 to 60%, more preferably 45 to 55%, of the substrate length and the second layer extends from the outlet end to the inlet end over 20 to 80%, more preferably 30 to 70%, more preferably 40 to 60%, more preferably 45 to 55%, of the substrate length.

According to said alternative, the first layer preferably comprises palladium impregnated onto one or more of zirconia and alumina.

Preferably, the first layer comprises palladium at a loading, calculated as elemental palladium, in the range of from 5 to 100 g/f$^3$, preferably in the range of from 0.71 to 2.82 g/l (20 to 80 g/ft$^3$), more preferably in the range of from 1.06 to 2.47 g/l (30 to 70 g/ft$^3$), more preferably in the range of from 1.24 to 1.94 g/l (35 to 55 g/ft$^3$), more preferably in the range of from 1.41 to 1.77 g/l (40 to 50 g/ft$^3$).

It is preferred that from 98 to 100 weight-%, preferably from 99 to 100 weight-%, more preferably from 99.5 to 100 weight-%, of the first layer consist of palladium impregnated onto one or more of zirconia and alumina.

Preferably, the SCR catalyst of the second layer comprises a zeolite comprising Cu, more preferably a zeolite having the structure type CHA.

Preferably, the second layer further comprises a metal oxide binder, preferably a metal oxide binder as defined in the following under paragraphs II and III.

Preferably from 98 to 100 weight-%, more preferably from 99 to 100 weight-%, more preferably from 99.5 to 100 weight-%, of the second layer consist of a zeolite comprising Cu, preferably a zeolite having the structure type CHA, and preferably a metal oxide binder as defined in the following under paragraphs II and III.

Furthermore, the present invention relates to a method for treating an exhaust gas stream comprising contacting the gas with a catalytic article according to the present invention such that nitrogen oxides ($NO_x$) and hydrocarbons (HCs) in the exhaust gas stream are reduced.

The present invention further relates to an emission treatment system for treatment of an exhaust gas stream, the emission treatment system comprising: an engine (e.g., a diesel engine or other lean burn engine) producing an exhaust gas stream; a catalytic article according to the present invention positioned downstream from the engine in fluid communication with the exhaust gas stream and adapted for the reduction of $NO_x$ and oxidation of HCs within the exhaust stream to form a treated exhaust gas stream, wherein the catalytic article is positioned, preferably, to directly receive the engine exhaust gas stream produced from the engine without an intervening catalytic article; and an injector adapted for the addition of a reductant (e.g., ammonia or an ammonia precursor) to the exhaust gas stream upstream of the catalytic article. The system can further include an injector adapted for the addition of hydrocarbons to the exhaust gas stream, located upstream of the catalytic article. Other catalytic articles can be included, such as a diesel oxidation catalyst located downstream of the catalytic article and/or a soot filter located downstream of the diesel oxidation catalyst.

As used in the context of paragraph I, the singular forms "a," "an," and "the" include plural referents unless the context clearly dictates otherwise.

As used herein, the term "catalyst" or "catalyst composition" refers to a material that promotes a reaction. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a combustion engine, which may contain entrained non-gaseous components such as liquid droplets, solid particulates, and the like. The exhaust gas stream of a combustion engine may typically further comprise combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the term "substrate" preferably refers to the monolithic material onto which the catalyst composition is placed. As used herein, the term "support" preferably refers to any high surface area material, usually a metal oxide material, upon which a catalytic precious metal is applied.

As used in the context of paragraph I, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 30%-90% by weight)

of particles in a liquid vehicle, which is then coated onto a substrate and dried to provide a washcoat layer.

As used herein, the term "catalytic article" refers to an element that is used to promote a desired reaction. For example, a catalytic article may comprise a washcoat containing catalytic compositions on a substrate. As used herein, "impregnated" or "impregnation" refers to permeation of the catalytic material into the porous structure of the support material. The term "abatement" means a decrease in the amount, caused by any means.

The present invention is directed to a catalytic article effective in the abatement of nitrogen oxides ($NO_x$) and hydrocarbons (HCs) comprising a substrate having a catalyst composition disposed thereon, wherein the catalyst composition comprises a platinum group metal (PGM) impregnated onto a porous support and a selective catalytic reduction (SCR) catalyst, wherein the catalyst composition is substantially free of platinum (Pt). Such a catalytic article is particularly beneficial in engine exhaust gas treatment systems where the regeneration process of selective catalytic reduction (SCR) catalysts and diesel particulate filters uses hydrocarbons to increase exhaust temperature. Hydrocarbons, such as fuel, are either delivered directly from the engine into the exhaust gas stream (e.g., determined by the engine management system) or are injected into the exhaust gas stream entering the catalytic article during the regeneration cycle to promote the elimination of contaminants at elevated temperatures from the SCR catalyst or downstream soot filter. In engine treatment systems comprising the catalytic article of the invention, the PGM component impregnated onto the porous support is able to oxidize HCs without affecting the catalytic activity of the SCR catalyst towards NOx conversion. Thus, the HC oxidation catalyst component of the catalytic article will not cause significant ammonia and/or ammonia precursor oxidation. As a result, efficient regeneration cycles can be achieved wherein removal of contaminants from the catalyst using hydrocarbons can be conducted without adversely affecting SCR performance activity.

Catalyst Composition

The catalyst composition of the present invention includes an oxidation catalyst component comprising a platinum group metal (PGM) component impregnated onto a porous support and a selective catalytic reduction (SCR) catalyst. As used in the context of paragraph I, "platinum group metal component" or "PGM component" refers to platinum group metals or oxides thereof, such as palladium (Pd), ruthenium (Ru), rhodium (Rh), osmium (Os), iridium (Ir), and mixtures thereof. The PGM component does not include platinum (Pt). Preferably, the platinum group metal component is rhodium (Rh), palladium (Pd), or a combination thereof. More preferably, the platinum group metal component comprises a combination of palladium (Pd) and rhodium (Rh), such as in a weight ratio of about 1:10 to about 10:1. Alternatively, more preferably the platinum group metal is palladium or rhodium.

Preferably, the PGM component is impregnated onto a porous support material, preferably a refractory metal oxide material. The concentrations of the PGM component (e.g., Pd, Rh or a combination thereof) can vary, but will typically be from about 0.1 weight-% to about 10 weight-% relative to the weight of the support material impregnated thereon. The catalyst composition is substantially free of platinum. As used herein, the term "substantially free of platinum" means that there is no additional platinum intentionally added to the catalyst composition, and, preferably, there is less than 0.01 weight-% of any additional platinum by weight present in the catalyst composition. Preferably, "substantially free of Pt" includes "free of Pt".

As used in the context of paragraph I, "refractory metal oxide material" refers to a metal-containing oxide material exhibiting chemical and physical stability at high temperatures, such as the temperatures associated with gasoline and diesel engine exhaust. Exemplary refractory metal oxide materials include alumina, silica, zirconia, titania, ceria, and physical mixtures or chemical combinations thereof, including atomically-doped combinations.

Preferably, the refractory metal oxide material is alumina.

Preferably, "refractory metal oxide material" is modified with a metal oxide(s) of alkali, semimetal, and/or transition metal, e.g., La, Mg, Ba, Sr, Zr, Ti, Si, Ce, Mn, Nd, Pr, Sm, Nb, W, Y, Nd, Mo, Fe, or combinations thereof.

Preferably, the amount of alkali, semimetal, and/or transition metal oxide(s) used to modify the "refractory metal oxide material" can range from about 0.5% to about 50% by weight based on the amount of "refractory metal oxide material". Exemplary combinations of refractory metal oxide materials include alumina-zirconia, ceria-zirconia, alumina-ceria-zirconia, lanthana-alumina, lanthana-zirconia, lanthana-zirconia-alumina, baria-alumina, baria lanthana-alumina, baria lanthana-neodymia alumina, and alumina-ceria.

According to the present invention, it is preferred that in the catalytic article, the platinum group metal impregnated onto a porous support is palladium impregnated onto zirconia and the SCR catalyst comprises one or more of a mixed metal oxide and a zeolite comprising one or more of Cu and Fe. More preferably, the SCR catalyst comprises a zeolite comprising Cu, more preferably a zeolite having the structure type CHA.

Where the catalyst composition comprises a first layer and a second layer, it may be preferred that the SCR catalyst of the first layer comprises one or more of a mixed metal oxide and a zeolite comprising one or more of Cu and Fe, more preferably a mixed metal oxide, more preferably $V_2O_5/TiO_2$. More preferably, the PGM impregnated onto a porous support is palladium or rhodium impregnated on ceria-zirconia. More preferably, the SCR catalyst of the first layer comprises $V_2O_5/TiO_2$. Alternatively, the SCR catalyst of the first layer more preferably comprises a zeolite comprising one or more of Cu and Fe.

Preferably, high surface area refractory metal oxide materials are used, such as alumina support materials, also referred to as "gamma alumina" or "activated alumina," typically exhibit a BET specific surface area in excess of 60 $m^2/g$, often up to about 200 $m^2/g$ or higher. Preferably, the BET specific surface area is in the range of from more than 60 to 200 $m^2/g$. "BET specific surface area" has its usual meaning of referring to the Brunauer, Emmett, Teller method for determining surface area by $N_2$ adsorption. Preferably, the BET specific surface area was determined as described in Reference Example 6. Preferably, the BET specific surface area ranges from about 100 to about 150 $m^2/g$, more preferably ranges from 100 to 150 $m^2/g$. Useful commercial alumina includes high surface area alumina, such as high bulk density gamma-alumina, and low or medium bulk density large pore gamma-alumina.

Preferably, the porous support includes ceria, zirconia ($ZrO_2$), titania ($TiO_2$), yttria ($Y_2O_3$), neodymia ($Nd_2O_3$), lanthana ($La_2O_3$), praseodymia ($Pr_6O_{11}$), or mixtures thereof. Combinations of metal oxides are often referred to as mixed metal oxide composites. For example, a "ceria-zirconia composite" means a composite comprising ceria and zirconia, without specifying the amount of either component. Suitable ceria-zirconia composites include, but are not limited to, composites having a ceria content ranging from about 5 to about 75 weight-%, preferably from about 10 to about 60 weight-%, more preferably from about 20 to about 50 weight-%, more preferably from about 30 to about 45 weight-% based on the total weight of the ceria-zirconia composite (e.g., at least about 5 weight-%, preferably at least about 10 weight-%, more preferably at least about 20 weight-%, more preferably at least about 30 weight-%, more preferably at least about 40 weight-% ceria content, with an upper boundary of about 75 weight-%).

Preferably, the zirconia content of suitable ceria-zirconia composites range from about 5 to about 75 weight-%, preferably from about 15 to about 70 weight-%, more preferably from about 25 to about 60 wt. %, more preferably from about 35 to about 55 wt. % based on the total weight of the ceria-zirconia composite (e.g., at least about 5 weight-%, preferably at least about 15 weight-%, more preferably at least about 25 weight-% ceria, more preferably at least about 35 weight-%, more preferably at least about 45 weight-% ceria content, with an upper boundary of about 75 weight-%).

Preferably, the SCR catalyst comprises a mixed metal oxide component or a metal promoted molecular sieve. For SCR catalysts comprising a mixed metal oxide component, the term "mixed metal oxide component" as used therein refers to an oxide that contains cations of more than one chemical element or cations of a single element in several states of oxidation. More preferably, the mixed metal oxide is selected from Fe/titania (e.g. $FeTiO_3$), Fe/alumina (e.g. $FeAl_2O_3$), Mg/titania (e.g. $MgTiO_3$), Mg/alumina (e.g. $MgAl_2O_3$), Mn/alumina, Mn/titania (e.g. $MnO_x/TiO_2$) (e.g. $MnO_x/Al_2O_3$), Cu/titania (e.g. $CuTiO_3$), Ce/Zr (e.g. $CeZrO_2$), Ti/Zr (e.g. $TiZrO_2$), vanadia/titania (e.g. $V_2O_5/TiO_2$), and mixtures thereof. More preferably, the mixed metal oxide component comprises vanadia/titania.

More preferably, the amount of vanadia present in the mixed metal oxide component (e.g., vanadia/titania) ranges from about 1 to about 10%, preferably from about 2% to about 8%, more preferably from about 3 to about 6% by weight based on the total weight of the mixed metal oxide component (no more than about 10%, preferably about 9%, more preferably about 8%, more preferably about 7%, more preferably about 6%, more preferably about 5%, more preferably about 4%, more preferably about 3%, more preferably about 2%, more preferably about 1% by weight based on the total weight of the mixed metal oxide component, with a lower boundary of 0%).

More preferably, the mixed metal oxide component can be activated or stabilized. For example, the vanadia/titania oxide can be activated or stabilized with tungsten (e.g. $WO_3$) to provide $V_2O_5/TiO_2/WO_3$. More preferably, the amount of tungsten present in the mixed metal oxide component (e.g., $V_2O_5/TiO_2/WO_3$) ranges from about 0.5 to about 10% by weight based on the total weight of the mixed metal oxide component (no more than about 10%, preferably about 9%, more preferably about 8%, more preferably about 7%, more preferably about 6%, more preferably about 5%, more preferably about 4%, more preferably about 3%, more preferably about 2%, more preferably about 1% by weight based on the total weight of the mixed metal oxide component, with a lower boundary of 0%). More preferably, the vanadia is activated or stabilized with tungsten (e.g., $WO_3$). The tungsten can be dispersed at concentrations ranging from about 0.5 to about 10% by weight based on the total weight of vanadia (no more than about 10%, preferably about 9%, more preferably about 8%, more preferably about 7%, more preferably about 6%, more preferably about 5%, more preferably about 4%, more preferably about 3%, more preferably about 2%, more preferably about 1% by weight based on the total weight of vanadia, with a lower boundary of 0%). Examples of mixed metal oxides as SCR catalysts are disclosed in U.S. Pat. Appl. Pub. No. 2001/0049339 to Schafer-Sindelindger et al For SCR catalysts comprising a metal promoted molecular sieve, the term "molecular sieve" refers to framework materials such as zeolites and other framework materials (e.g. isomorphously substituted materials). Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. It will be appreciated that by defining the molecular sieves by their framework type, it is intended to include any and all zeolite or isotypic framework materials, such as SAPO, ALPO and MeAPO, Ge-silicates, all-silica, and similar materials having the same framework type.

Generally, molecular sieves, e.g. zeolites, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Angstroms in diameter. The molar ratio of silica to alumina (SAR) of zeolites, as well as other molecular sieves, can vary over a wide range, but is generally 2 or greater. Preferably, the molecular sieve has a SAR molar ratio in the range of about 2 to about 300, including about 5 to about 250, about 5 to about 200, about 5 to about 100, and about 5 to about 50. More preferably, the molecular sieve has a SAR molar ratio in the range of about 10 to about 200, about 10 to about 100, about 10 to about 75, about 10 to about 60, and about 10 to about 50. The molecular sieve may have a SAR molar ratio in the range of about 15 to about 100, about 15 to about 75, about 15 to about 60, and about 15 to about 50. The molecular sieve may have a SAR molar ratio in the range of about 20 to about 100, about 20 to about 75, about 20 to about 60, and about 20 to about 50.

Preferably, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. The term "aluminophosphates" refers to another specific example of a molecular sieve, including aluminum and phosphate atoms. Aluminophosphates are crystalline materials having rather uniform pore sizes.

Preferably, the molecular sieve, independently, comprises $SiO_4/AlO_4$ tetrahedra that are linked by common oxygen atoms to form a three-dimensional network. Preferably, the molecular sieve comprises $SiO_4/AlO_4/PO_4$ tetrahedra. The molecular sieve can be differentiated mainly according to the geometry of the voids which are formed by the rigid network of the (SiO$_4$)/AlO$_4$, or SiO$_4$/AlO$_4$/PO$_4$, tetrahedra. The entrances to the voids are formed from 6, 8, 10, or 12 ring atoms with respect to the atoms which form the entrance opening. Preferably, the molecular sieve comprises ring sizes of no larger than 12, including 6, 8, 10, and 12.

Preferably, the molecular sieve can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AVL, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EEI, EMT, EON, EPI, ERI, ESV, ETR, EUO, FAU, FER, FRA, GIS, GIU, GME, GON, GOO, HEU, IFR, IFY, IHW, IRN, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWF, MWW, NAB, NAT, NES, NON, NPO, NPT, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SFW, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. Preferably, a molecular sieve comprises a framework structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFI. More preferably, a molecular sieve comprises a framework structure type CHA.

Preferably, the molecular sieve comprises an 8-ring small pore aluminosilicate zeolite. As used herein, the term "small pore" refers to pore openings which are smaller than about 5 Angstroms, for example on the order of about 3.8 Angstroms. The phrase "8-ring" zeolites refers to zeolites having 8-ring pore openings and double-six ring secondary building units and having a cage like structure resulting from the connection of double six-ring building units by 4 rings. Preferably, the molecular sieve is a small pore molecular sieve having a maximum ring size of eight tetrahedral atoms.

As noted above, the molecular sieve may include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, Ti-SAPO-34, and CuSAPO-47.

As referenced herein above, the disclosed SCR catalyst generally comprises molecular sieves (e.g., zeolites) that are metal-promoted. As used herein, "promoted" refers to a molecular sieve comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, a suitable metal may be exchanged into the molecular sieves. Copper participates in the conversion of nitrogen oxides and thus may be a particularly useful metal for exchange. Accordingly, it is preferred that a catalyst composition is provided which comprises a copper-promoted molecular sieve, such as Cu-CHA.

Promoter metals can generally be selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. Further promoter metals that can, preferably, be used to prepare metal-promoted molecular sieves include, but are not limited to, cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. More preferably, promoter metals are one or more of Cu and Fe. Combinations of such metals can be employed, e.g. copper and iron, giving a mixed Cu—Fe-promoted molecular sieve, e.g. Cu—Fe-CHA.

The promoter metal content of a metal-promoted molecular sieve, calculated as the oxide, preferably, ranges from about 0.1 weight-% to about 10 weight-%, preferably 0.1 weight-% to about 5 weight-%, more preferably about 0.5 weight-% to about 4 weight-%, or more preferably about 2 wt. % to about 5 weight-%, or more preferably about 1 weight-% to about 3 weight-% based on the total weight of the calcined molecular sieve (including promoter) and reported on a volatile-free basis. Preferably, the promoter metal of the molecular sieve comprises Cu, Fe, or a combination thereof.

Substrate

The substrate for the catalytic article of the invention may be constructed of any material typically used for preparing automotive catalysts and will typically comprise a metal or ceramic honeycomb structure. The substrate typically provides a plurality of wall surfaces upon which the catalytic article washcoat composition is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 weight-% of the alloy, preferably from 10-25 weight-% of chromium, 3-8 weight-% of aluminum, and up to 20 weight-% of nickel. The alloys may also contain small or trace amounts of one or more other metals, such as manganese, copper, vanadium, titanium and the like. The surface of the metal substrate may be oxidized at high temperatures, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-α alumina, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material.

The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.1 inches. A representative commercially-available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry.

Alternatively, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls.

An exemplary substrate 2 in the form of a flow-through substrate coated with a washcoat composition as described herein is illustrated FIGS. 1 and 2. Referring to FIG. 1, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 2, walls 12 are so dimensioned and configured that gas flow passages 10 have a substantially regular polygonal shape. As shown, the washcoat composition can be applied in multiple, distinct layers if desired. In the figure, the washcoat consists of both a discrete bottom washcoat layer 14 adhered to the walls 12 of the substrate member and a second discrete top washcoat layer 16 coated over the bottom washcoat layer 14. The present invention can be practiced with one or more (e.g., 2, 3, or 4) washcoat layers and is not limited to the illustrated two-layer embodiment. Alternatively, the entire catalyst composition of the invention could be homogenously mixed in the same catalyst layer, for example as defined in detail in the foregoing and under paragraphs II and III.

The catalytic article preferably comprises a catalyst composition with multiple layers, wherein each layer has a different composition. The bottom layer (e.g., layer 14 of FIG. 2) can comprise a SCR catalyst composition of the invention and the top layer (e.g., layer 16 of FIG. 2) can comprise an oxidation catalyst component (e.g., a PGM component impregnated on a porous support) of the invention. The catalytic article may alternatively comprise a catalyst composition, wherein the bottom layer (e.g., layer 14 of FIG. 2) can comprise an oxidation catalyst component (e.g., a PGM component impregnated on a porous support) of the invention and the top layer (e.g., layer 16 of FIG. 2) can comprise a SCR catalyst composition of the invention.

The relative amount of the SCR catalyst and the oxidation catalyst component can vary. For example, the relative amount of PGM component in the oxidation catalyst component in an exemplary dual layer coating can comprise about 10-90% by weight based on the total weight of catalyst composition in the bottom layer (adjacent to the substrate surface) and the SCR catalyst is present about 10-90% by weight based on the total weight of the catalyst composition in the top layer respectively. The same percentages could apply if the SCR catalyst is in the bottom layer and the remaining components are in the top layer.

FIG. 3 illustrates an exemplary substrate 2 in the form a wall flow filter substrate coated with a washcoat composition as described herein. As seen in FIG. 3, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element. It may also be preferred that the substrate is coated with at least two layers contained in separate washcoat slurries in an axially zoned configuration. For example, the same substrate can be coated with a washcoat slurry of one layer and a washcoat slurry of another layer, wherein each layer is different. This may be more easily understood by reference to FIG. 4, which shows an embodiment in which the first washcoat zone 24 and the second washcoat zone 26 are located side by side along the length of the substrate 22. The first washcoat zone 24 of specific embodiments extends from the inlet end 25 of the substrate 22 through the range of about 5% to about 95% of the length of the substrate 22. The second washcoat zone 26 extends from the outlet 27 of the substrate 22 from about 5% to about 95% of the total axial length of the substrate 22. The catalyst compositions of at least two components within a treatment system as described in the current invention can be zoned onto the same substrate. Preferably, the oxidation catalyst component and the SCR catalyst are zoned onto the same substrate. For example, referring back to FIG. 4, the first washcoat zone 24 represents the oxidation catalyst component and extends from the inlet end 25 of the substrate through the range of about 5% to about 95% of the length of the substrate 22. Hence, the second washcoat zone 26 comprising the SCR catalyst is located side by side to zone 24 extending from the outlet 27 of the substrate 22. Alternatively, the first washcoat zone 24 can represent the SCR catalyst and the second washcoat zone 26 can comprise the oxidation catalyst component. The oxidation catalyst component and the SCR catalyst may also be zoned onto different substrates as defined in the foregoing and under paragraph III.

In describing the quantity of washcoat or catalytic metal components or other components of the composition, it is convenient to use units of weight of component per unit volume of catalyst substrate. Therefore, the units, grams per cubic inch ("g/in$^3$") and grams per cubic foot ("g/ft$^3$") are used herein to mean the weight of a component per volume of the substrate, including the volume of void spaces of the substrate, 1 g/ft$^3$ corresponding to 0.035 g/l and 1 g/in$^3$ corresponding to 61.0237441 g/l. Other units of weight per volume such as g/l are also sometimes used. It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Preferably, the total loading of the catalytic article (i.e., oxidation catalyst component and the SCR catalyst) on the catalyst substrate is from about 0.5 to about 6 g/in$^3$, more preferably from about 1 to about 5 g/in$^3$, more preferably from about 1 to about 3 g/in$^3$. The total loading of the active metal without support material (e.g., PGM component only) is preferably in the range from about 0.1 to about 200 g/ft$^3$, more preferably from about 0.1 to about 100 g/ft$^3$, more preferably about 1 to about 50 g/ft$^3$, more preferably from about 1 to about 30 g/ft$^3$, more preferably from about 5 to about 25 g/ft$^3$ for each layer.

Alternatively, the total loading of the active metal without support material (e.g., PGM component only) is preferably in the range of from 5 to 100 g/ft$^3$, preferably in the range of from 20 to 80 g/ft$^3$, more preferably in the range of from 30 to 70 g/ft$^3$, more preferably in the range of from 35 to 55 g/ft$^3$, more preferably in the range of from 40 to 50 g/ft$^3$.

Method of Making the Catalyst Composition

Preparation of the platinum group metal-impregnated porous support materials may comprise impregnating the porous support in particulate form with an active metal solution, such as a palladium and/or ruthenium precursor solution. The active metal can be impregnated into the same support particles or separate support particles using an incipient wetness technique. Preferably, the porous support is a metal oxide. More preferably, the porous support is a refractory metal oxide material.

Incipient wetness impregnation techniques, also called capillary impregnation or dry impregnation are commonly used for the synthesis of heterogeneous materials, i.e., catalysts. Preferably, a metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The concentration profile of the impregnated material depends on the mass transfer conditions within the pores during impregnation and drying.

The support particles are typically dried enough to absorb substantially all of the solution to form a moist solid. Aqueous solutions of water soluble compounds or complexes of the active metal (i.e., PGM component) are typically utilized, such as ruthenium chloride, ruthenium nitrate (e.g., Ru (NO) and salts thereof), hexaammine ruthenium chloride, or combinations thereof. An aqueous solution of water soluble compounds having palladium as the active metal comprises metal precursors such as palladium nitrate, palladium tetraamine, palladium acetate, or combinations thereof. Following treatment of the support particles with the active metal solution, the particles may be dried, such as by heat treating the particles at elevated temperature (e.g., 100-150° C.) fora period of time (e.g., 1-3 hours), and then calcined to convert the active metal to a more catalytically active form. An exemplary calcination process involves heat treatment in air at a temperature of about 400-550° C. for 10 min to 3 hours. The above process can be repeated as needed to reach the desired level of active metal impregnation. For example, the preparation of SCR catalysts comprising metal-promoted molecular sieves are disclosed in U.S. Pat. No. 9,480,976 to Rivas-Cardona et al.; U.S. Pat. No. 9,352,307 to Stiebels et al.; U.S. Pat. No. 9,321,009 to Wan et al.; U.S. Pat. No. 9,199,195 to Andersen et al.; U.S. Pat. No. 9,138,732 to Bull et al.; U.S. Pat. No. 9,011,807 to Mohanan et al.; U.S. Pat. No. 8,715,618 to Turkhan et al.; U.S. Pat. No. 8,293,182 to Boorse et al.; U.S. Pat. No. 8,119,088 to Boorse et al.; U.S. Pat. No. 8,101,146 to Fedeyko et al.; and U.S. Pat. No. 7,220,692 to Marshall et al. For example, the preparation of SCR catalysts comprising mixed metal oxides are disclosed in U.S. Pat. No. 4,518,710 to Brennan et al.; U.S. Pat. No. 5,137,855 to Hegedus et al.; U.S. Pat. No. 5,476,828 to Kapteijn et al.; U.S. Pat. No. 8,685,882 to Hong et al.; and U.S. Pat. No. 9,101,908 to Jurng et al.

Substrate Coating Process

The aforementioned catalyst composition may be prepared in the form of catalyst particles as noted above. These catalyst particles can be mixed with water to form a slurry for purposes of coating a catalyst substrate, such as a honeycomb-type substrate. In addition to the catalyst particles, the slurry may optionally contain a binder in the form of alumina, silica, Zr acetate, colloidal zirconia, or Zr hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1-5 weight-% of the total washcoat loading.

Addition of acidic or basic species to the slurry can be carried out to adjust the pH accordingly. For example, the pH of the slurry may be adjusted by the addition of ammonium hydroxide or aqueous nitric acid. A typical pH range for the slurry can be of about 3 to 6. The slurry can be milled to reduce the particle size and enhance particle mixing. The milling can be accomplished in a ball mill, continuous mill, or other similar equipment, and the solids content of the slurry may be, e.g., about 20-60 weight-%, more particularly about 20-40 weight-%. Preferably, the post-milling slurry is characterized by a D90 particle size of about 10 to about 40 microns, preferably 10 to about 30 microns, more preferably about 10 to about 15 microns. The D90 is determined using a dedicated particle size analyzer. The equipment was manufactured by Sympatec in 2010 and uses laser diffraction to measure particle sizes in small volume slurry (for example see Reference Example 1). The slurry is coated on the catalyst substrate using any washcoat technique known in the art. Preferably, the catalyst substrate is dipped one or more times in the slurry or otherwise coated with the slurry. Thereafter, the coated substrate is preferably dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied. The catalyst composition can be applied as a single layer or in multiple layers as noted above. The catalyst composition may be applied in a single layer (e.g., only layer 14 of FIG. 2). Or, the catalyst composition may be applied in multiple layers with each layer having a different composition as explained above.

Emission Treatment System

The present invention further relates to an emission treatment system that incorporates the catalytic article of the invention effective in the abatement of $NO_x$ and HC. The catalytic article of the present invention is typically used in an integrated emission treatment system comprising one or more additional components for the treatment of exhaust gas emissions, e.g., exhaust gas emissions from a diesel engine.

The present invention further relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises a catalytic article having an inlet end and an outlet end, wherein the catalytic article is according to the present invention and has a first layer and a second layer in a zoned configuration;

wherein the catalytic article is the first catalytic article of the exhaust gas treatment system downstream of the upstream end of the exhaust gas treatment system and wherein the inlet end of the catalytic article is arranged upstream of the outlet end of the catalytic article.

Preferably, the exhaust gas treatment system further comprises one or more of a diesel oxidation catalyst, a selective catalytic reduction catalyst, an ammonia oxidation catalyst located downstream of the catalytic article.

Preferably, the exhaust gas treatment system further comprises an ammonia oxidation catalyst located downstream of the catalytic article, wherein the ammonia oxidation catalyst has an inlet end and an outlet end, wherein the outlet end of the catalytic article is in fluid communication with the inlet end of the ammonia oxidation catalyst and wherein between the outlet end of the catalytic article and the inlet end of the ammonia oxidation catalyst, no catalyst for treating the exhaust gas exiting the second catalyst is located in the exhaust gas treatment system. More preferably, the ammonia oxidation catalyst is as defined in the present invention under paragraph III.

Preferably, the exhaust gas treatment system further comprises a particulate filter, wherein the particulate filter has an inlet end and an outlet end and is located downstream of the catalytic article, preferably wherein the outlet end of the catalytic article is in fluid communication with the inlet end of the particulate filter and wherein between the outlet end of the catalytic article and the inlet end of the particulate filter, no catalyst for treating the exhaust gas stream exiting the second catalyst is located in the exhaust gas treatment system. More preferably, the particulate filter is a catalyzed particulate filter. Alternatively, the particulate filter can be located downstream of the ammonia oxidation catalyst.

Preferably the exhaust gas treatment system further comprises an injector for injecting a fluid into the exhaust gas stream exiting the diesel engine, said injector being more preferably located upstream of the catalytic article and downstream of the upstream end of the exhaust gas treatment system. More preferably, the fluid is an aqueous urea solution.

One exemplary emission treatment system is illustrated in FIG. 5, which depicts a schematic representation of an emission treatment system 32. As shown, the emission treatment system can include a plurality of catalytic components in series downstream of an engine 32 with the catalytic article of the invention 38 always being the first catalytic component in any given series. FIG. 5 illustrates five catalytic components, in series; however, the total number of catalytic components can vary and five components is merely one example. Without limitation, Table 1 presents various exhaust gas treatment system configurations of one or more embodiments. It is noted that each catalytic component is connected to the next catalytic component via exhaust conduits such that the engine is upstream of catalytic component A, which is upstream of catalytic component B (when present), which is upstream of catalytic component C (when present), which is upstream of catalytic component D (when present), which is upstream of catalytic component E (when present). The reference to catalytic components A-E in the table can be cross-referenced with the same designations in FIG. 5. The configurations of Table 1 are exemplary only and other configurations can be used without departing from the invention.

The SCR catalyst noted in Table 1 can be any catalyst conventionally used to abate NOx present in engine exhaust and typically comprises a mixed metal oxide composition (e.g., vanadia/titania) or a metal ion-exchanged molecular sieve composition (e.g., Cu and/or Fe-promoted molecular sieve).

Reference to SCRoF (or SCR on filter) in Table 1 refers to a particulate or soot filter (e.g., a wall flow filter), which includes the conventionally SCR catalyst composition.

The DOC catalyst noted in Table 1 can be any catalyst conventionally used to combust unburned gaseous and non-volatile hydrocarbons (i.e., the SOF) and carbon monoxide to form carbon dioxide and water. The DOC catalysts in Table 1 typically comprise a platinum group metal supported on an oxygen storage component (e.g., ceria) and/or refractory metal oxide support (e.g., alumina).

Reference to AMOx in Table 1 refers to an ammonia oxidation catalyst, which is typically downstream of an SCR catalyst, used to remove any slipped ammonia from the exhaust gas treatment system. Said AMOx catalyst may comprise a PGM component. Preferably, the AMOx catalyst comprises a bottom coat with PGM and a top coat with SCR functionality.

The soot filter noted in Table 1 is designed to trap and burn soot. Often the soot filter is coated with a washcoat layer containing one or more catalysts for burning trapped soot and or oxidizing exhaust gas stream emissions. In general, the soot burning catalyst can be any known catalyst for combustion of soot. The soot burning catalyst can be, for example, an oxidation catalyst component comprising one or more precious group metal catalysts (e.g., platinum, palladium, and/or rhodium).

The various exhaust gas emission treatment systems in Table 1 may further include a reductant injector for ammonia precursor injection 50 and/or an injector for adding hydrocarbons 51 into the exhaust gas stream. The reductant injector 50 for introducing a nitrogenous reducing agent into the exhaust stream is located immediately upstream of the catalytic article 38, in certain embodiments, as shown in FIG. 5. Examples of such reductants include ammonia, hydrazine or any suitable ammonia precursor such as urea $((NH_2)_2CO)$, ammonium carbonate, ammonium carbamate, ammonium hydrogen carbonate or ammonium formate. The presence of ammonia or the ammonia precursor in the gas exhaust stream promotes the reduction of the $NO_x$ to $N_2$ and water as the gas is exposed to the catalyst composition of catalytic article 38. The reductant injector 50 can be located at any point upstream of an SCR catalyst article and not necessarily upstream of all catalytic articles as shown in said figure. The location of the reductant injector 50 will depend on the location of the SCR catalyst. Preferably, the HC injector 51 may also be introduced upstream of catalytic article 38. Preferably, the HC injector 51 is located upstream or downstream of injector 50, if present. The catalytic article 38 oxidizes the introduced hydrocarbons into the gas exhaust stream creating sufficient temperature to remove contaminates from the catalytic article and downstream components. Hydrocarbons may promote the release of contaminants from the catalytic article thereby restoring the catalytic activity of the catalytic article. Further, during the regeneration cycle de-sulfation and/or the removal of amine-containing (e.g., urea) deposits may occur. Hydrocarbons can be introduced into the gas exhaust stream directly from the engine. The engine management system controlling the engine can periodically provide direct addition of fuel to the engine exhaust gas stream. An optional second hydrogen injector may be added to exhaust gas engine treatment system configurations having a DOC catalytic component, wherein the optional second hydrocarbon injector is located immediately upstream of the DOC catalytic component. As recognized by one skilled in the art, in the configurations listed in Table 1, any one or more of components A, B, C, D, or E can be disposed on a particulate filter, such as a wall flow filter, or on a flow-through honeycomb substrate. An engine exhaust system can comprise one or more catalyst compositions mounted in a position near the engine (in a close-coupled position, CC), with additional catalyst compositions in a position underneath the vehicle body (in an underfloor position, UF). Preferably, component A (e.g., catalytic article of the invention) is in a closed coupled position, meaning that component A is the first catalyst of the engine exhaust gas treatment system, and the remaining components are UF.

TABLE 1

Exhaust gas treatment system

| Component A | Component B | Component C | Component D | Component E |
|---|---|---|---|---|
| Catalytic Article of the Invention | — | — | — | — |
| Catalytic Article of the Invention | SCR | AMOx | — | — |
| Catalytic Article of the Invention | SCR | AMOx | Soot Filter | — |
| Catalytic Article of the Invention | SCR | AMOx | DOC | Soot filter |
| Catalytic Article of the Invention | SCRoF | AMOx | DOC | — |
| Catalytic Article of the Invention | DOC | Soot filter | Optional SCR | Optional AMOx |
| Catalytic Article of the Invention | DOC | SCRoF | Optional AMOx | — |
| Catalytic Article of the Invention | AMOX | Soot Filter | — | — |
| DOC (preferably Pd) | Catalytic Article of the Invention | AMOX | Soot Filter | — |

II. Exhaust Gas Treatment System

Surprisingly, it was also found that the exhaust gas treatment system for treating an exhaust gas stream leaving a diesel engine according to the present invention and described in the following permits to be resistant to HC poisoning and prevents sulfating in order to maintain sufficient DeNOx to meet the environmental requirements while being cost effective and by avoiding engine measures such as to raise exhaust gas temperatures.

Therefore, the present invention further relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises palladium supported on an oxidic material comprising zirconium and further comprises one or more of a vanadium oxide and a zeolitic material comprising one or more of copper and iron; or a first catalyst having an inlet end and an outlet end and being a catalytic article according to the present invention;

(ii) a second catalyst having an inlet end and an outlet end and comprising a coating disposed on a substrate, wherein the coating comprises a platinum group metal supported on an oxidic material and further comprises one or more of a vanadium oxide, a tungsten oxide and a zeolitic material comprising one or more of copper and iron;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst.

Preferably, the outlet end of the first catalyst according to (i) is in fluid communication with the inlet end of the second catalyst according to (ii) and between the outlet end of the first catalyst according to (i) and the inlet end of the second catalyst according to (ii), no catalyst for treating the exhaust gas stream exiting the first catalyst is located in the exhaust gas treatment system.

Preferably, the first catalyst comprises a hydrocarbon (HC) oxidation component and a nitrogen oxide (NOx) reduction component.

With respect to the oxidic material comprised in the coating of the first catalyst, it is preferred that from 90 to 100 weight-%, more preferably from 95 to 100 weight-%, more preferably from 99 to 100 weight-% of the oxidic material comprised in the coating of the first catalyst consist of zirconium and oxygen, preferably of zirconia.

It is preferred that the coating of the first catalyst according to (i) comprises a zeolitic material comprising one or more of copper and iron.

In the context of the present invention, the term "zeolitic material" refers to a zeolitic material preferably having a framework structure type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, -EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof.

With respect to the zeolitic material comprised in the coating of the first catalyst, no specific restriction exists provided that the zeolitic material is suitable for the intended use of the first catalyst in the exhaust gas treatment system of the present invention. Preferred zeolitic materials are zeolitic materials having a framework structure of the type AEI, GME, CHA, MFI, BEA, FAU, MOR or mixtures of two or more thereof, preferably a framework structure of the type AEI, CHA, BEA or mixtures of two or more thereof. More preferably, the zeolitic material comprised in the coating of the first catalyst has a framework structure of the type CHA or AEI, more preferably a framework structure of the type CHA. Zeolitic materials having framework structure type CHA include, for example, zeolite SSZ-13 and zeolite SAPO-34 wherein SSZ-13 is preferred.

In the context of the present invention, it is preferred that the zeolitic material comprised in the coating of the first catalyst, more preferably which has a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

Preferably, the zeolitic material comprised in the coating of the first catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material. More preferably, the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material.

Preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

Preferably, the zeolitic material comprised in the coating of the first catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-% based on the total weight of the zeolitic material. More preferably, from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

Preferably, the coating of the first catalyst further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia. More preferably, the coating of the first catalyst comprises the metal oxide binder at a loading in the range of from 0.02 to 0.2 $g/in^3$, more preferably in the range of from 0.07 to 0.15 $g/in^3$.

According to the present invention, it is preferred that the coating of the first catalyst according to (i) comprises a vanadium oxide, wherein the vanadium oxide is preferably one or more of a vanadium (V) oxide and a vanadium (IV) oxide. Optionally, the vanadium oxide contains one or more of tungsten, iron and antimony.

Preferably, the vanadium oxide is supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

With regard to the substrate of the first catalyst according to (i), it is preferred that said substrate comprises, preferably consists of, a ceramic or metallic substance.

With regard to the substrate of the first catalyst comprising, preferably consisting of, a ceramic substrate, no specific restriction exists provided that the substrate is suitable for the intended use of the first catalyst comprised in the exhaust gas treatment system of the present invention. It is preferred that the ceramic substance comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

With regard to the substrate of the first catalyst comprising, preferably consisting of, a metallic substrate, no specific restriction exists provided that the substrate is suitable for the intended use of the first catalyst comprised in the exhaust gas treatment system of the present invention. It is preferred that the metallic substance comprises, more preferably consists of, oxygen and one or more of iron, chromium, and aluminum.

It is preferred that the substrate of the first catalyst according to (i) is a monolith, preferably a honeycomb monolith, more preferably a flow-through honeycomb monolith.

According to the present invention, it is preferred that the substrate of the first catalyst has a substrate length and the coating of the first catalyst is disposed on 20 to 100%, preferably on 50 to 100%, more preferably on 75 to 100%, more preferably on 95 to 100%, more preferably on 99 to 100% of the substrate length.

Generally, there is no restriction regarding the loading of palladium comprised in the coating of the first catalyst provided that the palladium loading is suitable for the intended use in the first catalyst in the exhaust gas treatment system. Preferably, the coating of the first catalyst comprises palladium at a loading in the range of from 0.035 to 2.82 g/l (1 to 80 g/ft$^3$), more preferably in the range of from 0.53 to 2.12 g/l (15 to 60 g/ft$^3$), more preferably in the range of from 0.71 to 1.77 g/l (20 to 50 g/ft$^3$), more preferably in the range of from 0.88 to 1.59 g/l (25 to 45 g/ft$^3$), more preferably in the range of from 0.88 to 1.24 g/l (25 to 35 g/ft$^3$).

As for the palladium loading, there is generally no restriction regarding the loading of the zeolitic material comprised in the coating of the first catalyst provided that the loading of the zeolitic material is suitable for the intended use in the first catalyst in the exhaust gas treatment system. Preferably, the coating of the first catalyst comprises the zeolitic material at a loading in the range of from 61.02 to 274.61 g/l (1.0 to 4.5 g/in$^3$), more preferably in the range of from 91.54 to 244.10 g/l (1.5 to 4.0 g/in$^3$), more preferably in the range of from 122.05 to 183.07 g/l (2.0 to 3.0 g/in$^3$), more preferably in the range of from 128.15 to 170.87 g/l (2.1 to 2.8 g/in$^3$), more preferably in the range of from 128.15 to 158.66 g/l (2.1 to 2.6 g/in$^3$).

Generally, there is no restriction regarding the loading of the vanadium oxide comprised in the coating of the first catalyst provided that the loading of the vanadium oxide is suitable for the intended use in the first catalyst in the exhaust gas treatment system. Preferably, the coating of the first catalyst comprises the vanadium oxide at a loading in the range of from 122.04 to 366.14 g/l (2.0 to 6.0 g/in$^3$), more preferably in the range of from 183.07 to 335.63 g/l (3.0 to 5.5 g/in$^3$), more preferably in the range of from 244.1 to 305.12 g/l (4.0 to 5.0 g/in$^3$).

According to the present invention, it is preferred that from 95 to 100 weight-%, more preferably from 98 to 100 weight-%, more preferably from 99 to 100 weight-%, more preferably from 99.5 to 100 weight-% of the coating of the first catalyst comprise, preferably consist of, palladium supported on an oxidic material wherein from 99 to 100 weight-% of said oxidic material consist of zirconium and oxygen, preferably of zirconia, a copper containing zeolitic material having a framework structure of the type CHA, and preferably a metal oxide binder as defined in the present invention.

Therefore, the present invention preferably relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises palladium supported on an oxidic material comprising zirconium and further comprises a zeolitic material comprising one or more of copper and iron, wherein from 95 to 100 weight-%, preferably from 98 to 100 weight-%, more preferably from 99 to 100 weight-%, more preferably from 99.5 to 100 weight-% of the coating of the first catalyst comprise, preferably consist of, palladium supported on an oxidic material wherein from 99 to 100 weight-% of said oxidic material consist of zirconium and oxygen, preferably of zirconia, a copper containing zeolitic material having a framework structure of the type CHA, and preferably a metal oxide binder as defined in the present invention;

(ii) a second catalyst having an inlet end and an outlet end and comprising a coating disposed on a substrate, wherein the coating comprises a platinum group metal supported on an oxidic material and further comprises one or more of a vanadium oxide, a tungsten oxide and a zeolitic material comprising one or more of copper and iron;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst.

According to the present invention, it is preferred that from 95 to 100 weight-%, more preferably from 98 to 100 weight-%, more preferably from 99 to 100 weight-%, more preferably from 99.5 to 100 weight-% of the coating of the first catalyst comprise, preferably consist of, palladium supported on an oxidic material wherein from 99 to 100 weight-% of said oxidic material consist of zirconium and oxygen, preferably of zirconia, and a vanadium oxide supported on titania, wherein titania optionally contains one or more of tungsten and silicon.

Therefore, the present invention preferably relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises palladium supported on an oxidic material comprising zirconium and further comprises a vanadium oxide wherein from 95 to 100 weight-%, preferably from 98 to 100 weight-%, more preferably from 99 to 100 weight-%, more preferably from 99.5 to 100 weight-% of the coating of the first catalyst comprise, preferably consist of, palladium supported on an oxidic material wherein from 99 to 100 weight-% of said oxidic material consist of zirconium and oxygen, preferably of zirconia, and a vanadium oxide supported on titania, wherein titania optionally contains one or more of tungsten and silicon;

(ii) a second catalyst having an inlet end and an outlet end and comprising a coating disposed on a substrate, wherein the coating comprises a platinum group metal supported on an oxidic material and further comprises one or more of a vanadium oxide, a tungsten oxide and a zeolitic material comprising one or more of copper and iron;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst.

According to the present invention, it is preferred that the first catalyst according to (i) has a selective catalytic reduction (SCR) component and a diesel oxidation component.

Preferably from 0 to 0.0035 g/l, more preferably from 0 to 0.00035 g/l, more preferably from 0 to 0.000035 g/l of one or more of platinum, iridium, osmium and rhodium are comprised in the coating of the first catalyst, wherein more preferably, from 0 to 0.000035 g/l of platinum, iridium, osmium and rhodium are comprised in the coating of the first catalyst.

Preferably, the coating of the first catalyst is free of platinum, more preferably free of platinum and rhodium, more preferably free of platinum, rhodium, iridium and osmium.

Preferably from 0 to 2 weight-%, more preferably from 0 to 1 weight-%, more preferably from 0 to 0.1 weight-% of the oxidic material supporting palladium comprised in the coating of the first catalyst consist of ceria and alumina, wherein more preferably from 0 to 0.1 weight-% of the oxidic material comprised in the coating of the first catalyst consists of ceria, alumina, titania, lanthana and baria.

Preferably, the oxidic material supporting palladium comprised in the coating of the first catalyst is free of ceria and alumina, more preferably free of ceria, alumina and titania, more preferably free of ceria, alumina, titania, lanthana and baria.

With respect to the first catalyst, it is alternatively preferred that the first catalyst is a catalytic article according to the present invention and as defined under paragraph I. More preferably, the first catalyst comprises a single layer or a first (top or under) layer and a second (top or under) layer.

With respect to the first catalyst, it is alternatively preferred that the first catalyst is the second catalyst according to (ii) as defined under paragraph III.

According to the present invention, it is preferred that the second catalyst according to (ii) comprises a nitrogen oxide (NOx) reduction component and an ammonia oxidation component.

It is preferred that the second catalyst according to (ii) is an ammonia oxidation (AMOX) catalyst.

Preferably, the coating of the second catalyst according to (ii) comprises a zeolitic material comprising one or more of copper and iron.

With respect to the zeolitic material comprised in the coating of the second catalyst, no specific restriction exists provided that said zeolitic material is suitable for the intended use of the second catalyst in the exhaust gas treatment system of the present invention. Generally, the zeolitic material comprised in the coating of the second catalyst nay have a framework structure of the type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, WEN, YUG, ZON, mixtures of two or more thereof, and mixed types of two or more thereof. Preferably, the zeolitic material comprised in the coating of the second catalyst has a framework structure of the type AEI, GME, CHA, MFI, BEA, FAU, MOR or mixtures of two or more thereof, more preferably a framework structure of the type AEI, CHA, BEA or mixtures of two or more thereof, more preferably a framework structure of the type CHA or AEI, more preferably a framework structure of the type CHA. Zeolitic materials having framework structure type CHA include, for example, zeolite SSZ-13 and zeolite SAPO-34 wherein SSZ-13 is preferred.

In the context of the present invention, it is preferred that the zeolitic material comprised in the coating of the second catalyst, more preferably which has a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

Preferably, the zeolitic material comprised in the coating of the second catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material. More preferably, the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material.

Preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 40:1, more preferably in the range of from 10:1 to 40:1, more preferably in the range of from 20:1 to 35:1.

Preferably, the zeolitic material comprised in the coating of the second catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material. More preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 40:1, more preferably in the range of from 10:1 to 40:1, more preferably in the range of from 20:1 to 35:1.

Preferably, the coating of the second catalyst further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia. More preferably, the coating of the second catalyst comprises the metal oxide binder at a loading in the range of from 1.22 to 12.20 g/l (0.02 to 0.2 g/in$^3$), more preferably in the range of from 4.27 to 9.15 g/l (0.07 to 0.15 g/in$^3$).

It is preferred that the platinum group metal comprised in the coating of the second catalyst is one or more of platinum, palladium and rhodium, preferably one or more of platinum and palladium.

Preferably, the platinum group metal comprised in the coating of the second catalyst is a mixture of platinum and palladium. More preferably, the weight ratio of platinum: palladium, calculated as elemental platinum and elemental palladium, comprised in the coating of the second catalyst, is in the range of from 1:1 to 30:1, more preferably in the range of from 5:1 to 20:1, more preferably in the range of from 8:1 to 12:1, more preferably in the range of from 9:1 to 11:1.

Alternatively, the platinum group metal comprised in the coating of the second catalyst is platinum.

According to the present invention, it is preferred that the oxidic material supporting the platinum group metal comprised in the coating of the second catalyst comprises, preferably consists of, one or more of alumina, zirconia, silica, titania and ceria, preferably one or more of alumina, silica and zirconia, more preferably one or more of zirconia and alumina.

Preferably from 20 to 100 weight-%, more preferably from 40 to 100 weight-%, more preferably from 60 to 100 weight-%, more preferably from 70 to 90 weight-%, more preferably from 75 to 85 weight-% of the oxidic material supporting the platinum group metal comprised in the coating of the second catalyst consist of alumina.

According to the present invention, it is preferred that the coating of the second catalyst according to (ii) comprises a vanadium oxide, wherein the vanadium oxide is preferably one or more of a vanadium (V) oxide and a vanadium (IV) oxide. Optionally, the vanadium oxide contains one or more of tungsten, iron and antimony.

Preferably, the vanadium oxide is supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon.

It is preferred that the coating of the second catalyst comprises a tungsten oxide, wherein the tungsten oxide is preferably a tungsten trioxide, wherein the tungsten oxide optionally contains one or more of iron and antimony. Preferably, the tungsten oxide is supported on an oxidic material comprising one or more of titanium and zirconium, more preferably an oxidic material comprising one or more of titania and zirconia, more preferably on titania.

It is preferred that the coating of the second catalyst comprises a vanadium oxide and a tungsten oxide, wherein the tungsten oxide is a tungsten trioxide, wherein the vanadium oxide is preferably supported on an oxidic material comprising one or more of titanium, silicon and zirconium, preferably an oxidic material comprising one or more of titanium and silicon, more preferably an oxidic material comprising one or more of titania and zirconia, more preferably on titania, wherein titania optionally contains one or more of tungsten and silicon, and the tungsten oxide is preferably supported on an oxidic material comprising one or more of titanium and zirconium, more preferably an oxidic material comprising one or more of titania and zirconia, more preferably on titania.

With respect to the substrate of the second catalyst, it is preferred that said substrate comprises, more preferably consists of, a ceramic or metallic substance.

With regard to the substrate of the second catalyst comprising, preferably consisting of, a ceramic substrate, no specific restriction exists provided that the substrate is suitable for the intended use of the second catalyst comprised in the exhaust gas treatment system of the present invention. It is preferred that the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

With regard to the substrate of the second catalyst comprising, preferably consisting of, a metallic substrate, no specific restriction exists provided that the substrate is suitable for the intended use of the second catalyst comprised in the exhaust gas treatment system of the present invention. It is preferred that the metallic substance preferably comprises, more preferably consists of, oxygen and one or more of iron, chromium, and aluminum.

It is preferred that the substrate of the second catalyst is a monolith, preferably a honeycomb monolith, more preferably a flow-through honeycomb monolith.

Preferably, the substrate of the second catalyst has a substrate length and the coating of the second catalyst is disposed on 20 to 100%, preferably on 50 to 100%, more preferably on 75 to 100%, more preferably on 95 to 100%, more preferably on 99 to 100% of the substrate length.

Generally, there is no specific restriction regarding the loading of the platinum group metal comprised in the coating of the second catalyst provided that said loading is suitable for the intended use of the second catalyst in the exhaust gas treatment system of the present invention. Preferably, the platinum group metal, calculated as elemental platinum group metal, at a loading in the range of from 0.035 to 0.53 g/l (1 to 15 g/ft$^3$), more preferably in the range of from 0.11 to 0.35 g/l (3 to 10 g/ft$^3$), more preferably in the range of from 0.16 to 0.32 g/l (4.5 to 9.0 g/ft$^3$), more preferably in the range of from 0.26 to 0.30 g/l (7.5 to 8.5 g/ft$^3$).

Generally, there is no specific restriction regarding the loading of the zeolitic material comprised in the coating of the second catalyst provided that said loading is suitable for the intended use of the second catalyst in the exhaust gas treatment system of the present invention. Preferably, the coating of the second catalyst comprises the zeolitic material at a loading in the range of from 30.51 to 335.63 g/l (0.5 to 5.5 g/in$^3$), more preferably in the range of from 91.54 to 305.12 g/l (1.5 to 5.0 g/in$^3$), more preferably in the range of from 122.05 to 244.09 g/l (2.0 to 4.0 g/in$^3$), more preferably in the range of from 122.05 to 213.58 g/l (2.0 to 3.5 g/in$^3$).

According to the present invention, no specific restriction exists regarding the loading of the vanadium oxide comprised in the coating of the second catalyst provided that said loading is suitable for the intended use of the second catalyst in the exhaust gas treatment system of the present invention. Preferably, the coating of the second catalyst comprises one or more of a vanadium oxide and a tungsten oxide at a loading in the range of from 122.04 to 366.14 g/l (2.0 to 6.0 g/in$^3$), more preferably in the range of from 183.07 to 335.63 g/l (3.0 to 5.5 g/in$^3$), more preferably in the range of from 244.1 to 305.12 g/l (4.0 to 5.0 g/in$^3$).

According to the present invention, it is preferred that the coating of the second catalyst comprises, preferably consists of, a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, on an oxidic material comprising a mixture of zirconia and alumina, a zeolitic material having a framework structure of the type CHA and comprising copper, and preferably a metal oxide binder as defined in the present invention. More preferably, from 95 to 100 weight-%, more preferably from 98 to 100 weight-%, more preferably from 99 to 100 weight-%, more preferably from 99.5 to 100 weight-% of the coating of the second catalyst comprise a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina, a zeolitic material having a framework structure of the type CHA and comprising copper, and preferably a metal oxide binder as defined in the present invention.

According to the present invention, the coating of the first catalyst comprises, preferably consists of, palladium supported on an oxidic material comprising zirconium, preferably consisting of zirconium and oxygen, more preferably zirconia, a zeolitic material having a framework structure of the type CHA and comprising copper, and preferably a metal oxide binder as defined in the present invention; and the coating of the second catalyst comprises, preferably consists of, a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina, a zeolitic material having a framework structure of the type CHA and comprising copper, and preferably a metal oxide binder as defined in the present invention.

Therefore, the present invention preferably relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises, preferably consists of, palladium supported on an oxidic material comprising zirconium, preferably consisting of zirconium and oxygen, more preferably zirconia, a zeolitic material having a framework structure of the type CHA and comprising copper, and preferably a metal oxide binder as defined in the present invention;

(ii) a second catalyst having an inlet end and an outlet end and comprising a coating disposed on a substrate, wherein the coating comprises, preferably consists of, a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina, a zeolitic material having a framework structure of the type CHA and comprising copper, and preferably a metal oxide binder as defined in the present invention;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst.

More preferably from 95 to 100 weight-%, more preferably from 98 to 100 weight-%, more preferably from 99 to 100 weight-%, more preferably from 99.5 to 100 weight-% of the coating of the first catalyst comprises palladium supported on an oxidic material consisting of zirconia, a zeolitic material having a framework structure type CHA comprising copper, and preferably a metal oxide binder as defined in the present invention; and wherein from 95 to 100 weight-%, preferably from 98 to 100 weight-%, more preferably from 99 to 100 weight-%, more preferably from 99.5 to 100 weight-% of the coating of the second catalyst comprises a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina, a zeolitic material having a framework structure of the type CHA and comprising copper, and preferably a metal oxide binder as defined in the present invention.

Alternatively, it is preferred that the coating of the first catalyst comprises, preferably consists of, palladium supported on an oxidic material comprising zirconium, preferably consisting of zirconium 5 and oxygen, more preferably zirconia, and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, wherein titania optionally contains one or more of tungsten and silicon; and that the coating of the second catalyst comprises, preferably consists of, a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina, a zeolitic material having a framework structure of the type CHA and comprising copper, and preferably a metal oxide binder as defined in the present invention.

Therefore, the present invention preferably relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises, preferably consists of, palladium supported on an oxidic material comprising zirconium, preferably consisting of zirconium and oxygen, more preferably zirconia, and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, wherein titania optionally contains one or more of tungsten and silicon;

(ii) a second catalyst having an inlet end and an outlet end and comprising a coating disposed on a substrate, wherein the coating comprises, preferably consists of, a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina, a zeolitic material having a framework structure of the type CHA and comprising copper, and preferably a metal oxide binder as defined in the present invention;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst.

More preferably from 95 to 100 weight-%, more preferably from 98 to 100 weight-%, more preferably from 99 to 100 weight-%, more preferably from 99.5 to 100 weight-% of the coating of the first catalyst comprises, preferably consists of, palladium supported on an oxidic material consisting of zirconia and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, wherein titania optionally contains one or more of tungsten and silicon; and from 95 to 100 weight-%, preferably from 98 to 100 weight-%, more preferably from 99 to 100 weight-%, more preferably from 99.5 to 100 weight-% of the coating of the second catalyst comprises a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina, a zeolitic material having a framework structure of the type CHA and comprising copper, and preferably a metal oxide binder as defined in the present invention.

Alternatively, it is preferred that the coating of the second catalyst comprises, preferably consists of, platinum supported on an oxidic material comprising a mixture of zirconia and alumina, a zeolitic material having a framework structure of the type CHA and comprising copper, and preferably a metal oxide binder as defined in the present invention. More preferably, from 95 to 100 weight-%, preferably from 98 to 100 weight-%, more preferably from 99 to 100 weight-%, more preferably from 99.5 to 100 weight-% of the coating of the second catalyst comprise platinum supported on an oxidic material comprising a mixture of zirconia and alumina, a zeolitic material having a framework structure of the type CHA and comprising copper, and preferably a metal oxide binder as defined in the present invention.

According to the present invention, it is preferred that the coating of the first catalyst comprises, preferably consists of, palladium supported on an oxidic material comprising zirconium, preferably consisting of zirconia, and a zeolitic material having a framework structure of the type CHA and comprising copper, and preferably a metal oxide binder as defined in the present invention; and that the coating of the second catalyst comprises, preferably consists of, platinum supported on an oxidic material comprising a mixture of zirconia and alumina, a zeolitic material having a framework structure of the type CHA and comprising copper, and preferably a metal oxide binder as defined in the present invention.

Therefore, the present invention preferably relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises, preferably consists of, palladium supported on an oxidic material comprising zirconium, preferably consisting of zirconium and oxygen, more preferably zirconia, a zeolitic material having a framework structure of the type CHA and comprising copper, and preferably a metal oxide binder as defined in the present invention;

(ii) a second catalyst having an inlet end and an outlet end and comprising a coating disposed on a substrate, wherein the coating comprises, preferably consists of, platinum supported on an oxidic material comprising a mixture of zirconia and alumina, a zeolitic material having a framework structure of the type CHA and comprising copper, and preferably a metal oxide binder as defined in the present invention;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst; wherein in the exhaust gas treatment system, the second catalyst according to (ii) is located downstream of the first catalyst according to (i) and wherein the inlet end of the second catalyst is arranged upstream of the outlet end of the second catalyst.

More preferably from 95 to 100 weight-%, more preferably from 98 to 100 weight-%, more preferably from 99 to 100 weight-%, more preferably from 99.5 to 100 weight-% of the coating of the first catalyst comprises palladium supported on an oxidic material consisting of zirconia and a zeolitic material having a framework structure type CHA and comprising copper, and preferably a metal oxide binder as defined in the present invention; and from 95 to 100 weight-%, preferably from 98 to 100 weight-%, more preferably from 99 to 100 weight-%, more preferably from 99.5 to 100 weight-% of the coating of the second catalyst comprises platinum supported on an oxidic material comprising a mixture of zirconia and alumina, a zeolitic material having a framework structure of the type CHA and comprising copper, and preferably a metal oxide binder as defined in the present invention.

Alternatively, it is preferred that the coating of the first catalyst comprises, preferably consists of, palladium supported on an oxidic material comprising zirconium, preferably consisting of zirconium and oxygen, more preferably zirconia, and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, wherein titania optionally contains tungsten and silicon; and that the coating of the second catalyst comprises, preferably consists of, platinum supported on an oxidic material comprising a mixture of zirconia and alumina and a zeolitic material having a framework structure of the type CHA and comprising copper, and preferably a metal oxide binder as defined in the present invention.

Therefore, the present invention further relates to an exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises, preferably consists of, palladium supported on an oxidic material comprising zirconium, preferably consisting of zirconium and oxygen, more preferably zirconia, and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, wherein titania optionally contains tungsten and silicon;

(ii) a second catalyst having an inlet end and an outlet end and comprising a coating disposed on a substrate, wherein the coating comprises, preferably consists of, platinum supported on an oxidic material comprising a mixture of zirconia and alumina, a zeolitic material having a framework structure of the type CHA and comprising copper, and preferably a metal oxide binder as defined in the present invention;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst.

More preferably from 95 to 100 weight-%, more preferably from 98 to 100 weight-%, more preferably from 99 to 100 weight-%, more preferably from 99.5 to 100 weight-% of the coating of the first catalyst comprises palladium supported on an oxidic material consisting of zirconia and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony; and from 95 to 100 weight-%, preferably from 98 to 100 weight-%, more preferably from 99 to 100 weight-%, more preferably from 99.5 to 100 weight-% of the coating of the second catalyst comprises platinum supported on an oxidic material comprising a mixture of zirconia and alumina, a zeolitic material having a framework structure of the type CHA and comprising copper, and preferably a metal oxide binder as defined in the present invention.

According to the present invention, it is preferred that the substrate of the first catalyst comprises, preferably consists of, a cordierite and the substrate of the second catalyst comprises, preferably consists of, a cordierite.

Preferably, the substrate of the first catalyst on which substrate the coating of the first catalyst is disposed, is a first substrate and the substrate of the second catalyst on which substrate the coating of the second catalyst is disposed, is a second substrate, wherein the first substrate and the second substrate are different from each other.

With respect to the size (length and width) of the substrates of the first catalyst and of the second catalyst, no specific restriction exists provided that each substrate is suitable for the intended used of the first catalyst and of the second catalyst, respectively, comprised in the exhaust gas treatment system of the present invention.

Preferably, the substrate of the first catalyst has a substrate length in the range of from 2.54 to 25.4 cm (1 to 10 inches), preferably in the range of from 5.08 to 20.32 cm (2 to 8 inches), more preferably in the range of from 10.16 to 19.05 cm (4 to 7.5 inches), more preferably in the range of from 12.7 to 17.78 cm (5 to 7 inches).

Preferably, the substrate of the second catalyst has a substrate length in the range of from 2.54 to 25.4 cm (1 to 10 inches), more preferably in the range of from 3.81 to 17.78 cm (1.5 to 7 inches), more preferably in the range of from 5.08 to 12.7 cm (2 to 5 inches), more preferably in the range of from 5.08 to 10.16 cm (2 to 4 inches). More preferably, the substrate of the first catalyst has a substrate length in the range of from 12.7 to 17.78 cm (5 to 7 inches) and the substrate of the second catalyst has a substrate length in the range of from 5.08 to 10.16 cm (2 to 4 inches).

Preferably, the length of the first substrate is greater than the length of the second substrate, wherein the ratio of the length of the first substrate relative to the length of the second substrate is preferably in the range of from 1.1:1 to 4:1, more preferably in the range of from 1.5:1 to 3.5:1, more preferably in the range of from 1.9:1 to 2.1:1.

Preferably, the substrate of the first catalyst has a substrate width in the range of from 10.16 to 43.18 cm (4 to 17 inches), preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches).

Preferably, the substrate of the second catalyst has a substrate width in the range of from 10.16 to 43.18 cm (4 to 17 inches), more preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches). More preferably, the substrate of the first catalyst has a substrate width in the range of from 22.86 to 33.02 cm (9 to 13 inches), more preferably in the range of from 22.86 to 27.94 cm (9 to 11 inches) and the substrate of the second catalyst has a substrate width in the range of from 22.86 to 33.02 cm (9 to 13 inches), more preferably in the range of from 22.86 to 27.94 cm (9 to 11 inches).

According to the present invention, it may be preferred that the substrate of the first catalyst, on which substrate the coating of the first catalyst is disposed, and the substrate of the second catalyst, on which substrate the coating of the second catalyst is disposed, together form a single substrate, wherein said single substrate comprises an inlet end and an outlet end, wherein the inlet end is arranged upstream of the outlet end, and the coating of the first catalyst is disposed on said single substrate from the inlet end towards the outlet end of said single substrate and the coating of the second catalyst is disposed on said single substrate from the outlet end towards the inlet end of said single substrate, wherein the coating of the first catalyst covers from 25 to 75% of the substrate length and the coating of the second catalyst covers from 25 to 75% of the substrate length. More preferably, the coating of the first catalyst covers from 25 to 70%, preferably from 35 to 65%, more preferably from 45 to 55%, of the substrate length and the coating of the second catalyst covers from 25 to 70%, preferably from 35 to 65%, more preferably on from 45 to 55% of the substrate length. Alternatively, more preferably, the coating of the first catalyst covers from 50 to 75%, preferably from 69 to 75% of the substrate length and the coating of the second catalyst covers from 25 to 50%, preferably from 25 to 31% of the substrate length.

Preferably, the coating of the first catalyst and the coating of the second catalyst overlap. As an alternative, it is preferred that there is a gap between the coating of the first catalyst and the coating of the second catalyst.

According to the present invention, the first catalyst preferably comprises no further coating. Preferably, the first catalyst consists of a coating disposed on a substrate.

According to the present invention, it is preferred that the second catalyst comprises no further coating. Preferably, the second catalyst consists of a coating disposed on a substrate. More preferably, the first catalyst consists of a coating disposed on a substrate and the second catalyst consists of a coating disposed on a substrate.

According to the present invention, it is preferred that the exhaust gas treatment system further comprises an injector for injecting a fluid into the exhaust gas stream exiting the diesel engine, said injector being located upstream of the first catalyst and downstream of the upstream end of the exhaust gas treatment system. More preferably, the fluid is a urea solution, more preferably an aqueous urea solution.

According to the present invention, it is preferred that the exhaust gas treatment system further comprises one or more of a diesel oxidation catalyst, a nitrogen oxides reduction catalyst and an ammonia oxidation catalyst located downstream of the second catalyst according to (ii).

Preferably, the exhaust gas treatment system further comprises a diesel oxidation catalyst and a particulate filter, preferably a catalyzed particulate filter, wherein the diesel oxidation catalyst has an inlet end and an outlet end and is located downstream of the second catalyst according to (ii) and the particulate filter is located downstream of the diesel oxidation catalyst towards the downstream end of the exhaust gas treatment system. More preferably, the outlet end of the second catalyst according to (ii) is in fluid communication with the inlet end of the diesel oxidation catalyst and between the outlet end of the second catalyst according to (Ii) and the inlet end of the diesel oxidation catalyst, no catalyst for treating the exhaust gas stream exiting the second catalyst is located in the exhaust gas treatment system.

Alternatively, it is preferred that the exhaust gas treatment system further comprises a particulate filter, wherein the particulate filter has an inlet end and an outlet end and is located downstream of the second catalyst according to (ii), preferably wherein the outlet end of the second catalyst according to (ii) is in fluid communication with the inlet end of the particulate filter and between the outlet end of the second catalyst according to (ii) and the inlet end of the particulate filter, no catalyst for treating the exhaust gas stream exiting the second catalyst is located in the exhaust gas treatment system. More preferably, the particulate filter is a catalyzed particulate filter.

The present invention further relates to a method for the simultaneous selective catalytic reduction of NOx, the oxidation of a hydrocarbon, the oxidation of nitrogen monoxide and the oxidation of ammonia, comprising (1) providing an exhaust gas stream from a diesel engine comprising one or more of NOx, ammonia, nitrogen monoxide and a hydrocarbon;

(2) passing the exhaust gas stream provided in (1) through the exhaust gas system according to the present invention.

The present invention further relates to a catalyst for the selective catalytic reduction of NOx and for the oxidation of a hydrocarbon, comprising a coating disposed on a substrate, wherein the coating comprises palladium supported on an oxidic material comprising zirconium, and further comprises one or more of a vanadium oxide and a zeolitic material comprising one or more of copper and iron, wherein from 0 to 2 weight-% of the oxidic material consist of ceria and alumina.

Preferably, the catalyst comprises a hydrocarbon (HC) oxidation component and a nitrogen (NOx) reduction component.

Preferably from 90 to 100 weight-%, more preferably from 95 to 100 weight-%, more preferably from 99 to 100 weight-% of the oxidic material comprised in the coating consist of zirconium and oxygen, preferably of zirconia.

According to the present invention, the coating preferably comprises a zeolitic material comprising one or more of copper and iron.

With respect to the zeolitic material comprised in the coating of the catalyst of the present invention, no specific restriction exists provided that said zeolitic material is suitable for the intended use of the catalyst of the present invention. Generally, the zeolitic material comprised in the coating of the second catalyst nay have a framework structure of the type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, -EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof. Preferably, the zeolitic material comprised in the coating has a framework structure of the type AEI, GME, CHA, MFI, BEA, FAU, MOR or mixtures of two or more thereof, more preferably a framework structure of the type AEI, CHA, BEA or mixtures of two or more thereof, more preferably a framework of the type CHA or AEI, more preferably a framework structure of the type CHA. Zeolitic materials having framework structure type CHA include, for example, zeolite SSZ-13 and zeolite SAPO-34 wherein SSZ-13 is preferred.

In the context of the present invention, it is preferred that the zeolitic material comprised in the coating of the catalyst, more preferably which has a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

Preferably, the zeolitic material comprised in the coating comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material. More preferably, the amount of iron comprised in the zeolitic material, calculated as $Fe_2O_3$, is in the range of from 0 to 0.01 weight-%, preferably in the range of from 0 to 0.001 weight-%, more preferably in the range of from 0 to 0.0001 weight-%, based on the total weight of the zeolitic material.

Preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

Preferably, the zeolitic material comprised in the coating comprises iron, wherein the amount of iron comprised in the zeolitic material, calculated as $Fe_2O_3$, is preferably in the range of from 0.1 to 10.0 weight-%, more preferably in the range of from 2.0 to 7.0 weight-%, more preferably in the range of from 2.5 to 5.5 weight-% based on the total weight of the zeolitic material, and preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

Preferably, the coating of the catalyst further comprises a metal oxide binder, wherein the metal oxide binder more preferably comprises one or more of zirconia, alumina, titania, silica, and a mixed oxide comprising two or more of Zr, Al, Ti, and Si, more preferably comprises one or more of alumina and zirconia, more preferably comprises zirconia. More preferably, the coating of the catalyst comprises the metal oxide binder at a loading in the range of from 1.22 to 12.20 g/l (0.02 to 0.2 g/in$^3$), more preferably in the range of from 4.27 to 9.15 g/l (0.07 to 0.15 g/in$^3$).

According to the present invention, it is preferred that the coating comprises a vanadium oxide, wherein the vanadium oxide is preferably one or more of a vanadium (V) oxide and a vanadium (IV) oxide. Optionally, the vanadium oxide contains one or more of tungsten, iron and antimony.

Preferably, the vanadium oxide is supported on an oxidic material comprising one or more of titanium, silicon, and zirconium, preferably an oxidic material comprising one or more of titanium and silicon, more preferably an oxidic material comprising one or more of titania and silica, more preferably on titania, wherein titania optionally contains one or more of tungsten and silicon.

With respect to the substrate of the catalyst of the present invention, it is preferred that said substrate comprises, preferably consists of, a ceramic or metallic substance.

With regard to the substrate of the catalyst comprising, preferably consisting of, a ceramic substrate, no specific restriction exists provided that the substrate is suitable for the intended use of the catalyst of the present invention. It is preferred that the ceramic substance comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

With regard to the substrate of the catalyst comprising, preferably consisting of, a metallic substrate, no specific restriction exists provided that the substrate is suitable for the intended use of the catalyst of the present invention. It is preferred that the metallic substance comprises, more preferably consists of, one or more of iron, chromium, aluminum and oxygen.

It is preferred that the substrate is a monolith, preferably a honeycomb monolith, more preferably a flow-through honeycomb monolith.

According to the present invention, it is preferred that the substrate of the catalyst has a substrate length and the coating is disposed on 20 to 100%, more preferably on 50 to 100%, more preferably on 75 to 100%, more preferably on 95 to 100%, more preferably on 99 to 100% of the substrate length.

With respect to the loading of palladium comprised in the coating of the catalyst of the present invention, no specific restriction exists provided that said loading is suitable for the intended use of the catalyst of the present invention. Preferably, the coating comprises palladium at a loading in the range of from 0.035 to 2.82 g/l (1 to 80 g/ft$^3$), more preferably in the range of from 0.53 to 2.12 g/l (15 to 60 g/ft$^3$), more preferably in the range of from 0.71 to 1.77 g/l (20 to 50 g/ft$^3$), more preferably in the range of from 0.88 to 1.59 g/l (25 to 45 g/ft$^3$), more preferably in the range of from 0.88 to 1.24 g/l (25 to 35 g/ft$^3$).

With respect to the loading of the zeolitic material comprised in the coating of the catalyst of the present invention, no specific restriction exists provided that said loading is suitable for the intended use of the catalyst of the present invention. It is preferred that the coating comprises the zeolitic material at a loading in the range of from 61.02 to 274.61 g/l (1.0 to 4.5 g/in$^3$), more preferably in the range of from 91.54 to 244.10 g/l (1.5 to 4.0 g/in$^3$), more preferably in the range of from 122.05 to 183.07 g/l (2.0 to 3.0 g/in$^3$), more preferably in the range of from 128.15 to 170.87 g/l (2.1 to 2.8 g/in$^3$), more preferably in the range of from 128.15 to 158.66 g/l (2.1 to 2.6 g/in$^3$).

With respect to the loading of the vanadium oxide comprised in the coating of the catalyst of the present invention, no specific restriction exists provided that said loading is suitable for the intended use of the catalyst of the present invention. It is preferred that the coating comprises the vanadium oxide at a loading in the range of from 122.04 to 366.14 g/l (2.0 to 6.0 g/in$^3$), more preferably in the range of from 183.07 to 335.63 g/l (3.0 to 5.5 g/in$^3$), more preferably in the range of from 244.1 to 305.12 g/l (4.0 to 5.0 g/in$^3$).

According to the present invention, it is preferred that from 95 to 100 weight-%, more preferably from 98 to 100 weight-%, more preferably from 99 to 100 weight-%, more preferably from 99.5 to 100 weight-% of the coating consist of palladium supported on an oxidic material, wherein from 99 to 100 weight-% of said oxidic material consist of zirconium and oxygen, preferably of zirconia, a copper containing zeolitic material having a framework structure of the type CHA, and preferably a metal oxide binder as defined in the present invention.

Therefore, the present invention preferably relates to a catalyst for the selective catalytic reduction of NOx and for the oxidation of a hydrocarbon, comprising a coating disposed on a substrate, wherein the coating comprises palladium supported on an oxidic material comprising zirconium, and further comprises a zeolitic material comprising one or more of copper and iron, and preferably a metal oxide binder as defined in the present invention;

wherein from 0 to 2 weight-% of the oxidic material consist of ceria and alumina; wherein from 95 to 100 weight-%, more preferably from 98 to 100 weight-%, more preferably from 99 to 100 weight-%, more preferably from 99.5 to 100 weight-% of the coating consist of palladium supported on an oxidic material, wherein from 99 to 100 weight-% of said oxidic material consist of zirconium and oxygen, more preferably of zirconia, a copper containing zeolitic material having a framework structure of the type CHA, and preferably a metal oxide binder as defined in the present invention.

Alternatively, it is preferred that from 95 to 100 weight-%, more preferably from 98 to 100 weight-%, more preferably from 99 to 100 weight-%, more preferably from 99.5 to 100 weight-% of the coating comprise, preferably consist of, palladium supported on an oxidic material, wherein from 99 to 100 weight-% of said oxidic material consist of zirconium and oxygen, preferably of zirconia, and a vanadium oxide supported on titania, wherein titania optionally contains one or more of tungsten and silicon.

Therefore, the present invention preferably relates to a catalyst for the selective catalytic reduction of NOx and for the oxidation of a hydrocarbon, comprising a coating disposed on a substrate, wherein the coating comprises palladium supported on an oxidic material comprising zirconium, and further comprises a vanadium oxide, wherein from 0 to 2 weight-% of the oxidic material consist of ceria and alumina, wherein from 95 to 100 weight-%, preferably from 98 to 100 weight-%, more preferably from 99 to 100 weight-%, more preferably from 99.5 to 100 weight-% of the coating comprise, preferably consist of, palladium supported on an oxidic material, wherein from 99 to 100 weight-% of said oxidic material consist of zirconium and oxygen, preferably of zirconia, and a vanadium oxide supported on titania, wherein titania optionally contains one or more of tungsten and silicon.

According to the present invention, it is preferred that the catalyst comprises a selective catalytic reduction (SCR) component and a diesel oxidation component.

Preferably, from 0 to 0.0035 g/l, preferably from 0 to 0.00035 g/l, more preferably from 0 to 0.000035 g/l of one or more of platinum, iridium, osmium and rhodium are comprised in the coating, wherein more preferably from 0 to 0.000035 g/l of platinum, iridium, osmium and rhodium are comprised in the coating.

Preferably, the coating is free of platinum, preferably free of platinum and rhodium, more preferably free of platinum, rhodium, iridium and osmium.

Preferably from 0 to 2 weight-%, more preferably from 0 to 1 weight-%, more preferably from 0 to 0.1 weight-% of the oxidic material supporting palladium comprised in the coating consist of ceria, alumina and titania, wherein more preferably from 0 to 0.1 weight-% of the oxidic material comprised in the coating consists of ceria, alumina, titania, lanthana and baria.

Preferably, the oxidic material supporting palladium comprised in the coating is free of ceria, alumina and titania, more preferably free of ceria, alumina, titania, lanthana and baria.

It is preferred that the catalyst comprises no further coating. Preferably, the catalyst of the present invention consists of a coating supported on a substrate.

The present invention further relates to a method for preparing a catalyst, preferably the catalyst according to the present invention, comprising (a) preparing a first mixture comprising palladium, an oxidic material comprising zirconium, wherein from 0 to 2 weight-% of the oxidic material consist of ceria and alumina, and water;

(b) preparing a second mixture comprising a solvent and one or more of a vanadium oxide and a zeolitic material comprising one or more of copper and iron, wherein the vanadium oxide is preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon;

(c) mixing the first mixture obtained in (a) and the second mixture obtained in (b) obtaining a slurry;

(d) disposing the slurry obtained in (c) on a substrate, obtaining a slurry-treated substrate;

(e) optionally, drying the slurry-treated substrate obtained in (d), obtaining a substrate having a coating disposed thereon;

(f) calcining the slurry-treated substrate obtained in (d), preferably the dried slurry-treated substrate obtained in (e), obtaining the catalyst according to the present invention.

Regarding (a) of said method, no specific restriction exists provided that according to (a) a first mixture is obtained comprising palladium, an oxidic material comprising zirconium, wherein from 0 to 2 weight-% of the oxidic material consist of ceria and alumina, and water. Preferably, (a) comprises (a.1) mixing an aqueous mixture of a palladium precursor, preferably an aqueous palladium nitrate mixture, with an oxidic material comprising zirconium, wherein from 0 to 2 weight-% of the oxidic material consist of ceria and alumina, obtaining palladium supported on the oxidic material;

(a.2) calcining the palladium supported on the oxidic material obtained in (a.1);

(a.3) mixing the calcined palladium supported on the oxidic material obtained in (a.2) with a disposing adjuvant, preferably one or more of tartaric acid and monoethanolamine, more preferably tartaric acid and monoethanolamine.

More preferably, according to (a.1), the aqueous mixture of a palladium precursor, preferably an aqueous palladium nitrate mixture, is added dropwise to the oxidic material.

Preferably, according to (a.2), the palladium supported on the oxidic material is calcined in gas atmosphere having a temperature in the range of from 490 to 690° C., preferably in the range of from 540 to 640° C., more preferably in the range of from 570 to 610° C.

Preferably, according to (a.2), the palladium supported on the oxidic material is calcined in gas atmosphere for a duration in the range of from 2 to 6 hours, preferably in the range of from 3 to 5 hours. More preferably, according to (a.2), the palladium supported on the oxidic material is calcined in gas atmosphere having a temperature in the range of from 570 to 610° C. for a duration in the range of from 3 to 5 hours.

With respect to palladium and the oxidic material, reference is made to the respective disclosure regarding the coating of the catalyst according to the present invention.

Regarding (b) of said method, no specific restriction exists provided that according to (b) a second mixture is obtained comprising one or more of a vanadium oxide, preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon, and a zeolitic material comprising one or more of copper and iron, and a solvent. Preferably, (b) comprises (b.1) mixing a mixture of a source of zirconyl acetate with a zeolitic material having a framework structure of the type CHA and comprising one or more of copper and iron; or preparing a solution of vanadium oxalate, preferably adding an oxidic material, more preferably with a dispersant;

(b.2) milling the mixture obtained in (b.1) to a particle size Dv90, as determined according to Reference Example 1, in the range of from 1 to 15 micrometers, preferably in the range of from 2 to 10 micrometers, more preferably in the range of from 3.5 to 6 micrometers.

With respect to the zeolitic material and the vanadium oxide, reference is made to the respective disclosure regarding the coating of the catalyst according to the present invention.

Preferably, disposing the slurry on a substrate in (d), wherein the substrate has a substrate length, comprises disposing the slurry on 20 to 100%, more preferably on 50 to 100%, more preferably from on 75 to 100%, more preferably on 95 to 100%, more preferably on 99 to 100% of the substrate length.

Preferably, according to (e), the slurry-treated substrate is dried in gas atmosphere having a temperature in the range of from 90 to 200° C., more preferably in the range of from 110 to 180° C., more preferably in the range of from 120 to 160° C., more preferably the slurry-treated substrate is dried in gas atmosphere for a duration in the range of from 5 to 300 minutes, more preferably in the range of 10 to 120 minutes, more preferably in the range of from 20 to 60 minutes.

Preferably, according to (e), the slurry-treated substrate is dried in gas atmosphere having a temperature in the range of from 90 to 200° C., more preferably in the range of from 100 to 150° C., more preferably in the range of from 110 to 130° C., preferably for a duration preferably in the range of from 5 to 300 minutes, more preferably in the range of from 5 to 60 minutes, more preferably in the range of from 7 to 20 minutes; and further dried in gas atmosphere preferably having a temperature in the range of from 90 to 200° C., more preferably in the range of from 140 to 180° C., more preferably in the range of from 150 to 170° C., for a duration preferably in the range of from 5 to 300 minutes, more preferably 10 to 80 minutes, more preferably in the range of from 20 to 40 minutes.

Preferably, according to (f), the slurry-treated substrate obtained in (d), preferably the dried slurry-treated substrate obtained in (e), is calcined in gas atmosphere having a temperature in the range of from 300 to 600° C., more preferably in the range of from 400 to 500° C., more preferably in the range of from 425 to 475° C.

Preferably, according to (f), the slurry-treated substrate obtained in (d), more preferably the dried slurry-treated substrate obtained in (e), is calcined in gas atmosphere for a duration in the range of from 5 to 120 minutes, more preferably in the range of from 10 to 90 minutes, more preferably in the range of from 15 to 50 minutes, more preferably in the range of from 20 to 40 minutes. More preferably, according to (f), the slurry-treated substrate obtained in (d), more preferably the dried slurry-treated substrate obtained in (e), is calcined in gas atmosphere having a temperature in the range of from 425 to 475° C. for a duration in the range of from 20 to 40 minutes.

Preferably, said method consists of (a) preparing a first mixture comprising palladium, an oxidic material comprising zirconium, wherein from 0 to 2 weight-% of the oxidic material consist of ceria and alumina, and water, (b) preparing a second mixture comprising a solvent and one or more of a vanadium oxide and a zeolitic material comprising one or more of copper and iron, wherein the vanadium oxide is preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon;

(c) mixing the first mixture obtained in (a) and the second mixture obtained in (b) obtaining a slurry;

(d) disposing the slurry obtained in (c) on a substrate, obtaining a slurry-treated substrate;

(e) drying the slurry-treated substrate obtained in (d), obtaining a substrate having a coating disposed thereon;

(f) calcining the dried slurry-treated substrate obtained in (e), obtaining the catalyst according to the present invention.

The present invention further relates to a catalyst, preferably the catalyst according to the present invention, obtainable or obtained by the method according to the present invention, preferably according to the method consisting of (a) preparing a first mixture comprising palladium, an oxidic material comprising zirconium, wherein from 0 to 2 weight-% of the oxidic material consist of ceria and alumina, and water, (b) preparing a second mixture comprising a solvent and one or more of a vanadium oxide and a zeolitic material comprising one or more of copper and iron, wherein the vanadium oxide is preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon;

(c) mixing the first mixture obtained in (a) and the second mixture obtained in (b) obtaining a slurry;

(d) disposing the slurry obtained in (c) on a substrate, obtaining a slurry-treated substrate;

(e) drying the slurry-treated substrate obtained in (d), obtaining a substrate having a coating disposed thereon;

(f) calcining the dried slurry-treated substrate obtained in (e), obtaining the catalyst according to the present invention.

The present invention further relates to a use of the catalyst according to the present invention as the first catalyst in an exhaust gas treatment system for treating an exhaust gas stream exiting a diesel engine, preferably in the exhaust gas treatment system according to the present invention.

The present invention further relates to a use of the catalyst according to the present invention for the simultaneous selective catalytic reduction of NOx and the oxidation of a hydrocarbon. Preferably, the catalyst is used in combination with one or more of a diesel oxidation catalyst, a nitrogen oxides reduction catalyst and an ammonia oxidation catalyst, preferably with an ammonia oxidation catalyst downstream of the catalyst according to the present invention, more preferably with an ammonia oxidation catalyst downstream of the catalyst according to the present invention and a diesel oxidation catalyst downstream of the ammonia oxidation catalyst.

The present invention further relates to a method for the simultaneously selective catalytic reduction of NOx and the oxidation of a hydrocarbon, wherein the NOx and the hydrocarbon are comprised in an exhaust gas stream, said method comprising (1) providing the exhaust gas stream, preferably from a diesel engine;

(2) passing the exhaust gas stream provided in (1) through the catalyst according to the present invention.

The present invention further relates to a method for preparing a catalyst, preferably the first catalyst comprised in the exhaust gas treatment system according to the present invention, comprising (A) preparing a first mixture comprising palladium, an oxidic material comprising zirconium, and water, (B) preparing a second mixture comprising a solvent and one or more of a vanadium oxide and a zeolitic material comprising one or more of copper and iron, wherein the vanadium oxide is preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon;

(C) mixing the first mixture obtained in (A) and the second mixture obtained in (B) obtaining a slurry;

(D) disposing the slurry obtained in (C) on a substrate, obtaining a slurry-treated substrate;

(E) optionally, drying the slurry-treated substrate obtained in (D), obtaining a substrate having a coating disposed thereon;

(F) calcining the slurry-treated substrate obtained in (D), preferably the dried slurry-treated substrate obtained in (E), obtaining the first catalyst comprised in the exhaust gas treatment system according to the present invention.

Regarding (A) of said method, no specific restriction exists provided that according to (A) a first mixture is obtained comprising palladium, an oxidic material comprising zirconium and water. Preferably, (A) comprises (A.1) mixing an aqueous mixture of a palladium precursor, preferably an aqueous palladium nitrate mixture, with an oxidic material comprising zirconium, obtaining palladium supported on the oxidic material;

(A.2) calcining the palladium supported on the oxidic material obtained in (A.1);

(A.3) mixing the calcined palladium supported on the oxidic material obtained in (A.2) with a disposing adjuvant, preferably one or more of tartaric acid and monoethanolamine, more preferably tartaric acid and monoethanolamine.

Preferably, according to (A.1), the aqueous mixture of a palladium precursor, preferably an aqueous palladium nitrate mixture, is added dropwise to the oxidic material.

Preferably, according to (A.2), the palladium supported on the oxidic material is calcined in gas atmosphere having a temperature in the range of from 490 to 690° C., preferably in the range of from 540 to 640° C., more preferably in the range of from 570 to 610° C.

Preferably, according to (A.2), the palladium supported on the oxidic material is calcined in gas atmosphere for a duration in the range of from 2 to 6 hours, preferably in the range of from 3 to 5 hours. More preferably, according to (A.2), the palladium supported on the oxidic material is calcined in gas atmosphere having a temperature in the range of from 570 to 610° C. for a duration in the range of from 3 to 5 hours.

With respect to palladium and the oxidic material, reference is made to the respective disclosure regarding the coating of the first catalyst comprised in the exhaust gas treatment system according to the present invention.

Regarding (B) of said method, no specific restriction exists provided that according to (B) a second mixture is obtained comprising one or more of a vanadium oxide, preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon, and a zeolitic material comprising one or more of copper and iron, and a solvent. Preferably, (B) comprises (B.1) mixing a mixture of zirconyl acetate with a zeolitic material having a framework structure of the type CHA and comprising one or more of copper and iron; or preparing a solution of vanadium oxalate, preferably adding an oxidic material, more preferably with a dispersant;

(B.2) milling the mixture obtained in (B.1) to a particle size Dv90, as determined according to Reference Example 1, in the range of from 1 to 15 micrometers, preferably in the range of from 2 to 10 micrometers, more preferably in the range of from 3.5 to 6 micrometers.

With respect to the zeolitic material and the vanadium oxide, reference is made to the respective disclosure regarding the coating of the first catalyst comprised in the exhaust gas treatment system according to the present invention.

Preferably, disposing the slurry on a substrate in (D), wherein the substrate has a substrate length, comprises disposing the slurry on 20 to 100%, preferably on 50 to 100%, more preferably from on 75 to 100%, more preferably on 95 to 100%, more preferably on 99 to 100% of the substrate length.

Preferably, according to (E), the slurry-treated substrate is dried in gas atmosphere having a temperature in the range of from 90 to 200° C., preferably in the range of from 110 to 180° C., more preferably in the range of from 120 to 160° C., wherein more preferably the slurry-treated substrate is dried in gas atmosphere for a duration in the range of from 5 to 300 minutes, more preferably in the range of 10 to 120 minutes, more preferably in the range of from 20 to 60 minutes.

Preferably, according to (E), the slurry-treated substrate is dried in gas atmosphere having a temperature in the range of from 90 to 200° C., preferably in the range of from 100 to 150° C., more preferably in the range of from 110 to 130° C., for a duration preferably in the range of from 5 to 300 minutes, more preferably in the range of from 5 to 60 minutes, more preferably in the range of from 7 to 20 minutes; and further dried in gas atmosphere having a temperature in the range of from 90 to 200° C., preferably in the range of from 140 to 180° C., more preferably in the range of from 150 to 170° C., for a duration preferably in the range of from 5 to 300 minutes, more preferably 10 to 80 minutes, more preferably in the range of from 20 to 40 minutes.

Preferably, according to (F), the slurry-treated substrate obtained in (D), preferably the dried slurry-treated substrate obtained in (E), is calcined in gas atmosphere having a temperature in the range of from 300 to 600° C., preferably in the range of from 400 to 500° C., more preferably in the range of from 425 to 475° C.

Preferably, according to (F), the slurry-treated substrate obtained in (D), preferably the dried slurry-treated substrate obtained in (E), is calcined in gas atmosphere for a duration in the range of from 5 to 120 minutes, preferably in the range of from 10 to 90 minutes, more preferably in the range of from 15 to 50 minutes, more preferably in the range of from 20 to 40 minutes. More preferably, according to (F), the slurry-treated substrate obtained in (D), preferably the dried slurry-treated substrate obtained in (E), is calcined in gas atmosphere having a temperature in the range of from 425 to 475° C. for a duration of from 20 to 40 minutes.

Preferably said method consists of (A) preparing a first mixture comprising palladium, an oxidic material comprising zirconium, and water, (B) preparing a second mixture comprising a solvent and one or more of a vanadium oxide and a zeolitic material comprising one or more of copper and iron, wherein the vanadium oxide is preferably supported on an oxidic material comprising one or more of titanium, silicon and zirconium, more preferably an oxidic material comprising one or more of titanium and silicon, more preferably an oxidic material comprising one or more of titania and zirconia, more preferably on titania, wherein titania optionally contains one or more of tungsten and silicon;

(C) mixing the first mixture obtained in (A) and the second mixture obtained in (B) obtaining a slurry;

(D) disposing the slurry obtained in (C) on a substrate, obtaining a slurry-treated substrate;

(E) drying the slurry-treated substrate obtained in (D), obtaining a substrate having a coating disposed thereon;

(F) calcining the dried slurry-treated substrate obtained in (E), obtaining the first catalyst comprised in the exhaust gas treatment system according to the present invention.

The present invention further relates to a catalyst, preferably the first catalyst comprised in the exhaust gas treatment system according to the present invention, obtainable or obtained by a method according to the method of the present invention, preferably according to the method consisting of (A) preparing a first mixture comprising palladium, an oxidic material comprising zirconium, and water, (B) preparing a second mixture comprising a solvent and one or more of a vanadium oxide and a zeolitic material comprising one or more of copper and iron, wherein the vanadium oxide is preferably supported on an oxidic material comprising one or more of titanium, silicon and zirconium, more preferably an oxidic material comprising one or more of titanium and silicon, more preferably an oxidic material comprising one or more of titania and zirconia, more preferably on titania, wherein titania optionally contains one or more of tungsten and silicon;

(C) mixing the first mixture obtained in (A) and the second mixture obtained in (B) obtaining a slurry;

(D) disposing the slurry obtained in (C) on a substrate, obtaining a slurry-treated substrate;

(E) drying the slurry-treated substrate obtained in (D), obtaining a substrate having a coating disposed thereon;

(F) calcining the dried slurry-treated substrate obtained in (E), obtaining the first catalyst comprised in the exhaust gas treatment system according to the present invention.

III. Exhaust Gas Treatment System

Surprisingly, it was also found that the exhaust gas treatment system for treating an exhaust gas stream leaving a diesel engine according to the present invention and described in the following permits to be resistant to HC poisoning and prevents sulfating in order to maintain sufficient DeNOx to meet the environmental requirements while being cost effective and by avoiding engine measures such as to raise exhaust gas temperatures.

Therefore, the present invention further relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising one or more of zirconium, silicon, aluminum and titanium, wherein from 99 to 100 weight-% of the coating of the first catalyst consist of palladium supported on an oxidic material comprising one or more of zirconium, silicon, aluminum and titanium;

(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises one or more of a vanadium oxide and a zeolitic material comprising one or more of copper and iron, or a second catalyst having an inlet end and an outlet end and being a catalytic article according to the present invention;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

Preferably, the oxidic material comprised in the coating of the first catalyst according to (i) comprises, preferably consists of, one or more of zirconium and aluminum. More preferably, the oxidic material comprised in the coating of the first catalyst according to (i) comprises aluminum, wherein more preferably from 90 to 100 weight-%, more preferably from 95 to 100 weight-%, more preferably from 99 to 100 weight-% of the oxidic material comprised in the coating of the first catalyst consist of aluminum and oxygen, preferably of alumina. Alternatively, more preferably, the oxidic material comprised in the coating of the first catalyst according to (i) comprises zirconium, wherein more preferably from 90 to 100 weight-%, more preferably from 95 to 100 weight-%, more preferably from 99 to 100 weight-% of the oxidic material comprised in the coating of the first catalyst consist of zirconium and oxygen, preferably of zirconia.

With respect to the substrate of the first catalyst, it is preferred that said substrate comprises, preferably consists of, a ceramic or metallic substance.

With regard to the substrate of the first catalyst comprising, preferably consisting of, a ceramic substrate, no specific restriction exists provided that the substrate is suitable for the intended use of the first catalyst comprised in the exhaust gas treatment system of the present invention. It is preferred that the ceramic substance comprises, more preferably consists of, one or more of an alumina, a silica, a silicate, an aluminosilicate, more preferably a cordierite or a mullite, an aluminotitanate, a silicon carbide, a zirconia, a magnesia, preferably a spinel, and a titania, more preferably one or more of a silicon carbide and a cordierite, more preferably a cordierite.

With regard to the substrate of the first catalyst comprising, preferably consisting of, a metallic substrate, no specific restriction exists provided that the substrate is suitable for the intended use of the first catalyst comprised in the exhaust gas treatment system of the present invention. It is preferred that the metallic substance comprises, more preferably consists of, oxygen and one or more of iron, chromium and aluminum.

Preferably, the substrate of the first catalyst is a monolith, more preferably a honeycomb monolith, more preferably a flow-through honeycomb monolith.

According to the invention, it is preferred that the coating of the first catalyst is disposed on the internal walls over 20 to 100%, more preferably over 50 to 100%, more preferably over 75 to 100%, more preferably over 95 to 100%, more preferably over 99 to 100% of the substrate length. More preferably, the coating of the first catalyst is disposed on the internal walls over 99.5 to 100% of the substrate length.

Generally, there is no restriction regarding the loading of palladium comprised in the coating of the first catalyst according to (i) provided that the loading is suitable for the intended use of the first catalyst in the exhaust gas treatment system of the present invention. Preferably, the coating of the first catalyst comprises palladium at a loading, calculated as elemental palladium, in the range of from 0.18 to 3.53 g/l (5 to 100 g/ft$^3$), more preferably in the range of from 0.71 to 2.82 g/l (20 to 80 g/ft$^3$), more preferably in the range of from 1.06 to 2.47 g/l (30 to 70 g/ft$^3$), more preferably in the range of from 1.24 to 1.94 g/l (35 to 55 g/ft$^3$). More preferably, the coating of the first catalyst comprises palladium at a loading in the range of from 1.41 to 1.77 g/l (40 to 50 g/ft$^3$).

Preferably, the loading of the coating of the first catalyst is in the range of from 12.20 to 305.11 g/l (0.2 to 5 g/in$^3$), more preferably in the range of from 30.51 to 183.07 g/l (0.5 to 3 g/in$^3$), more preferably in the range of 42.72 to 122.05 g/l (0.7 to 2 g/in$^3$). More preferably, the loading of the coating of the first catalyst is in the range of 54.92 to 91.54 g/l (0.9 to 1.5 g/in$^3$).

According to the present invention, it is preferred that from 99 to 100 weight-%, more preferably from 99.5 to 100 weight-%, more preferably from 99.9 to 100 weight-% of the coating of the first catalyst comprise, preferably consist of, palladium supported on an oxidic material wherein from 99 to 100 weight-% of said oxidic material consist of aluminum and oxygen, preferably of alumina. Alternatively, it is preferred that from 99 to 100 weight-%, more preferably from 99.5 to 100 weight-%, more preferably from 99.9 to 100 weight-% of the coating of the first catalyst comprise, preferably consist of, palladium supported on an oxidic material wherein from 99 to 100 weight-% of said oxidic material consist of zirconium and oxygen, preferably of zirconia.

Preferably, from 0 to 0.0035 g/l, more preferably from 0 to 0.00035 g/l, more preferably from 0 to 0.000035 g/l of one or more of platinum, iridium, osmium and rhodium are comprised in the coating of the first catalyst, wherein more preferably from 0 to 0.000035 g/l of platinum, iridium, osmium and rhodium are comprised in the coating of the first catalyst.

Preferably, the coating of the first catalyst is free of platinum, more preferably free of platinum and rhodium, more preferably free of platinum, rhodium, iridium and osmium, wherein the term "free of" as used in this context of the present invention relates to a coating which contains said element or said elements only as unavoidable impurities possibly present in any one of the materials used for preparing the coating.

Preferably, from 0 to 2 weight-%, more preferably from 0 to 1 weight-%, more preferably from 0 to 0.1 weight-% of the oxidic material comprised in the coating of the first catalyst consist of ceria and titania. More preferably, from 0 to 0.1 weight-% of the oxidic material comprised in the coating of the first catalyst consists of ceria, titania, lanthana and baria.

Preferably, the oxidic material comprised in the coating of the first catalyst is free of ceria, more preferably free of ceria and titania, more preferably free of ceria, titania, lanthana and baria.

Preferably, from 0 to 0.061 g/l, more preferably from 0 to 0.0061 g/l, more preferably from 0 to 0.00061 g/l of a selective catalytic reduction (SCR) component is comprised in the coating of the first catalyst, wherein more preferably 0 g/l of a selective catalytic reduction (SCR) component is comprised in the coating of the first catalyst.

According to the present invention, it is preferred that the coating of the second catalyst according to (ii) comprises a zeolitic material comprising one or more of copper and iron.

In the context of the present invention, the term "zeolitic material" refers to a zeolitic material preferably having a framework structure type ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, mixtures of two or more thereof, and mixed types of two or more thereof.

Preferably, the coating of the second catalyst comprises a zeolitic material comprising one or more of copper and iron, wherein the zeolitic material comprised in the coating of the second catalyst has a framework structure of the type AEI, GME, CHA, MFI, BEA, FAU, MOR or mixtures of two or more thereof, more preferably a framework structure of the type AEI, CHA, BEA or mixtures of two or more thereof, more preferably a framework structure of the type CHA or AEI, more preferably a framework structure of the type CHA. Zeolitic materials having framework structure type CHA include, for example, zeolite SSZ-13 and zeolite SAPO-34 wherein SSZ-13 is preferred.

In the context of the present invention, it is preferred that the zeolitic material comprised in the coating of the second catalyst, more preferably which has a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

Preferably, the zeolitic material comprised in the coating of the second catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material. More preferably, the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material.

Preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar ratio $SiO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

Preferably, the zeolitic material comprised in the coating of the second catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-% based on the total weight of the zeolitic material. More preferably from 95 to 100 weight-%, more preferably from 98 to 100 weight-%, more preferably, from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

Preferably, the coating of the second catalyst according to (ii) further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia. More preferably, the coating of the second catalyst comprises the metal oxide binder at a loading in the range of from 1.22 to 12.20 g/l (0.02 to 0.2 g/in$^3$), preferably in the range of from 4.88 to 10.98 g/l (0.08 to 0.18 g/in$^3$).

Therefore, the present invention preferably relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising one or more of zirconium, silicon, aluminum and titanium, wherein from 99 to 100 weight-% of the coating of the first catalyst consist of palladium supported on an oxidic material comprising one or more of zirconium and aluminum, wherein the coating of the first catalyst comprises palladium at a loading, calculated as elemental palladium, in the range of from 0.18 to 3.53 g/l (5 to 100 g/ft$^3$), preferably in the range of from 0.71 to 2.82 g/l (20 to 80 g/ft$^3$), more preferably in the range of from 1.06 to 2.47 g/l (30 to 70 g/ft$^3$), more preferably in the range of from 1.24 to 1.94 g/l (35 to 55 g/ft$^3$), more preferably in the range of from 1.41 to 1.77 g/l (40 to 50 g/ft$^3$);

(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises a zeolitic material having a framework structure of the type CHA and comprising copper, and preferably a metal oxide binder as defined in the present invention, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material, or a second catalyst, being a catalytic article according to the present invention, having an inlet end and an outlet end;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

According to the present invention, it is preferred that the coating of the second catalyst according to (ii) comprises a vanadium oxide. Optionally, the vanadium oxide contains one or more of tungsten, iron and antimony.

Preferably, the vanadium oxide is one or more of a vanadium (V) oxide and a vanadium (IV) oxide, wherein the vanadium oxide optionally contains one or more of tungsten, iron and antimony.

Preferably, the vanadium oxide is supported on an oxidic material comprising one or more of titanium, silicon and zirconium, more preferably an oxidic material comprising one or more of titanium and silicon, more preferably an oxidic material comprising one or more of titania and silica preferably on titania, wherein titania optionally contains one or more of tungsten and silicon. More preferably, the vanadium oxide is one or more of vanadium (V) oxide and a vanadium (IV) oxide and contains antimony, the vanadium oxide being supported on titania.

Further, it is preferred that the coating of the second catalyst further comprises a platinum group metal, wherein the platinum group metal is one or more of platinum, palladium, rhodium, iridium and osmium, more preferably one or more of palladium and rhodium. More preferably, the platinum group metal is palladium.

Preferably, the platinum group metal is supported on an oxidic material, wherein the oxidic material comprised in the coating of the second catalyst comprises one or more of zirconia, silica, alumina and titania, more preferably one or more of zirconia and alumina. More preferably, the platinum group metal is supported on zirconia. More preferably, wherein from 90 to 100 weight-%, preferably from 95 to 100 weight-%, more preferably from 99 to 100 weight-% of the oxidic material comprised in the coating of the second catalyst consist of zirconia.

According to the present invention, when a zeolitic material is comprised in the coating of the second catalyst, it is preferred that the coating of the second catalyst comprises the zeolitic material at a loading in the range of from 61.02 to 274.61 g/l (1.0 to 4.5 g/in$^3$), more preferably in the range of from 91.54 to 244.10 g/l (1.5 to 4.0 g/in$^3$), more preferably in the range of from 122.05 to 213.58 g/l (2.0 to 3.5 g/in$^3$), more preferably in the range of from 128.15 to 183.07 g/l (2.1 to 3 g/in$^3$). More preferably, the coating of the second catalyst comprises the zeolitic material at a loading in the range of from 128.15 to 158.66 g/l (2.1 to 2.6 g/in$^3$).

According to the present invention, when a vanadium oxide is comprised in the coating of the second catalyst, it is preferred that the vanadium oxide is present at a loading in the range of from 122 to 335 g/l (2.0 to 5.5 g/in$^3$), more preferably in the range of from 240 to 300 g/l (3.9 to 4.9 g/in$^3$), more preferably in the range of from 262.4 to 280.7 g/l (4.3 to 4.6 g/in$^3$).

Further, when the coating of the second catalyst comprises a platinum group metal, it is preferred that the platinum group metal is comprised therein at a loading, calculated as elemental platinum group metal, in the range of from 0.035 to 2.82 g/l (1 to 80 g/ft$^3$), more preferably in the range of from 0.53 to 2.12 g/l (15 to 60 g/ft$^3$), more preferably in the range of from 0.71 to 1.77 g/l (20 to 50 g/ft$^3$). More preferably, the platinum group metal is comprised in the coating of the second catalyst at a loading in the range of from 0.88 to 1.59 g/l (25 to 45 g/ft$^3$), more preferably in the range of from 0.88 to 1.24 g/l (25 to 35 g/ft$^3$).

According to a first preferred aspect of the present invention, the coating of the second catalyst comprises a copper containing zeolitic material having a framework structure of the type CHA. In this case, it is preferred that from 95 to 100 weight-%, more preferably from 98 to 100 weight-%, more preferably from 99 to 100 weight-%, more preferably from 99.5 to 100 weight-% of the coating of the second catalyst comprise, preferably consist of, a copper containing zeolitic material having a framework structure of the type CHA, and preferably a metal oxide binder as defined in the present invention.

According to a second preferred aspect of the present invention, the coating of the second catalyst comprises a copper containing zeolitic material having a framework structure of the type CHA and palladium supported on an oxidic material comprising zirconium, and preferably a metal oxide binder as defined in the present invention. In this case, it is preferred that from 95 to 100 weight-%, more preferably from 98 to 100 weight-%, more preferably from 99 to 100 weight-%, more preferably from 99.5 to 100 weight-% of the coating of the second catalyst comprise, preferably consist of, a copper containing zeolitic material having a framework structure of the type CHA and palladium supported on an oxidic material, wherein from 99 to 100 weight-% of said oxidic material consist of zirconium and oxygen, preferably of zirconia, and preferably a metal oxide binder as defined in the present invention.

According to a third preferred aspect of the present invention, the coating of the second catalyst comprises a vanadium oxide supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon. In this case, it is preferred that from 95 to 100 weight-%, more preferably from 98 to 100 weight-%, more preferably from 99 to 100 weight-%, more preferably from 99.5 to 100 weight-% of the coating of the second catalyst comprise, preferably consist of, a vanadium oxide supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon.

According to a fourth preferred aspect of the present invention, the coating of the second catalyst comprises a vanadium oxide supported on an oxidic material comprising one or more of titanium, silicon and zirconium, more preferably an oxidic material comprising one or more of titanium and silicon, more preferably an oxidic material comprising one or more of titania and silicon, more preferably on titania, wherein titania optionally contains one or more of tungsten and silicon and palladium supported on an oxidic material comprising zirconium. In this case, it is preferred that from 95 to 100 weight-%, more preferably from 98 to 100 weight-%, more preferably from 99 to 100 weight-%, more preferably from 99.5 to 100 weight-% of the coating of the second catalyst comprise, preferably consist of, a vanadium oxide supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon, and palladium supported on an oxidic material, wherein from 99 to 100 weight-% of said oxidic material consist of zirconium and oxygen, preferably of zirconia.

According to the first and third preferred aspects, it is preferred that from 0 to 0.0035 g/l, more preferably from 0 to 0.00035 g/l, more preferably from 0 to 0.000035 g/l, more preferably from 0 to 0.0000035 g/l of one or more of platinum, palladium, rhodium, iridium and osmium are comprised in the coating of the second catalyst, wherein more preferably from 0 to 0.0000035 g/l of platinum, palladium, rhodium, iridium and osmium are comprised in the coating of the second catalyst. More preferably, the coating of the second catalyst is free of platinum, palladium and rhodium, more preferably free of platinum, palladium, rhodium, iridium and osmium.

According to the present invention, it is preferred that from 0 to 0.0035 g/l, more preferably from 0 to 0.00035 g/l, more preferably from 0 to 0.000035 g/l, more preferably from 0 to 0.0000035 g/l of one or more of platinum, iridium, osmium and rhodium are comprised in the coating of the second catalyst, wherein more preferably from 0 to 0.0000035 g/l of platinum, iridium, osmium and rhodium are comprised in the coating of the second catalyst.

Preferably, the coating of the second catalyst is free of platinum, more preferably free of platinum and rhodium, more preferably free of platinum, iridium, osmium and rhodium.

Further, it is preferred that, when the coating of the second catalyst comprises palladium supported on an oxidic material, from 0 to 2 weight-%, more preferably from 0 to 1 weight-%, more preferably from 0 to 0.1 weight-% of the oxidic material supporting palladium comprised in the coating of the second catalyst consist of ceria and alumina, wherein more preferably from 0 to 0.1 weight-% of the oxidic material comprised in the coating of the second catalyst consists of ceria, alumina, titania, lanthana and baria.

Preferably, the oxidic material supporting palladium comprised in the coating of the second catalyst is free of ceria and alumina, more preferably free of ceria, alumina and titania, more preferably free of ceria, alumina, titania, lanthana and baria.

According to the second preferred aspect of the present invention, when the coating of the second catalyst comprises palladium supported on zirconia and a copper containing zeolitic material having a framework structure of the type CHA, and preferably a metal oxide binder as defined in the present invention, it is preferred that said zeolitic material and palladium supported on zirconia, and preferably said binder, are comprised is a single coat, wherein the single coat is disposed on at least a portion of the internal walls of the substrate of the second catalyst.

According to a fifth preferred aspect of the present invention, the coating of the second catalyst comprises a copper containing zeolitic material having a framework structure of the type CHA and a platinum group metal is one or more of platinum, palladium, rhodium, iridium and osmium, more preferably palladium, supported on an oxidic material comprising one or more of zirconia, alumina and titania, preferably one or more of alumina and titania, more preferably one or more of alumina and zirconia, and preferably a metal oxide binder as defined in the present invention; and the coating of the second catalyst consists of a top coat, wherein the copper containing zeolitic material having a framework structure of the type CHA, and preferably a metal oxide binder as defined in the present invention, is comprised, and a bottom coat, wherein the platinum group metal supported on an oxidic material is comprised, wherein the bottom coat is disposed on at least a portion of the surface of the internal walls of the substrate of the second catalyst and the top coat is disposed on the bottom coat.

According to an alternative of the fifth preferred aspect of the present invention, the coating of the second catalyst comprises a vanadium oxide, preferably one or more of vanadium (V) oxide and vanadium (IV) oxide, supported on an oxidic material and a platinum group metal being one or more of platinum, palladium, rhodium, iridium and osmium, preferably palladium, supported on an oxidic material comprising one or more of zirconia, alumina and titania, preferably one or more of alumina and zirconia; the coating of the second catalyst consists of a top coat, wherein the vanadium oxide supported on an oxidic material is comprised, and a bottom coat, wherein the platinum group metal supported on an oxidic material is comprised, wherein the bottom coat is disposed on at least a portion of the surface of the internal walls of the substrate of the second catalyst and the top coat is disposed on the bottom coat.

With respect to the bottom coat of the second catalyst, it is preferred that the platinum group metal comprised therein is palladium.

Preferably, the oxidic material comprised in the bottom coat of the second catalyst comprises, preferably consists of, alumina and zirconia.

Preferably from 60 to 100 weight-%, more preferably from 70 to 90 weight-%, more preferably from 75 to 85 weight-% of the oxidic material comprised in the bottom coat of the second catalyst consist of alumina.

Preferably, the bottom coat of the second catalyst comprises palladium at a loading, calculated as elemental palladium, in the range of from 0.035 to 1.41 g/l (1 to 40 g/ft$^3$), more preferably in the range of from 0.18 to 1.06 g/l (5 to 30 g/ft$^3$), more preferably in the range of from 0.35 to 0.88 g/l (10 to 25 g/ft$^3$), more preferably in the range of from 0.42 to 0.64 g/l (12 to 18 g/ft$^3$).

Preferably from 95 to 100 weight-%, more preferably from 98 to 100 weight-%, more preferably from 99 to 100 weight-%, more preferably from 99.5 to 100 weight-% of the bottom coat of the second catalyst comprise, preferably consist of, palladium supported on an oxidic material, wherein from 99.5 to 100 weight-% of said oxidic material comprise, more preferably consist of, one or more of alumina and zirconia.

With respect to the top coat of the second catalyst, it is preferred that said top coat comprises the zeolitic material at a loading in the range of from 61.02 to 274.61 g/l (1 to 4.5 g/in$^3$), more preferably in the range of from 91.54 to 244.10 g/l (1.5 to 4 g/in$^3$), more preferably in the range of from 122.05 to 244.10 (2 to 4 g/in³), more preferably in the range of from 152.56 to 213.58 g/l (2.5 to 3.5 g/in³).

With respect to the alternative top coat of the second catalyst, it is preferred that said top coat comprises the vanadium oxide at a loading in the range of from 91.54 to 335 g/l (1.5 to 5.5 g/in³).

It is preferred that from 95 to 100 weight-%, more preferably from 98 to 100 weight-%, more preferably from 99 to 100 weight-%, more preferably from 99.5 to 100 weight-% of the bottom coat of the second catalyst consist of palladium supported on an oxidic material, wherein from 99.5 to 100 weight-% of said oxidic material comprise, more preferably consist of, one or more of alumina and zirconia and from 95 to 100 weight-%, preferably from 98 to 100 weight-%, more preferably from 99 to 100 weight-%, more preferably from 99.5 to 100 weight-% of the top coat of the second catalyst consist of a copper containing zeolitic material having a framework structure of the type CHA, and preferably a metal oxide binder as defined in the present invention.

It is alternatively preferred that from 95 to 100 weight-%, more preferably from 98 to 100 weight-%, more preferably from 99 to 100 weight-%, more preferably from 99.5 to 100 weight-% of the bottom coat of the second catalyst consist of palladium supported on an oxidic material, wherein from 99.5 to 100 weight-% of said oxidic material comprise, more preferably consist of, one or more of alumina and zirconia and from 95 to 100 weight-%, preferably from 98 to 100 weight-%, more preferably from 99 to 100 weight-%, more preferably from 99.5 to 100 weight-% of the top coat of the second catalyst consist of a vanadium oxide supported on an oxidic material, preferably one or more of vanadium (V) oxide and vanadium (IV) oxide.

According the fifth preferred aspect, it is preferred that from 0 to 0.0035 g/l, more preferably from 0 to 0.00035 g/l, more preferably from 0 to 0.000035 g/l of one or more of platinum, iridium, osmium and rhodium are comprised in the bottom coat of the second catalyst, wherein more preferably from 0 to 0.000035 g/l of platinum, iridium, osmium and rhodium are comprised in the bottom coat of the second catalyst.

Preferably, the bottom coat of the second catalyst is free of platinum and rhodium, more preferably free of platinum, rhodium, iridium and osmium.

According to the fifth preferred aspect, it is preferred that from 0 to 6.10 g/l, more preferably from 0 to 0.61 g/l, more preferably from 0 to 0.061 g/l, more preferably from 0 to 0.0061 g/l of one or more of a zeolitic material and a vanadium oxide are comprised in the bottom coat, wherein more preferably from 0 to 0.0061 g/l of a zeolitic material and a vanadium oxide are comprised in the bottom coat of the second catalyst.

According to a sixth preferred aspect of the present invention, it is preferred that the second catalyst is a catalytic article according to the present invention and as defined under paragraph I above. More preferably, the first catalyst comprises a single layer or a first (top or under) layer and a second (top or under) layer.

According to a seventh preferred aspect of the present invention, it is preferred that the second catalyst is the first catalyst according to (i) as defined under paragraph II.

With regard to the second catalyst used in the exhaust gas treatment system of the present invention, it is preferred that said second catalyst is a selective catalytic reduction (SCR) catalyst.

Alternatively, said second catalyst may be an ammonia oxidation (AMOX) catalyst.

According to the present invention, it is preferred that the second catalyst consists of a coating disposed on a substrate.

With respect to the substrate of the second catalyst, it is preferred that said substrate comprises, more preferably consists of, a ceramic or metallic substance.

With regard to the substrate of the second catalyst comprising, preferably consisting of, a ceramic substrate, no specific restriction exists provided that the substrate is suitable for the intended use of the second catalyst comprised in the exhaust gas treatment system of the present invention. It is preferred that the ceramic substance comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite. More preferably, the ceramic substrate comprises, more preferably consists of, a cordierite.

With regard to the substrate of the second catalyst comprising, preferably consisting of, a metallic substrate, no specific restriction exists provided that the substrate is suitable for the intended use of the second catalyst comprised in the exhaust gas treatment system of the present invention. It is preferred that the metallic substance comprises, more preferably consists of, oxygen and one or more of iron, chromium and aluminum.

It is preferred that the substrate of the second catalyst is a monolith, preferably a honeycomb monolith, more preferably a flow-through honeycomb monolith.

Alternatively, it may be preferred that the substrate of the second catalyst is a monolith, preferably a honeycomb monolith, more preferably an extruded honeycomb monolith. More preferably, the extruded honeycomb monolith may comprise, more preferably consist of, one or more of a vanadium oxide, the vanadium oxide optionally containing one or more of tungsten, iron and antimony, a tungsten oxide, a titanium oxide and a zeolitic material comprising one or more transition metals, preferably one or more of Cu and Fe. The extruded honeycomb monolith may further contain one or more of a silicon oxide and an aluminum oxide. More preferably, the substrate of the second catalyst may be an extruded honeycomb monolith comprising, more preferably consisting of, a silicon oxide and one or more of a vanadium oxide and a titanium oxide. It may be further preferred that the extruded honeycomb monolith is a flow-through extruded honeycomb monolith.

As a further alternative, the substrate of the second catalyst may preferably be a corrugated monolith, the corrugated monolith comprising, more preferably consisting of, one or more of a vanadium oxide, the vanadium oxide optionally containing one or more of tungsten, iron and antimony, a tungsten oxide, a titanium oxide and a zeolitic material comprising one or more transition metals, preferably one or more of Cu and Fe. The corrugated monolith may further contain one or more of a silicon oxide and an aluminum oxide. More preferably, the substrate of the second catalyst may be a corrugated monolith comprising, more preferably consisting of, a silicon oxide and one or more of a vanadium oxide and a titanium oxide.

According to the present invention, it is preferred that the substrate of the first catalyst comprises, more preferably consists of, oxygen and one or more of iron, chromium and aluminum and the substrate of the second catalyst comprises, preferably consists of, a cordierite. Alternatively, it is preferred that the substrate of the first catalyst comprises, more preferably consists of, a cordierite and the substrate of the second catalyst comprises, more preferably consists of, a cordierite.

With respect to the size, i.e. the length and the width, of the substrates of the first catalyst and of the second catalyst, no specific restriction exists provided that each substrate is suitable for the intended used of the first catalyst and of the second catalyst comprised in the exhaust gas treatment system of the present invention.

Preferably, the substrate of the first catalyst has a substrate length in the range of from 2.54 to 25.4 cm (1 to 10 inches), more preferably in the range of from 3.81 to 20.32 cm (1.5 to 8 inches), more preferably in the range of from 5.08 to 17.78 cm (2 to 7 inches), more preferably in the range of from 5.08 to 15.24 cm (2 to 6 inches), more preferably in the range of from 5.08 to 10.16 cm (2 to 4 inches).

Preferably, the substrate of the second catalyst has a substrate length in the range of from 2.54 to 25.4 cm (1 to 10 inches), more preferably in the range of from 3.81 to 20.32 cm (1.5 to 8 inches), more preferably in the range of from 5.08 to 17.78 cm (2 to 7 inches), more preferably in the range of from 5.08 to 15.24 cm (2 to 6 inches), more preferably in the range of from 5.08 to 10.16 cm (2 to 4 inches).

More preferably, the substrate of the first catalyst has a substrate length in the range of from 5.08 to 10.16 cm (2 to 4 inches) and the substrate of the second catalyst has a substrate length in the range of from 5.08 to 10.16 cm (2 to 4 inches).

Preferably, the substrate of the first catalyst has a substrate width in the range of from 10.16 to 43.18 cm (4 to 17 inches), more preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches).

Preferably, the substrate of the second catalyst has a substrate width in the range of from 10.16 to 43.18 cm (4 to 17 inches), more preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches).

More preferably, the substrate of the first catalyst has a substrate width in the range of from 22.86 to 33.02 cm (9 to 13 inches), more preferably in the range of from 22.86 to 27.94 cm (9 to 11 inches) and the substrate of the second catalyst has a substrate width in the range of from 22.86 to 33.02 cm (9 to 13 inches), more preferably in the range of from 22.86 to 27.94 cm (9 to 11 inches).

According to the present invention, it is preferred that the coating of the second catalyst is disposed on the internal walls of the substrate of the second catalyst over 20 to 100%, more preferably over 50 to 100%, more preferably over 75 to 100%, more preferably over 95 to 100% of the substrate length. More preferably, the coating of the second catalyst is disposed on the internal walls of the substrate of the second catalyst over 99 to 100% of the substrate length.

Therefore, it is preferred that the coating of the first catalyst is disposed on the internal walls of the substrate of the first catalyst over 99 to 100% of the substrate length and that the coating of the second catalyst is disposed on the internal walls of the substrate of the second catalyst over 99 to 100% of the substrate length.

According to the present invention, it is preferred that the substrate of the first catalyst on which substrate the coating of the first catalyst is disposed, is a first substrate and the substrate of the second catalyst on which substrate the coating of the second catalyst is disposed, is a second substrate, wherein the first substrate and the second substrate are different from each other.

Alternatively, it is preferred that the substrate of the first catalyst, on which substrate the coating of the first catalyst is disposed, and the substrate of the second catalyst, on which substrate the coating of the second catalyst is disposed, together form a single substrate, wherein said single substrate comprises an inlet end and an outlet end, wherein the inlet end is arranged upstream of the outlet end, and the coating of the first catalyst is disposed on said single substrate from the inlet end towards the outlet end of said single substrate and the coating of the second catalyst is disposed on said single substrate from the outlet end towards the inlet end of said single substrate, wherein the coating of the first catalyst covers from 5 to 75% of the substrate length and the coating of the second catalyst covers from 25 to 95% of the substrate length. More preferably, the coating of the first catalyst covers from 20 to 75%, more preferably from 35 to 65%, more preferably from 45 to 55%, of the substrate length and the coating of the second catalyst covers from 25 to 80%, more preferably from 35 to 65%, more preferably on from 45 to 55% of the substrate length. Alternatively, the coating of the first catalyst covers from 5 to 60%, more preferably from 5 to 40%, more preferably from 8 to 30%, more preferably from 10 to 25% of the substrate length and the coating of the second catalyst covers from 40 to 90%, preferably from 50 to 85%, more preferably of from 75 to 85% of the substrate length.

Preferably, the coating of the first catalyst and the coating of the second catalyst overlap. As an alternative, it is preferred that there is a gap between the coating of the first catalyst and the coating of the second catalyst.

According to the fifth preferred aspect, the coating of the second catalyst consists of a bottom coat and a top coat, wherein it is preferred that the bottom coat of the coating of the second catalyst is disposed on the internal walls of the substrate of the second catalyst over 20 to 100%, more preferably over 50 to 100%, more preferably over 75 to 100%, more preferably over 95 to 100%, more preferably over 99 to 100% of the substrate length and the top coat of the coating of the second catalyst is disposed over 20 to 100%, more preferably over 50 to 100%, more preferably over 75 to 100%, more preferably over 95 to 100%, more preferably over 99 to 100% of the substrate length on the bottom coat.

According to the present invention, it is preferred that from 99 to 100 weight-% of the coating of the first catalyst consist of palladium supported on an oxidic compound consisting of aluminum and oxygen, more preferably alumina, and the coating of the second catalyst comprises, preferably consists of, a copper containing zeolitic material having a framework structure of the type CHA, and preferably a metal oxide binder as defined in the present invention.

Therefore, the present invention preferably relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising aluminum, wherein from 99 to 100 weight-% of the coating of the first catalyst consist of palladium supported on an oxidic compound consisting of aluminum and oxygen, preferably alumina;

(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises, preferably consists of, a copper containing zeolitic material having a framework structure of the type CHA, and preferably a metal oxide binder as defined in the present invention;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst; wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

Preferably from 99.5 to 100 weight-%, more preferably from 99.9 to 100 weight-% of the coating of the first catalyst consist of palladium supported on an oxidic compound consisting of aluminum and oxygen, preferably alumina, and from 95 to 100 weight-%, more preferably from 98 to 100 weight-%, more preferably from 99 to 100 weight-%, more preferably from 99.5 to 100 weight-% of the coating of the second catalyst comprises, preferably consists of, a copper containing zeolitic material having a framework structure of the type CHA, and preferably a metal oxide binder as defined in the present invention.

Alternatively, it is preferred that from 99 to 100 weight-% of the coating of the first catalyst consist of palladium supported on an oxidic compound consisting of zirconium and oxygen, more preferably zirconia, and the coating of the second catalyst comprises, preferably consists of, a copper containing zeolitic material having a framework structure of the type CHA, and preferably a metal oxide binder as defined in the present invention.

Therefore, the present invention preferably also relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising zirconium, wherein from 99 to 100 weight-% of the coating of the first catalyst consist of palladium supported on an oxidic compound consisting of zirconium and oxygen, preferably zirconia;

(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises, preferably consists of, a copper containing zeolitic material having a framework structure of the type CHA, and preferably a metal oxide binder as defined in the present invention;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

Preferably from 99.5 to 100 weight-%, more preferably from 99.9 to 100 weight-% of the coating of the first catalyst consist of palladium supported on an oxidic compound consisting of zirconium and oxygen, preferably zirconia, and from 95 to 100 weight-%, more preferably from 98 to 100 weight-%, more preferably from 99 to 100 weight-%, more preferably from 99.5 to 100 weight-% of the coating of the second catalyst comprises, preferably consists of, a copper containing zeolitic material having a framework structure of the type CHA, and preferably a metal oxide binder as defined in the present invention.

Alternatively, it is preferred that from 99 to 100 weight-% of the coating of the first catalyst consist of palladium supported on an oxidic compound consisting of aluminum and oxygen, more preferably alumina, and the coating of the second catalyst comprises, more preferably consists of, a vanadium oxide supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon.

Therefore, the present invention preferably also relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising aluminum, wherein from 99 to 100 weight-% of the coating of the first catalyst consist of palladium supported on an oxidic compound consisting of aluminum and oxygen, preferably alumina;

(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises, preferably consists of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

Preferably from 99.5 to 100 weight-%, more preferably from 99.9 to 100 weight-% of the coating of the first catalyst consist of palladium supported on an oxidic compound consisting of aluminum and oxygen, more preferably alumina, and from 95 to 100 weight-%, more preferably from 98 to 100 weight-%, more preferably from 99 to 100 weight-%, more preferably from 99.5 to 100 weight-% of the coating of the second catalyst comprises, preferably consists of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

Alternatively, it is preferred that from 99 to 100 weight-% of the coating of the first catalyst preferably consist of palladium supported on an oxidic compound consisting of zirconium and oxygen, more preferably zirconia, and the coating of the second catalyst comprises, more preferably consists of, a vanadium oxide supported on an oxidic material comprising one or more of titanium, silicon and zirconium, more preferably an oxidic material comprising one or more of titanium and silicon, more preferably an oxidic material comprising one or more of titania and silica, more preferably on titania, wherein titania optionally contains one or more of tungsten and silicon.

Therefore, the present invention preferably also relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising zirconium, wherein from 99 to 100 weight-% of the coating of the first catalyst consist of palladium supported on an oxidic compound consisting of zirconium and oxygen, preferably zirconia;

(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises, preferably consists of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst; wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

Preferably from 99.5 to 100 weight-%, more preferably from 99.9 to 100 weight-% of the coating of the first catalyst consist of palladium supported on an oxidic compound consisting of zirconium and oxygen, preferably zirconia, and from 95 to 100 weight-%, preferably from 98 to 100 weight-%, more preferably from 99 to 100 weight-%, more preferably from 99.5 to 100 weight-% of the coating of the second catalyst comprises, preferably consists of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

According to the present invention, it is preferred that the exhaust gas treatment system further comprises an injector for injecting a fluid into the exhaust gas stream exiting the diesel engine, said injector being located upstream of the first catalyst and downstream of the upstream end of the exhaust gas treatment system. Preferably, the fluid is an aqueous urea solution.

According to the present invention, it is conceivable that, alternatively, the second catalyst according to (ii) comprised in the exhaust gas treatment system of the present invention has an inlet end and an outlet end and comprises a substrate, wherein the substrate has an inlet end, and outlet end and a substrate length extending from the inlet end to the outlet end of the substrate and comprises a plurality of passages defined by the internal walls of the substrate, wherein the substrate of the second catalyst is an extruded substrate.

Therefore, according to said alternative, the present invention preferably relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising one or more of zirconium, silicon, aluminum and titanium, wherein from 99 to 100 weight-% of the coating of the first catalyst consist of palladium supported on an oxidic material comprising one or more of zirconium, silicon, aluminum and titanium;

(ii) a second catalyst having an inlet end and an outlet end and comprising a substrate, wherein the substrate has an inlet end, and outlet end and a substrate length extending from the inlet end to the outlet end of the substrate and comprises a plurality of passages defined by the internal walls of the substrate, wherein the substrate of the second catalyst is an extruded substrate;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

In this respect, it is conceivable that the extruded substrate preferably comprises, more preferably consists of, one or more of a vanadium oxide, the vanadium oxide optionally containing one or more of tungsten, iron and antimony, a tungsten oxide, a titanium oxide and a zeolitic material comprising one or more transition metals, preferably one or more of Cu and Fe. The extruded substrate may further contain one or more of a silicon oxide and an aluminum oxide. More preferably, the substrate of the second catalyst is an extruded substrate comprising, more preferably consisting of, a silicon oxide and one or more of a vanadium oxide and a titanium oxide. It is further preferred that the substrate of the second catalyst is a monolith, preferably a honeycomb monolith, more preferably a flow-through honeycomb monolith. With regard to the aforementioned second catalyst used in the exhaust gas treatment system of the present invention, it is preferred that said second catalyst is a selective catalytic reduction (SCR) catalyst. More preferably, the second catalyst comprises no coating.

According to the present invention, it is conceivable that, as a further alternative, the second catalyst according to (ii) comprised in the exhaust gas treatment system of the present invention has an inlet end and an outlet end and comprises a substrate, wherein the substrate has an inlet end, and outlet end and a substrate length extending from the inlet end to the outlet end of the substrate and comprises a plurality of passages defined by the internal walls of the substrate, wherein the substrate of the second catalyst is a corrugated substrate.

Therefore, according to said alternative, the present invention preferably relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising one or more of zirconium, silicon, aluminum and titanium, wherein from 99 to 100 weight-% of the coating of the first catalyst consist of palladium supported on an oxidic material comprising one or more of zirconium, silicon, aluminum and titanium;

(ii) a second catalyst having an inlet end and an outlet end and comprising a substrate, wherein the substrate has an inlet end, and outlet end and a substrate length extending from the inlet end to the outlet end of the substrate and comprises a plurality of passages defined by the internal walls of the substrate, wherein the substrate of the second catalyst is a corrugated substrate;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

In this respect, it is conceivable that the corrugated substrate preferably comprises, more preferably consists of, one or more of a vanadium oxide, the vanadium oxide optionally containing one or more of tungsten, iron and antimony, a tungsten oxide, a titanium oxide and a zeolitic material comprising one or more transition metals, preferably one or more of Cu and Fe. The corrugated substrate may further contain one or more of a silicon oxide and an aluminum oxide. More preferably, the substrate of the second catalyst is corrugated substrate comprising, more preferably consisting of, a silicon oxide and one or more of a vanadium oxide and a titanium oxide. It is further preferred that the substrate of the second catalyst is a monolith, preferably a corrugated monolith. With regard to the aforementioned second catalyst used in the exhaust gas treatment system of the present invention, it is preferred that said second catalyst is a selective catalytic reduction (SCR) catalyst. More preferably, the second catalyst comprises no coating.

According to the present invention, it is preferred that the exhaust gas treatment system further comprises one or more of a diesel oxidation catalyst, a selective catalytic reduction catalyst, an ammonia oxidation catalyst located downstream of the second catalyst according to (ii).

Preferably, the exhaust gas treatment system of the present invention further comprises an ammonia oxidation catalyst located downstream of the second catalyst according to (ii), wherein the ammonia oxidation catalyst has an inlet end and an outlet end, wherein the outlet end of the second catalyst according to (ii) is in fluid communication with the inlet end of the ammonia oxidation catalyst and between the outlet end of the second catalyst according to (ii) and the inlet end of the ammonia oxidation catalyst, no catalyst for treating the exhaust gas exiting the second catalyst is located in the exhaust gas treatment system. More preferably, the ammonia oxidation catalyst comprises a coating disposed on a substrate, wherein the coating comprises a platinum group metal supported on an oxidic material and a zeolitic material comprising one or more of copper and iron.

More preferably, the zeolitic material comprised in the coating of said ammonia oxidation catalyst has a framework structure of the type AEI, GME, CHA, MFI, BEA, FAU, MOR or mixtures of two or more thereof, more preferably a framework structure of the type AEI, CHA, BEA or mixtures of two or more thereof, more preferably a framework structure of the type CHA or AEI, more preferably a framework structure of the type CHA.

In the context of the present invention, it is preferred that the zeolitic material comprised in the coating of the ammonia oxidation catalyst, more preferably which has a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

It is further preferred that the zeolitic material comprised in the coating of said ammonia oxidation catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 6 weight-%, more preferably in the range of from 2.5 to 5.5 weight-%, more preferably in the range of from 2.5 to 3.5 weight-% based on the total weight of the zeolitic material. More preferably, the amount of iron comprised in the zeolitic material, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material.

Preferably wherein from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 40:1, more preferably in the range of from 10:1 to 40:1, more preferably in the range of from 20:1 to 35:1.

It may be preferred that the zeolitic material comprised in the coating of said ammonia oxidation catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 40:1, more preferably in the range of from 10:1 to 40:1, more preferably in the range of from 20:1 to 35:1.

Preferably, the coating of said ammonia oxidation catalyst further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia. More preferably, the coating of said ammonia oxidation catalyst comprises the metal oxide binder at a loading in the range of from 1.22 to 12.20 g/l (0.02 to 0.2 g/in$^3$), preferably in the range of from 4.88 to 10.98 g/l (0.08 to 0.18 g/in$^3$).

With respect to the platinum group metal comprised in the coating of the ammonia oxidation catalyst, it is preferred that the platinum group metal is one or more of platinum, palladium and rhodium, more preferably one or more of platinum and palladium, more preferably platinum.

Further, it is preferred that the oxidic material comprised in the coating of said ammonia oxidation catalyst comprises, more preferably consists of, one or more of alumina, zirconia, silica, titania and ceria, preferably one or more of alumina, silica and zirconia, more preferably one or more of zirconia and alumina.

Preferably from 60 to 100 weight-%, more preferably from 70 to 90 weight-%, more preferably from 75 to 85 weight-% of the oxidic material comprised in the coating of said ammonia oxidation catalyst consist of alumina.

With respect to the substrate of said ammonia oxidation catalyst, it is preferred that said substrate comprises, more preferably consists of, a ceramic or metallic substance.

With regard to the substrate of said ammonia oxidation catalyst comprising, preferably consisting of, a ceramic substrate, no specific restriction exists provided that the substrate is suitable for the intended use of said ammonia oxidation catalyst comprised in the exhaust gas treatment system of the present invention. It is preferred that the ceramic substance comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

With regard to the substrate of said ammonia oxidation catalyst comprising, preferably consisting of a metallic substance, no specific restriction exists provided that the substrate is suitable for the intended use of said ammonia oxidation catalyst comprised in the exhaust gas treatment system of the present invention. It is preferred that the metallic substance preferably comprises, more preferably consists of, oxygen and one or more of iron, chromium and aluminum.

It is preferred that the substrate of said ammonia oxidation catalyst is a monolith, more preferably a honeycomb monolith, more preferably a flow-through honeycomb monolith.

Preferably, the substrate of said ammonia oxidation catalyst has a substrate length and the coating of said ammonia oxidation catalyst is disposed on 20 to 100%, more preferably on 50 to 100%, more preferably on 75 to 100%, more preferably on 95 to 100%, more preferably on 99 to 100% of the substrate length.

Preferably, the coating of said ammonia oxidation catalyst comprises the platinum group metal at a loading, calculated as elemental platinum group metal, in the range of from 0.035 to 0.53 g/l (1 to 15 g/ft$^3$), more preferably in the range of from 0.11 to 0.35 g/l (3 to 10 g/ft$^3$), more preferably in the range of from 0.16 to 0.32 g/l (4.5 to 9.0 g/ft$^3$), more preferably in the range of from 0.26 to 0.30 g/l (7.5 to 8.5 g/ft$^3$).

Preferably, the coating of the ammonia oxidation catalyst comprises the zeolitic material at a loading in the range of from 30.51 to 335.63 g/l (0.5 to 5.5 g/in$^3$), more preferably in the range of from 91.54 to 305.12 g/l (1.5 to 5.0 g/in$^3$), more preferably in the range of from 122.05 to 244.09 g/l (2.0 to 4.0 g/in$^3$), more preferably in the range of from 122.05 to 213.58 g/l (2.0 to 3.5 g/in$^3$).

It is preferred that the coating of the ammonia oxidation catalyst comprises, preferably consist of, platinum supported on an oxidic material comprising alumina, wherein preferably from 75 to 85 weight-% of the oxidic material comprised in the coating of said ammonia oxidation catalyst consist of alumina, a copper containing zeolitic material having a framework structure of the type CHA, and a metal oxide binder as defined in the present invention. More preferably, from 95 to 100 weight-%, more preferably from 98 to 100 weight-%, more preferably from 99 to 100 weight-%, more preferably from 99.5 to 100 weight-% of the coating of the ammonia oxidation catalyst comprises, preferably consist of, platinum supported on an oxidic material comprising alumina, wherein preferably from 75 to 85 weight-% of the oxidic material comprised in the coating of said ammonia oxidation catalyst consist of alumina, a copper containing zeolitic material having a framework structure of the type CHA, and a metal oxide binder as defined in the present invention.

Therefore, the present invention preferably relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising zirconium, wherein from 99 to 100 weight-% of the coating of the first catalyst consist of palladium supported on an oxidic material consisting of zirconium and oxygen, preferably zirconia;

(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises, preferably consists of, a copper containing zeolitic material having a framework structure of the type CHA, and a metal oxide binder as defined in the present invention;

(iii) an ammonia oxidation catalyst comprising a coating disposed on a substrate, wherein the coating comprises, preferably consists of, platinum supported on an oxidic material comprising alumina, wherein preferably from 75 to 85 weight-% of the oxidic material comprised in the coating of the ammonia oxidation catalyst consist of alumina, a copper containing zeolitic material having a framework structure of the type CHA, and a metal oxide binder as defined in the present invention;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system, wherein the ammonia oxidation catalyst according to (iii) is located downstream of the second catalyst according to (ii), wherein the ammonia oxidation catalyst has an inlet end and an outlet end, wherein the outlet end of the second catalyst according to (ii) is in fluid communication with the inlet end of the ammonia oxidation catalyst and wherein between the outlet end of the second catalyst according to (ii) and the inlet end of the ammonia oxidation catalyst, no catalyst for treating the exhaust gas exiting the second catalyst is located in the exhaust gas treatment system.

It is preferred that the ammonia oxidation catalyst consists of a coating disposed on a substrate.

Alternatively, the exhaust gas treatment system of the present invention preferably further comprises a diesel oxidation catalyst located downstream of the second catalyst according to (ii), wherein the diesel oxidation catalyst has an inlet end and an outlet end, wherein the outlet end of the second catalyst according to (ii) is in fluid communication with the inlet end of the diesel oxidation catalyst and between the outlet end of the second catalyst according to (ii) and the inlet end of the diesel oxidation catalyst, no catalyst for treating the exhaust gas exiting the second catalyst is located in the exhaust gas treatment system. More preferably, the diesel oxidation catalyst comprises a coating disposed on a substrate, wherein the coating comprises a platinum group metal supported on an oxidic material.

With respect to the platinum group metal comprised in the coating of said diesel oxidation catalyst, it is preferred that the platinum group metal is one or more of platinum, palladium and rhodium, preferably one or more of platinum and palladium, more preferably platinum.

Further, it is preferred that the oxidic material comprised in the coating of said diesel oxidation catalyst comprises, preferably consists of, one or more of alumina, zirconia, silica, titania and ceria, preferably one or more of alumina, titania and zirconia.

With respect to the substrate of said diesel oxidation catalyst, it is preferred that said substrate comprises, preferably consists of, a ceramic or metallic substance. More preferably, said substrate comprises, more preferably consists of, a cordierite, or oxygen and one or more of iron, chromium and aluminum.

It is preferred that the substrate of said diesel oxidation catalyst is a monolith, preferably a honeycomb monolith, more preferably a flow-through honeycomb monolith.

Preferably, the substrate of said diesel oxidation catalyst has a substrate length and the coating of said diesel oxidation catalyst is disposed on 20 to 100%, preferably on 50 to 100%, more preferably on 75 to 100%, more preferably on 95 to 100%, more preferably on 99 to 100% of the substrate length.

Preferably, the coating of said diesel oxidation catalyst comprises the platinum group metal at a loading, calculated as elemental platinum group metal, in the range of from 0.035 to 1.77 g/l (1 to 50 g/ft$^3$), more preferably in the range of from 0.07 to 1.41 g/l (2 to 40 g/ft$^3$), more preferably in the range of from 0.18 to 1.24 g/l (5 to 35 g/ft$^3$), more preferably in the range of from 0.35 to 1.06 g/l (10 to 30 g/ft$^3$).

Therefore, the present invention preferably relates to an exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising zirconium, wherein from 99 to 100 weight-% of the coating of the first catalyst consist of palladium supported on an oxidic material consisting of zirconium and oxygen, preferably zirconia;

(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises, preferably consists of, a vanadium oxide supported on an oxidic material comprising one or more of titanium, silicon and zirconium, preferably on an oxidic material comprising one or more of titanium and silicon, more preferably on an oxidic material comprising one or more of titania and silica, more preferably on titania, wherein titania optionally contains one or more of tungsten and silicon, wherein the vanadium oxide optionally contains one or more of tungsten, iron and antimony;

(iii) a diesel oxidation catalyst comprising a coating disposed on a substrate, wherein the coating comprises, preferably consists of, platinum supported on an oxidic material comprising one or more of alumina, titania and zirconia;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst; wherein in the exhaust gas treatment system, the second catalyst according to (ii) is located downstream of the first catalyst according to (i) and wherein the inlet end of the second catalyst is arranged upstream of the outlet end of the second catalyst;

wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system, wherein the diesel oxidation catalyst according to (iii) is located downstream of the second catalyst according to (ii), wherein the diesel oxidation catalyst has an inlet end and an outlet end, wherein the outlet end of the second catalyst according to (ii) is in fluid communication with the inlet end of the diesel oxidation catalyst and wherein between the outlet end of the second catalyst according to (ii) and the inlet end of the diesel oxidation catalyst, no catalyst for treating the exhaust gas exiting the second catalyst is located in the exhaust gas treatment system.

Alternatively, according to the present invention, the exhaust gas treatment system preferably further comprises a particulate filter, wherein the particulate filter has an inlet end and an outlet end and is located downstream of the second catalyst according to (ii), preferably wherein the outlet end of the second catalyst according to (ii) is in fluid communication with the inlet end of the particulate filter and between the outlet end of the second catalyst according to (ii) and the inlet end of the particulate filter, no catalyst for treating the exhaust gas stream exiting the second catalyst is located in the exhaust gas treatment system. More preferably, the particulate filter is a catalyzed particulate filter.

The present invention further relates to a method for the simultaneous selective catalytic reduction of NOx, the oxidation of hydrocarbon, the oxidation of nitrogen monoxide and the oxidation of ammonia, comprising (1) providing an exhaust gas stream from a diesel engine comprising one or more of NOx, ammonia, nitrogen monoxide and a hydrocarbon;

(2) passing the exhaust gas stream provided in (1) through the exhaust gas system according to the present invention.

The present invention further relates to a method for preparing a catalyst, preferably the first catalyst comprised in the exhaust gas treatment system according to the present invention, comprising (a) preparing a slurry comprising palladium, an oxidic material comprising one or more of zirconium and aluminum, and water, (b) disposing the slurry obtained in (a) on a substrate, obtaining a slurry-treated substrate;

(c) optionally, drying the slurry-treated substrate obtained in (b), obtaining a substrate having a coating disposed thereon;

(d) calcining the slurry-treated substrate obtained in (b), preferably the dried slurry-treated substrate obtained in (c), obtaining the first catalyst comprised in the exhaust gas treatment system according to the present invention.

Regarding (a) of said method, no specific restriction exists provided that according to (a) a slurry is obtained comprising palladium, an oxidic material comprising one or more of zirconium and aluminum, and water. Preferably, (a) comprises (a.1) mixing an aqueous solution of a palladium precursor, preferably an aqueous palladium nitrate solution, with an oxidic material comprising one or more of zirconium and aluminum, obtaining palladium supported on the oxidic material;

(a.2) calcining the palladium supported on the oxidic material obtained in (a.1);

(a.3) mixing the calcined palladium supported on the oxidic material obtained in (a.2) with a disposing adjuvant, preferably one or more of tartaric acid and monoethanolamine, more preferably tartaric acid and monoethanolamine.

More preferably, (a) further comprises (a.4) milling the mixture obtained in (a.3) to a particle size Dv90, as determined according to Reference Example 1, in the range of from 1 to 20 micrometers, preferably in the range of from 5 to 15 micrometers, more preferably in the range of from 9 to 11 micrometers.

Preferably, according to (a.1), the aqueous solution of a palladium precursor, preferably an aqueous palladium nitrate solution, is added dropwise to the oxidic material.

Preferably, according to (a.2), the palladium supported on the oxidic material is calcined in gas atmosphere having a temperature in the range of from 490 to 690° C., preferably in the range of from 540 to 640° C., more preferably in the range of from 570 to 610° C.

Preferably, according to (a.2), the palladium supported on the oxidic material is calcined in gas atmosphere for a duration in the range of from 2 to 6 hours, preferably in the range of from 3 to 5 hours. More preferably, according to (a.2), the palladium supported on the oxidic material is calcined in gas atmosphere having a temperature in the range of from 570 to 610° C. for a duration in the range of from 3 to 5 hours.

With regard to the oxidic material and palladium used according to (a), reference is made to the respective disclosure above regarding the coating of first catalyst. In particular, it is preferred that palladium is present in the slurry with zirconium or alternatively with aluminum.

Further, it is preferred that, wherein disposing the slurry on a substrate in (b), wherein the substrate has a substrate length, comprises disposing the slurry on 20 to 100%, preferably on 50 to 100%, more preferably from on 75 to 100%, more preferably on 95 to 100%, more preferably on 99 to 100% of the substrate length.

According to (c), the slurry-treated substrate is preferably dried in gas atmosphere having a temperature in the range of from 90 to 200° C., more preferably in the range of from 110 to 180° C., more preferably in the range of from 120 to 160° C., wherein more preferably the slurry-treated substrate is dried in gas atmosphere for a duration in the range of from 5 to 300 minutes, more preferably in the range of 10 to 120 minutes, more preferably in the range of from 20 to 60 minutes.

Further, according to (c), the slurry-treated substrate is preferably dried in gas atmosphere having a temperature in the range of from 90 to 200° C., more preferably in the range of from 100 to 150° C., more preferably in the range of from 110 to 130° C., for a duration in the range of from 5 to 300 minutes, more preferably in the range of from 5 to 60 minutes, more preferably in the range of from 7 to 20 minutes; and further dried in gas atmosphere having a temperature in the range of from 90 to 200° C., preferably in the range of from 140 to 180° C., more preferably in the range of from 150 to 170° C., for a duration in the range of from 5 to 300 minutes, more preferably 10 to 80 minutes, more preferably in the range of from 20 to 40 minutes.

Further, it is preferred that, according to (d), the slurry-treated substrate obtained in (b), preferably the dried slurry-treated substrate obtained in (c), is calcined in gas atmosphere having a temperature in the range of from 300 to 600° C., preferably in the range of from 400 to 500° C., more preferably in the range of from 425 to 475° C.

Preferably, according to (d), the slurry-treated substrate obtained in (b), preferably the dried slurry-treated substrate obtained in (c), is calcined in gas atmosphere for a duration in the range of from 5 to 120 minutes, preferably in the range of from 10 to 90 minutes, more preferably in the range of from 15 to 50 minutes, more preferably in the range of from 20 to 40 minutes.

Preferably, said method consists of (a) preparing a slurry comprising palladium, an oxidic material comprising one or more of zirconium and aluminum, and water, (b) disposing the slurry obtained in (a) on a substrate, obtaining a slurry-treated substrate;

(c) drying the slurry-treated substrate obtained in (b), obtaining a substrate having a coating disposed thereon;

(d) calcining the dried slurry-treated substrate obtained in (c), obtaining the first catalyst comprised in the exhaust gas treatment system according to the present invention.

IV. Embodiments

The present invention is illustrated by the following first set of embodiments and combinations of embodiments resulting from the dependencies and back-references as indicated. The first set of embodiments may be combined with any one of the second set of embodiments and the third set of embodiments below. Further, it is noted that in each instance where a range of embodiments is mentioned, for example in the context of a term such as "The catalytic article (or exhaust gas treatment system) of any one of embodiments 1 to 4", every embodiment in this range is meant to be explicitly disclosed for the skilled person, i.e. the wording of this term is to be understood by the skilled person as being synonymous to "The catalytic article (or exhaust gas treatment system) of any one of embodiments 1, 2, 3 and 4".

1. A catalytic article comprising:
   a substrate having a catalyst composition disposed thereon, wherein the catalyst composition comprises a platinum group metal (PGM) impregnated onto a porous support and a selective catalytic reduction (SCR) catalyst;
   wherein the catalyst composition is substantially free of platinum (Pt); and
   wherein the catalytic article is effective in the abatement of nitrogen oxides ($NO_x$) and hydrocarbons (HCs).

2. The catalytic article of embodiment 1, wherein the PGM is palladium (Pd), rhodium (Rh), or a combination thereof, preferably palladium or rhodium.

3. The catalytic article of embodiment 1 or 2, wherein the PGM has a loading of about 0.1 to 100 g/ft$^3$, preferably 1 to 50 g/ft³, more preferably 1 to 30 g/ft³, more preferably 5 g/ft³ to about 25 g/ft³, calculated as elemental PGM.

4. The catalytic article of any one of embodiments 1 to 3, wherein the porous support comprises a refractory metal oxide material.

5. The catalytic article of embodiment 4, wherein the refractory metal oxide material comprises ceria, zirconia, yttria, lanthana, neodymia, praseodymia, or a combination thereof.

6. The catalytic article of embodiment 4 or 5, wherein the refractory metal oxide material comprises a ceria-zirconia composite.

7. The catalytic article of embodiment 6, wherein the ceria and zirconia of the ceria-zirconia composite are each present in an amount ranging from about 5 to about 75 weight-% based on the total weight of the ceria-zirconia composite.

8. The catalytic article of embodiment 6, wherein the ceria and zirconia of the ceria-zirconia composite are each present in an amount ranging from about 25 to about 60 weight-% based on the total weight of the ceria-zirconia composite.

9. The catalytic article of embodiment 4, wherein the refractory metal oxide material is alumina.

10. The catalytic article of any one of embodiments) to 9, wherein the SCR catalyst comprises a mixed metal oxide component.

11. The catalytic article of embodiment 10, wherein the mixed metal oxide component is selected from $FeTiO_3$, $FeAl_2O_3$, $MgTiO_3$, $MgAlO_3$, $MnO_x/TiO_2$, $CuTiO_3$, $CeZrO_2$, $TiZrO_2$, $V_2O_5/TiO_2$, and mixtures thereof.

12. The catalytic article of embodiment 10 or 11, wherein the mixed metal oxide component comprises titania and vanadia.

13. The catalytic article of embodiment 11 or 12, wherein vanadia is present in the mixed metal oxide component in an amount ranging from about 1 to about 10% by weight based on the total weight of the mixed metal oxide.

14. The catalytic article of any one of embodiments 10 to 13, wherein the mixed metal oxide component further comprises tungsten (W).

15. The catalytic article of any one of embodiments) to 14, wherein the SCR catalyst comprises a metal ion-exchanged molecular sieve.

16. The catalytic article of embodiment 15, wherein the metal is selected from Cu, Co, Ni, La, Mn, Fe, V, Ag, Ce, Nd, Mo, Hf, Y, W, and combinations thereof.

17. The catalytic article of embodiment 16, wherein the metal is Cu, Fe, or a combination thereof.

18. The catalytic article of any one of embodiments 15 to 17, wherein the metal is present in an amount of about 0.1% to about 10% by weight based on the weight of the ion-exchanged molecular sieve, calculated as metal oxide.

19. The catalytic article of any one of embodiments 15 to 18, wherein the molecular sieve is a zeolite.

20. The catalytic article of embodiment 19, wherein the zeolite has a framework structure type selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, and UFI, and combinations thereof.

21. The catalytic article of embodiment 20, wherein the framework structure type is CHA.

22. The catalytic article of any one of embodiments 19 to 21, wherein the zeolite comprised in the catalyst composition, more preferably which has a framework structure type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

23. The catalytic article of any one of embodiments 1 to 22, wherein the platinum group metal impregnated onto a porous support is palladium impregnated onto zirconia and the SCR catalyst comprises one or more of a mixed metal oxide and a zeolite comprising one or more of Cu and Fe.

24. The catalytic article of embodiment 23, wherein the SCR catalyst comprises a zeolite comprising Cu, preferably a zeolite having a framework structure type CHA.

25. The catalytic article of any one of embodiments 1 to 24, wherein the substrate is a honeycomb substrate.

26. The catalytic article of embodiment 25, wherein the honeycomb substrate is metal or ceramic.

27. The catalytic article of embodiment 25 or 26, wherein the honeycomb substrate is a flow-through substrate or a wall flow filter.

28. The catalytic article of any one of embodiments 1 to 27, wherein the catalyst composition comprises a first layer and a second layer, wherein the first layer comprises the SCR catalyst and the second layer comprises PGM impregnated onto the porous support.

29. The catalytic article of embodiment 28, wherein the first layer is disposed directly on the substrate and the second layer is disposed on top of the first layer.

30. The catalytic article of embodiment 28, wherein the second layer is disposed directly on the substrate and the first layer is disposed on top of the second layer.

31. The catalytic article of embodiment 28, wherein the first layer and the second layer are disposed directly on the substrate in a zoned configuration.

32. The catalytic article of any one of embodiments 28 to 31, wherein the SCR catalyst of the first layer comprises one or more of a mixed metal oxide and a zeolite comprising one or more of Cu and Fe, preferably a mixed metal oxide, more preferably $V_2O_5/TiO_2$.

33. The catalytic article of any one of embodiments 28 to 32, wherein the PGM impregnated onto a porous support is palladium or rhodium impregnated on ceria-zirconia.

34. The catalytic article of any one of embodiments 1 to 27, wherein the substrate has an inlet end, an outlet end and a substrate length extending from the inlet end to the outlet end of the substrate and comprises a plurality of passages defined by the internal walls of the substrate and wherein the catalyst composition comprises a first layer and a second layer, wherein the first layer comprises PGM impregnated onto the porous support and the second layer comprises the SCR catalyst.

35. The catalytic article of embodiment 34, wherein the first layer extends from the inlet end to the outlet end of the substrate over 5 to 95% of the substrate length and the second layer extends from the outlet end to the inlet end over 5 to 95% of the substrate length.

36. The catalytic article of embodiment 34 or 35, wherein the first layer extends from the inlet end to the outlet end of the substrate over 20 to 80%, preferably 30 to 70%, more preferably 40 to 60%, more preferably 45 to 55%, of the substrate length and the second layer extends from the outlet end to the inlet end over 20 to 80%, preferably 30 to 70%, more preferably 40 to 60%, more preferably 45 to 55%, of the substrate length.

37. The catalytic article of any one of embodiments 34 to 36, wherein the first layer comprises palladium impregnated onto one or more of zirconia and alumina.

38. The catalytic article of any one of embodiments 34 to 37, wherein the first layer comprises palladium at a loading, calculated as elemental palladium, in the range of from 5 to 100 g/ft³, preferably in the range of from 0.71 to 2.82 g/l (20 to 80 g/ft³), more preferably in the range of from 1.06 to 2.47 g/l (30 to 70 g/ft³), more preferably in the range of from 1.24 to 1.94 g/l (35 to 55 g/ft³), more preferably in the range of from 1.41 to 1.77 g/l (40 to 50 g/ft³).

39. The catalytic article of any one of embodiments 34 to 38, wherein from 98 to 100 weight-%, preferably from 99 to 100 weight-%, more preferably from 99.5 to 100 weight-%, of the first layer consist of palladium impregnated onto one or more of zirconia and alumina.

40. The catalytic article of any one of embodiments 34 to 39, wherein the SCR catalyst comprises a zeolite comprising Cu, preferably a zeolite having the structure type CHA.

41. The catalytic article of any one of embodiments 34 to 40, wherein the second layer further comprises a metal oxide binder, preferably a metal oxide binder as defined in embodiment 27°.

42. The catalytic article of any one of embodiments 34 to 41, wherein from 98 to 100 weight-%, preferably from 99 to 100 weight-%, more preferably from 99.5 to 100 weight-%, of the second layer consist of a zeolite comprising Cu, preferably a zeolite having the structure type CHA, and preferably a metal oxide binder as defined in embodiment 27°.

43. The catalytic article of any one of embodiments 1 to 27, wherein the catalyst composition comprises, preferably consists of, a single layer.

44. The catalytic article of any one of embodiments 1 to 43 being the first catalyst according to (i) of the exhaust gas treatment system according to any one of embodiments 1' to 87'.

45. The catalytic article of any one of embodiments 1 to 43 being the second catalyst according to (ii) of the exhaust gas treatment system according to any one of embodiments 1° to 113°.

46. A method for treating an exhaust gas stream comprising contacting the gas with a catalytic article according to any one of embodiments 1 to 45 such that nitrogen oxides ($NO_x$) and hydrocarbons (HCs) in the exhaust gas stream are reduced.

47. An emission treatment system for treatment of an exhaust gas stream, the emission treatment system comprising:
an engine producing an exhaust gas stream;
a catalytic article according to any one of embodiments 1 to 45 positioned downstream from the engine in fluid communication with the exhaust gas stream and adapted for the reduction of NOx and HCs within the exhaust stream to form a treated exhaust gas stream; and
an injector adapted for the addition of a reductant to the exhaust gas stream upstream of the catalytic article.

48. The emission treatment system of embodiment 47, wherein the catalytic article is positioned to directly receive the engine exhaust gas stream produced from the engine with no intervening catalyst articles.

49. The emission treatment system of embodiment 47 or 48, further comprising an injector adapted for the addition of hydrocarbons to the exhaust gas stream, located upstream of the catalytic article.

50. The emission treatment system of any one of embodiments 47 to 49, further comprising a diesel oxidation catalyst located downstream from the catalytic article.

51. The emission treatment system of any one of embodiments 47 to 49, further comprising a soot filter located downstream from the catalytic article.

52. The emission treatment system of any one of embodiments 47 to 51, wherein the engine is a diesel engine.

53. The emission treatment system of any one of embodiments 47 to 52, wherein the reductant comprises ammonia or an ammonia precursor.

54. An exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises
a catalytic article according to any one of embodiments 31 to 42, the catalytic article having an inlet end and an outlet end;
wherein the catalytic article is the first catalytic article of the exhaust gas treatment system downstream of the upstream end of the exhaust gas treatment system and wherein the inlet end of the catalytic article is arranged upstream of the outlet end of the catalytic article.

55. The exhaust gas treatment system of embodiment 54, further comprising one or more of a diesel oxidation catalyst, a selective catalytic reduction catalyst, an ammonia oxidation catalyst located downstream of the catalytic article.

56. The exhaust gas treatment system of embodiment 54 or 55, further comprising an ammonia oxidation catalyst located downstream of the catalytic article, wherein the ammonia oxidation catalyst has an inlet end and an outlet end, wherein the outlet end of the catalytic article is in fluid communication with the inlet end of the ammonia oxidation catalyst and wherein between the outlet end of the catalytic article and the inlet end of the ammonia oxidation catalyst, no catalyst for treating the exhaust gas exiting the second catalyst is located in the exhaust gas treatment system.

57. The exhaust gas treatment system of embodiment 56, wherein the ammonia oxidation catalyst is as defined in any one of embodiments 93° to 111°.

58. The exhaust gas treatment system of any one of embodiments 54 to 57 further comprising a particulate filter, wherein the particulate filter has an inlet end and an outlet end and is located downstream of the catalytic article, preferably wherein the outlet end of the catalytic article is in fluid communication with the inlet end of the particulate filter and wherein between the outlet end of the catalytic article and the inlet end of the particulate filter, no catalyst for treating the exhaust gas stream exiting the second catalyst is located in the exhaust gas treatment system.

59. The exhaust gas treatment system of embodiment 58, wherein the particulate filter is a catalyzed particulate filter.

60. The exhaust gas treatment system of any one of embodiments 54 to 59, further comprising an injector for injecting a fluid into the exhaust gas stream exiting the diesel engine, said injector being preferably located upstream of the catalytic article and downstream of the upstream end of the exhaust gas treatment system.

61. The exhaust gas treatment system of embodiment 60, wherein the fluid is an aqueous urea solution.

The present invention is further illustrated by the following second set of embodiments and combinations of embodiments resulting from the dependencies and back-references as indicated. The second set of embodiments may be combined with any one of the first set of embodiments above and the third set of embodiments below.

1'. An exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises (i) a first catalyst having an inlet end and an outlet end and comprising a coating disposed on a substrate, wherein the coating comprises palladium supported on an oxidic material comprising zirconium and further comprises one or more of a vanadium oxide and a zeolitic material comprising one or more of copper and iron; or a first catalyst having an inlet end and an outlet end and being a catalytic article according to any one of embodiments 1 to 43;

(ii) a second catalyst having an inlet end and an outlet end and comprising a coating disposed on a substrate, wherein the coating comprises a platinum group metal supported on an oxidic material and further comprises one or more of a vanadium oxide, a tungsten oxide and a zeolitic material comprising one or more of copper and iron;

wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;

wherein in the exhaust gas treatment system, the second catalyst according to (ii) is located downstream of the first catalyst according to (i) and wherein the inlet end of the second catalyst is arranged upstream of the outlet end of the second catalyst.

2'. The exhaust gas treatment system of embodiment 1', wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

3'. The exhaust gas treatment system of embodiment 1' or 2', wherein the first catalyst comprises a hydrocarbon (HC) oxidation component and a nitrogen oxide (NOx) reduction component.

4'. The exhaust gas treatment system of any one of embodiments 1' to 3', wherein from 90 to 100 weight-%, preferably from 95 to 100 weight-%, more preferably from 99 to 100 weight-% of the oxidic material comprised in the coating of the first catalyst consist of zirconium and oxygen, preferably of zirconia.

5'. The exhaust gas treatment system of any one of embodiments 1' to 4', wherein the coating of the first catalyst according to (i) comprises a zeolitic material comprising one or more of copper and iron.

6'. The exhaust gas treatment system of any one of embodiments 1' to 5', wherein the zeolitic material comprised in the coating of the first catalyst has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.

7'. The exhaust gas treatment system of any one of embodiments 1' to 6', wherein the zeolitic material comprised in the coating of the first catalyst, preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

8'. The exhaust gas treatment system of any one of embodiment 5' to 7', wherein the zeolitic material comprised in the coating of the first catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material, wherein the amount of iron comprised in the zeolitic material, calculated as $Fe_2O_3$, is more preferably in the range of from 0 to 0.01 weight-%, more preferably in the range of from 0 to 0.001 weight-%, more preferably in the range of from 0 to 0.0001 weight-%, based on the total weight of the zeolitic material.

9'. The exhaust gas treatment system of embodiment 7' or 8', wherein from 95 to 100 weight-%, preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

10'. The exhaust gas treatment system of any one of embodiments 1' to 6', wherein the zeolitic material comprised in the coating of the first catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-% based on the total weight of the zeolitic material, and wherein preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

11'. The exhaust gas treatment system of any one of embodiments 1' to 10', wherein the coating of the first catalyst further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia;

wherein the coating of the first catalyst more preferably comprises the metal oxide binder at a loading in the range of from 1.22 to 12.20 g/l (0.02 to 0.2 g/in$^3$), more preferably in the range of from 4.27 to 9.15 g/l (0.07 to 0.15 g/in$^3$).

12'. The exhaust gas treatment system of any one of embodiments 1' to 11', wherein the coating of the first catalyst according to (i) comprises a vanadium oxide, wherein the vanadium oxide is preferably one or more of a vanadium (V) oxide and a vanadium (IV) oxide, wherein the vanadium oxide optionally contains one or more of tungsten, iron and antimony.

13'. The exhaust gas treatment system of embodiment 12', wherein the vanadium oxide is supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

14'. The exhaust gas treatment system of any one of embodiments 1' to 13', wherein the substrate of the first catalyst comprises a ceramic or metallic substance.

15'. The exhaust gas treatment system of any one of embodiments 1' to 14', wherein the substrate of the first catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite, or
    wherein the substrate of the first catalyst comprises, preferably consists of, a metallic substance, wherein the metallic substance preferably comprises, more preferably consists of, oxygen and one or more of iron, chromium, and aluminum.

16'. The exhaust gas treatment system of any one of embodiments 1' to 15', wherein the substrate of the first catalyst is a monolith, preferably a honeycomb monolith, more preferably a flow-through honeycomb monolith.

17'. The exhaust gas treatment system of any one of embodiments 1' to 16', wherein the substrate of the first catalyst has a substrate length and wherein the coating of the first catalyst is disposed on 20 to 100%, preferably on 50 to 100%, more preferably on 75 to 100%, more preferably on 95 to 100%, more preferably on 99 to 100% of the substrate length.

18'. The exhaust gas treatment system of any one of embodiments 1' to 17', wherein the coating of the first catalyst comprises palladium at a loading in the range of from 0.035 to 2.82 g/l (1 to 80 g/ft$^3$), preferably in the range of from 0.53 to 2.12 g/l (15 to 60 g/ft$^3$), more preferably in the range of from 0.71 to 1.77 g/l (20 to 50 g/ft$^3$), more preferably in the range of from 0.88 to 1.59 g/l (25 to 45 g/ft$^3$), more preferably in the range of from 0.88 to 1.24 g/l (25 to 35 g/ft$^3$).

19'. The exhaust gas treatment system of any one of embodiments 1' to 18', wherein the coating of the first catalyst comprises the zeolitic material at a loading in the range of from 61.02 to 274.61 g/l (1.0 to 4.5 g/in$^3$), preferably in the range of from 91.54 to 244.10 g/l (1.5 to 4.0 g/in$^3$), more preferably in the range of from 122.05 to 183.07 g/l (2.0 to 3.0 g/in$^3$), more preferably in the range of from 128.15 to 170.87 g/l (2.1 to 2.8 g/in$^3$), more preferably in the range of from 128.15 to 158.66 g/l (2.1 to 2.6 g/in$^3$).

20'. The exhaust gas treatment system of any one of embodiments 1' to 19', wherein the coating of the first catalyst comprises the vanadium oxide at a loading in the range of from 122.04 to 366.14 g/l (2.0 to 6.0 g/in$^3$), preferably in the range of from 183.07 to 335.63 g/l (3.0 to 5.5 g/in$^3$), more preferably in the range of from 244.1 to 305.12 g/l (4.0 to 5.0 g/in$^3$).

21'. The exhaust gas treatment system of any one of embodiments 1' to 20', wherein from 95 to 100 weight-%, preferably from 98 to 100 weight-%, more preferably from 99 to 100 weight-%, more preferably from 99.5 to 100 weight-% of the coating of the first catalyst comprise, preferably consist of, palladium supported on an oxidic material wherein from 99 to 100 weight-% of said oxidic material consist of zirconium and oxygen, preferably of zirconia, and a copper containing zeolitic material having a framework structure of the type CHA, and preferably a metal oxide binder as defined in embodiment 11'.

22'. The exhaust gas treatment system of any one of embodiments 1' to 20', wherein from 95 to 100 weight-%, preferably from 98 to 100 weight-%, more preferably from 99 to 100 weight-%, more preferably from 99.5 to 100 weight-% of the coating of the first catalyst comprise, preferably consist of, palladium supported on an oxidic material wherein from 99 to 100 weight-% of said oxidic material consist of zirconium and oxygen, preferably of zirconia, and a vanadium oxide supported on titania, wherein titania optionally contains one or more of tungsten and silicon.

23'. The exhaust gas treatment system of any one of embodiments 1' to 22', wherein the first catalyst has a selective catalytic reduction (SCR) component and a diesel oxidation component.

24'. The exhaust gas treatment system of any one of embodiments 1' to 23', wherein from 0 to 0.0035 g/l, preferably from 0 to 0.00035 g/l, more preferably from 0 to 0.000035 g/l of one or more of platinum, iridium, osmium and rhodium are comprised in the coating of the first catalyst, wherein more preferably, from 0 to 0.000035 g/l of platinum, iridium, osmium and rhodium are comprised in the coating of the first catalyst.

25'. The exhaust gas treatment system of any one of embodiments 1' to 23', wherein the coating of the first catalyst is free of platinum, preferably free of platinum and rhodium, more preferably free of platinum, rhodium, iridium and osmium.

26'. The exhaust gas treatment system of any one of embodiments 1' to 25', wherein from 0 to 2 weight-%, preferably from 0 to 1 weight-%, more preferably from 0 to 0.1 weight-% of the oxidic material supporting palladium comprised in the coating of the first catalyst consist of ceria and alumina, wherein more preferably from 0 to 0.1 weight-% of the oxidic material comprised in the coating of the first catalyst consists of ceria, alumina, titania, lanthana and baria; or
    wherein the oxidic material supporting palladium comprised in the coating of the first catalyst is free of ceria and alumina, preferably free of ceria, alumina and titania, more preferably free of ceria, alumina, titania, lanthana and baria.

27'. The exhaust gas treatment system of embodiment 1', wherein the first catalyst is the catalytic article according to any one of embodiments 1 to 30 and 43.

28'. The exhaust gas treatment system of any one of embodiments 1' to 27', wherein the second catalyst according to (ii) comprises a nitrogen oxide (NOx) reduction component and an ammonia oxidation component.

29'. The exhaust gas treatment system of any one of embodiments 1' to 28', wherein the second catalyst according to (ii) is an ammonia oxidation (AMOX) catalyst.

30'. The exhaust gas treatment system of any one of embodiments 1' to 29', wherein the coating of the second catalyst according to (ii) comprises a zeolitic material comprising one or more of copper and iron.

31'. The exhaust gas treatment system of any one of embodiments 1' to 30', wherein the zeolitic material comprised in the coating of the second catalyst has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.

32'. The exhaust gas treatment system of any one of embodiments 1' to 31', wherein the zeolitic material comprised in the coating of the second catalyst, preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

33'. The exhaust gas treatment system of any one of embodiments 30' to 32', wherein the zeolitic material comprised in the coating of the second catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material; wherein the amount of iron comprised in the zeolitic material, calculated as $Fe_2O_3$, is more preferably in the range of from 0 to 0.01 weight-%, more preferably in the range of from 0 to 0.001 weight-%, more preferably in the range of from 0 to 0.0001 weight-%, based on the total weight of the zeolitic material.

34'. The exhaust gas treatment system of any one of embodiments 30' to 33', wherein from 95 to 100 weight-%, preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 40:1, more preferably in the range of from 10:1 to 40:1, more preferably in the range of from 20:1 to 35:1.

35'. The exhaust gas treatment system of any one of embodiments 30' to 32', wherein the zeolitic material comprised in the coating of the second catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 40:1, more preferably in the range of from 10:1 to 40:1, more preferably in the range of from 20:1 to 35:1.

36'. The exhaust gas treatment system of any one of embodiments 1' to 35', wherein the coating of the second catalyst further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia;
    wherein the coating of the second catalyst more preferably comprises the metal oxide binder in the coating at a loading in the range of from 1.22 to 12.20 g/l (0.02 to 0.2 g/in$^3$), more preferably in the range of from 4.27 to 9.15 g/l (0.07 to 0.15 g/in$^3$).

37'. The exhaust gas treatment system of any one of embodiments 1' to 36', wherein the platinum group metal comprised in the coating of the second catalyst is one or more of platinum, palladium and rhodium, preferably one or more of platinum and palladium.

38'. The exhaust gas treatment system of embodiment 37', wherein the platinum group metal comprised in the coating of the second catalyst is a mixture of platinum and palladium; wherein the weight ratio of platinum:palladium, calculated as elemental platinum and elemental palladium, comprised in the coating of the second catalyst, is preferably in the range of from 1:1 to 30:1, more preferably in the range of from 5:1 to 20:1, more preferably in the range of from 8:1 to 12:1, more preferably in the range of from 9:1 to 11:1.

39'. The exhaust gas treatment system of embodiment 37', wherein the platinum group metal comprised in the coating of the second catalyst is platinum.

40'. The exhaust gas treatment system of any one of embodiments 1' to 39', wherein the oxidic material supporting the platinum group metal comprised in the coating of the second catalyst comprises, preferably consists of, one or more of alumina, zirconia, silica, titania and ceria, preferably one or more of alumina, silica and zirconia, more preferably one or more of zirconia and alumina.

41'. The exhaust gas treatment system of any one of embodiments 1' to 40', wherein from 20 to 100 weight-%, preferably from 40 to 100 weight-%, more preferably from 60 to 100 weight-%, more preferably from 70 to 90 weight-%, more preferably from 75 to 85 weight-% of the oxidic material supporting the platinum group metal comprised in the coating of the second catalyst consist of alumina.

42'. The exhaust gas treatment system of any one of embodiments 1' to 41', wherein the coating of the second catalyst comprises a vanadium oxide, wherein the vanadium oxide is preferably one or more of a vanadium (V) oxide and a vanadium (IV) oxide, wherein the vanadium oxide optionally contains one or more of tungsten, iron and antimony.

43'. The exhaust gas treatment system of embodiment 42', wherein the vanadium oxide is supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

44'. The exhaust gas treatment system of any one of embodiments 1' to 43', wherein the coating of the second catalyst comprises a tungsten oxide, wherein the tungsten oxide is preferably a tungsten trioxide, wherein the tungsten oxide optionally contains one or more of iron and antimony.

45'. The exhaust gas treatment system of embodiment 44', wherein the tungsten oxide is supported on an oxidic material comprising one or more of titanium and zirconium, preferably an oxidic material comprising one or more of titania and zirconia, more preferably on titania.

46'. The exhaust gas treatment system of any one of embodiments 1' to 45', wherein the coating of the second catalyst comprises a vanadium oxide and a tungsten oxide, wherein the tungsten oxide is a tungsten trioxide, wherein the vanadium oxide is preferably supported on an oxidic material comprising one or more of titanium, silicon and zirconium, preferably an oxidic material comprising one or more of titanium and silicon, more preferably an oxidic material comprising one or more of titania and zirconia, more preferably on titania, wherein titania optionally contains one or more of tungsten and silicon, and the tungsten oxide is preferably supported on an oxidic material comprising one or more of titanium and zirconium, preferably an oxidic material comprising one or more of titania and zirconia, more preferably on titania.

47'. The exhaust gas treatment system of any one of embodiments 1' to 46', wherein the substrate of the second catalyst comprises a ceramic or metallic substance.

48'. The exhaust gas treatment system of any one of embodiments 1' to 47', wherein the substrate of the second catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

49'. The exhaust gas treatment system of any one of embodiments 1' to 47', wherein the substrate of the second catalyst comprises, preferably consists of, a metallic substance, wherein the metallic substance preferably comprises, more preferably consists of, oxygen and one or more of iron, chromium, and aluminum.

50'. The exhaust gas treatment system of any one of embodiments 1' to 49', wherein the substrate of the second catalyst is a monolith, preferably a honeycomb monolith, more preferably a flow-through honeycomb monolith.

51'. The exhaust gas treatment system of any one of embodiments 1' to 50', wherein the substrate of the second catalyst has a substrate length and wherein the coating of the second catalyst is disposed on 20 to 100%, preferably on 50 to 100%, more preferably on 75 to 100%, more preferably on 95 to 100%, more preferably on 99 to 100% of the substrate length.

52'. The exhaust gas treatment system of any one of embodiments 1' to 51', wherein the coating of the second catalyst comprises the platinum group metal, calculated as elemental platinum group metal, at a loading in the range of from 0.035 to 0.53 g/l (1 to 15 g/ft$^3$), preferably in the range of from 0.11 to 0.35 g/l (3 to 10 g/ft$^3$), more preferably in the range of from 0.16 to 0.32 g/l (4.5 to 9.0 g/ft$^3$), more preferably in the range of from 0.26 to 0.30 g/l (7.5 to 8.5 g/ft$^3$).

53'. The exhaust gas treatment system of any one of embodiments 1' to 52', wherein the coating of the second catalyst comprises the zeolitic material at a loading in the range of from 30.51 to 335.63 g/l (0.5 to 5.5 g/in$^3$), more preferably in the range of from 91.54 to 305.12 g/l (1.5 to 5.0 g/in$^3$), more preferably in the range of from 122.05 to 244.09 g/l (2.0 to 4.0 g/in$^3$), more preferably in the range of from 122.05 to 213.58 g/l (2.0 to 3.5 g/in$^3$).

54'. The exhaust gas treatment system of any one of embodiments 1' to 53', wherein the coating of the second catalyst comprises one or more of a vanadium oxide and a tungsten oxide at a loading in the range of from 122.04 to 366.14 g/l (2.0 to 6.0 g/in$^3$), preferably in the range of from 183.07 to 335.63 g/l (3.0 to 5.5 g/in$^3$), more preferably in the range of from 244.1 to 305.12 g/l (4.0 to 5.0 g/in$^3$).

55'. The exhaust gas treatment system of any one of embodiments 1' to 38' and 47' to 53', wherein the coating of the second catalyst comprises, preferably consists of, a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, on an oxidic material comprising a mixture of zirconia and alumina, a zeolitic material having a framework structure of the type CHA and comprising copper, and preferably a metal oxide binder as defined in embodiment 36'.

56'. The exhaust gas treatment system of any one of embodiments 1' to 55', wherein from 95 to 100 weight-%, preferably from 98 to 100 weight-%, more preferably from 99 to 100 weight-%, more preferably from 99.5 to 100 weight-% of the coating of the second catalyst comprise a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina and a zeolitic material having a framework structure of the type CHA and comprising copper, and preferably a metal oxide binder as defined in embodiment 36'.

57'. The exhaust gas treatment system of any one of embodiments 1' to 55', wherein the coating of the first catalyst comprises, preferably consists of, palladium supported on an oxidic material comprising zirconium, preferably consisting of zirconia, and a zeolitic material having a framework structure of the type CHA and comprising copper, and preferably a metal oxide binder as defined in embodiment 11', and wherein the coating of the second catalyst comprises, preferably consists of, a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina and a zeolitic material having a framework structure of the type CHA and comprising copper, and preferably a metal oxide binder as defined in embodiment 36'.

58'. The exhaust gas treatment system of any one of embodiments 1' to 55', wherein the coating of the first catalyst comprises, preferably consists of, palladium supported on an oxidic material comprising zirconium, preferably consisting of zirconia, and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, and wherein the coating of the second catalyst comprises, preferably consists of, a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina and a zeolitic material having a framework structure of the type CHA and comprising copper, and preferably a metal oxide binder as defined in embodiment 36'.

59'. The exhaust gas system of embodiment 57', wherein from 95 to 100 weight-%, preferably from 98 to 100 weight-%, more preferably from 99 to 100 weight-%, more preferably from 99.5 to 100 weight-% of the coating of the first catalyst comprises palladium supported on an oxidic material consisting of zirconia and a zeolitic material having a framework structure type CHA and comprising copper, and preferably a metal oxide binder as defined in embodiment 11', and wherein from 95 to 100 weight-%, preferably from 98 to 100 weight-%, more preferably from 99 to 100 weight- %, more preferably from 99.5 to 100 weight-% of the coating of the second catalyst comprises a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina and a zeolitic material having a framework structure of the type CHA and comprising copper, and preferably a metal oxide binder as defined in embodiment 36'.

60'. The exhaust gas system of embodiment 58', wherein from 95 to 100 weight-%, preferably from 98 to 100 weight-%, more preferably from 99 to 100 weight-%, more preferably from 99.5 to 100 weight-% of the coating of the first catalyst comprises palladium supported on an oxidic material consisting of zirconia and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, and
    wherein from 95 to 100 weight-%, preferably from 98 to 100 weight-%, more preferably from 99 to 100 weight-%, more preferably from 99.5 to 100 weight-% of the coating of the second catalyst comprises a mixture of platinum and palladium, wherein the weight ratio of platinum relative to palladium, calculated as Pt:Pd, is preferably in the range of from 5:1 to 15:1, more preferably in the range of from 8:1 to 12:1, more preferably in the range of from 9:1 to 11:1, supported on an oxidic material comprising a mixture of zirconia and alumina and a zeolitic material having a framework structure of the type CHA and comprising copper, and preferably a metal oxide binder as defined in embodiment 36'.

61'. The exhaust gas treatment system of any one of embodiments 1' to 54', wherein the coating of the second catalyst comprises, preferably consists of, platinum supported on an oxidic material comprising a mixture of zirconia and alumina and a zeolitic material having a framework structure of the type CHA and comprising copper, and preferably a metal oxide binder as defined in embodiment 36'.

62'. The exhaust gas treatment system of any one of embodiments 1' to 54', wherein from 95 to 100 weight-%, preferably from 98 to 100 weight-%, more preferably from 99 to 100 weight-%, more preferably from 99.5 to 100 weight-% of the coating of the second catalyst comprise platinum supported on an oxidic material comprising a mixture of zirconia and alumina and a zeolitic material having a framework structure of the type CHA and comprising copper, and preferably a metal oxide binder as defined in embodiment 36'.

63'. The exhaust gas treatment system of any one of embodiments 1' to 54', wherein the coating of the first catalyst comprises, preferably consists of, palladium supported on an oxidic material comprising zirconium, preferably consisting of zirconia, and a zeolitic material having a framework structure of the type CHA and comprising copper, and preferably a metal oxide binder as defined in embodiment 11', and
    wherein the coating of the second catalyst comprises, preferably consists of, platinum supported on an oxidic material comprising a mixture of zirconia and alumina and a zeolitic material having a framework structure of the type CHA and comprising copper, and preferably a metal oxide binder as defined in embodiment 36'.

64'. The exhaust gas treatment system of any one of embodiments 1' to 54', wherein the coating of the first catalyst comprises, preferably consists of, palladium supported on an oxidic material comprising zirconium, preferably consisting of zirconia, and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, and
    wherein the coating of the second catalyst comprises, preferably consists of, platinum supported on an oxidic material comprising a mixture of zirconia and alumina and a zeolitic material having a framework structure of the type CHA and comprising copper, and preferably a metal oxide binder as defined in embodiment 36'.

65'. The exhaust gas system of embodiment 63', wherein from 95 to 100 weight-%, preferably from 98 to 100 weight-%, more preferably from 99 to 100 weight-%, more preferably from 99.5 to 100 weight-% of the coating of the first catalyst comprises palladium supported on an oxidic material consisting of zirconia, a zeolitic material having a framework structure type CHA and comprising copper, and preferably a metal oxide binder as defined in embodiment 11', and
    wherein from 95 to 100 weight-%, preferably from 98 to 100 weight-%, more preferably from 99 to 100 weight-%, more preferably from 99.5 to 100 weight-% of the coating of the second catalyst comprises platinum supported on an oxidic material comprising a mixture of zirconia and alumina and a zeolitic material having a framework structure of the type CHA and comprising copper, and preferably a metal oxide binder as defined in embodiment 36'.

66'. The exhaust gas system of embodiment 64', wherein from 95 to 100 weight-%, preferably from 98 to 100 weight-%, more preferably from 99 to 100 weight-%, more preferably from 99.5 to 100 weight-% of the coating of the first catalyst comprises palladium supported on an oxidic material consisting of zirconia and a vanadium oxide supported on titania, wherein the vanadium oxide is more preferably one or more of a vanadium (V) oxide and a vanadium (IV) oxide, wherein the vanadium oxide optionally contains one or more of tungsten, iron and antimony, and
    wherein from 95 to 100 weight-%, preferably from 98 to 100 weight-%, more preferably from 99 to 100 weight-%, more preferably from 99.5 to 100 weight-% of the coating of the second catalyst comprises platinum supported on an oxidic material comprising a mixture of zirconia and alumina and a zeolitic material having a framework structure of the type CHA and comprising copper, and preferably a metal oxide binder as defined in embodiment 36'.

67'. The exhaust gas treatment system of any one of embodiments 1' to 66', wherein the substrate of the first catalyst comprises, preferably consists of, a cordierite and the substrate of the second catalyst comprises, preferably consists of, a cordierite.

68'. The exhaust gas treatment system of any one of embodiments 1' to 67', wherein the substrate of the first catalyst on which substrate the coating of the first catalyst is disposed, is a first substrate and the substrate of the second catalyst on which substrate the coating of the second catalyst is disposed, is a second substrate, wherein the first substrate and the second substrate are different from each other.

69'. The exhaust gas treatment system of any one of embodiments 1' to 68', wherein the substrate of the first catalyst has a substrate length in the range of from 2.54 to 25.4 cm (1 to 10 inches), preferably in the range of from 5.08 to 20.32 cm (2 to 8 inches), more preferably in the range of from 10.16 to 19.05 cm (4 to 7.5 inches), more preferably in the range of from 12.7 to 17.78 cm (5 to 7 inches).

70'. The exhaust gas treatment system of any one of embodiments 1' to 69', wherein the substrate of the second catalyst has a substrate length in the range of from 2.54 to 25.4 cm (1 to 10 inches), preferably in the range of from 3.81 to 17.78 cm (1.5 to 7 inches), more preferably in the range of from 5.08 to 12.7 cm (2 to 5 inches), more preferably in the range of from 5.08 to 10.16 cm (2 to 4 inches).

71'. The exhaust gas treatment system of embodiment 69' or 70', wherein the length of the first substrate is greater than the length of the second substrate, wherein the ratio of the length of the first substrate relative to the length of the second substrate is preferably in the range of from 1.1:1 to 4:1, preferably in the range of from 1.5:1 to 3.5:1, more preferably in the range of from 1.9:1 to 2.1:1.

72'. The exhaust gas treatment system of any one of embodiments 1' to 71', wherein the substrate of the first catalyst has a substrate width in the range of from 10.16 to 43.18 cm (4 to 17 inches), preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches).

73'. The exhaust gas treatment system of any one of embodiments 1' to 72', wherein the substrate of the second catalyst has a substrate width in the range of from 10.16 to 43.18 cm (4 to 17 inches), preferably in the range of from 17.78 to 38.10 cm (7 to 15 inches), more preferably in the range from 20.32 to 35.56 cm (8 to 14 inches), more preferably in the range of from 22.86 to 33.02 cm (9 to 13 inches), more preferably in the range of from 22.86 to 27.94 cm (9 to 11 inches).

74'. The exhaust gas treatment system of any one of embodiments 1' to 67' and 69' to 73', wherein the substrate of the first catalyst, on which substrate the coating of the first catalyst is disposed, and the substrate of the second catalyst, on which substrate the coating of the second catalyst is disposed, together form a single substrate, wherein said single substrate comprises an inlet end and an outlet end, wherein the inlet end is arranged upstream of the outlet end, and wherein the coating of the first catalyst is disposed on said single substrate from the inlet end towards the outlet end of said single substrate and the coating of the second catalyst is disposed on said single substrate from the outlet end towards the inlet end of said single substrate, wherein the coating of the first catalyst covers from 25 to 75% of the substrate length and the coating of the second catalyst covers from 25 to 75% of the substrate length.

75'. The exhaust gas treatment system of embodiment 74', wherein the coating of the first catalyst covers from 25 to 70%, preferably from 35 to 65%, more preferably from 45 to 55%, of the substrate length and the coating of the second catalyst covers from 25 to 70%, preferably from 35 to 65%, more preferably on from 45 to 55% of the substrate length.

76'. The exhaust gas treatment system of embodiment 74', wherein the coating of the first catalyst covers from 50 to 75%, preferably from 69 to 75% of the substrate length and the coating of the second catalyst covers from 25 to 50%, preferably from 25 to 31% of the substrate length.

77'. The exhaust gas treatment system of any one of embodiments 74' to 76', wherein the coating of the first catalyst and the coating of the second catalyst overlap.

78'. The exhaust gas treatment system of any one of embodiments 74' to 76', wherein there is a gap between the coating of the first catalyst and the coating of the second catalyst.

79'. The exhaust gas treatment system of any one of embodiments 1' to 78', wherein the first catalyst comprises no further coating.

80'. The exhaust gas treatment system of any one of embodiments 1' to 79', wherein the second catalyst comprises no further coating.

81'. The exhaust gas treatment system of any one of embodiments 1' to 80', further comprising an injector for injecting a fluid into the exhaust gas stream exiting the diesel engine, said injector being located upstream of the first catalyst and downstream of the upstream end of the exhaust gas treatment system.

82'. The exhaust gas treatment system of embodiment 81', wherein the fluid is an aqueous urea solution.

83'. The exhaust gas treatment system of any one of embodiments 1' to 82', further comprising one or more of a diesel oxidation catalyst, a nitrogen oxides reduction catalyst and an ammonia oxidation catalyst located downstream of the second catalyst according to (ii).

84'. The exhaust gas treatment system of any one of embodiments 1' to 83', further comprising a particulate filter, wherein the particulate filter has an inlet end and an outlet end and is located downstream of the second catalyst according to (ii), preferably wherein the outlet end of the second catalyst according to (ii) is in fluid communication with the inlet end of the particulate filter and wherein between the outlet end of the second catalyst according to (ii) and the inlet end of the particulate filter, no catalyst for treating the exhaust gas stream exiting the second catalyst is located in the exhaust gas treatment system.

85'. The exhaust gas treatment system of embodiment 84', wherein the particulate filter is a catalyzed particulate filter.

86'. The exhaust gas treatment system of embodiment 83', comprising a diesel oxidation catalyst and a particulate filter, preferably a catalyzed particulate filter, wherein the diesel oxidation catalyst has an inlet end and an outlet end and is located downstream of the second catalyst according to (ii) and the particulate filter is located downstream of the diesel oxidation catalyst towards the downstream end of the exhaust gas treatment system.

87'. The exhaust gas treatment system of embodiment 86', wherein the outlet end of the second catalyst according to (ii) is in fluid communication with the inlet end of the diesel oxidation catalyst and wherein between the outlet end of the second catalyst according to (Ii) and the inlet end of the diesel oxidation catalyst, no catalyst for treating the exhaust gas stream exiting the second catalyst is located in the exhaust gas treatment system.

88'. A method for the simultaneous selective catalytic reduction of NOx, the oxidation of a hydrocarbon, the oxidation of nitrogen monoxide and the oxidation of ammonia, comprising
(1) providing an exhaust gas stream from a diesel engine comprising one or more of NOx, ammonia, nitrogen monoxide and a hydrocarbon;
(2) passing the exhaust gas stream provided in (1) through the exhaust gas system according to any one of embodiments 1' to 87'.

89'. A catalyst for the selective catalytic reduction of NOx and for the oxidation of a hydrocarbon, comprising a coating disposed on a substrate, wherein the coating comprises palladium supported on an oxidic material comprising zirconium, and further comprises one or more of a vanadium oxide and a zeolitic material comprising one or more of copper and iron, wherein from 0 to 2 weight-% of the oxidic material consist of ceria and alumina.

90'. The catalyst of embodiment 89', comprising a hydrocarbon (HC) oxidation component and a nitrogen (NOx) reduction component.

91'. The catalyst of embodiment 89' or 90', wherein from 90 to 100 weight-%, preferably from 95 to 100 weight-%, more preferably from 99 to 100 weight-% of the oxidic material comprised in the coating consist of zirconium and oxygen, preferably of zirconia.

92'. The catalyst of any one of embodiments 89' to 91', wherein the coating comprises a zeolitic material comprising one or more of copper and iron.

93'. The catalyst of embodiment 92', wherein the zeolitic material comprised in the coating has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework of the type CHA or AEI, more preferably a framework structure of the type CHA, wherein the zeolitic material having a framework structure of the type CHA is more preferably a zeolite SSZ-13.

94'. The catalyst of embodiment 92' or 93', wherein the zeolitic material comprised in the coating of the catalyst, preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

95'. The catalyst of any one of embodiments 92' to 94', wherein the zeolitic material comprised in the coating comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material;

wherein the amount of iron comprised in the zeolitic material, calculated as $Fe_2O_3$, is more preferably in the range of from 0 to 0.01 weight-%, more preferably in the range of from 0 to 0.001 weight-%, more preferably in the range of from 0 to 0.0001 weight-%, based on the total weight of the zeolitic material.

96'. The catalyst of any one of embodiments 93' to 95', wherein from 95 to 100 weight-%, preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

97'. The catalyst of any one of embodiments 92' to 94', wherein the zeolitic material comprised in the coating comprises iron, wherein the amount of iron comprised in the zeolitic material, calculated as $Fe_2O_3$, is preferably in the range of from 0.1 to 10.0 weight-%, more preferably in the range of from 2.0 to 7.0 weight-%, more preferably in the range of from 2.5 to 5.5 weight-% based on the total weight of the zeolitic material, and wherein preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

98'. The catalyst of any one of embodiments 89' to 97', wherein the coating further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia;

wherein the coating comprises the metal oxide binder at a loading in the range of from 1.22 to 12.20 g/l (0.02 to 0.2 g/in³), more preferably in the range of from 4.27 to 9.15 g/l (0.07 to 0.15 g/in³).

99'. The catalyst of any one of embodiments 89' to 98', wherein the coating comprises a vanadium oxide, wherein the vanadium oxide is preferably one or more of a vanadium (V) oxide and a vanadium (IV) oxide, wherein the vanadium oxide optionally contains one or more of tungsten, iron and antimony.

100'. The catalyst of embodiment 99', wherein the vanadium oxide is supported on an oxidic material comprising one or more of titanium, silicon, and zirconium, preferably an oxidic material comprising one or more of titanium and silicon, more preferably an oxidic material comprising one or more of titania and silica, more preferably on titania, wherein titania optionally contains one or more of tungsten and silicon.

101'. The catalyst of any one of embodiments 89' to 100', wherein the substrate comprises a ceramic or metallic substance.

102'. The catalyst of any one of embodiments 89' to 101', wherein the substrate comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.

103'. The catalyst of any one of embodiments 89' to 102', wherein the substrate comprises, preferably consists of, a metallic substance, wherein the metallic substance preferably comprises, more preferably consists of, one or more of iron, chromium, aluminum and oxygen.

104'. The catalyst of any one of embodiments 89' to 103', wherein the substrate is a monolith, preferably a honeycomb monolith, more preferably a flow-through honeycomb monolith.

105'. The catalyst of any one of embodiments 89' to 104', wherein the substrate has a substrate length and wherein the coating is disposed on 20 to 100%, preferably on 50 to 100%, more preferably on 75 to 100%, more preferably on 95 to 100%, more preferably on 99 to 100% of the substrate length.

106'. The catalyst of any one of embodiments 89' to 105', wherein the coating comprises palladium at a loading in the range of from 0.035 to 2.82 g/l (1 to 80 g/ft³), preferably in the range of from 0.53 to 2.12 g/l (15 to 60 g/ft³), more preferably in the range of from 0.71 to 1.77 g/l (20 to 50 g/ft³), more preferably in the range of from 0.88 to 1.59 g/l (25 to 45 g/ft³), more preferably in the range of from 0.88 to 1.24 g/l (25 to 35 g/ft³).

107'. The catalyst of any one of embodiments 89' to 106', wherein the coating comprises the zeolitic material at a loading in the range of from 61.02 to 274.61 g/l (1.0 to 4.5 g/in³), preferably in the range of from 91.54 to 244.10 g/l (1.5 to 4.0 g/in³), more preferably in the range of from 122.05 to 183.07 g/l (2.0 to 3.0 g/in³), more preferably in the range of from 128.15 to 170.87 g/l (2.1 to 2.8 g/in³), more preferably in the range of from 128.15 to 158.66 g/l (2.1 to 2.6 g/in³).

108'. The catalyst of any one of embodiments 89' to 107', wherein the coating comprises the vanadium oxide at a loading in the range of from 122.04 to 366.14 g/l (2.0 to 6.0 g/in³), preferably in the range of from 183.07 to 335.63 g/l (3.0 to 5.5 g/in³), more preferably in the range of from 244.1 to 305.12 g/l (4.0 to 5.0 g/in³).

109'. The catalyst of any one of embodiments 89' to 98' and 101' to 107', wherein from 95 to 100 weight-%, preferably from 98 to 100 weight-%, more preferably from 99 to 100 weight-%, more preferably from 99.5 to 100 weight-% of the coating comprise, preferably consist of, palladium supported on an oxidic material, wherein from 99 to 100 weight-% of said oxidic material consist of zirconium and oxygen, preferably of zirconia, and a copper containing zeolitic material having a framework structure of the type CHA, and preferably a metal oxide binder as defined in embodiment 98'.

110'. The catalyst of any one of embodiments 89' to 91', 99' to 106' and 108', wherein from 95 to 100 weight-%, preferably from 98 to 100 weight-%, more preferably from 99 to 100 weight-%, more preferably from 99.5 to 100 weight-% of the coating comprise, preferably consist of, palladium supported on an oxidic material, wherein from 99 to 100 weight-% of said oxidic material consist of zirconium and oxygen, preferably of zirconia, and a vanadium oxide supported on titania, wherein titania optionally contains one or more of tungsten and silicon.

111'. The catalyst of any one of embodiments 89' to 110' comprises a selective catalytic reduction (SCR) component and a diesel oxidation component.

112'. The catalyst of any one of embodiments 89' to 111', wherein from 0 to 0.0035 g/l, preferably from 0 to 0.00035 g/l, more preferably from 0 to 0.000035 g/l of one or more of platinum, iridium, osmium and rhodium are comprised in the coating, wherein more preferably from 0 to 0.000035 g/l of platinum, iridium, osmium and rhodium are comprised in the coating.

113'. The catalyst of any one of embodiments 89' to 112', wherein the coating is free of platinum, preferably free of platinum and rhodium, more preferably free of platinum, rhodium, iridium and osmium.

114'. The catalyst of any one of embodiments 89' to 113', wherein from 0 to 2 weight-%, preferably from 0 to 1 weight-%, more preferably from 0 to 0.1 weight-% of the oxidic material supporting palladium comprised in the coating consist of ceria, alumina and titania, wherein more preferably from 0 to 0.1 weight-% of the oxidic material comprised in the coating consists of ceria, alumina, titania, lanthana and baria.

115'. The catalyst of any one of embodiments 89' to 114', wherein the oxidic material supporting palladium comprised in the coating is free of ceria, alumina and titania, more preferably free of ceria, alumina, titania, lanthana and baria.

116'. The catalyst of any one of embodiments 89' to 115', wherein the catalyst comprises no further coating.

117'. A method for preparing a catalyst, preferably the catalyst according to any one of embodiments 89' to 116', comprising
  (a) preparing a first mixture comprising palladium, an oxidic material comprising zirconium, wherein from 0 to 2 weight-% of the oxidic material consist of ceria and alumina, and water,
  (b) preparing a second mixture comprising a solvent and one or more of a vanadium oxide and a zeolitic material comprising one or more of copper and iron, wherein the vanadium oxide is preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon;
  (c) mixing the first mixture obtained in (a) and the second mixture obtained in (b) obtaining a slurry;
  (d) disposing the slurry obtained in (c) on a substrate, obtaining a slurry-treated substrate;
  (e) optionally, drying the slurry-treated substrate obtained in (d), obtaining a substrate having a coating disposed thereon;
  (f) calcining the slurry-treated substrate obtained in (d), preferably the dried slurry-treated substrate obtained in (e), obtaining the catalyst according to any one of embodiments 89' to 116'.

118'. The method of embodiment 117', wherein (a) comprises
  (a.1) mixing an aqueous mixture of a palladium precursor, preferably an aqueous palladium nitrate mixture, with an oxidic material comprising zirconium, wherein from 0 to 2 weight-% of the oxidic material consist of ceria and alumina, obtaining palladium supported on the oxidic material;
  (a.2) calcining the palladium supported on the oxidic material obtained in (a.1);
  (a.3) mixing the calcined palladium supported on the oxidic material obtained in (a.2) with a disposing adjuvant, preferably one or more of tartaric acid and monoethanolamine, more preferably tartaric acid and monoethanolamine.

119'. The method of embodiment 118', wherein, according to (a.1), the aqueous mixture of a palladium precursor, preferably an aqueous palladium nitrate mixture, is added dropwise to the oxidic material.

120'. The method of embodiment 118' or 119', wherein, according to (a.2), the palladium supported on the oxidic material is calcined in gas atmosphere having a temperature in the range of from 490 to 690° C., preferably in the range of from 540 to 640° C., more preferably in the range of from 570 to 610° C.

121'. The method of any one of embodiments 118' to 120', wherein, according to (a.2), the palladium supported on the oxidic material is calcined in gas atmosphere for a duration in the range of from 2 to 6 hours, preferably in the range of from 3 to 5 hours.

122'. The method of any one of embodiments 117' to 121', wherein (b) comprises
  (b.1) mixing a mixture of zirconyl acetate with a zeolitic material having a framework structure of the type CHA and comprising one or more of copper and iron or preparing a solution of vanadium oxalate, preferably adding an oxidic material, more preferably with a dispersant;

(b.2) milling the mixture obtained in (b.1) to a particle size Dv90, as determined according to Reference Example 1, in the range of from 1 to 15 micrometers, preferably in the range of from 2 to 10 micrometers, more preferably in the range of from 3.5 to 6 micrometers.

123'. The method of any one of embodiments 117' to 122', wherein disposing the slurry on a substrate in (d), wherein the substrate has a substrate length, comprises disposing the slurry on 20 to 100%, preferably on 50 to 100%, more preferably from on 75 to 100%, more preferably on 95 to 100%, more preferably on 99 to 100% of the substrate length.

124'. The method of any one of embodiments 117' to 123', wherein, according to (e), the slurry-treated substrate is dried in gas atmosphere having a temperature in the range of from 90 to 200° C., preferably in the range of from 110 to 180° C., more preferably in the range of from 120 to 160° C., wherein more preferably the slurry-treated substrate is dried in gas atmosphere for a duration in the range of from 5 to 300 minutes, more preferably in the range of 10 to 120 minutes, more preferably in the range of from 20 to 60 minutes.

125'. The method of any one of embodiments 117' to 124', wherein, according to (e), the slurry-treated substrate is dried in gas atmosphere having a temperature in the range of from 90 to 200° C., preferably in the range of from 100 to 150° C., more preferably in the range of from 110 to 130° C., for a duration in the range of from 5 to 300 minutes, more preferably in the range of from 5 to 60 minutes, more preferably in the range of from 7 to 20 minutes; and further dried in gas atmosphere having a temperature in the range of from 90 to 200° C., preferably in the range of from 140 to 180° C., more preferably in the range of from 150 to 170° C., for a duration in the range of from 5 to 300 minutes, more preferably 10 to 80 minutes, more preferably in the range of from 20 to 40 minutes.

126'. The method of any one of embodiments 117' to 125', wherein, according to (f), the slurry-treated substrate obtained in (d), preferably the dried slurry-treated substrate obtained in (e), is calcined in gas atmosphere having a temperature in the range of from 300 to 600° C., preferably in the range of from 400 to 500° C., more preferably in the range of from 425 to 475° C.

127'. The method of any one of embodiments 117' to 126', wherein, according to (f), the slurry-treated substrate obtained in (d), preferably the dried slurry-treated substrate obtained in (e), is calcined in gas atmosphere for a duration in the range of from 5 to 120 minutes, preferably in the range of from 10 to 90 minutes, more preferably in the range of from 15 to 50 minutes, more preferably in the range of from 20 to 40 minutes.

128'. The method of any one of embodiments 117' to 127', consisting of (a) preparing a first mixture comprising palladium, an oxidic material comprising zirconium, wherein from 0 to 2 weight-% of the oxidic material consist of ceria and alumina, and water, (b) preparing a second mixture comprising a solvent and one or more of a vanadium oxide and a zeolitic material comprising one or more of copper and iron, wherein the vanadium oxide is preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon;

(c) mixing the first mixture obtained in (a) and the second mixture obtained in (b) obtaining a slurry;

(d) disposing the slurry obtained in (c) on a substrate, obtaining a slurry-treated substrate;

(e) drying the slurry-treated substrate obtained in (d), obtaining a substrate having a coating disposed thereon;

(f) calcining the dried slurry-treated substrate obtained in (e), obtaining the catalyst according to any one of embodiments 89' to 116'.

129'. A catalyst, preferably the catalyst according to any one of embodiments 89' to 116', obtainable or obtained by the method according to any one of embodiments 117' to 128', preferably according to embodiment 128'.

130'. Use of the catalyst according to any one of embodiments 89' to 116' or 129' as the first catalyst in an exhaust gas treatment system for treating an exhaust gas stream exiting a diesel engine, preferably in the exhaust gas treatment system according to any one of embodiments 1' to 87'.

131'. Use of the catalyst according to any one of embodiments 89' to 116' or 129' for the simultaneous selective catalytic reduction of NOx and the oxidation of a hydrocarbon.

132'. The use of embodiment 131', wherein the catalyst is used in combination with one or more of a diesel oxidation catalyst, a nitrogen oxides reduction catalyst and an ammonia oxidation catalyst, preferably with an ammonia oxidation catalyst downstream of the catalyst according to any one of embodiments 89' to 116' or 129', more preferably with an ammonia oxidation catalyst downstream of the catalyst according to any one of embodiments 89' to 116' or 129' and a diesel oxidation catalyst downstream of the ammonia oxidation catalyst.

133'. A method for the simultaneously selective catalytic reduction of NOx and the oxidation of a hydrocarbon, wherein the NOx and the hydrocarbon are comprised in an exhaust gas stream, said method comprising (1) providing the exhaust gas stream, preferably from a diesel engine;

(2) passing the exhaust gas stream provided in (1) through the catalyst according to any one of embodiments 89' to 116' or 129'.

134'. A method for preparing a catalyst, preferably the first catalyst comprised in the exhaust gas treatment system according to any one of embodiments 1' to 86', comprising (A) preparing a first mixture comprising palladium, an oxidic material comprising zirconium, and water, (B) preparing a second mixture comprising a solvent and one or more of a vanadium oxide and a zeolitic material comprising one or more of copper and iron, wherein the vanadium oxide is preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon;

(C) mixing the first mixture obtained in (A) and the second mixture obtained in (B) obtaining a slurry;

(D) disposing the slurry obtained in (C) on a substrate, obtaining a slurry-treated substrate;

(E) optionally, drying the slurry-treated substrate obtained in (D), obtaining a substrate having a coating disposed thereon;

(F) calcining the slurry-treated substrate obtained in (D), preferably the dried slurry-treated substrate obtained in (E), obtaining the first catalyst comprised in the exhaust gas treatment system according to any one of embodiments 1' to 87'.

135'. The method of embodiment 134', wherein (A) comprises (A.1) mixing an aqueous mixture of a palladium precursor, preferably an aqueous palladium nitrate mixture, with an oxidic material comprising zirconium, obtaining palladium supported on the oxidic material;

(A.2) calcining the palladium supported on the oxidic material obtained in (A.1);

(A.3) mixing the calcined palladium supported on the oxidic material obtained in (A.2) with a disposing adjuvant, preferably one or more of tartaric acid and monoethanolamine, more preferably tartaric acid and monoethanolamine.

136'. The method of embodiment 135', wherein, according to (A.1), the aqueous mixture of a palladium precursor, preferably an aqueous palladium nitrate mixture, is added dropwise to the oxidic material.

137'. The method of embodiment 135' or 136', wherein, according to (A.2), the palladium supported on the oxidic material is calcined in gas atmosphere having a temperature in the range of from 490 to 690° C., preferably in the range of from 540 to 640° C., more preferably in the range of from 570 to 610° C.

138'. The method of any one of embodiments 135' to 137', wherein, according to (A.2), the palladium supported on the oxidic material is calcined in gas atmosphere for a duration in the range of from 2 to 6 hours, preferably in the range of from 3 to 5 hours.

139'. The method of any one of embodiments 134' to 138', wherein (B) comprises (B.1) mixing a mixture of zirconyl acetate with a zeolitic material having a framework structure of the type CHA and comprising one or more of copper and iron; or preparing a solution of vanadium oxalate, preferably adding an oxidic material, more preferably with a dispersant;

(B.2) milling the mixture obtained in (B.1) to a particle size Dv90, as determined according to Reference Example 1, in the range of from 1 to 15 micrometers, preferably in the range of from 2 to 10 micrometers, more preferably in the range of from 3.5 to 6 micrometers.

140'. The method of any one of embodiments 134' to 139', wherein disposing the slurry on a substrate in (D), wherein the substrate has a substrate length, comprises disposing the slurry on 20 to 100%, preferably on 50 to 100%, more preferably from on 75 to 100%, more preferably on 95 to 100%, more preferably on 99 to 100% of the substrate length.

141'. The method of any one of embodiments 134' to 140', wherein, according to (E), the slurry-treated substrate is dried in gas atmosphere having a temperature in the range of from 90 to 200° C., preferably in the range of from 110 to 180° C., more preferably in the range of from 120 to 160° C., wherein more preferably the slurry-treated substrate is dried in gas atmosphere for a duration in the range of from 5 to 300 minutes, more preferably in the range of 10 to 120 minutes, more preferably in the range of from 20 to 60 minutes.

142'. The method of any one of embodiments 134' to 141', wherein, according to (E), the slurry-treated substrate is dried in gas atmosphere having a temperature in the range of from 90 to 200° C., preferably in the range of from 100 to 150° C., more preferably in the range of from 110 to 130° C., for a duration preferably in the range of from 5 to 300 minutes, more preferably in the range of from 5 to 60 minutes, more preferably in the range of from 7 to 20 minutes; and further dried in gas atmosphere having a temperature in the range of from 90 to 200° C., preferably in the range of from 140 to 180° C., more preferably in the range of from 150 to 170° C., for a duration preferably in the range of from 5 to 300 minutes, more preferably 10 to 80 minutes, more preferably in the range of from 20 to 40 minutes.

143'. The method of any one of embodiments 134' to 142', wherein, according to (F), the slurry-treated substrate obtained in (D), preferably the dried slurry-treated substrate obtained in (E), is calcined in gas atmosphere having a temperature in the range of from 300 to 600° C., preferably in the range of from 400 to 500° C., more preferably in the range of from 425 to 475° C.

144'. The method of any one of embodiments 134' to 143', wherein, according to (F), the slurry-treated substrate obtained in (D), preferably the dried slurry-treated substrate obtained in (E), is calcined in gas atmosphere for a duration in the range of from 5 to 120 minutes, preferably in the range of from 10 to 90 minutes, more preferably in the range of from 15 to 50 minutes, more preferably in the range of from 20 to 40 minutes.

145'. The method of any one of embodiments 134' to 144', consisting of (A) preparing a first mixture comprising palladium, an oxidic material comprising zirconium, and water, (B) preparing a second mixture comprising a solvent and one or more of a vanadium oxide and a zeolitic material comprising one or more of copper and iron, wherein the vanadium oxide is preferably supported on an oxidic material comprising one or more of titanium, silicon, and zirconium, more preferably an oxidic material comprising one or more of titanium and silicon, more preferably an oxidic material comprising one or more of titania and silica, more preferably on titania, wherein titania optionally contains one or more of tungsten and silicon;

(C) mixing the first mixture obtained in (A) and the second mixture obtained in (B) obtaining a slurry;

(D) disposing the slurry obtained in (C) on a substrate, obtaining a slurry-treated substrate;

(E) drying the slurry-treated substrate obtained in (D), obtaining a substrate having a coating disposed thereon;

(F) calcining the dried slurry-treated substrate obtained in (E), obtaining the first catalyst comprised in the exhaust gas treatment system according to any one of embodiments 1' to 87'.

146'. A catalyst, preferably the first catalyst comprised in the exhaust gas treatment system according to any one of embodiments 1' to 87', obtainable or obtained by a method according to any one of embodiments 134' to 145', preferably according to embodiment 145'.

The present invention is further illustrated by the following third set of embodiments and combinations of embodiments resulting from the dependencies and back-references as indicated. The third set of embodiments may be combined with any one of the first set of embodiments and the second set of embodiments above.

1°. An exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises
 (i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising one or more of zirconium, silicon, aluminum and titanium, wherein from 99 to 100 weight-% of the coating of the first catalyst consist of palladium supported on an oxidic material comprising one or more of zirconium, silicon, aluminum and titanium;
 (ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises one or more of a vanadium oxide and a zeolitic material comprising one or more of copper and iron, or
 (ii) a second catalyst having an inlet end and an outlet end and being a catalytic article according to any one of embodiments 1 to 43;
wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;
wherein in the exhaust gas treatment system, the second catalyst according to (ii) is located downstream of the first catalyst according to (i) and wherein the inlet end of the second catalyst is arranged upstream of the outlet end of the second catalyst;
wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

2°. The exhaust gas treatment system of embodiment 1°, wherein the oxidic material comprised in the coating of the first catalyst according to (i) comprises, preferably consists of, one or more of zirconium and aluminum.

3°. The exhaust gas treatment system of embodiment 2°, wherein the oxidic material comprised in the coating of the first catalyst according to (i) comprises aluminum.

4°. The exhaust gas treatment system of embodiment 2°, wherein the oxidic material comprised in the coating of the first catalyst according to (i) comprises zirconium.

5°. The exhaust gas treatment system of embodiment 3°, wherein from 90 to 100 weight-%, preferably from 95 to 100 weight-%, more preferably from 99 to 100 weight-% of the oxidic material comprised in the coating of the first catalyst consist of aluminum and oxygen, preferably of alumina.

6°. The exhaust gas treatment system of embodiment 4°, wherein from 90 to 100 weight-%, preferably from 95 to 100 weight-%, more preferably from 99 to 100 weight-% of the oxidic material comprised in the coating of the first catalyst consist of zirconium and oxygen, preferably of zirconia.

7°. The exhaust gas treatment system of any one of embodiments 1° to 6°, wherein the substrate of the first catalyst comprises a ceramic or metallic substance.

8°. The exhaust gas treatment system of any one of embodiments 1° to 7°, wherein the substrate of the first catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titanic, more preferably one or more of a silicon carbide and a cordierite, more preferably a cordierite.

9°. The exhaust gas treatment system of any one of embodiments 1° to 7°, wherein the substrate of the first catalyst comprises, preferably consists of, a metallic substance, wherein the metallic substance preferably comprises, more preferably consists of, oxygen and one or more of iron, chromium and aluminum.

10°. The exhaust gas treatment system of any one of embodiments 1° to 9°, wherein the substrate of the first catalyst is a monolith, preferably a honeycomb monolith, more preferably a flow-through honeycomb monolith.

11°. The exhaust gas treatment system of any one of embodiments 1° to 10°, wherein the coating of the first catalyst is disposed on the internal walls over 20 to 100%, preferably over 50 to 100%, more preferably over 75 to 100%, more preferably over 95 to 100%, more preferably over 99 to 100% of the substrate length.

12°. The exhaust gas treatment system of any one of embodiments 1° to 11°, wherein the coating of the first catalyst comprises palladium at a loading, calculated as elemental palladium, in the range of from 0.18 to 3.53 g/l (5 to 100 g/ft$^3$), preferably in the range of from 0.71 to 2.82 g/l (20 to 80 g/ft$^3$), more preferably in the range of from 1.06 to 2.47 g/l (30 to 70 g/ft$^3$), more preferably in the range of from 1.24 to 1.94 g/l (35 to 55 g/ft$^3$), more preferably in the range of from 1.41 to 1.77 g/l (40 to 50 g/ft$^3$).

13°. The exhaust gas treatment system of any one of embodiments 1° to 12°, wherein the loading of the coating of the first catalyst is in the range of from 12.20 to 305.11 g/l (0.2 to 5 g/in$^3$), preferably in the range of from 30.51 to 183.07 g/l (0.5 to 3 g/in$^3$), more preferably in the range of 42.72 to 122.05 g/l (0.7 to 2 g/in$^3$), more preferably in the range of 54.92 to 91.54 g/l (0.9 to 1.5 g/in$^3$).

14°. The exhaust gas treatment system of any one of embodiments 1° to 13°, wherein from 99.5 to 100 weight-%, preferably from 99.9 to 100 weight-% of the coating of the first catalyst comprise, preferably consist of, palladium supported on an oxidic material wherein from 99 to 100 weight-% of said oxidic material consist of aluminum and oxygen, preferably of alumina.

15°. The exhaust gas treatment system of any one of embodiments 1° to 13°, wherein from 99.5 to 100 weight-%, preferably from 99.9 to 100 weight-% of the coating of the first catalyst comprise, preferably consist of, palladium supported on an oxidic material wherein from 99 to 100 weight-% of said oxidic material consist of zirconium and oxygen, preferably of zirconia.

16°. The exhaust gas treatment system of any one of embodiments 1° to 15°, wherein from 0 to 0.0035 g/l, preferably from 0 to 0.00035 g/l, more preferably from 0 to 0.000035 g/l of one or more of platinum, iridium, osmium and rhodium are comprised in the coating of the first catalyst, wherein more preferably from 0 to 0.000035 g/l of platinum, iridium, osmium and rhodium are comprised in the coating of the first catalyst.

17°. The exhaust gas treatment system of any one of embodiments 1° to 16°, wherein the coating of the first catalyst is free of platinum, preferably free of platinum and rhodium, more preferably free of platinum, rhodium, iridium and osmium.

18°. The exhaust gas treatment system of any one of embodiments 1° to 17°, wherein from 0 to 2 weight-%, preferably from 0 to 1 weight-%, more preferably from 0 to 0.1 weight-% of the oxidic material comprised in the coating of the first catalyst consist of ceria and titania, wherein more preferably from 0 to 0.1 weight-% of the oxidic material comprised in the coating of the first catalyst consists of ceria, titania, lanthana and baria.

19°. The exhaust gas treatment system of any one of embodiments 1° to 18°, wherein the oxidic material comprised in the coating of the first catalyst is free of ceria, preferably free of ceria and titania, more preferably free of ceria, titania, lanthana and baria.

20°. The exhaust gas treatment system of any one of embodiments 1° to 19°, wherein from 0 to 0.061 g/l, preferably from 0 to 0.0061 g/l, more preferably from 0 to 0.00061 g/l of a selective catalytic reduction (SCR) component is comprised in the coating of the first catalyst, wherein more preferably 0 g/l of a selective catalytic reduction (SCR) component is comprised in the coating of the first catalyst.

21°. The exhaust gas treatment system of any one of embodiments 1° to 20°, wherein the coating of the second catalyst according to (ii) comprises a zeolitic material comprising one or more of copper and iron.

22°. The exhaust gas treatment system of embodiment 21°, wherein the coating of the second catalyst comprises a zeolitic material comprising one or more of copper and iron, wherein the zeolitic material comprised in the coating of the second catalyst has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.

23°. The exhaust gas treatment system of embodiment 21° or 22°, wherein the zeolitic material comprised in the coating of the second catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 5.5 weight-%, more preferably in the range of from 2.5 to 3.5 weight-%, based on the total weight of the zeolitic material; wherein the amount of iron comprised in the zeolitic material, calculated as $Fe_2O_3$, is more preferably in the range of from 0 to 0.01 weight-%, more preferably in the range of from 0 to 0.001 weight-%, more preferably in the range of from 0 to 0.0001 weight-%, based on the total weight of the zeolitic material.

24°. The exhaust gas treatment system of embodiment 22° or 23°, wherein from 95 to 100 weight-%, preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

25°. The exhaust gas treatment system of embodiment 21° or 22°, wherein the zeolitic material comprised in the coating of the second catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-% based on the total weight of the zeolitic material, and wherein preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 45:1, more preferably in the range of from 10:1 to 40:1, more preferably in the range of from 20:1 to 35:1.

26°. The exhaust gas treatment system of any one of embodiments 1° to 25°, wherein the zeolitic material comprised in the coating of the second catalyst, preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

27°. The exhaust gas treatment system of any one of embodiments 1° to 26°, wherein the coating of the second catalyst according to (ii) further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia; wherein the coating comprises the metal oxide binder at a loading in the range of from 1.22 to 12.20 g/l (0.02 to 0.2 g/in$^3$), preferably in the range of from 4.88 to 10.98 g/l (0.08 to 0.18 g/in$^3$).

28°. The exhaust gas treatment system of any one of embodiments 1° to 27°, wherein the coating of the second catalyst according to (ii) comprises a vanadium oxide; wherein the vanadium oxide is preferably one or more of a vanadium (V) oxide and a vanadium (IV) oxide, wherein the vanadium oxide optionally contains one or more of tungsten, iron and antimony.

29°. The exhaust gas treatment system of embodiment 28°, wherein the vanadium oxide is supported on an oxidic material comprising one or more of titanium, silicon and zirconium, preferably on an oxidic material comprising one or more of titanium and silicon, more preferably on an oxidic material comprising one or more of titania and silica preferably on titania, wherein titania optionally contains one or more of tungsten and silicon.

30°. The exhaust gas treatment system of any one of embodiments 1° to 29°, wherein the coating of the second catalyst further comprises a platinum group metal, wherein the platinum group metal is one or more of platinum, palladium, rhodium, iridium and osmium, preferably one or more of palladium and rhodium.

31°. The exhaust gas treatment system of embodiment 30°, wherein the platinum group metal is palladium.

32°. The exhaust gas treatment system of embodiment 30° or 31°, wherein the platinum group metal is supported on an oxidic material, wherein the oxidic material comprised in the coating of the second catalyst comprises one or more of zirconia, silica, alumina and titania, preferably one or more of zirconia and alumina.

33°. The exhaust gas treatment system of embodiment 32°, wherein the platinum group metal is supported on zirconia.

34°. The exhaust gas treatment system of embodiment 33°, wherein from 90 to 100 weight-%, preferably from 95 to 100 weight-%, more preferably from 99 to 100 weight-% of the oxidic material comprised in the coating of the second catalyst consist of zirconia.

35°. The exhaust gas treatment system of any one of embodiments 21° to 34°, wherein the coating of the second catalyst comprises the zeolitic material at a loading in the range of from 61.02 to 274.61 g/l (1.0 to 4.5 g/in$^3$), preferably in the range of from 91.54 to 244.10 g/l (1.5 to 4.0 g/in$^3$), more preferably in the range of from 122.05 to 213.58 g/l (2.0 to 3.5 g/in$^3$), more preferably in the range of from 128.15 to 183.07 g/l (2.1 to 3 g/in$^3$), more preferably in the range of from 128.15 to 158.66 g/l (2.1 to 2.6 g/in$^3$).

36°. The exhaust gas treatment system of any one of embodiments 28° to 35°, wherein the coating of the second catalyst comprises the vanadium oxide at a loading in the range of from 122 to 335 g/l (2.0 to 5.5 g/in$^3$), preferably in the range of from 240 to 300 g/l (3.9 to 4.9 g/in$^3$), more preferably in the range of from 260 to 280 g/l (4.3 to 4.6 g/in$^3$).

37°. The exhaust gas treatment system of any one of embodiments 30° to 36°, wherein the coating of the second catalyst comprises the platinum group metal at a loading, calculated as elemental platinum group metal, in the range of from 0.035 to 2.82 g/l (1 to 80 g/ft$^3$), preferably in the range of from 0.53 to 2.12 g/l (15 to 60 g/ft$^3$), more preferably in the range of from 0.71 to 1.77 g/l (20 to 50 g/ft$^3$), more preferably in the range of from 0.88 to 1.59 g/l (25 to 45 g/ft$^3$), more preferably in the range of from 0.88 to 1.24 g/l (25 to 35 g/ft$^3$).

38°. The exhaust gas treatment system of any one of embodiments 21° to 35°, wherein from 95 to 100 weight-%, preferably from 98 to 100 weight-%, more preferably from 99 to 100 weight-%, more preferably from 99.5 to 100 weight-% of the coating of the second catalyst comprise, preferably consist of, a copper containing zeolitic material having a framework structure of the type CHA, and preferably a metal oxide binder as defined in embodiment 27°.

39°. The exhaust gas treatment system of any one of embodiments 21° to 37°, wherein from 95 to 100 weight-%, preferably from 98 to 100 weight-%, more preferably from 99 to 100 weight-%, more preferably from 99.5 to 100 weight-% of the coating of the second catalyst comprise, preferably consist of, palladium supported on an oxidic material, wherein from 99 to 100 weight-% of said oxidic material consist of zirconium and oxygen, preferably of zirconia, a copper containing zeolitic material having a framework structure of the type CHA, and preferably a metal oxide binder as defined in embodiment 27°.

40°. The exhaust gas treatment system of any one of embodiments 28° to 36°, wherein from 95 to 100 weight-%, preferably from 98 to 100 weight-%, more preferably from 99 to 100 weight-%, more preferably from 99.5 to 100 weight-% of the coating of the second catalyst comprise, preferably consist of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

41°. The exhaust gas treatment system of any one of embodiments 28° to 37°, wherein from 95 to 100 weight-%, preferably from 98 to 100 weight-%, more preferably from 99 to 100 weight-%, more preferably from 99.5 to 100 weight-% of the coating of the second catalyst comprise, preferably consist of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon, and palladium supported on an oxidic material, wherein from 99 to 100 weight-% of said oxidic material consist of zirconium and oxygen, preferably of zirconia.

42°. The exhaust gas treatment system of any one of embodiments 21° to 38°, 40°, wherein from 0 to 0.0035 g/l, preferably from 0 to 0.00035 g/l, more preferably from 0 to 0.000035 g/l, more preferably from 0 to 0.0000035 g/l of one or more of platinum, palladium, rhodium, iridium and osmium are comprised in the coating of the second catalyst, wherein more preferably from 0 to 0.0000035 g/l of platinum, palladium, rhodium, iridium and osmium are comprised in the coating of the second catalyst.

43°. The exhaust gas treatment system of any one of embodiments 21° to 38, 40°, wherein the coating of the second catalyst is free of platinum, palladium and rhodium, preferably free of platinum, palladium, rhodium, iridium and osmium.

44°. The exhaust gas treatment system of any one of embodiments 21° to 41°, wherein from 0 to 0.0035 g/l, preferably from 0 to 0.00035 g/l, more preferably from 0 to 0.000035 g/l, more preferably from 0 to 0.0000035 g/l of one or more of platinum, iridium, osmium and rhodium are comprised in the coating of the second catalyst, wherein more preferably from 0 to 0.0000035 g/l of platinum, iridium, osmium and rhodium are comprised in the coating of the second catalyst.

45°. The exhaust gas treatment system of any one of embodiments 21° to 41°, wherein the coating of the second catalyst is free of platinum, preferably free of platinum and rhodium, more preferably free of platinum, iridium, osmium and rhodium.

46°. The exhaust gas treatment system of any one of embodiments 31° to 45°, wherein from 0 to 2 weight-%, preferably from 0 to 1 weight-%, more preferably from 0 to 0.1 weight-% of the oxidic material supporting palladium comprised in the coating of the second catalyst consist of ceria and alumina, wherein more preferably from 0 to 0.1 weight-% of the oxidic material comprised in the coating of the second catalyst consists of ceria, alumina, titania, lanthana and baria.

47°. The exhaust gas treatment system of any one of embodiments 31° to 45°, wherein the oxidic material supporting palladium comprised in the coating of the second catalyst is free of ceria and alumina, preferably free of ceria, alumina and titania, more preferably free of ceria, alumina, titania, lanthana and baria.

48°. The exhaust gas treatment system of any one of embodiments 1° to 47°, wherein the coating of the second catalyst in which a copper containing zeolitic material having a framework structure of the type CHA and palladium supported on zirconia are comprised is a single coat, wherein the single coat is disposed on at least a portion of the internal walls of the substrate of the second catalyst.

49°. The exhaust gas treatment system of any one of embodiments 23° to 45°, wherein the coating of the second catalyst in which a copper containing zeolitic material having a framework structure of the type CHA and a platinum group metal being one or more of platinum, palladium, rhodium, iridium and osmium, preferably palladium, supported on an oxidic material comprising one or more of zirconia, alumina and titania, preferably one or more of alumina and zirconia, consists of
  a top coat, wherein the copper containing zeolitic material having a framework structure of the type CHA is comprised, and
  a bottom coat, wherein the platinum group metal supported on an oxidic material is comprised, wherein the bottom coat is disposed on at least a portion of the surface of the internal walls of the substrate of the second catalyst and the top coat is disposed on the bottom coat; or
wherein the coating of the second catalyst in which a vanadium oxide, preferably one or more of vanadium (V) oxide and vanadium (IV) oxide, supported on an oxidic material, and a platinum group metal being one or more of platinum, palladium, rhodium, iridium and osmium, preferably palladium, supported on an oxidic material comprising one or more of zirconia, alumina and titania, preferably one or more of alumina and zirconia, consists of
  a top coat, wherein the vanadium oxide supported on an oxidic material is comprised, and a bottom coat, wherein the platinum group metal supported on an oxidic material is comprised, wherein the bottom coat is disposed on at least a portion of the surface of the internal walls of the substrate of the second catalyst and the top coat is disposed on the bottom coat.

50°. The exhaust gas treatment system of embodiment 49°, wherein the platinum group metal comprised in the bottom coat of the second catalyst is palladium.

51°. The exhaust gas treatment system of embodiment 49° or 50°, wherein the oxidic material comprised in the bottom coat of the second catalyst comprises, preferably consists of, one or more of alumina and zirconia.

52°. The exhaust gas treatment system of any one of embodiments 49° to 51°, wherein from 60 to 100 weight-%, preferably from 70 to 90 weight-%, more preferably from 75 to 85 weight-% of the oxidic material comprised in the bottom coat of the second catalyst consist of alumina.

53°. The exhaust gas treatment system of any one of embodiments of 50° to 52°, wherein the bottom coat of the second catalyst comprises palladium at a loading, calculated as elemental palladium, in the range of from 0.035 to 1.41 g/l (1 to 40 g/ft$^3$), preferably in the range of from 0.18 to 1.06 g/l (5 to 30 g/ft$^3$), more preferably in the range of from 0.35 to 0.88 g/l (10 to 25 g/ft$^3$), more preferably in the range of from 0.42 to 0.64 g/l (12 to 18 g/ft$^3$).

54°. The exhaust gas treatment system of any one of embodiments 49° to 53°, wherein from 95 to 100 weight-%, preferably from 98 to 100 weight-%, more preferably from 99 to 100 weight-%, more preferably from 99.5 to 100 weight-% of the bottom coat of the second catalyst comprise, preferably consist of, palladium supported on an oxidic material, wherein from 99.5 to 100 weight-% of said oxidic material comprise, more preferably consist of, one or more of alumina and zirconia.

55°. The exhaust gas treatment system of any one of embodiments 49° to 53°, wherein the top coat of the second catalyst comprises the zeolitic material at a loading in the range of from 61.02 to 274.61 g/l (1 to 4.5 g/in$^3$), preferably in the range of from 91.54 to 244.10 g/l (1.5 to 4 g/in$^3$), more preferably in the range of from 122.05 to 244.10 (2 to 4 g/in$^3$), more preferably in the range of from 152.56 to 213.58 g/l (2.5 to 3.5 g/in$^3$).

56°. The exhaust gas treatment system of any one of embodiments 49° to 55°, wherein from 95 to 100 weight-%, preferably from 98 to 100 weight-%, more preferably from 99 to 100 weight-%, more preferably from 99.5 to 100 weight-% of the bottom coat of the second catalyst comprise, preferably consist of, palladium supported on an oxidic material, wherein from 99.5 to 100 weight-% of said oxidic material comprise, more preferably consist of, one or more of alumina and zirconia; and
  wherein from 95 to 100 weight-%, preferably from 98 to 100 weight-%, more preferably from 99 to 100 weight-%, more preferably from 99.5 to 100 weight-% of the top coat of the second catalyst comprise, preferably consist of, a copper containing zeolitic material having a framework structure of the type CHA, and preferably a metal oxide binder as defined in embodiment 27°.

57°. The exhaust gas treatment system of any one of embodiments 49° to 56°, wherein from 0 to 0.0035 g/l, preferably from 0 to 0.00035 g/l, more preferably from 0 to 0.000035 g/l of one or more of platinum, iridium, osmium and rhodium are comprised in the bottom coat of the second catalyst, wherein more preferably from 0 to 0.000035 g/l of platinum, iridium, osmium and rhodium are comprised in the bottom coat of the second catalyst.

58°. The exhaust gas treatment system of any one of embodiments 49° to 56°, wherein the bottom coat of the second catalyst is free of platinum and rhodium, preferably free of platinum, rhodium, iridium and osmium.

59°. The exhaust gas treatment system of any one of embodiments 49° to 58°, wherein from 0 to 6.10 g/l, preferably from 0 to 0.61 g/l, more preferably from 0 to 0.061 g/l, more preferably from 0 to 0.0061 g/l of one or more of a zeolitic material and a vanadium oxide are comprised in the bottom coat, wherein more preferably from 0 to 0.0061 g/l of a zeolitic material and a vanadium oxide are comprised in the bottom coat of the second catalyst.

60°. The exhaust gas treatment system of any one of embodiments 1° to 59°, wherein the second catalyst is a selective catalytic reduction (SCR) catalyst.

61°. The exhaust gas treatment system of any one of embodiments 1° to 59°, wherein the second catalyst is an ammonia oxidation (AMOX) catalyst.

62°. The exhaust gas treatment system of any one of embodiments 1° to 61°, wherein the second catalyst consists of a coating disposed on a substrate.

63°. The exhaust gas treatment system of any one of embodiments 1° to 20°, wherein the second catalyst is the catalytic article according to any one of embodiments 1 to 30 and 43.

64°. The exhaust gas treatment system of any one of embodiments 1° to 64°, wherein the substrate of the second catalyst comprises a ceramic or metallic substance.

65°. The exhaust gas treatment system of any one of embodiments 1° to 64°, wherein the substrate of the second catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite; or wherein the substrate of the second catalyst comprises, preferably consists of, a metallic substance, wherein the metallic substance preferably comprises, more preferably consists of, oxygen and one or more of iron, chromium and aluminum.

66°. The exhaust gas treatment system of any one of embodiments 1° to 65°, wherein the substrate of the second catalyst is a monolith, preferably a honeycomb monolith, more preferably a flow-through honeycomb monolith.

67°. The exhaust gas treatment system of any one of embodiments 1° to 66°, wherein the substrate of the first catalyst comprises, preferably consists of, oxygen and one or more of iron, chromium and aluminum and the substrate of the second catalyst comprises, preferably consists of, a cordierite.

68°. The exhaust gas treatment system of any one of embodiments 1° to 67°, wherein the substrate of the first catalyst comprises, preferably consists of, a cordierite and the substrate of the second catalyst comprises, preferably consists of, a cordierite.

69°. The exhaust gas treatment system of any one of embodiments 1° to 68°, wherein the substrate of the first catalyst has a substrate length in the range of from 2.54 to 25.4 cm (1 to 10 inches), preferably in the range of from 3.81 to 20.32 cm (1.5 to 8 inches), more preferably in the range of from 5.08 to 17.78 cm (2 to 7 inches), more preferably in the range of from 5.08 to 15.24 cm (2 to 6 inches), more preferably in the range of from 5.08 to 10.16 cm (2 to 4 inches).

70°. The exhaust gas treatment system of any one of embodiments 1° to 69°, wherein the substrate of the second catalyst has a substrate length in the range of from 2.54 to 25.4 cm (1 to 10 inches), preferably in the range of from 3.81 to 20.32 cm (1.5 to 8 inches), more preferably in the range of from 5.08 to 17.78 cm (2 to 7 inches), more preferably in the range of from 5.08 to 15.24 cm (2 to 6 inches), more preferably in the range of from 5.08 to 10.16 cm (2 to 4 inches).

71°. The exhaust gas treatment system of any one of embodiments 1° to 70°, wherein the substrate of the first catalyst has a substrate width in the range of from 10.16 to 43.18 cm (4 to 17 inches), preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches).

72°. The exhaust gas treatment system of any one of embodiments 1° to 71°, wherein the substrate of the second catalyst has a substrate width in the range of from 10.16 to 43.18 cm (4 to 17 inches), preferably in the range of from 17.78 to 38.10 cm (7 to 15 inches), more preferably in the range of from 20.32 to 35.56 cm (8 to 14 inches), more preferably in the range of from 22.86 to 33.02 cm (9 to 13 inches), more preferably in the range of from 22.86 to 27.94 cm (9 to 11 inches).

73°. The exhaust gas treatment system of any one of embodiments 1° to 48° and 60° to 72°, wherein the coating of the second catalyst is disposed on the internal walls of the substrate of the second catalyst over 20 to 100%, preferably over 50 to 100%, more preferably over 75 to 100%, more preferably over 95 to 100%, more preferably over 99 to 100% of the substrate length.

74°. The exhaust gas treatment system of any one of embodiments 1° to 48° and 60° to 73°, wherein the substrate of the first catalyst on which substrate the coating of the first catalyst is disposed, is a first substrate and the substrate of the second catalyst on which substrate the coating of the second catalyst is disposed, is a second substrate, wherein the first substrate and the second substrate are different from each other.

75°. The exhaust gas treatment system of any one of embodiments 1° to 48° and 60° to 73°, wherein the substrate of the first catalyst, on which substrate the coating of the first catalyst is disposed, and the substrate of the second catalyst, on which substrate the coating of the second catalyst is disposed, together form a single substrate, wherein said single substrate comprises an inlet end and an outlet end, wherein the inlet end is arranged upstream of the outlet end, and wherein the coating of the first catalyst is disposed on said single substrate from the inlet end towards the outlet end of said single substrate and the coating of the second catalyst is disposed on said single substrate from the outlet end towards the inlet end of said single substrate, wherein the coating of the first catalyst covers from 5 to 75% of the substrate length and the coating of the second catalyst covers from 25 to 95% of the substrate length.

76°. The exhaust gas treatment system of embodiment 75°, wherein the coating of the first catalyst covers from 20 to 75%, preferably from 35 to 65%, more preferably from 45 to 55%, of the substrate length and the coating of the second catalyst covers from 25 to 80%, preferably from 35 to 65%, more preferably on from 45 to 55% of the substrate length.

77°. The exhaust gas treatment system of embodiment 75°, wherein the coating of the first catalyst covers from 5 to 60%, preferably from 5 to 40%, more preferably from 8 to 30%, more preferably from 10 to 25% of the substrate length and the coating of the second catalyst covers from 40 to 90%, preferably from 50 to 85%, more preferably of from 75 to 85% of the substrate length.

78°. The exhaust gas treatment system of any one of embodiments 75° to 77°, wherein the coating of the first catalyst and the coating of the second catalyst overlap.

79°. The exhaust gas treatment system of any one of embodiments 75° to 77°, wherein there is a gap between the coating of the first catalyst and the coating of the second catalyst.

80°. The exhaust gas treatment system of any one of embodiments 49° to 77°, wherein the bottom coat of the coating of the second catalyst is disposed on the internal walls over 20 to 100%, preferably over 50 to 100%, more preferably over 75 to 100%, more preferably over 95 to 100%, more preferably over 99 to 100% of the substrate length of the substrate of the second catalyst and wherein the top coat of the coating of the second catalyst is disposed over 20 to 100%, preferably over 50 to 100%, more preferably over 75 to 100%, more preferably over 95 to 100%, more preferably over 99 to 100% of the substrate length on the bottom coat.

81°. The exhaust gas treatment system of any one of embodiments 1° to 80°, wherein from 99 to 100 weight-% of the coating of the first catalyst consist of palladium supported on an oxidic compound consisting of aluminum and oxygen, preferably alumina, and the coating of the second catalyst comprises, preferably consists of, a copper containing zeolitic material having a framework structure of the type CHA, and preferably a metal oxide binder as defined in embodiment 27°.

82°. The exhaust gas treatment system of any one of embodiments 1° to 80°, wherein from 99 to 100 weight-% of the coating of the first catalyst consist of palladium supported on an oxidic compound consisting of zirconium and oxygen, preferably zirconia, and the coating of the second catalyst comprises, preferably consists of, a copper containing zeolitic material having a framework structure of the type CHA, and preferably a metal oxide binder as defined in embodiment 27°.

83°. The exhaust gas treatment system of any one of embodiments 1° to 80°, wherein from 99.5 to 100 weight-%, preferably from 99.9 to 100 weight-% of the coating of the first catalyst consist of palladium supported on an oxidic compound consisting of aluminum and oxygen, preferably alumina, and from 95 to 100 weight-%, preferably from 98 to 100 weight-%, more preferably from 99 to 100 weight-%, more preferably from 99.5 to 100 weight-% of the coating of the second catalyst comprises, preferably consists of, a copper containing zeolitic material having a framework structure of the type CHA, and preferably a metal oxide binder as defined in embodiment 27°.

84°. The exhaust gas treatment system of any one of embodiments 1° to 80°, wherein from 99.5 to 100 weight-%, preferably from 99.9 to 100 weight-% of the coating of the first catalyst consist of palladium supported on an oxidic compound consisting of zirconium an oxygen, preferably zirconia, and from 95 to 100 weight-%, preferably from 98 to 100 weight-%, more preferably from 99 to 100 weight-%, more preferably from 99.5 to 100 weight-% of the coating of the second catalyst comprises, preferably consists of, a copper containing zeolitic material having a framework structure of the type CHA, and preferably a metal oxide binder as defined in embodiment 27°.

85°. The exhaust gas treatment system of any one of embodiments 1° to 80°, wherein from 99 to 100 weight-% of the coating of the first catalyst consist of palladium supported on an oxidic compound consisting of aluminum and oxygen, preferably alumina, and the coating of the second catalyst comprises, preferably consists of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

86°. The exhaust gas treatment system of any one of embodiments 1° to 80°, wherein from 99 to 100 weight-% of the coating of the first catalyst consist of palladium supported on an oxidic compound consisting of zirconium and oxygen, preferably zirconia, and the coating of the second catalyst comprises, preferably consists of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

87°. The exhaust gas treatment system of any one of embodiments 1° to 80°, wherein from 99.5 to 100 weight-%, preferably from 99.9 to 100 weight-% of the coating of the first catalyst consist of palladium supported on an oxidic compound consisting of aluminum and oxygen, preferably alumina, and from 95 to 100 weight-%, preferably from 98 to 100 weight-%, more preferably from 99 to 100 weight-%, more preferably from 99.5 to 100 weight-% of the coating of the second catalyst comprises, preferably consists of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

88°. The exhaust gas treatment system of any one of embodiments 1° to 80°, wherein from 99.5 to 100 weight-%, preferably from 99.9 to 100 weight-% of the coating of the first catalyst consist of palladium supported on an oxidic compound consisting of zirconium and oxygen, preferably zirconia, and from 95 to 100 weight-%, preferably from 98 to 100 weight-%, more preferably from 99 to 100 weight-%, more preferably from 99.5 to 100 weight-% of the coating of the second catalyst comprises, preferably consists of, a vanadium oxide supported on an oxidic material comprising one or more of titanium, silicon and zirconium, preferably an oxidic material comprising one or more of titanium and silicon, more preferably an oxidic material comprising one or more of titania and silica, more preferably on titania, wherein titania optionally contains one or more of tungsten and silicon.

89°. The exhaust gas treatment system of any one of embodiments 1° to 88°, further comprising an injector for injecting a fluid into the exhaust gas stream exiting the diesel engine, said injector being located upstream of the first catalyst and downstream of the upstream end of the exhaust gas treatment system.

90°. The exhaust gas treatment system of embodiment 89°, wherein the fluid is an aqueous urea solution.

91°. The exhaust gas treatment system of any one of embodiments 1° to 90°, further comprising one or more of a diesel oxidation catalyst, a selective catalytic reduction catalyst, an ammonia oxidation catalyst located downstream of the second catalyst according to (ii).

92°. The exhaust gas treatment system of embodiment 91°, further comprising an ammonia oxidation catalyst located downstream of the second catalyst according to (ii), wherein the ammonia oxidation catalyst has an inlet end and an outlet end, wherein the outlet end of the second catalyst according to (ii) is in fluid communication with the inlet end of the ammonia oxidation catalyst and wherein between the outlet end of the second catalyst according to (ii) and the inlet end of the ammonia oxidation catalyst, no catalyst for treating the exhaust gas exiting the second catalyst is located in the exhaust gas treatment system.

93°. The exhaust gas treatment system of embodiment 92°, wherein the ammonia oxidation catalyst comprises a coating disposed on a substrate, wherein the coating comprises a platinum group metal supported on an oxidic material and a zeolitic material comprising one or more of copper and iron.

94°. The exhaust gas treatment system of embodiment 93°, wherein the zeolitic material comprised in the coating of said ammonia oxidation catalyst has a framework structure of the type AEI, GME, CHA, MFI, BEA, FAU, MOR or mixtures of two or more thereof, preferably a framework structure of the type AEI, CHA, BEA or mixtures of two or more thereof, more preferably a framework structure of the type CHA or AEI, more preferably a framework structure of the type CHA.

95°. The exhaust gas treatment system of embodiment 93° or 94°, wherein the zeolitic material comprised in the coating of said ammonia oxidation catalyst comprises copper, wherein the amount of copper comprised in the zeolitic material, calculated as CuO, is preferably in the range of from 0.1 to 10.0 weight-%, more preferably in the range of from 2.0 to 7.0 weight-%, more preferably in the range of from 2.5 to 6 weight-%, more preferably in the range of from 2.5 to 5.5 weight-%, more preferably in the range of from 2.5 to 3.5 weight-% based on the total weight of the zeolitic material;

wherein the amount of iron comprised in the zeolitic material, calculated as $Fe_2O_3$, is more preferably in the range of from 0 to 0.01 weight-%, more preferably in the range of from 0 to 0.001 weight-%, more preferably in the range of from 0 to 0.0001 weight-%, based on the total weight of the zeolitic material.

96°. The exhaust gas treatment system of embodiment 95°, wherein from 95 to 100 weight-%, preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SO_2:Al_2O_3$, is preferably in the range of from 2:1 to 50:1, more preferably in the range of from 4:1 to 40:1, more preferably in the range of from 10:1 to 40:1, more preferably in the range of from 20:1 to 35:1.

97°. The exhaust gas treatment system of embodiment 93° or 94°, wherein the zeolitic material comprised in the coating of said ammonia oxidation catalyst comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight-%, more preferably from 99 to 100 weight-% of the framework structure of the zeolitic material consist to Si, Al, O, and optionally one or more of H and P, wherein in the framework structure, the molar ratio of Si to Al, calculated as molar $SiO_2:Al_2O_3$, is preferably in the range of from 2:1 to 50:1, more preferably in the range of from 4:1 to 40:1, more preferably in the range of from 10:1 to 40:1, more preferably in the range of from 20:1 to 35:1.

98°. The exhaust gas treatment system of any one of embodiments 93° to 97°, wherein the zeolitic material comprised in the coating of the ammonia oxidation catalyst, more preferably which has a framework type CHA, has a mean crystallite size of at least 0.5 micrometer, preferably in the range of from 0.5 to 1.5 micrometers, more preferably in the range of from 0.6 to 1.0 micrometer, more preferably in the range of from 0.6 to 0.8 micrometer determined via scanning electron microscopy.

99°. The exhaust gas treatment system of any one of embodiments 93° to 98°, wherein the coating of the ammonia oxidation catalyst further comprises a metal oxide binder, wherein the metal oxide binder preferably comprises one or more of zirconia, alumina, titania, silica, and a mixed oxide comprising two or more of Zr, Al, Ti, and Si, more preferably comprises one or more of alumina and zirconia, more preferably comprises zirconia; wherein the coating comprises the metal oxide binder at a loading in the range of from 1.22 to 12.20 g/l (0.02 to 0.2 g/in$^3$), preferably in the range of from 4.88 to 10.98 g/l (0.08 to 0.18 g/in$^3$).

100°. The exhaust gas treatment system of any one of embodiments 93° to 99°, wherein the platinum group metal comprised in the coating of said ammonia oxidation catalyst is one or more of platinum, palladium and rhodium, preferably one or more of platinum and palladium, more preferably platinum.

101°. The exhaust gas treatment system of any one of embodiments 93° to 100°, wherein the oxidic material comprised in the coating of said ammonia oxidation catalyst comprises, preferably consists of, one or more of alumina, zirconia, silica, titania and ceria, preferably one or more of alumina, silica and zirconia, more preferably one or more of zirconia and alumina.

102°. The exhaust gas treatment system of any one of embodiments 93° to 101°, wherein from 60 to 100 weight-%, preferably from 70 to 90 weight-%, more preferably from 75 to 85 weight-% of the oxidic material comprised in the coating of said ammonia oxidation catalyst consist of alumina.

103°. The exhaust gas treatment system of any one of embodiments 93° to 102°, wherein the substrate of said ammonia oxidation catalyst comprises a ceramic or metallic substance.

104°. The exhaust gas treatment system of any one of embodiments 93° to 103°, wherein the substrate of said ammonia oxidation catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite; or wherein the substrate of said ammonia oxidation catalyst comprises, preferably consists of, a metallic substance, wherein the metallic substance preferably comprises, more preferably consists of, oxygen and one or more of iron, chromium and aluminum.

105°. The exhaust gas treatment system of any one of embodiments 93° to 104°, wherein the substrate of said ammonia oxidation catalyst is a monolith, preferably a honeycomb monolith, more preferably a flow-through honeycomb monolith.

106°. The exhaust gas treatment system of any one of embodiments 93° to 105°, wherein the substrate of said ammonia oxidation catalyst has a substrate length and wherein the coating of said ammonia oxidation catalyst is disposed on 20 to 100%, preferably on 50 to 100%, more preferably on 75 to 100%, more preferably on 95 to 100%, more preferably on 99 to 100% of the substrate length.

107°. The exhaust gas treatment system of any one of embodiments 93° to 106°, wherein the coating of said ammonia oxidation catalyst comprises the platinum group metal, calculated as elemental platinum group metal, at a loading in the range of from 0.035 to 0.53 g/l (1 to 15 g/ft$^3$), preferably in the range of from 0.11 to 0.35 g/l (3 to 10 g/ft$^3$), more preferably in the range of from 0.16 to 0.32 g/l (4.5 to 9.0 g/ft$^3$), more preferably in the range of from 0.26 to 0.30 g/l (7.5 to 8.5 g/ft$^3$).

108°. The exhaust gas treatment system of any one of embodiments 93° to 107°, wherein the coating of the ammonia oxidation catalyst comprises the zeolitic material at a loading in the range of from 30.51 to 335.63 g/l (0.5 to 5.5 g/in$^3$), more preferably in the range of from 91.54 to 305.12 g/l (1.5 to 5.0 g/in$^3$), more preferably in the range of from 122.05 to 244.09 g/l (2.0 to 4.0 g/in$^3$), more preferably in the range of from 122.05 to 213.58 g/l (2.0 to 3.5 g/in$^3$).

109°. The exhaust gas treatment system of any one of embodiments 93° to 108°, wherein the coating of the ammonia oxidation catalyst comprises, preferably consist of, platinum supported on an oxidic material comprising alumina, wherein preferably from 75 to 85 weight-% of the oxidic material comprised in the coating of said ammonia oxidation catalyst consist of alumina, a copper containing zeolitic material having a framework structure of the type CHA, and preferably a metal oxide binder as defined in embodiment 99°.

110°. The exhaust gas treatment system of any one of embodiments 93° to 109°, wherein from 95 to 100 weight-%, preferably from 98 to 100 weight-%, more preferably from 99 to 100 weight-%, more preferably from 99.5 to 100 weight-% of the coating of the ammonia oxidation catalyst comprises, preferably consist of, platinum supported on an oxidic material comprising alumina, wherein preferably from 75 to 85 weight-% of the oxidic material comprised in the coating of said ammonia oxidation catalyst consist of alumina, and a copper containing zeolitic material having a framework structure of the type CHA, and preferably a metal oxide binder as defined in embodiment 99°.

111°. The exhaust gas treatment system of any one of embodiments 93° to 110°, wherein the ammonia oxidation catalyst consists of a coating disposed on a substrate.

112°. The exhaust gas treatment system of any one of embodiments 1° to 90°, further comprising a particulate filter, wherein the particulate filter has an inlet end and an outlet end and is located downstream of the second catalyst according to (ii), preferably wherein the outlet end of the second catalyst according to (ii) is in fluid communication with the inlet end of the particulate filter and wherein between the outlet end of the second catalyst according to (ii) and the inlet end of the particulate filter, no catalyst for treating the exhaust gas stream exiting the second catalyst is located in the exhaust gas treatment system.

113°. The exhaust gas treatment system of embodiment 112°, wherein the particulate filter is a catalyzed particulate filter.

114°. A method for the simultaneous selective catalytic reduction of NOx, the oxidation of hydrocarbon, the oxidation of nitrogen monoxide and the oxidation of ammonia, comprising
(1) providing an exhaust gas stream from a diesel engine comprising one or more of NOx, ammonia, nitrogen monoxide and a hydrocarbon;
(2) passing the exhaust gas stream provided in (1) through the exhaust gas system according to any one of embodiments 1° to 113°.

115°. A method for preparing a catalyst, preferably the first catalyst comprised in the exhaust gas treatment system according to any one of embodiments 1° to 113°, comprising
(a) preparing a slurry comprising palladium, an oxidic material comprising one or more of zirconium and aluminum, and water,
(b) disposing the slurry obtained in (a) on a substrate, obtaining a slurry-treated substrate;
(c) optionally, drying the slurry-treated substrate obtained in (b), obtaining a substrate having a coating disposed thereon;
(d) calcining the slurry-treated substrate obtained in (b), preferably the dried slurry-treated substrate obtained in (c), obtaining a catalyst, preferably the first catalyst comprised in the exhaust gas treatment system according to any one of embodiments 1° to 113°.

116°. The method of embodiment 115°, wherein (a) comprises
(a.1) mixing an aqueous solution of a palladium precursor, preferably an aqueous palladium nitrate solution, with an oxidic material comprising one or more of zirconium and aluminum, obtaining palladium supported on the oxidic material;
(a.2) calcining the palladium supported on the oxidic material obtained in (a.1);
(a.3) mixing the calcined palladium supported on the oxidic material obtained in (a.2) with a disposing adjuvant, preferably one or more of tartaric acid and monoethanolamine, more preferably tartaric acid and monoethanolamine.

117°. The method of embodiment 116°, wherein (a) further comprises
(a.4) milling the mixture obtained in (a.3) to a particle size Dv90, as determined according to Reference Example 1, in the range of from 1 to 20 micrometers, preferably in the range of from 5 to 15 micrometers, more preferably in the range of from 9 to 11 micrometers.

118°. The method of embodiment 116° or 117°, wherein, according to (a.1), the aqueous solution of a palladium precursor, preferably an aqueous palladium nitrate solution, is added dropwise to the oxidic material.

119°. The method of any one of embodiments 116° to 118°, wherein, according to (a.2), the palladium supported on the oxidic material is calcined in gas atmosphere having a temperature in the range of from 490 to 690° C., preferably in the range of from 540 to 640° C., more preferably in the range of from 570 to 610° C.

120°. The method of any one of embodiments 116° to 119°, wherein, according to (a.2), the palladium supported on the oxidic material is calcined in gas atmosphere for a duration in the range of from 2 to 6 hours, preferably in the range of from 3 to 5 hours.

121°. The method of any one of embodiments 115° to 120°, wherein disposing the slurry on a substrate in (b), wherein the substrate has a substrate length, comprises disposing the slurry on 20 to 100%, preferably on 50 to 100%, more preferably from on 75 to 100%, more preferably on 95 to 100%, more preferably on 99 to 100% of the substrate length.

122°. The method of any one of embodiments 115° to 121°, wherein, according to (c), the slurry-treated substrate is dried in gas atmosphere having a temperature in the range of from 90 to 200° C., preferably in the range of from 110 to 180° C., more preferably in the range of from 120 to 160° C., wherein more preferably the slurry-treated substrate is dried in gas atmosphere for a duration in the range of from 5 to 300 minutes, more preferably in the range of 10 to 120 minutes, more preferably in the range of from 20 to 60 minutes.

123°. The method of any one of embodiments 115° to 121°, wherein, according to (c), the slurry-treated substrate is dried in gas atmosphere having a temperature in the range of from 90 to 200° C., preferably in the range of from 100 to 150° C., more preferably in the range of from 110 to 130° C., for a duration preferably in the range of from 5 to 300 minutes, more preferably in the range of from 5 to 60 minutes, more preferably in the range of from 7 to 20 minutes; and further dried in gas atmosphere having a temperature in the range of from 90 to 200° C., preferably in the range of from 140 to 180° C., more preferably in the range of from 150 to 170° C., for a duration preferably in the range of from 5 to 300 minutes, more preferably 10 to 80 minutes, more preferably in the range of from 20 to 40 minutes.

124°. The method of any one of embodiments 115° to 123°, wherein, according to (d), the slurry-treated substrate obtained in (b), preferably the dried slurry-treated substrate obtained in (c), is calcined in gas atmosphere having a temperature in the range of from 300 to 600° C., preferably in the range of from 400 to 500° C., more preferably in the range of from 425 to 475° C.

125°. The method of any one of embodiments 115° to 124°, wherein, according to (d), the slurry-treated substrate obtained in (b), preferably the dried slurry-treated substrate obtained in (c), is calcined in gas atmosphere for a duration in the range of from 5 to 120 minutes, preferably in the range of from 10 to 90 minutes, more preferably in the range of from 15 to 50 minutes, more preferably in the range of from 20 to 40 minutes.

126°. The method of any one of embodiments 115° to 125°, consisting of
(a) preparing a slurry comprising palladium, an oxidic material comprising one or more of zirconium and aluminum, and water,
(b) disposing the slurry obtained in (a) on a substrate, obtaining a slurry-treated substrate;
(c) drying the slurry-treated substrate obtained in (b), obtaining a substrate having a coating disposed thereon;
(d) calcining the dried slurry-treated substrate obtained in (c), obtaining a catalyst, preferably the first catalyst comprised in the exhaust gas treatment system according to any one of embodiments 1° to 113°.

The present invention is further illustrated by the following Reference Examples, Comparative Examples, and Examples.

EXAMPLES

Reference Example 1

Determination of the Dv90 Values

The particle size distributions were determined by a static light scattering method using Sympatec HELOS equipment, wherein the optical concentration of the sample was in the range of from 5 to 10%.

Reference Example 2

Preparation of a CuCHA Zeolite

The zeolitic material having the framework structure type CHA comprising Cu and used in the examples herein was prepared according to the teaching of U.S. Pat. No. 8,293,199 B2. Particular reference is made to Inventive Example 2 of U.S. Pat. No. 8,293,199 B2, column 15, lines 26 to 52.

Example 1

Preparation of SCR catalyst article 1

A SCR catalytic article was prepared having two layers: a bottom washcoat layer and a top washcoat layer. The layered SCR catalytic article contained palladium with a total PGM loading of 10.8 g/ft$^3$, on a zirconia-ceria support (50% zirconia; 40% ceria; 5% lanthana; 5% praseodymia by weight), and a titania-based SCR catalyst. The substrate had a volume of 5.3 in$^3$ (0.091), a cell density of 300 cells per square inch, and a wall thickness of approximately 5 mil (0.005 inches). The layers were prepared as follows:

Bottom Washcoat Layer

A zirconia-ceria support was impregnated with a diluted Pd precursor solution using incipient wetness techniques to afford Pd-impregnated zirconia-ceria. This material was then added into ionized (DI) water to form a slurry suspension ranging from about 15 to about 30 weight-% solid content. The slurry was gently milled to break down few large aggregates, and the final particle size was a Dv90 ranging from about 8 to about 12 micrometers. The slurry was then coated onto a 300/5 honeycomb substrate. After drying, the catalyst was calcined at 550° C. for 1 hour in air. The resulting washcoat loading is 0.5 g/in$^3$ content, and the palladium loading was 10.8 g/ft$^3$.

Top Washcoat Layer

The top coated SCR catalyst was prepared from a commercially available TiO$_2$ support containing WO$_3$ and SiO$_2$. The powder was dispersed in deionized water by gentle mixing in the presence of organic dispersants. Vanadium oxalate was added to the slurry in an amount necessary to achieve 5% by weight V$_2$O$_5$ on the final dry TiO$_2$ support. A colloidal silica was added to the slurry in an amount necessary to give 5% by silica on the final dried TiO$_2$ support. The particle size of the final slurry (Dv90) was 1 to 7 micrometers with a pH between 4 to 7.5. The slurry was applied onto the above-mentioned substrate to coat over the bottom washcoat layer using deposition methods known in the art. After coating the substrate, the top washcoat was dried, and then calcined at a temperature of 500° C. for 1 hour in air to render the final two-layered SCR catalytic article. The resulting washcoat loading of the top washcoat was 3 g/in$^3$ content.

Example 2

Preparation of SCR Catalyst Article 2

A SCR catalytic article was prepared following the procedure of Example 1 except the bottom layer had a palladium loading of 22.3 g/ft$^3$.

Example 3

Preparation of SCR Catalyst Article 3

A SCR catalytic article was prepared following the procedure of Example 1 having two layers: the bottom layer contained a titania-based commercially available SCR catalyst comprising 2.5 weight-% V$_2$O$_5$ vanadia; and the top layer contained zirconia-ceria impregnated with palladium at a loading of 8.7 g/ft$^3$.

Example 4

Preparation of SCR Catalyst Article 4

A SCR catalytic article was prepared following the procedure of Example 1 except the bottom layer had a rhodium loading of 14.3 g/ft$^3$.

Example 5

Preparation of SCR Catalyst Article 5

A SCR catalytic article was prepared following the procedure of Example 1 except the bottom layer had a rhodium loading of 21.2 g/ft$^3$.

Example 6

Preparation of SCR Catalyst Article 6

A SCR catalytic article was prepared following the procedure of Example 3 except the top layer had a rhodium loading of 8.7 g/ft$^3$.

Example 7

Preparation of SCR Catalyst Article 7

A SCR catalytic article was prepared following the procedure of Example 1 except the bottom layer had a palladium loading of 13.9 g/ft$^3$.

Example 8

Preparation of SCR Catalyst Article 8

A SCR catalytic article was prepared following the procedure of Example 5 except the bottom layer had a rhodium loading of 11.6 g/ft$^3$.

Example 9

Preparation of SCR Catalyst Article 9

A SCR catalytic article was prepared following the procedure of Example 3 except the top layer had a palladium loading of 8.9 g/ft$^3$.

Example 10

Evaluation of SCR Activity

Test samples were either fresh or aged, wherein fresh samples were tested as is, without further treatment; and aged samples underwent an aging process wherein samples were exposed to a diesel engine exhaust at an inlet temperature at 550° C. for 100 hours, to simulate the lifetime of a catalyst on a vehicle. Nitrogen oxides selective catalytic reduction (SCR) efficiency of fresh or aged catalyst core was measured by adding a feed gas mixture of 500 ppm of NO, 500 ppm of NH$_3$, 10% 02 (by volume), 5% H$_2$O (by volume), balance N$_2$ to a steady state reactor containing individually a core of Catalyst Article 2 (aged), Catalyst Article 3 (aged), Catalyst Article 7 (fresh), Catalyst Article 8 (fresh), Catalyst Article 9 (fresh), Control A (titania-based SCR catalyst comprising 5% vanadia with no PGM content prepared following the procedure of the topcoat layer in Example 1 at a loading of 3 g/in$^3$-fresh), Control B (titania-based SCR catalyst comprising 5% vanadia with no PGM content prepared following the procedure of the topcoat layer in Example 1 at a loading of 3 g/in$^3$-aged), Control C (titania-based SCR catalyst comprising 2.5% vanadia with no PGM content prepared following the procedure of the bottom coat layer in Example 3-fresh), and Control D (titania-based SCR catalyst comprising 2.5% vanadia with no PGM content prepared following the procedure of the bottom coat layer in Example 3-aged.)

For the catalytic test, the washcoated cores (dimensions: 3 inches long×1 inch wide×1 inch high) were wrapped with a ceramic insulation mat and placed inside an Inconel reactor tube heated by an electrical furnace. The gases, O$_2$ (from air), N$_2$ and H$_2$O were preheated in a preheater furnace before entering the reactor. The reactive gases NO and NH$_3$ were introduced between the preheater furnace and the reactor. The reaction was carried at a space velocity of 80 000 h$^{-1}$ across a 150° C. to 600° C. temperature range. Space velocity is defined as the gas flow rate comprising the entire reaction mixture divided by the geometric volume of the catalyst core.

Results are shown in FIGS. 6 and 7. In FIG. 6, inventive Catalyst Articles 2, 7 and 8 exhibit similar NOx conversion activities as Controls A and B over the entire temperature range, with some inventive examples showing slightly inferior performance at high temperature. Similar results are shown in FIG. 7, wherein Catalyst Article 3 exhibits similar NOx conversion activity to the two control catalysts over a broad temperature range. Catalyst Article 9 exhibits lower NOx conversion activity in this temperature range. Apparently aging the catalyst provides improved ammonia oxidation activity and hence better promotion of SCR catalytic activity compared to catalyst compositions that are fresh (e.g., Catalyst Article 9). Overall, this testing confirms that a catalytic article that includes both an SCR catalyst and an oxidation catalyst comprising either Pd/zirconia-ceria or Rh/zirconia-ceria provides acceptable SCR catalytic activity, which indicates that the presence of the oxidation catalyst composition does not significantly interfere with the desired ammonia SCR reactions.

Example 11

Evaluation of N$_2$O Formation and HC/CO Oxidation

Test samples were aged and underwent an aging process wherein samples were placed in an engine at an inlet temperature at 550° C. for 100 hours, to simulate the lifetime of a catalyst on a vehicle. The average NO$_2$ formation, CO conversion, and HC conversion performance of aged catalyst cores were measured by adding a feed gas mixture of 200 ppm of NO, 500 ppm of CO, 10% O$_2$ (by volume), 5% H$_2$O (by volume), 500 ppm of C$_3$H$_6$, 100 ppm of toluene and decane to a steady state reactor containing a core of Catalyst Article 1, Catalyst Article 2, or Control B. The testing temperature range was from 100° C. to 500° C. with a ramp of about 25° C./min. Measurements were taken the second time the core samples were exposed to the temperature ramp starting at 100° C. For the catalytic test, the washcoated cores (dimensions: 3 inches long×1 inch wide×1 inch high) were exposed to a space velocity of 30,000 h$^{-0001}$ across a 100° C. to about 500° C. temperature range. Space velocity is defined as the gas flow rate comprising the entire reaction mixture divided by the geometric volume of the catalyst core.

The results are shown in FIGS. 8-10. FIG. 8 shows that inventive Catalyst Articles 1 and 2 do not produce significant amounts of NO$_2$ as compared to Control B. This data demonstrates that the addition of a platinum group metal (such as palladium) impregnated onto a metal oxide (such as zirconia-ceria) to a titania based SCR catalyst doped with vanadia does not significantly impact N$_{2O}$ formation.

FIG. 9 shows that inventive Catalyst Articles 1 and 2 completely oxidize CO at temperature above 350° C., while Control B produces incomplete CO oxidation (i.e., CO concentration actually increases) during the testing temperature range of about 250 to about 500° C. This data demonstrates that the addition of a platinum group metal (such as palladium) impregnated onto a metal oxide (such as zirconia-ceria) to a titania-based SCR catalyst doped with vanadia promotes CO conversion of the SCR catalyst.

FIG. 10 shows Catalyst Articles 1 and 2 completely oxidize HC at temperatures of about 450° C. and higher. At lower temperature, Catalyst Articles 1 and 2 exhibited better efficiency of HC oxidation compared to Control B. This data demonstrates that the addition of a platinum group metal (such as palladium) impregnated onto a metal oxide (such as zirconia-ceria) to a titania-based SCR catalyst doped with vanadia is beneficial for HC oxidation.

Reference Example 3

Preparation of a Second Catalyst of the Exhaust Gas System of the Present Invention, an AMOX Catalyst A mixture of a platinum precursor with platinum as an ammine stabilized hydroxo Pt(IV) complex, with a solid content of 16% by weight, and a mixture of a palladium precursor with palladium as the cation complex to a nitrate anion, with a solid content of 19% by weight, with a platinum to palladium weight ratio of 10:1 were added dropwise into 15.26 g/l (0.25 g/in$^3$) alumina ($Al_2O_3$ (about 80 weight-%), doped with about 20 weight-% $ZrO_2$, having a BET specific surface area of about 202.5 m$^2$/g, a Dv90 of 125 micrometers and a total pore volume of about 0.425 ml/g) under constant stirring, thereby performing an incipient wetness impregnation. The amount of liquids added was suitably calculated to fill the pore volume of the zirconia-alumina. The final solid content after incipient wetness was approximately 75% by weight. The resulting mixture after incipient wetness impregnation was pre-calcined at 590° C. for 4 hours to remove any moisture and to fix the platinum and palladium onto the metal oxide support material giving a dry platinum/palladium content of 0.28 g/l (8 g/ft$^3$).

Separately, a mixture with solids corresponding to 7.3 g/l (0.13 g/in$^3$) (calculated as $ZrO_2$) zirconyl-acetate with a solid content of 30% by weight was added to water to create a mixture with a solid content of approximately 3% by weight. To this, Cu-CHA zeolite slurry prepared according to Reference Example 2 herein except that the zeolite was spray-dried, and corresponding to 167.7 g/l (2.75 g/in$^3$) of washcoat loading was added. The resulting slurry was then milled until the resulting Dv90 determined as described in Reference Example 1 herein was 5 micrometers.

Subsequently, the pre-calcined Pt/Pd impregnated zirconia-alumina was made into a slurry. Firstly, tartaric acid in a ratio of 5/1 of the amount of Pt and Pd remaining after pre-calcination was added to water as was monoethanolamine in a ratio of 1/10 of the amount of tartaric acid. Secondly, the Pt/Pd impregnated zirconia-alumina was added to this solution and mixed into the solution thereby forming a Pt/Pd containing slurry. The slurry was then milled until the Dv90 determined as described in Reference Example 1 herein was 10 micrometers. To this Pt/Pd containing slurry, the direct exchanged Cu-CHA zeolite slurry was added and mixed, creating the final slurry that is ready for disposal.

The final slurry was then disposed over the full length of honeycomb cordierite monolith substrate (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried at 120° C. for 10 minutes and at 160° C. for 30 minutes and was then calcined at 450° C. for 30 minutes. The washcoat loading after calcination was 183.07 g/l (3.0 g/in$^3$).

Reference Example 4

Preparation of a SCR Catalyst Not According to the Present Invention 6.10 g/l (0.1 g/in$^3$) (calculated as $ZrO_2$) of zirconyl-acetate mixture with a solid content of 30% by weight were added to water to create a mixture with a solid content of approximately 3% by weight. To this, 122.05 g/l (2.0 g/in$^3$) of a Cu-CHA zeolite prepared according to Reference Example 2 herein except that the zeolite was spray-dried, were added. The resulting slurry was then milled until the resulting Dv90 determined as described in Reference Example 1 herein was 10 micrometers. The final slurry was then disposed over the full length of honeycomb cordierite monolith substrate (diameter: 26.67 cm (10.5 inches)× length: 15.24 cm (6 inches) cylindrically shaped substrate with 400/(2.54)$^2$ cells per square centimeter and 0.1 millimeter (4 mil) wall thickness). Afterwards, the substrate was dried at 120° C. for 10 minutes and at 160° C. for 30 minutes and was then calcined at 450° C. for 30 minutes. The washcoat loading after calcination was 128.15 g/l (2.1 g/in$^3$).

Reference Example 5

Preparation of an AMOX Catalyst

An aqueous mixture of a platinum precursor with platinum as an ammine stabilized hydroxo Pt(IV) complex, with a solid content of 16.5% by weight was added dropwise into 15.26 g/l (0.25 g/in$^3$) alumina ($Al_2O_3$ (about 80 weight-%) doped with about 20 weight-% $ZrO_2$ having a BET surface area of about 202.5 m$^2$/g, a Dv90 of 125 micrometers and a total pore volume of 0.425 ml/g) under constant stirring, thereby performing an incipient wetness impregnation. The amount of liquids added was suitably calculated to fill the pore volume of the zirconia-alumina. The final solid content after incipient wetness was approximately 75% by weight.

The resulting mixture after incipient wetness impregnation was pre-calcined at 590° C. for 4 hours to remove any moisture and to fix the platinum onto the metal oxide support material giving a dry platinum content of 0.28 g/l (8 g/ft$^3$).

Separately, 7.93 g/l (0.13 g/in$^3$) (calculated as $ZrO_2$) zirconyl-acetate mixture with a solid content of 30% by weight were added to water to create a mixture with a solid content of approximately 10% by weight. To this, 158.66 g/l (2.6 g/in$^3$) of the Cu-CHA zeolite prepared according to Reference Example 2 herein were added. The resulting slurry was then milled until the resulting Dv90 determined as described in Reference Example 1 herein was 5 micrometers.

Subsequently, the pre-calcined Pt impregnated zirconia-alumina was made into a slurry. Firstly, tartaric acid in a ratio of 5/1 of the amount of Pt remaining after pre-calcination was added to water as was monoethanolamine in a ratio of 1/10 of the amount of tartaric acid. Secondly, the Pt impregnated zirconia-alumina was added to this solution and mixed into the solution thereby forming a Pt containing slurry. The slurry was then milled until the Dv90 determined as described in Reference Example 1 herein was 10 micrometers.

To this Pt containing slurry, the direct exchanged Cu-CHA zeolite slurry was added and mixed, creating the final slurry that is ready for disposal.

The final slurry was then disposed over the full length of honeycomb cordierite monolith substrates (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried at 120° C. for 10 minutes and at 160° C.

for 30 minutes and was then calcined at 450° C. for 30 minutes. The washcoat loading after calcination was 183.07 g/l (3.0 g/in³).

Reference Example 6

Measurement of the BET Specific Surface Area

The BET specific surface area of the alumina was determined according to DIN 66131 or DIN-ISO 9277 using liquid nitrogen.

Comparative Example 1

Preparation of an Exhaust Gas Treatment System Not According to the Present Invention An exhaust gas treatment system not according to the present invention was prepared by combining the catalyst of Reference Example 4 and the catalyst of Reference Example 5, wherein the catalyst of Reference Example 5 was located downstream of the catalyst of Reference Example 4.

Example 12

Preparation of a First Catalyst According to the Invention Having an SCR Component and a Diesel Oxidation Component An aqueous mixture of Pd(NO₃)₂ with a solid content of 19% by weight was added dropwise into 30.51 g/l (0.5 g/in³) of zirconia oxide (with a pore volume of 0.420 ml/g) with a solid content of 96% under constant stirring, thereby performing an incipient wetness impregnation. The amount of liquids added was suitably calculated to fill the pore volume of the zirconia oxide. The final solid content after incipient wetness was 65% by weight. The resulting mixture was precalcined at 590° C. for 4 hours to remove any moisture and to fix the palladium onto the metal oxide support material giving a dry palladium content of 1.06 g/l (30 g/ft³).

Separately, a mixture with solids corresponding to 7.32 g/l (0.12 g/in³) (calculated as ZrO₂) of zirconyl-acetate mixture with a solid content of 30% by weight were added to water to create a mixture with a solid content of approximately 3% by weight. To this, 144.02 g/l (2.36 g/in³) of a Cu-CHA zeolite prepared according to Reference Example 2 herein, except that the zeolite was spray-dried, were added. The resulting slurry was then milled until the resulting Dv90 determined as described in Reference Example 1 herein was 5 micrometers.

Subsequently, the pre-calcined Pd impregnated zirconia oxide was made into a slurry. Firstly, tartaric acid in a weight ratio of 5:1 of the amount of Pd was added to water as was monoethanolamine in a ratio of 1:10 of the amount of tartaric acid. Secondly, the Pd impregnated zirconia oxide was added to this solution and mixed into the solution creating a Pd/Zr containing slurry. The slurry was then milled until the Dv90 determined as described in Reference Example 1 herein was 10 micrometers. To this Pd containing slurry, the Cu-CHA zeolite slurry was added and mixed, creating the final slurry.

The final slurry was then disposed over the full length of honeycomb cordierite monolith substrate (diameter: 26.67 cm (10.5 inches)×length: 15.24 cm (6 inches) cylindrically shaped substrate with 400/(2.54)² cells per square centimeter and 0.1 millimeter (4 mil) wall thickness). Afterwards, the substrate was dried at 120° C. for 10 minutes and at 160° C.

for 30 minutes and was then calcined at 450° C. for 30 minutes. The washcoat loading after calcination was 183.07 g/l (3.0 g/in³).

Example 13

Preparation of an Exhaust Gas Treatment System According to the Present Invention An exhaust gas treatment system according to the present invention was prepared by combining the catalyst of Example 12 and the catalyst of Reference Example 3, wherein the catalyst of Reference Example 3 was located downstream of the catalyst of Example 12 as depicted in FIG. 11a.

Example 14

Use of the Exhaust Gas Treatment Systems of Example 13 and of Comparative Example 1—HC Slip/SCR(out) Temperature The HC slip was measured at the exit of the AMOX catalyst (HC slip AMOX(out)) for the exhaust gas treatment systems of Example 13 and the exhaust gas treatment system of comparative Example 1 at different loadpoints 1 to 7 (space velocities: 50 k and 75 kh⁻¹ at decreasing SCR inlet temperatures starting at 370° C. and ending at 270° C., see Table 2 below). The results are displayed in FIG. 2.

TABLE 2

| | Measurement conditions | |
|---|---|---|
| Load-points | Exhaust mass flow (kg/hr) | Temperature SCR(in) (° C.) |
| 1 | 987 | 360 |
| 2 | 658 | 360 |
| 3 | 1048 | 310 |
| 4 | 744 | 314 |
| 5 | 1200 | 287 |
| 6 | 770 | 287 |
| 7 | 775 | 268 |

As may be taken from FIG. 12, the HC slips for the exhaust gas treatment system of Example 13 are of approximately 50 ppm at loadpoint 1, of approximately 20 ppm at loadpoint 2, approximately 210 ppm at loadpoint 3 and of less than 100 ppm at loadpoint 4. The HC slips for the exhaust gas treatment system of Comparative Example 1 are of approximately 200 ppm at loadpoints 1 and 4, less than 100 ppm at loadpoint 2 and there is a pic at loadpoint 3, where the HC slip is of more than 450 ppm. This shows that the SCR catalyst of the exhaust gas treatment system of comparative Example 1 displays no hydrocarbon functionality and that the AMOX of said comparative Example may compensate only at high SCR(in) temperature. This further shows that the exhaust gas treatment system of the present invention achieves improved hydrocarbon conversion compared to the system of Comparative Example 1, in particular due to this specific combination of two specific SCR and AMOX catalysts.

The SCR(out) temperatures for the exhaust gas treatment system of Example 13 are between 400 and 440° C. whereas the SCR(out) temperatures of the exhaust gas treatment system of comparative Example 1 are approximately equal to the SCR(in) temperatures. This illustrates that the exhaust gas treatment system of the present invention permits to create a favorable exotherm which permits to reduce the sulfur poisoning.

This example demonstrates that the exhaust gas treatment system of the present invention exhibits improved resistance to HC poisoning and to sulfur poisoning.

Example 15

Use of the Exhaust Gas Treatment System of Example 13 and of Comparative Example 1—NOx Conversion at Low Temperature The NOx conversion was measured at low temperature at the entrance of the exhaust gas treatment system, namely at 225° C.

TABLE 3

Measurement conditions

| Temperature (° C.) | Exhaust mass flow (kg/hr) | Engine out NOx (ppm) |
|---|---|---|
| 225 | 496 | 1036 |

As may be taken from FIG. 13, the exhaust gas treatment system of Example 13 permits to obtain a NOx conversion of more than 90% at 225° C. which is approximately equal (less than 2% difference) to the NOx conversion obtained with the exhaust gas treatment system of comparative Example 1. This shows that the use of palladium in the SCR catalyst does not impede the NOx conversion at low temperatures, in particular at 225° C.

Example 16

Impact of HC Injection on DeNOx Performance

For measuring the DeNOx performance after HC injection, the relative amount of reduced NOx was measured at 203° C. for the system of Example 13 and the system of Comparative Example 1.

TABLE 4

Measurement conditions

| Temperature (° C.) | Exhaust mass flow (kg/hr) | Engine out NOx (ppm) |
|---|---|---|
| 203 | 560 | 573 |

The results are shown in FIG. 14, wherein the exhaust gas treatment system of Example 13 shows a drop-off of less than 8% in DeNOx while the system of Comparative Example 1 shows a drop-off of approximately 15%. Accordingly, this example demonstrates that the exhaust gas treatment system of the present invention permits to prevent HC poisoning and/or coking of the catalyst.

Reference Example 7

Preparation of a First Catalyst of the Exhaust Gas Treatment System of the Present Invention, a DOC An aqueous mixture of a palladium nitrate with a solid content of 19% was added dropwise onto 30.51 g/l (0.5 g/in$^3$) of zirconia-oxide (with a pore volume of 0.420 ml/g) with a solid content of 96% under constant stirring, thereby performing an incipient wetness impregnation. The amount of liquids added was suitably calculated to fill the pore volume of the zirconia-oxide. The final solid content after incipient wetness was 65 weight %. The resulting mixture after incipient wetness impregnation was pre-calcined at 590° C. for 4 hours to remove any moisture and to fix the palladium onto the metal oxide support material giving a dry palladium content of 1.41 g/l (40 g/ft$^3$). Subsequently, the pre-calcined Pd impregnated zirconia oxide was made into a slurry. Firstly, tartaric acid in a weight ratio of 5:1 of the amount of Pd was added to water as was monoethanolamine in a ratio of 1:10 of the amount of tartaric acid. Secondly, the Pd impregnated zirconia oxide was added to this solution and mixed into the solution creating a Pd/Zr containing slurry. The slurry was then milled until the resulting Dv90 was 10 micrometers. The final slurry was then disposed over the full length of an uncoated honeycomb cordierite monolith substrates (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried at 120° C. for 10 minutes and at 160° C. for 30 minutes and was then calcined at 450° C. for 30 minutes. The washcoat loading after calcination was 67.13 g/l (1.1 g/in$^3$).

Reference Example 8

Preparation of a Second Catalyst of the Exhaust Gas Treatment System of the Present Invention, a SCR Catalyst 6.10 g/l (0.1 g/in$^3$) (calculated as $ZrO_2$) of zirconyl-acetate mixture with a solid content of 30% by weight were added to water to create a mixture with a solid content of approximately 3% by weight. To this, 122.05 g/l (2.0 g/in$^3$) of a Cu-CHA zeolite prepared according to Reference Example 2 were added. The resulting slurry was then milled until the resulting Dv90 determined as described in Reference Example 1 herein was 8 micrometers. The final slurry was then disposed over the full length of an uncoated honeycomb cordierite monolith substrate (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried at 120° C. for 10 minutes and at 160° C. for 30 minutes to remove 90% of moisture and was then calcined at 450° C. for 30 minutes. The washcoat loading after calcination was 128.15 g/l (2.1 g/in$^3$).

Reference Example 9

Preparation of a Second Catalyst of the Exhaust Gas Treatment System of the Present Invention, a SCR Catalyst An aqueous mixture of $Pd(NO_3)_2$ with a solid content of 20% by weight was added dropwise into 30.51 g/l (0.5 g/in$^3$) of zirconia-oxide (with a pore volume of 0.420 ml/g) with a solid content of 96% under constant stirring, thereby performing an incipient wetness impregnation. The amount of liquids added was suitably calculated to fill the pore volume of the zirconia oxide. The final solid content after incipient wetness was 65% by weight. The resulting mixture was precalcined at 590° C. for 4 hours to remove any moisture and to fix the palladium onto the metal oxide support material giving a dry palladium content of 1.06 g/l (30 g/ft$^3$). Separately, a mixture with solids corresponding to 7.32 g/l (0.12 g/in$^3$) (calculated as ZrO$_2$) of zirconyl-acetate mixture with a solid content of 30% by weight were added to water to create a mixture with a solid content of approximately 3% by weight. To this, 144.02 g/l (2.36 g/in$^3$) of a Cu-CHA zeolite prepared according to Reference Example 2, except that the zeolite was spray-dried, were added. The resulting slurry was then milled until the resulting Dv90 determined as described in Reference Example 1 herein was 5 micrometers. Subsequently, the pre-calcined Pd impregnated zirconia oxide was made into a slurry. Firstly, tartaric acid in a weight ratio of 5:1 of the amount of Pd was added to water as was monoethanolamine in a ratio of 1:10 of the amount of tartaric acid. Secondly, the Pd impregnated zirconia oxide was added to this solution and mixed into the solution creating a Pd/Zr containing slurry. The slurry was then milled until the Dv90 determined as described in Reference Example 1 herein was 10 micrometers. To this Pd containing slurry, the Cu-CHA zeolite slurry was added and mixed, creating the final slurry. The final slurry was then disposed over the full length of an uncoated honeycomb cordierite monolith substrate (diameter: 26.67 cm (10.5 inches)× length: 7.62 cm (3 inches) cylindrically shaped substrate with 400/(2.54)$^2$ cells per square centimeter and 0.1 millimeter (4 mil) wall thickness). Afterwards, the substrate was dried at 120° C. for 10 minutes and at 160° C. for 30 minutes and was then calcined at 450° C. for 30 minutes. The washcoat loading after calcination was 183.07 g/l (3.0 g/in$^3$).

Reference Example 10

Preparation of a Second Catalyst of the Exhaust Gas Treatment System of the Present Invention, a Layered SCR Catalyst Bottom Coat An aqueous mixture of a palladium precursor with palladium as the cation complex to a nitrate anion, with a solid content of 20% by weight, was added dropwise into 152.56 g/l (2.5 g/in$^3$) alumina (Al$_2$O$_3$ (about 80 weight-%) doped with about 20 weight-% ZrO$_2$, having a BET specific surface area of about 202.5 m$^2$/g, a Dv90 of 125 micrometers and a total pore volume of 0.425 ml/g) under constant stirring, thereby performing an incipient wetness impregnation. The amount of liquids added was suitably calculated to fill the pore volume of the zirconia-alumina.

The final solid content after incipient wetness was approximately 75% by weight. Subsequently, the Pd impregnated alumina was then milled until the Dv90 determined as described in Reference Example 1 herein was 10 micrometers. The slurry was then disposed over the full length of an uncoated honeycomb cordierite monolith substrate (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness) to obtain a bottom coat giving a dry platinum content corresponding to a Pd content of 0.53 g/l (15 g/ft$^3$) relative to the substrate in total. Afterwards, the substrate was dried at 120° C. for 10 minutes and at 160° C. for 30 minutes and was then calcined at 450° C. for 30 minutes. The washcoat loading of the bottom coat after calcination was 30.5 g/l (0.5 g/in$^3$)

Top Coat

An aqueous mixture with solids corresponding to 8.54 g/l (0.14 g/in$^3$) (calculated as ZrO$_2$) zirconyl-acetate with a solid content of 30% by weight were added to water to create a mixture with a solid content of approximately 10% by weight. To this, Cu-CHA zeolite slurry prepared according to Reference Example 2 and corresponding to 174.53 g/l (2.86 g/in$^3$) of washcoat loading was added. The resulting slurry was then milled until the resulting Dv90 determined as described in Reference Example 1 herein was 5 micrometers. The slurry was then disposed over the full length of the bottom coat to obtain a top coat. Afterwards, the substrate was dried at 120° C. for 10 minutes and at 160° C. for 30 minutes and was then calcined at 450° C. for 30 minutes. The washcoat loading of the top coat after calcination was 183.07 g/l (3.0 g/in$^3$).

Reference Example 11

Preparation of an AMOX Catalyst

A mixture of a platinum precursor with platinum as an ammine stabilized hydroxo Pt(IV) complex, with a solid content of 16% by weight, and a mixture of a palladium precursor with palladium as the cation complex to a nitrate anion, with a solid content of 19% by weight, with a platinum to palladium weight ratio of 10:1 were added dropwise into 2.5 g/in$^3$ alumina (Al$_2$O$_3$ (about 80 weight-%) doped with about 20 weight-% ZrO$_2$ having a BET specific surface area of about 202.5 m$^2$/g, a Dv90 of 125 micrometers and a total pore volume of 0.425 ml/g) under constant stirring, thereby performing an incipient wetness impregnation. The amount of liquids added was suitably calculated to fill the pore volume of the zirconia-alumina. The final solid content after incipient wetness was approximately 75% by weight. The resulting mixture after incipient wetness impregnation was pre-calcined at 590° C. for 4 hours to remove any moisture and to fix the platinum and palladium onto the metal oxide support material giving a dry platinum/ palladium content of 0.28 g/l (8 g/ft$^3$). Separately, a mixture with solids corresponding to 7.93 g/l (0.13 g/in$^3$) (calculated as ZrO$_2$) zirconyl-acetate with a solid content of 30% by weight was added to water to create a mixture with a solid content of approximately 3% by weight. To this, Cu-CHA zeolite slurry prepared according to Reference Example 2, except that the zeolite was spray-dried, and corresponding to 167.7 g/l (2.75 g/in$^3$) of washcoat loading was added. The resulting slurry was then milled until the resulting Dv90 determined as described in Reference Example 1 herein was 5 micrometers. Subsequently, the pre-calcined Pt/Pd impregnated zirconia-alumina was made into a slurry. Firstly, tartaric acid in a ratio of 5/1 of the amount of Pt and Pd remaining after pre-calcination was added to water as was monoethanolamine in a ratio of 1/10 of the amount of tartaric acid. Secondly, the Pt/Pd impregnated zirconia-alumina was added to this solution and mixed into the solution thereby forming a Pt/Pd containing slurry. The slurry was then milled until the Dv90 determined as described in Reference Example 1 herein was 10 micrometers. To this Pt/Pd containing slurry, the direct exchanged Cu-CHA zeolite slurry was added and mixed, creating the final slurry that is ready for disposal. The final slurry was then disposed over the full length of an uncoated honeycomb cordierite monolith substrate (diameter: 26.67 cm (10.5 inches)×length: 7.62 cm (3 inches) cylindrically shaped substrate with 400/(2.54)$^2$ cells per square centimeter and 0.1 millimeter (4 mil) wall thickness). Afterwards, the substrate was dried at 120° C. for 10 minutes and at 160° C.

for 30 minutes and was then calcined at 450° C. for 30 minutes. The washcoat loading after calcination was 183.07 g/l (3.0 g/in³).

Reference Example 12

Preparation of a Layered AMOX Catalyst

Bottom Coat

An aqueous mixture of a platinum precursor with platinum as an ammine stabilized hydroxo Pt(IV) complex was diluted by 20% and then added drop wise into 30.51 g/l (0.5 g/in³) alumina ($Al_2O_3$ doped with 1.5 weight-% of silica having a BET specific surface area of about 300 m²/g, a Dv50 of 35 micrometers and a total pore volume of 0.5 ml/g) under constant stirring, thereby performing an incipient wetness impregnation. The amount of liquids added was suitably calculated to fill the pore volume of the alumina doped with silica. To this incipient wetness impregnation mixture, acetic acid in the amount of 9 weight-% of the intended total dry washcoat loading of the bottom coat and additional water was added. The final solid content after incipient wetness impregnation was approximately 70 weight-%. Water was then added to the mixture along with n-octanol based on 0.2% of the intended dry washcoat loading of the bottom coat. The solid content after this step was 45 weight-%. The slurry was then milled until the Dv90 determined as described in Reference Example 1 herein was 8 micrometers. The slurry was then disposed over the full length of an uncoated honeycomb monolith substrate (diameter: 26.67 cm (10.5 inches)×length: 7.62 cm (3 inches) cylindrically shaped substrate with 300/(2.54)² cells per square cm and 0.13 mm (5 mil) wall thickness) to form the bottom coat giving a dry platinum content corresponding to a Pt content of 5 g/ft³ relative to the substrate in total. The substrate was then dried at 120° C. for 10 minutes and at 160° C. for 30 minutes and was then calcined at 450° C. for 30 minutes. The washcoat loading of the bottom coat after calcination was 30.5 g/l (0.5 g/in³).

Top Coat 0.13 g/in³ zirconyl-acetate mixture with 30 weight-% solids were added to water to create a mixture with a solid content of approximately 10 weight-%. To this, 175.14 g/l (2.87 g/in³) of the Cu-CHA zeolite prepared according to Reference Example 2 herein were added. The resulting slurry was then milled until the resulting Dv90 was 10 micrometer. The slurry was then disposed over the full length of the bottom coat. Afterwards, the substrate was dried at 120° C. for 10 minutes and at 160° C. for 30 minutes and was then calcined at 450° C. for 30 minutes. The washcoat loading of the top coat after calcination was 183 g/l (3.0 g/in³).

Reference Example 13

Preparation of a SCR Catalyst 6.10 g/l (0.1 g/in³) (calculated as $ZrO_2$) of zirconyl-acetate mixture with a solid content of 30% by weight were added to water to create a mixture with a solid content of approximately 3% by weight. To this, 122.05 g/l (2.0 g/in³) of a Cu-CHA zeolite prepared according to Reference Example 2, except that the zeolite was spray-dried, were added. The resulting slurry was then milled until the resulting Dv90 determined as described in Reference Example 1 herein was 10 micrometers. Said slurry was then disposed over the full length of an uncoated honeycomb cordierite monolith substrate (diameter: 26.67 cm (10.5 inches)× length: 15.24 cm (6 inches) cylindrically shaped substrate with 400/(2.54)² cells per square centimeter and 0.1 millimeter (4 mil) wall thickness). Afterwards, the substrate was dried at 120° C. for 10 minutes and at 160° C. for 30 minutes and was then calcined at 450° C. for 30 minutes. The washcoat loading after calcination was 128.15 g/l (2.1 g/in³).

Reference Example 14

Preparation of a Third Catalyst of the Exhaust Treatment System of the Present Invention, an AMOX Catalyst An aqueous mixture of a platinum precursor with platinum as an ammine stabilized hydroxo Pt(IV) complex, with a solid content of 15% by weight was added dropwise into 15.26 g/l (0.25 g/in³) alumina ($Al_2O_3$ (about 80 weight-%) doped with about 20 weight-% $ZrO_2$ having a BET specific surface area of about 202.5 m²/g, a Dv90 of 125 micrometers and a total pore volume of 0.425 ml/g) under constant stirring, thereby performing an incipient wetness impregnation. The amount of liquids added was suitably calculated to fill the pore volume of the zirconia-alumina. The final solid content after incipient wetness was approximately 75% by weight. The resulting mixture after incipient wetness impregnation was pre-calcined at 590° C. for 4 hours to remove any moisture and to fix the platinum onto the metal oxide support material giving a dry platinum content of 0.28 g/l (8 g/ft³). Separately, 7.93 g/l (0.13 g/in³) (calculated as $ZrO_2$) zirconyl-acetate mixture with a solid content of 30% by weight were added to water to create a mixture with a solid content of approximately 10% by weight. To this, 158.66 g/l (2.6 g/in³) of the Cu-CHA zeolite prepared according to Reference Example 2 herein were added. The resulting slurry was then milled until the resulting Dv90 determined as described in Reference Example 1 herein was 5 micrometers. Subsequently, the pre-calcined Pt impregnated zirconia-alumina was made into a slurry. Firstly, tartaric acid in a ratio of 5/1 of the amount of Pt remaining after precalcination was added to water as was monoethanolamine in a ratio of 1/10 of the amount of tartaric acid. Secondly, the Pt impregnated zirconia-alumina was added to this solution and mixed into the solution thereby forming a Pt containing slurry. The slurry was then milled until the Dv90 determined as described in Reference Example 1 herein was 10 micrometers. To this Pt containing slurry, the direct exchanged Cu-CHA zeolite slurry was added and mixed, creating the final slurry that is ready for disposal. The final slurry was then disposed over the full length of an uncoated honeycomb cordierite monolith substrates (diameter: 26.67 cm (10.5 inches)×length: 7.62 cm (3 inches) cylindrically shaped substrate with 400/(2.54)² cells per square centimeter and 0.1 millimeter (4 mil) wall thickness). Afterwards, the substrate was dried at 120° C. for 10 minutes and at 160° C. for 30 minutes and was then calcined at 450° C. for 30 minutes. The washcoat loading after calcination was of about 183.07 g/l (3.0 g/in³).

Reference Example 15

Preparation of a SCR Catalyst 850 g of a vanadium oxalate solution (3% vanadium) was mixed with distilled water and 32 kg of titania ($TiO_2$) were slowly added and mixed for 5 minutes. Further, an ammonium hydroxide solution (42% NH$_3$ in water) was added to the obtained mixture to adjust the pH to between 4.5 and 5.5 and then mixed for another 5 minutes under stirring. 1.6 kg of colloidal Si dispersion (40 weight-%) was added to the obtained mixture while continuing stirring for 10 minutes obtaining a final slurry. The final slurry was then disposed over the full length of an uncoated substrate (diameter: 26.67 cm (10.5 inches)×length: 15.24 cm (6 inches) cylindrically shaped substrate with 400/(2.54)$^2$ cells per square centimeter and 0.14 millimeter (5.5 mil) wall thickness) at a loading of 270 g/l (4.42 g/in$^3$), dried at 140° C. for 30 min and then calcined at 450° C. for 30 minutes.

Reference Example 16

Preparation of a DOC

In a tank, 9 kg of alumina (Al$_2$O$_3$ doped with 1.5 weight-% of silica having a BET specific surface area of about 300 m$^2$/g, a Dv50 of 35 micrometers and a total pore volume of 0.5 ml/g) were mixed with a diluted aqueous nitric acid (HNO$_3$) solution (50% concentration) forming a first mixture. In a separate tank, acetic acid (50% concentration), water and 3.6 kg of Zr(OH)$_4$ were mixed forming a second mixture. Further, the second mixture is added to the first mixture, in combination with 900 g of zirconium acetate solution (30%). The resulting Zr/Al containing slurry was then milled to achieve a Dv90 of around 10 micrometers. Separately, a slurry was prepared with 18 kg of TiO$_2$ which was wet impregnated with an aqueous solution of a platinum precursor with platinum as an ammine stabilized hydroxo Pt(IV) complex to achieve a platinum loading of 0.71 g/l (20 g/ft$^3$), acetic acid (50% concentration) and water were added to give the final TiO$_2$ containing slurry. The Zr/Al containing slurry, octanol and the TiO$_2$ containing slurry were then added to one another and mixed to obtain the final slurry with a pH of around 4.5. The final slurry was then disposed over the full length of an uncoated honeycomb cordierite monolith substrates (diameter: 26.67 cm (10.5 inches)× length: 10.16 cm (4 inches) cylindrically shaped substrate with 300/(2.54)$^2$ cells per square centimeter and 0.13 millimeter (5 mil) wall thickness) with a loading of approximately 61 g/l (1 g/in$^3$), dried at around 120° C. for 30 minutes and then calcined at 450° C. for 30 minutes.

Comparative Example 2

Preparation of an Exhaust Gas Treatment System Not According to the Present Invention An exhaust gas treatment system (referred to as "system 4" in the following) not according to the present invention was prepared by combining the catalyst of Reference Example 7 and the catalyst of Reference Example 11, wherein the catalyst of Reference Example 11 was located downstream of the catalyst of Reference Example 7.

Comparative Example 3

Preparation of an Exhaust Gas Treatment System Not According to the Present Invention An exhaust gas treatment system (referred to as "system 5" in the following) not according to the present invention was prepared by combining the catalyst of Reference Example 7 and the catalyst of Reference Example 12, wherein the catalyst of Reference Example 12 was located downstream of the catalyst of Reference Example 7.

Comparative Example 4

Preparation of an Exhaust Gas Treatment System Not According to the Present Invention An exhaust gas treatment not according to the present invention was prepared by combining the SCR catalyst of Reference Example 13 and the AMOX catalyst of Reference Example 14, wherein the catalyst of Reference Example 14 was located downstream of the catalyst of Reference Example 13.

Comparative Example 5

Preparation of an Exhaust Gas Treatment System Not According to the Present Invention An exhaust gas treatment system not according to the present invention was prepared by combining the catalyst of Reference Example 15 (referred to as "V-SCR" in the following) and the catalyst of Reference Example 16 (referred to as "Pt-DOC" in the following), wherein the catalyst of Reference Example 16 was located downstream of the catalyst of Reference Example 15.

Example 17

Preparation of an Exhaust Gas Treatment System According to the Present Invention An exhaust gas treatment system (referred to as "system 1" in the following) according to the present invention was prepared by combining the catalyst of Reference Example 7 and the catalyst of Reference Example 8, wherein the catalyst of Reference Example 8 was located downstream of the catalyst of Reference Example 7.

Example 18

Preparation of an Exhaust Gas Treatment System According to the Present Invention An exhaust gas treatment system (referred to as "system 2" in the following) according to the present invention was prepared by combining the catalyst of Reference Example 7 and the catalyst of Reference Example 9, wherein the catalyst of Reference Example 9 was located downstream of the catalyst of Reference Example 7.

Example 19

Preparation of an Exhaust Gas Treatment System According to the Present Invention An exhaust gas treatment system (referred to as "system 3" in the following) according to the present invention was prepared by combining the catalyst of Reference Example 7 and the catalyst of Reference Example 10, wherein the catalyst of Reference Example 10 was located downstream of the catalyst of Reference Example 7.

Example 20

Preparation of an Exhaust Gas Treatment System According to the Present Invention An exhaust gas treatment system according to the present invention was prepared by combining the DOC catalyst of Reference Example 7, the SCR catalyst of Reference Example 8 and the AMOX catalyst of Reference Example 14, wherein the catalyst of Reference Example 8 was located downstream of the catalyst of Reference Example 7 and the catalyst of Reference Example 14 was located downstream of the catalyst of Reference Example 8.

Example 21

Preparation of an Exhaust Gas Treatment System According to the Present Invention An exhaust gas treatment system according to the present invention was prepared by combining the catalyst of Reference Example 7 (referred to as "Pd-DOC" in the following), the catalyst of Reference Example 15 (referred to as "V-SCR" in the following) and the catalyst of Reference Example 16 (referred to as "Pt-DOC" in the following), wherein the catalyst of Reference Example 15 was located downstream of the catalyst of Reference Example 7 and wherein the catalyst of Reference Example 16 was located downstream of the catalyst of Reference Example 15.

Example 22

Use of the Exhaust Gas Treatment System of Examples 17 to 19 and Comparative Examples 2 and 3—Resistance to HC Poisoning The DeNOx and the $N_2O$ produced were measured at 230° C. for the exhaust gas treatment systems of Examples 17 to 19 and comparative Examples 2 and 3, before and after an HC injection upstream of said exhaust gas treatment systems (space velocity: 86 k.h-1). The results are displayed in Table 5 below.

TABLE 5

| Results according to Example 22 | | | | | |
|---|---|---|---|---|---|
| | DeNOx (%) | | | $N_2O$ (ppm) | |
| | Pre HC injection | Post HC injection | Delta | Pre HC injection | Post HC injection |
| System 1 | 43.2 | 44.0 | −0.8 | <1 | <1 |
| System 2 | 37.7 | 36.8 | −0.9 | <1 | <1 |
| System 3 | 48.0 | 47.2 | −0.8 | <1 | <1 |
| System 4 | 46.9 | 46.5 | −0.4 | 5 | 5 |
| System 5 | 52.9 | 48.4 | −4.5 | 35 | 35 |

As may be taken from Table 5, the DeNOx measured for the exhaust gas treatment systems 1 to 4 decreased only less than 1% after the HC injection while the DeNOx measured for the exhaust gas treatment system 5 not according to the present invention decreased 4.5%. This shows that the exhaust gas treatment systems 1 to 4 achieved improved hydrocarbon conversion and thus prevented the HC poisoning, in particular at low temperature.

Further, the quantities of $N_2O$ produced when using the exhaust gas treatment systems 1 to 3 are lower than 1 ppm. In contrast thereto, approximately 5 ppm of $N_2O$ was produced for the system 4 and approximately 35 ppm of $N_2O$ for the system 5, both not according to the present invention. This shows a higher ammonia oxidation capability for systems comprising platinum containing catalyst located downstream of the DOC compared to systems comprising palladium containing catalyst located downstream of the DOC. Further, it appears that the HC injection has no effect on the $N_2O$ production.

This example accordingly demonstrates that the exhaust gas treatment systems of the present invention comprising a specific DOC and a specific SCR catalyst located downstream of the DOC achieve improved hydrocarbon conversion, which means preventing the HC poisoning, while preventing the formation of $N_2O$.

Example 23

Fuel Burning Over the Exhaust Gas Treatment System of Examples 17, 18 and 19

The HC slip was measured at the exit of the exhaust gas treatment systems of Examples 17 to 19 (systems 1 to 3) and of Comparative Examples 2 and 3 (systems 4 and 5) at different loadpoints 1 to 12 (space velocities ranging from 200 k to 45 k h-1 at decreasing DOC inlet temperatures starting from 370 and ending at 240° C., see Table 2 below). The DOC outlet and SCR outlet temperatures were also measured for systems 1 to 5 at different loadpoints 1 to 12 (space velocities ranging from 200 k to 45 k h-1 at decreasing DOC inlet temperatures starting from 370 and ending at 240° C., see Table 6 below). The results are displayed in FIGS. 1 to 5, respectively.

TABLE 6

| Measurement conditions | | |
|---|---|---|
| Load-points | Exhaust mass flow (kg/hr) | Temperature DOC(in) (° C.) |
| 1 | 985 | 370 |
| 2 | 664 | 365 |
| 3 | 246 | 377 |
| 4 | 991 | 315 |
| 5 | 702 | 315 |
| 6 | 280 | 315 |
| 7 | 1100 | 295 |
| 8 | 723 | 295 |
| 9 | 305 | 295 |
| 10 | 751 | 270 |
| 11 | 325 | 277 |
| 12 | 430 | 240 |

As may be taken from FIG. 15, the DOC outlet temperature at loadpoints 1 to 9 and 11 was approximately 430° C. At two loadpoints 10 and 12, the system did not achieve sufficient HC oxidation. This shows that the DOC used in the inventive system 1 generated an exotherm upstream of the SCR catalyst of the inventive system. Further, the HC slips were approximately 10 ppm at loadpoint 7, of approximately 5 or less at loadpoints 4, 5 and 8 and were null at loadpoints 1 to 3, 6 and 9 to 12. This shows that the system of Example 17 achieved great hydrocarbon conversion (fuel burning).

As may be taken from FIG. 16, the DOC outlet temperature at loadpoints 1 to 9 and 11 was from approximately 400 to 425° C. At two loadpoints 10 and 12, the system did not achieve sufficient HC oxidation. This shows that the DOC used in the inventive system 2 generated an exotherm upstream of the SCR catalyst of the inventive system. Further, the HC slips were approximately 55 ppm at loadpoint 7, of approximately 30 ppm at loadpoint 4, of approximately 10 ppm at loadpoint 5, of approximately 5 or less at loadpoints 1, 2, 6, 8 and 9 and were null at loadpoints 3 and 10 to 12. This shows that the system of Example 18 achieves good hydrocarbon conversion (fuel burning).

As may be taken from FIG. 17, the DOC outlet temperature at loadpoints 1 to 9 and 11 was from approximately 400 to 425° C. At two loadpoints 10 and 12, the system was not achieve sufficient HC oxidation. This shows that the DOC used in the inventive system 3 generated an exotherm upstream of the SCR catalyst of the inventive system. Further, the HC slips were approximately 70 ppm at loadpoint 7, of approximately 20 ppm at loadpoint 4, of approximately 10 ppm at loadpoint 1, of approximately 5 or less at loadpoints 2, 5 and 8 and were null at loadpoints 3, 6 and 9 to 12. This shows that the system of Example 19 achieved good hydrocarbon conversion (fuel burning).

As may be taken from FIG. 18, the DOC outlet temperature at loadpoints 1 to 9 and 11 was from approximately 400 to 425° C. At two loadpoints 10 and 12, the system did not achieve sufficient HC oxidation. Further, the HC slips were of approximately 115 ppm at loadpoint 7, of approximately 20 ppm at loadpoints 4 and 8, of approximately 10 ppm at loadpoints 1 and 5, of less than 5 at loadpoint 2 and were null at loadpoints 3, 6 and 9 to 12. This shows that the comparative system 4 achieves lower hydrocarbon conversion (lower fuel burning) compared to the inventive system of Examples 17 to 19 in particular at loadpoints 4 and 7.

As may be taken from FIG. 19, the DOC outlet temperature at loadpoints 1 to 9 and 11 was from approximately 400 to 425° C. At two loadpoints 10 and 12, the system did not achieve sufficient HC oxidation. Further, the HC slips were approximately 120 ppm at loadpoint 7, of approximately 75 ppm at loadpoint 4, of approximately 40 ppm at loadpoint 1, of approximately 10 ppm at loadpoints 5 and 8, of less than 5 at loadpoint 2 and are null at loadpoints 3, 6 and 9 to 12. This shows that the comparative system 5 achieved lower hydrocarbon conversion (lower fuel burning) compared to the inventive system of Examples 17 to 19 in particular at loadpoints 4 and 7.

This example demonstrates that the exhaust gas treatment systems of the present invention generated a greater exotherm upstream of the SCR catalyst comprised in the inventive system and improved hydrocarbon conversion compared to the systems of comparative Examples 2 and 3.

Further, this example also demonstrates that the exhaust gas treatment systems according to the present invention generated an exotherm upstream of the SCR catalyst and prevents from ammonia oxidation while exhibiting an improved hydrocarbon conversion (fuel burning).

Example 24

DeNOx Performance Over the Systems of Example 20 and Comparative Example 4

The NOx reduction for the systems of Example 20 and Comparative Example 4 was determined at three different temperatures, i.e. 204, 217 and 274° C. (Ammonia to NOx ratio (ANR)=1.1). The results are displayed in FIG. 20.

TABLE 7

| Measurement conditions | | |
|---|---|---|
| Temperature (° C.) | Exhaust flow (kg/hr) | Engine out NOx (ppm) |
| 204 | 544 | 517 |
| 217 | 488 | 979 |
| 274 | 528 | 1486 |

From 204 to 274° C., the DeNOx is comparable between the exhaust gas treatment system of Example 20 and the exhaust gas treatment system of comparative Example 4. Indeed, the DeNOx for the system of Example 20 was approximately 71% at 204° C., approximately 76% at 217° C. and 88% at 274° C. and the DeNOx for the system of comparative Example 3 is approximately 69% at 204° C., approximately 78% at 217° C. and 88% at 274° C., the best performances being at 274° C.

This example demonstrates that the exhaust gas treatment system of the present invention did not impede the NOx conversion of the upstream SCR and AMOX, in particular at low temperatures, i.e. less than 300° C.

Example 25

Use of the Exhaust Gas Treatment System of Example 20 and Comparative Example 4—HC Slip/Temperature SCR (Out)

The HC slip was measured at the exit of the AMOX catalyst (HC slip AMOX(out)) for the exhaust gas treatment systems of Example 20 and the exhaust gas treatment system of comparative Example 4 at different loadpoints 1 to 7 (space velocity: 50 k and 75 $kh^{-1}$ at decreasing SCR inlet temperatures starting at 370° C. and ending at 270° C., see Table 8 below). The results are displayed in FIG. 21.

TABLE 8

| Measurement conditions | | |
|---|---|---|
| Loadpoints | Exhaust mass flow (kg/hr) | Temperature SCRin (° C.) |
| 1 | 987 | 360 |
| 2 | 658 | 360 |
| 3 | 1048 | 310 |
| 4 | 744 | 314 |
| 5 | 1200 | 287 |
| 6 | 770 | 287 |
| 7 | 775 | 268 |

The HC slips for the exhaust gas treatment system of Example 20 were approximately 5 ppm at loadpoint 2, approximately 20 ppm at loadpoints 1 and 4, approximately 25 ppm at loadpoint 6, at approximately 45 ppm at loadpoint 3 and the HC slip was approximately 80 ppm at loadpoint 5. The HC slips for the exhaust gas treatment system of Comparative Example 4 were approximately 90 ppm at loadpoint 2, approximately 200 ppm at loadpoints 1 and 4. Further, there is a peak at loadpoint 3, where the HC slip was of more than 450 ppm. This shows that the SCR catalyst of the exhaust gas treatment system of Comparative Example 4 displayed no HC functionality and that the AMOX of said comparative Example may compensate only at high SCR(in) temperature. This further shows that the exhaust gas treatment system of the present invention achieved excellent hydrocarbon conversion even at lower SCR(in) temperatures, namely below 300° C. (see loadpoints 5 and 6).

The SCR(out) temperatures for the exhaust gas treatment system of Example 20 were between 400 and 440° C., even at SCR(in) temperatures lower than 300° C., whereas the SCR(out) temperatures of the exhaust gas treatment system of Comparative Example 4 were approximately equal to the SCR(in) temperatures. This illustrates that the exhaust gas treatment system of the present invention permits to create a favorable exotherm which overcomes the deactivation due to sulfur poisoning.

This example demonstrates that the exhaust gas treatment system of the present invention exhibited improved resistance to HC poisoning and to sulfur poisoning.

Example 26

Impact of HC Injection on DeNOx Performance

For measuring the DeNOx performance after HC injection, the relative amount of reduced NOx was measured at 203° C. for the exhaust gas treatment system of Example 20 and the exhaust gas treatment system of comparative Example 4.

TABLE 9

| | Measurement conditions | |
|---|---|---|
| Temperature (° C.) | Exhaust mass flow (kg/hr) | Engine out NOx (ppm) |
| 203 | 560 | 573 |

The results are shown in FIG. 8, wherein the exhaust gas treatment system of Example 20 showed a drop-off of approximately 3% in DeNOx while the system of comparative Example 4 showed a drop-off of approximately 15%. Accordingly, this example demonstrates that the exhaust gas treatment system of the present invention was resistant to hydrocarbon (HC) poisoning at low temperatures as the NOx conversion was almost unchanged after an HC injection. Accordingly, the exhaust gas treatment system of the present invention prevented the HC poisoning of the SCR catalyst.

Example 27

Use of the Exhaust Gas Treatment System of Example 21 and of Comparative Example 5—Temperatures Post SCR/Fuel Burning The temperatures post V-SCR were measured at different conditions, namely at different temperatures before entering the first catalyst (Temperature pre-catalyst), in function of the time for the exhaust gas treatment system of Example 21 and of Comparative Example 5 and after fuel injections. The results are shown in FIGS. 23, 24 and 25.

TABLE 10

| | Measurement conditions | |
|---|---|---|
| | Exhaust gas flow (kg/h) | $O_2$ (%) |
| Fuel injection 1 | 980 | ca. 9 |
| Fuel injection 2 | 915 | ca. 8 |

As can be seen from FIGS. 23 and 24, at a temperature pre-catalyst of 330° C. and after the fuel injection 1, a stable exotherm is observed, namely the temperature post SCR for the system of Comparative Example 5 is of approximately 400° C. The V-SCR oxidized the fuel quite well. Further, the temperature post Pt-DOC was approximately 450° C. The fuel injection was stopped at approximately 80 minutes. During the cleaning phase (from approximately 85 to 100 minutes), the temperature of the SCR was the same as the temperature pre-catalyst. The diesel fuel, possibly adsorbed on the catalysts during the fuel injections, was evaporated and oxidized.

Furthermore, at a lower temperature pre-catalyst of 293° C. and after the fuel injection 2, the temperature post SCR for the system of Comparative Example 5 was 350° C. at maximum and decreased to attain approximately the temperature pre-catalyst. During the experiment, it was observed that the fuel burning started over the V-SCR but that the reaction was quenched. At the end of the fuel injection 2 (at approximately 165 minutes), no fuel burning was observed over the V-SCR. The Pt-DOC then took over the fuel oxidation to achieve the targeted fuel burning temperature of 450° C. However, at the beginning of the cleaning phase at approximately 170 minutes, an uncontrolled exotherm (a peak at more than 650° C.) was observed. Without wanting to be bound to any theory, it is assumed that this is due to the fuel absorbed on the V-SCR catalyst during the fuel injection, the latter being evaporated and oxidized during the cleaning phase at elevated engine out temperatures. Said exotherm may be responsible for the destruction of the catalysts of the system.

As can be seen from FIG. 25, at a temperature pre-catalyst of 335° C. and after the fuel injection 1, the temperature post Pd-DOC for the system of Example 21 is of approximately 410° C. and a stable exotherm is observed at the outlet of the V-SCR, namely the temperature post SCR for the system of Example 21 is of approximately 442° C. The V-SCR oxidizes the fuel almost completely. Without wanting to be bound to any theory, it is assumed that this is possible with the used of the Pd-DOC upstream of the V-SCR which permits to increase the temperature at the inlet of the V-SCR in a window where the V-SCR can perfectly operate as a fuel burning catalyst. Further, the temperature post Pt-DOC is of approximately 451° C. The fuel injection is stopped at approximately 80 minutes. During the cleaning phase (from approximately 85 to 100 minutes), the temperature post V-SCR is the same as the temperature pre-catalyst.

Furthermore, at a lower temperature pre-catalyst of 295° C. and after the fuel injection 2, the temperature post Pd-DOC for the system of Example 21 was approximately 389° C. and a stable exotherm was observed at the outlet end of the V-SCR, namely the temperature post V-SCR for the system of Example 21 is of approximately 435° C. The SCR oxidized the fuel almost completely. Without wanting to be bound to any theory, it is assumed that this was possible with the used of the Pd-DOC upstream of the V-SCR which increased the temperature at the inlet of the V-SCR in a window where the V-SCR can perfectly operate as a fuel burning catalyst. The temperature post Pt-DOC was approximately 450° C. The fuel injection was stopped at approximately 175 minutes and contrary to the results obtained with Comparative Example 5, no uncontrolled exotherm was observed during the cleaning phase. It was assumed that the Pd-DOC prevents fuel adsorption over the V-SCR due to the favorable temperature created post Pd-DOC.

This example demonstrates that the use of the exhaust gas treatment system of the present invention, namely comprising a specific DOC and a specific SCR downstream of the DOC, obtained an optimal fuel burning while preventing from damaging the system at low temperatures at the inlet end of the system, namely temperatures lower than 300° C.

BRIEF DESCRIPTION OF THE FIGURES

In order to provide an understanding of the invention, reference is made to the appended figures, which are not necessarily drawn to scale, and in which reference numerals refer to components of the invention.

FIG. 11a shows a schematic depiction of an engine coupled with an exhaust gas treatment system according to the present invention and a further catalytic unit. The exhaust gas treatment system 1 according to the present invention is depicted on FIG. 11a, said system comprises a first catalyst 2 as described in the foregoing which is located downstream of the diesel engine and downstream the inlet end of the exhaust gas treatment system 1. Optionally, a fluid injector 4 may be located upstream of the first catalyst 2 and downstream of the inlet end of the exhaust gas treatment system. Further, the system 1 comprises a second catalyst 3 as described in the foregoing which is located downstream of the first catalyst 2. The first catalyst 2 comprises a coating disposed on a substrate, both being not represented on FIG. 11a. The second catalyst 3 comprises a coating disposed on a substrate, both also not represented on FIG. 11a. The substrates of the catalyst 2 and the catalyst 3 are separate substrates, such that the first catalyst 2 and the second catalyst 3 are separated by a pipe or a tube 5. A further catalytic unit 6 may be disposed downstream of the exhaust gas treatment system 1, said unit 6 may be one or more of a diesel oxidation catalyst, a nitrogen oxides reduction catalyst and an ammonia oxidation.

FIG. 11b shows a schematic depiction of an engine coupled with an exhaust gas treatment system according to the present invention and a further catalytic unit. The exhaust gas treatment system 11 according to the present invention is depicted on FIG. 11b, said system comprises a first catalyst 12 as described in the foregoing which is located downstream of the diesel engine and downstream the inlet end of the exhaust gas treatment system 1. Optionally, a fluid injector 4 may be located upstream of the first catalyst 12 and downstream of the inlet end of the exhaust gas treatment system. Further, the system 11 comprises a second catalyst 13 as described in the foregoing which is located downstream of the first catalyst 12. The first catalyst 12 comprises a coating disposed on a substrate, both being not represented on FIG. 11a. The second catalyst 13 comprises a coating disposed on a substrate, both also not represented on FIG. 11a. The substrates of the catalyst 12 and the catalyst 13 form a single substrate. For example, the coating of the first catalyst 12 may cover from 48 to 52% of the substrate length from the inlet end to the outlet end of the substrate and the coating of the second catalyst 13 may cover from 48 to 52% of the substrate length from the outlet end to the inlet end of the substrate with no overlap of the coatings. Alternatively, the coatings of the catalysts 12 and 13 may overlap. As a further alternative, a gap between the coatings of the first catalyst 12 and of the second catalyst 13 may be created. These alternatives are not depicted on FIG. 11b. A further catalytic unit 6 may be disposed downstream of the exhaust gas treatment system 1, said unit 6 may be one or more of a diesel oxidation catalyst, a nitrogen oxides reduction catalyst and an ammonia oxidation.

CITED LITERATURE

Figure 1:
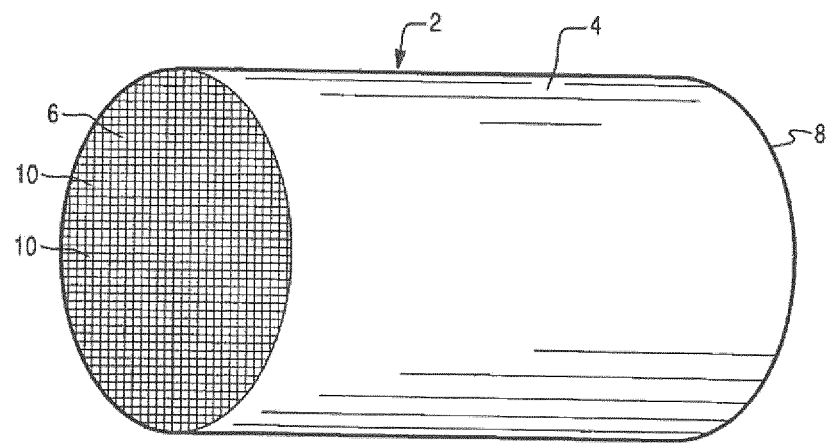
FIG. 1 shows a perspective view of a honeycomb-type substrate which may comprise a catalytic article (i.e., selective reduction catalyst (SCR)) washcoat composition in accordance with the present invention.
Figure 2:
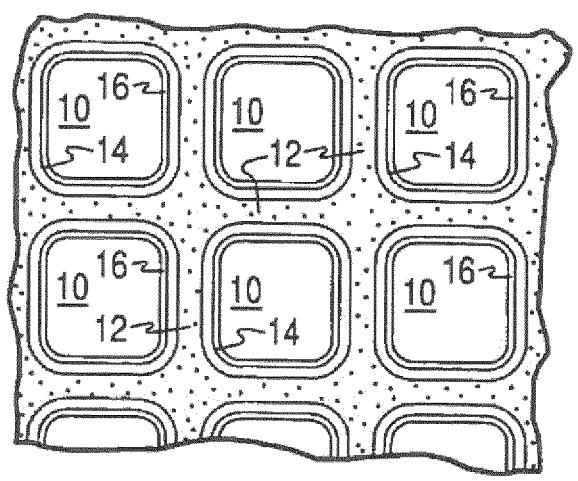
FIG. 2 shows a partial cross-sectional view enlarged relative to FIG. 1 and taken along a plane parallel to the end faces of the substrate of FIG. 1 representing a monolithic flow-through substrate, which shows an enlarged view of a plurality of the gas flow passages shown in FIG. 1.
Figure 3:
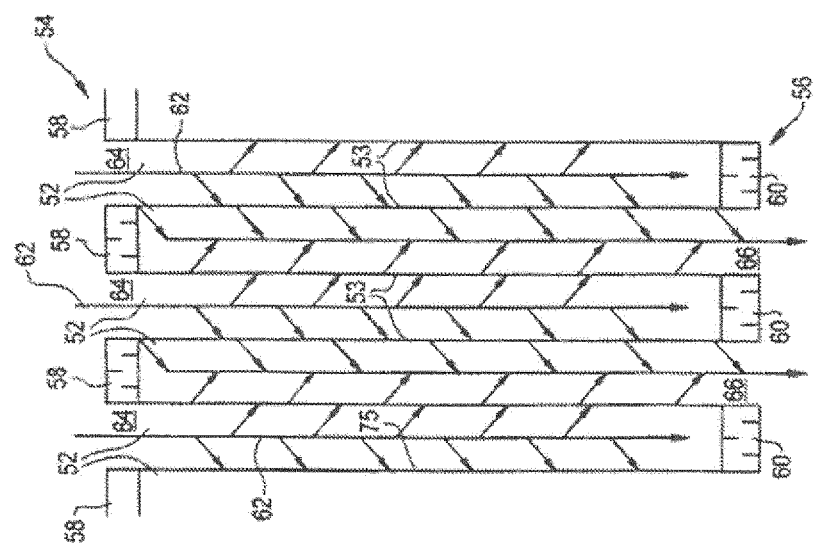
FIG. 3 shows a cutaway view of a section enlarged relative to FIG. 1, wherein the honeycomb-type substrate in FIG. 1 represents a wall flow filter substrate monolith.
Figure 4:
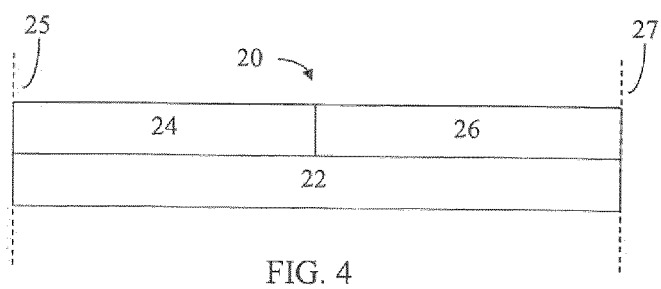
FIG. 4 shows a cross-sectional view of a zoned catalytic article of the present invention.
Figure 5:
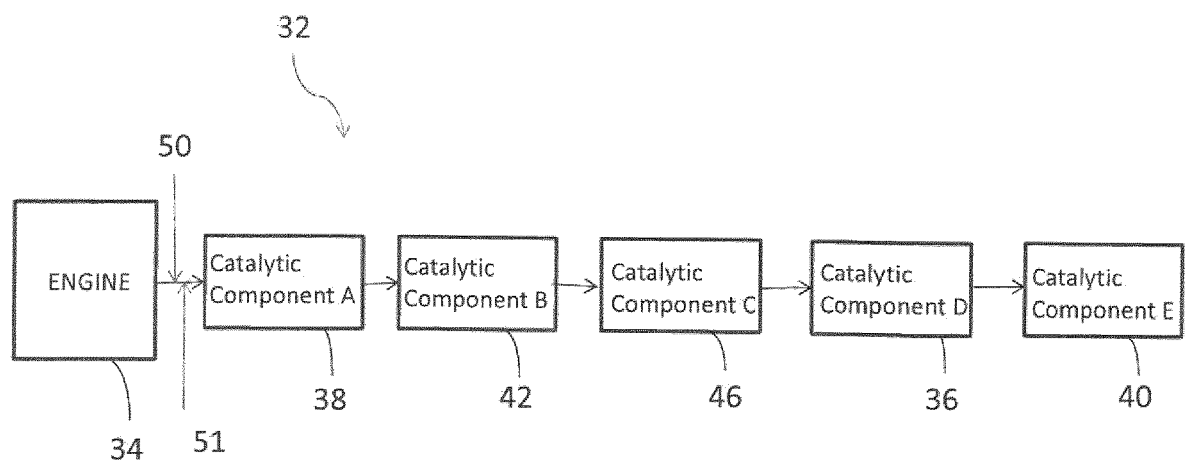
FIG. 5 shows a schematic depiction of an embodiment of an emission treatment system in which a catalytic article of the present invention is utilized.
Figure 6:
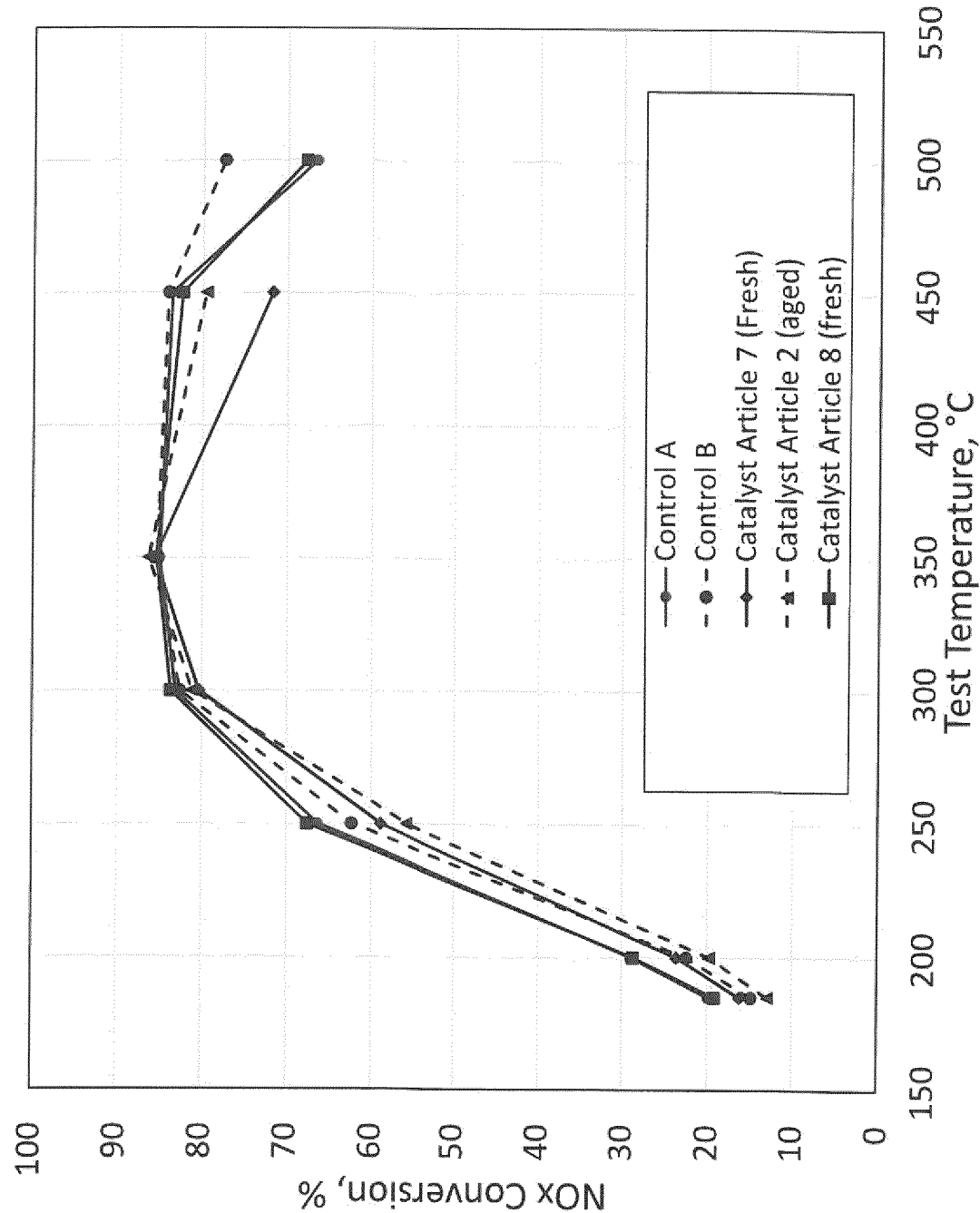
FIG. 6 is a line graph showing the NOx conversion activity of certain inventive embodiments of the present invention as set forth in the Examples.
Figure 7:
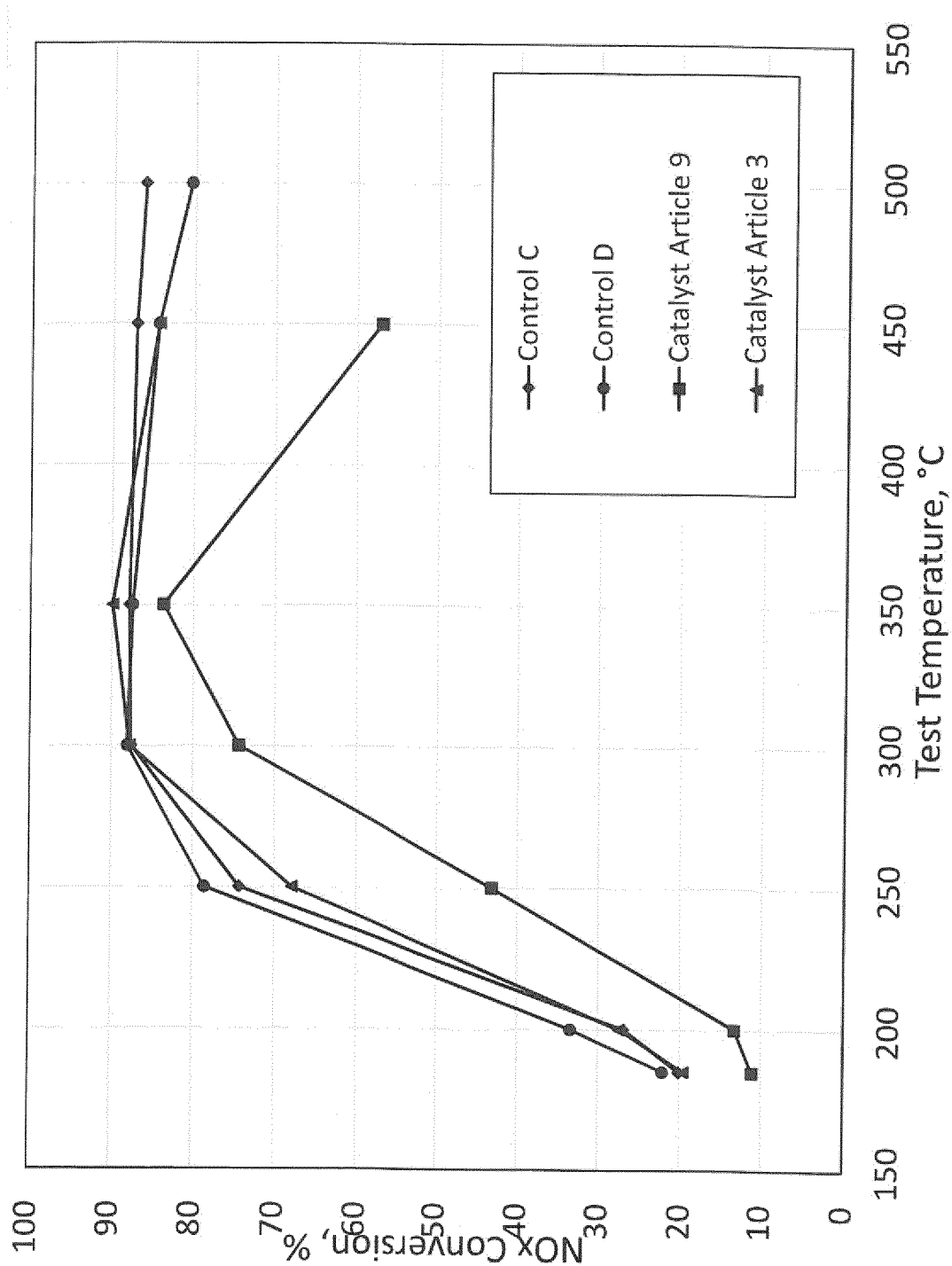
FIG. 7 is a line graph showing the $NO_x$ conversion activity of certain inventive embodiments of the present invention as set forth in the Examples.
Figure 8:
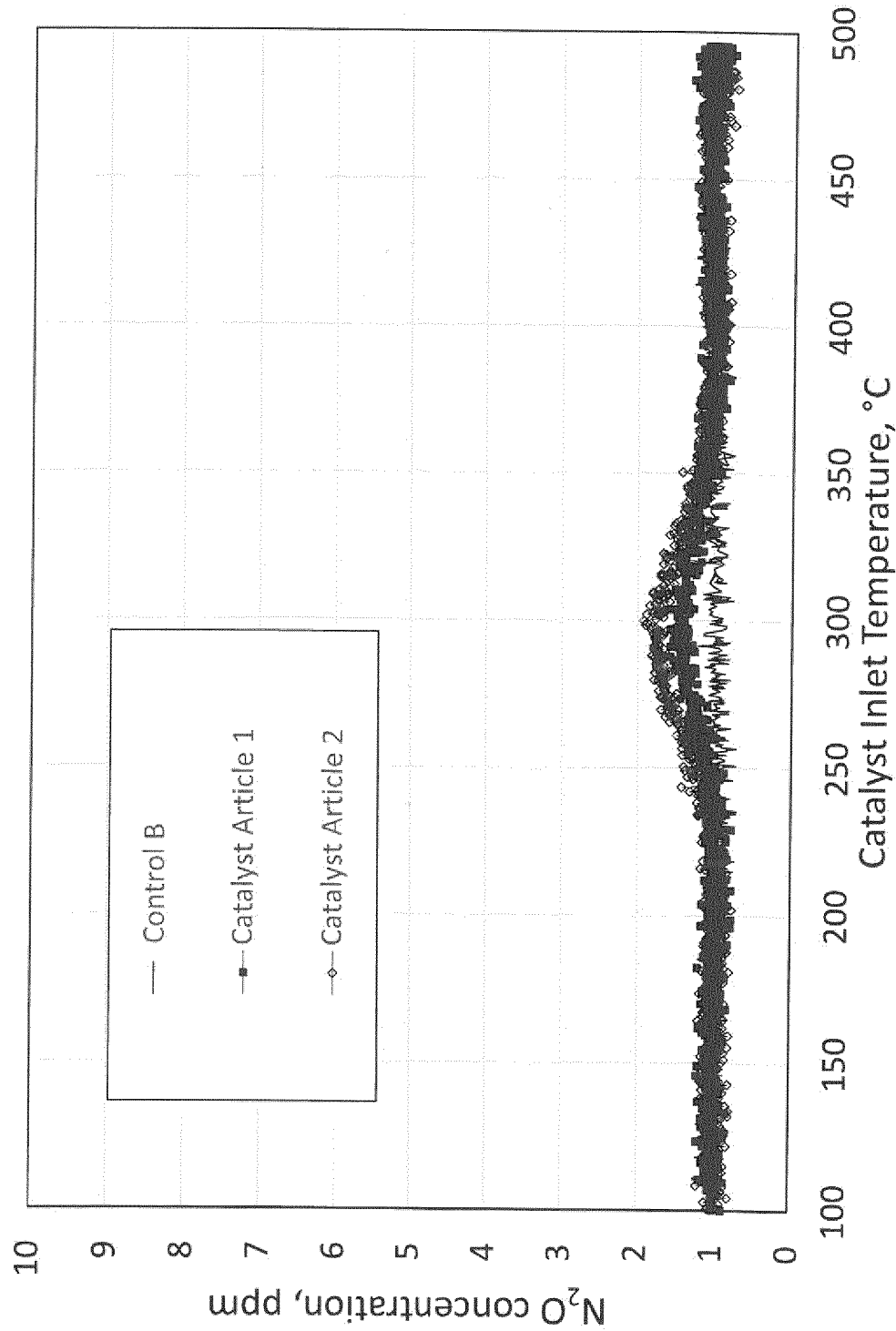
FIG. 8 is a graph showing the $NO_2$ formation of certain inventive embodiments of the present invention as set forth in the Examples.
Figure 9:
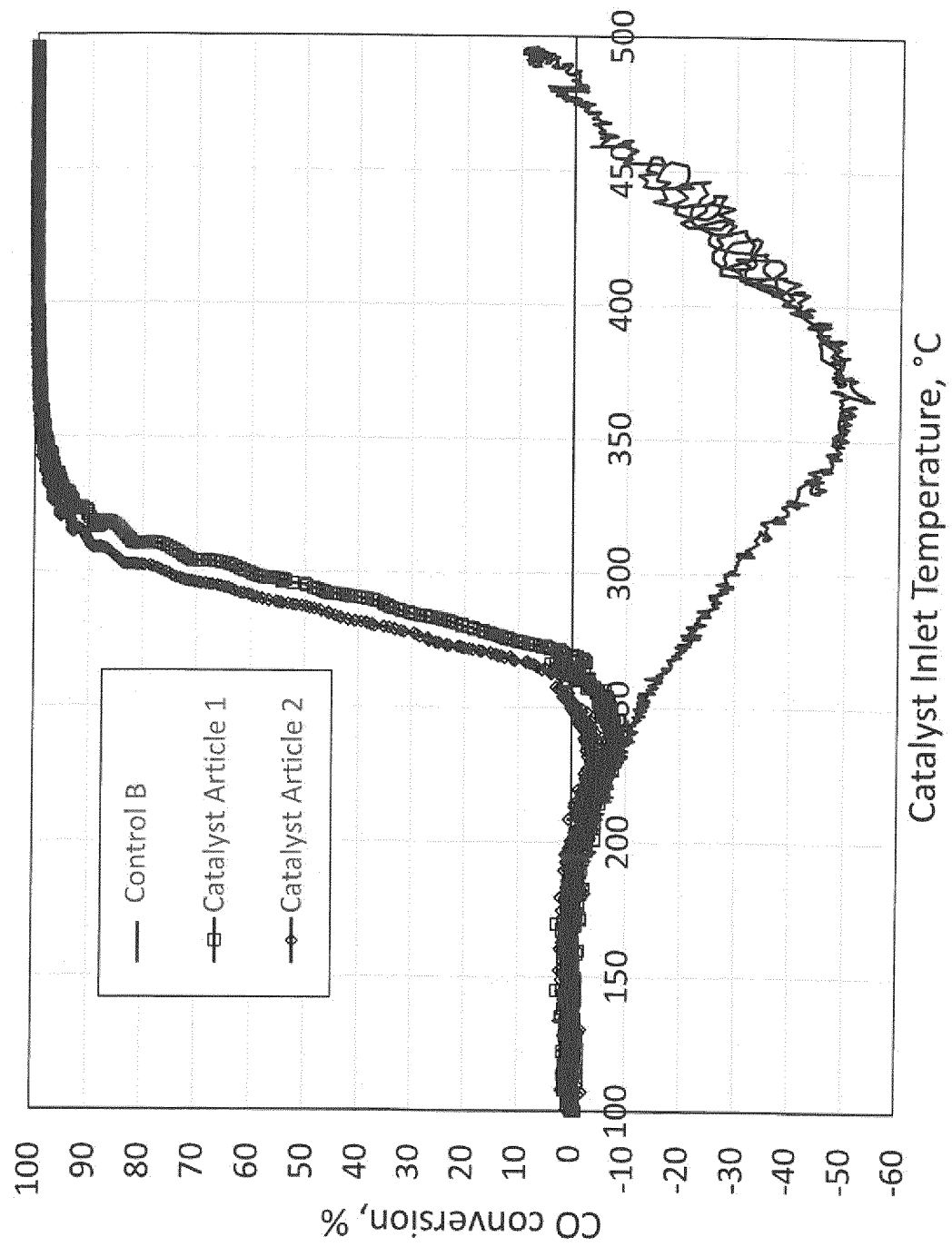
FIG. 9 is a graph showing the CO conversion of certain inventive embodiments of the present invention as set forth in the Examples.
Figure 10:
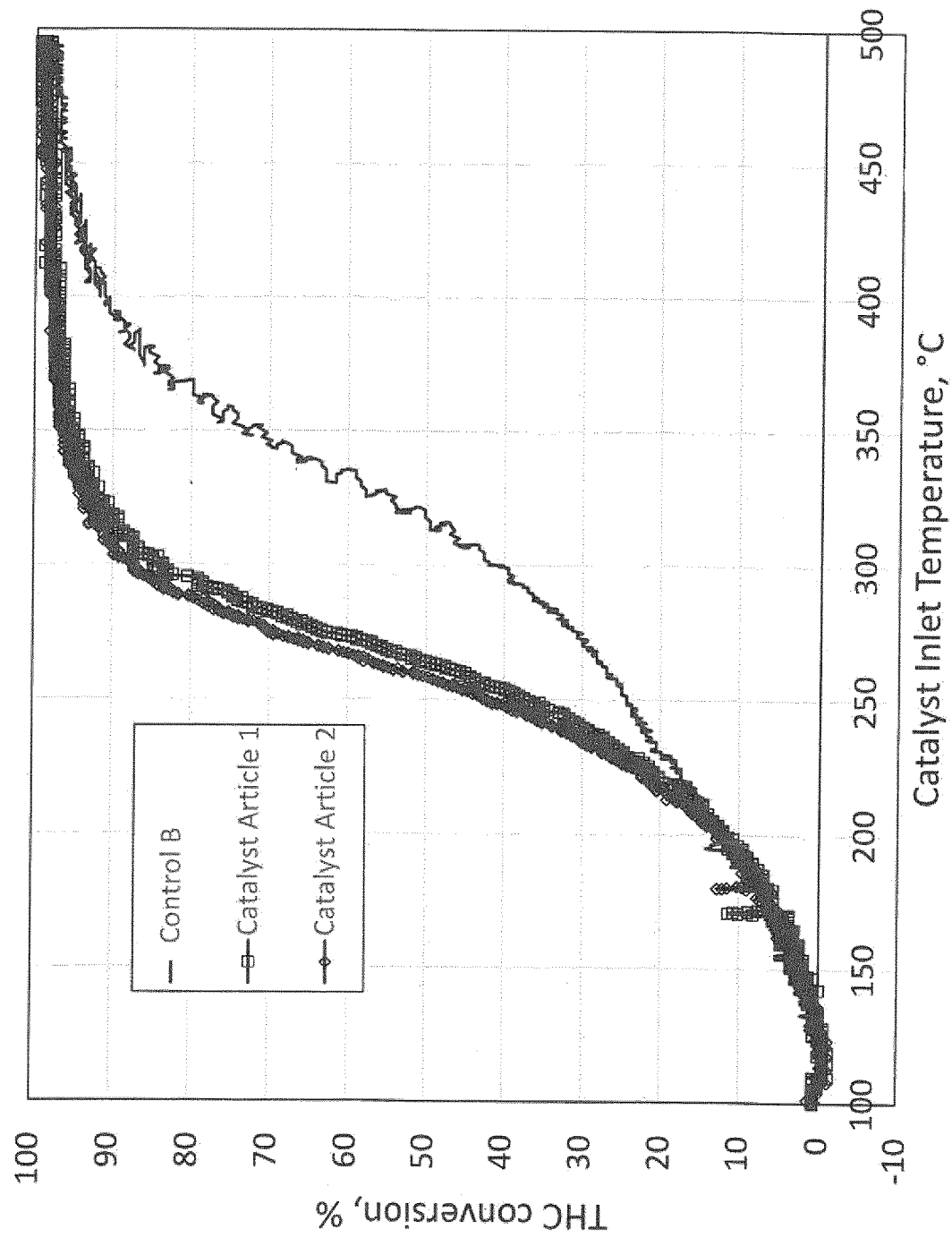
FIG. 10 is a graph showing the HC oxidation of certain inventive embodiments of the present invention as set forth in the Examples.
Figure 11:
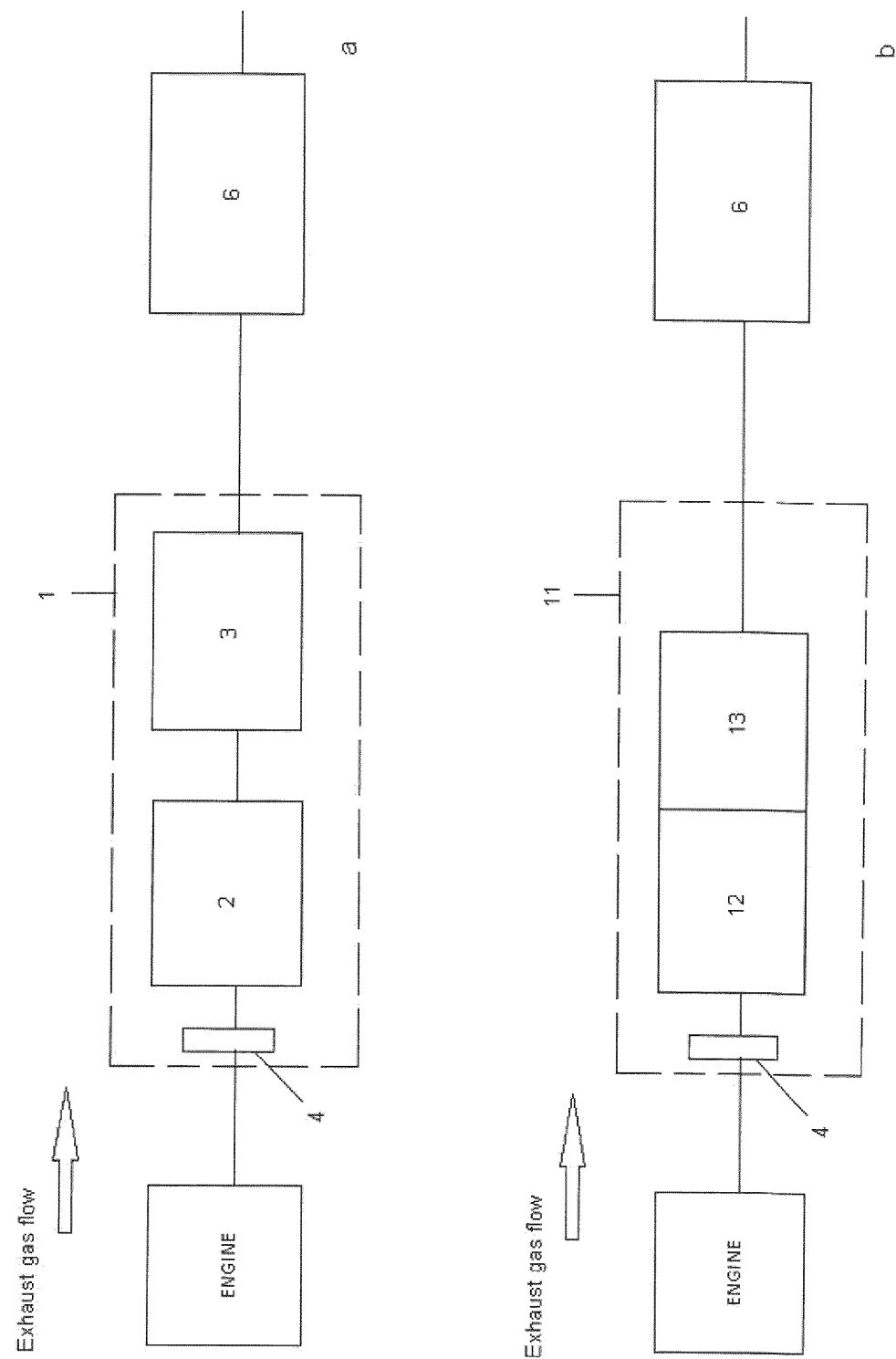
FIG. 11a shows a schematic depiction of an engine coupled with the exhaust gas treatment system according to the present invention and a further catalytic unit. In particular.
FIG. 11b shows a schematic depiction of an engine coupled with the exhaust gas treatment system according to the present invention and a further catalytic unit. In particular.
Figure 12:
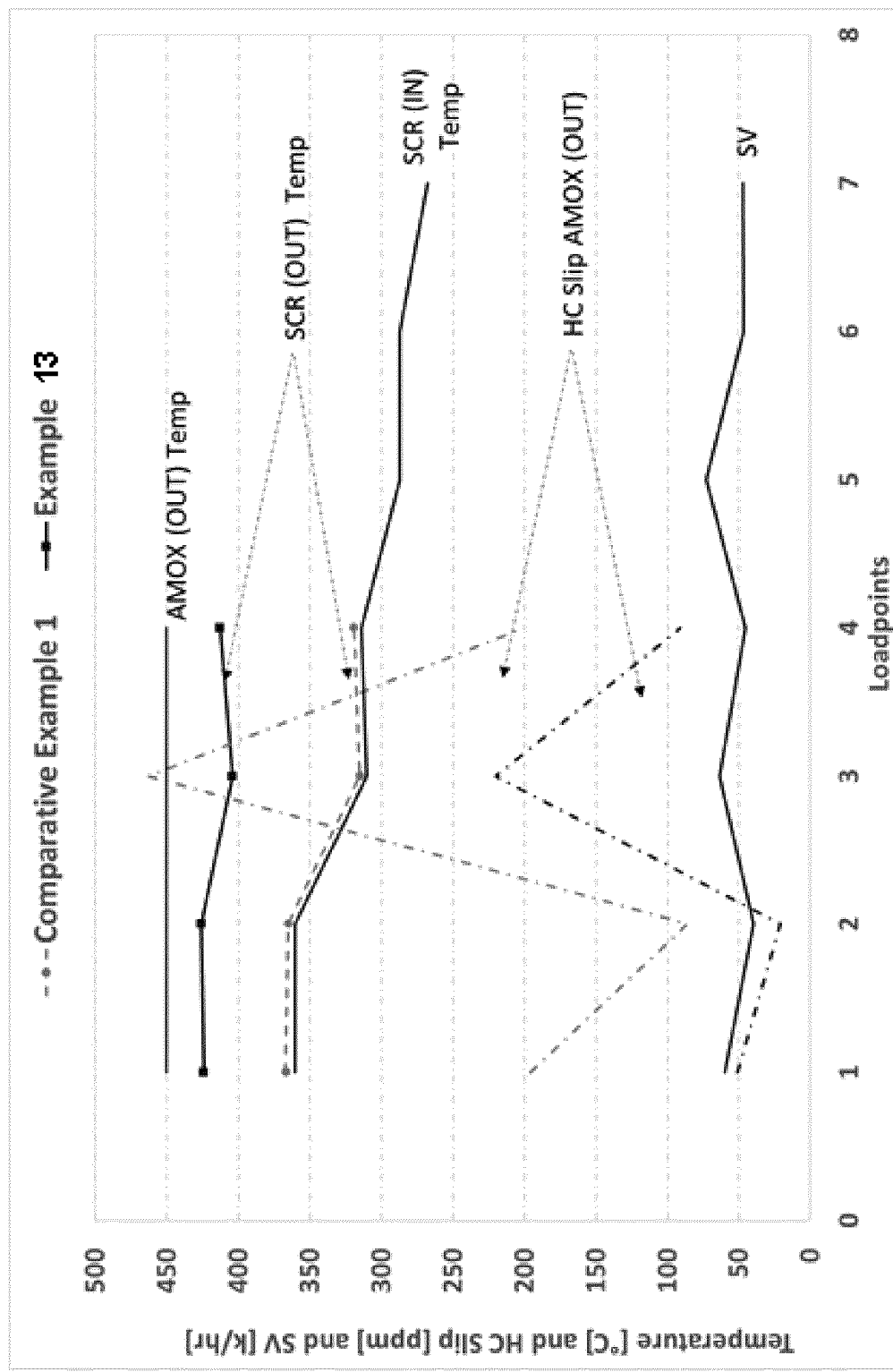
FIG. 12 shows the HC slip measured at the exit of the AMOX catalyst (HC slip AMO(out)) and the SCR(out) temperatures for the exhaust gas treatment systems of Example 13 and the exhaust gas treatment system of comparative Example 1 at different loadpoints 1 to 7.
Figure 13:
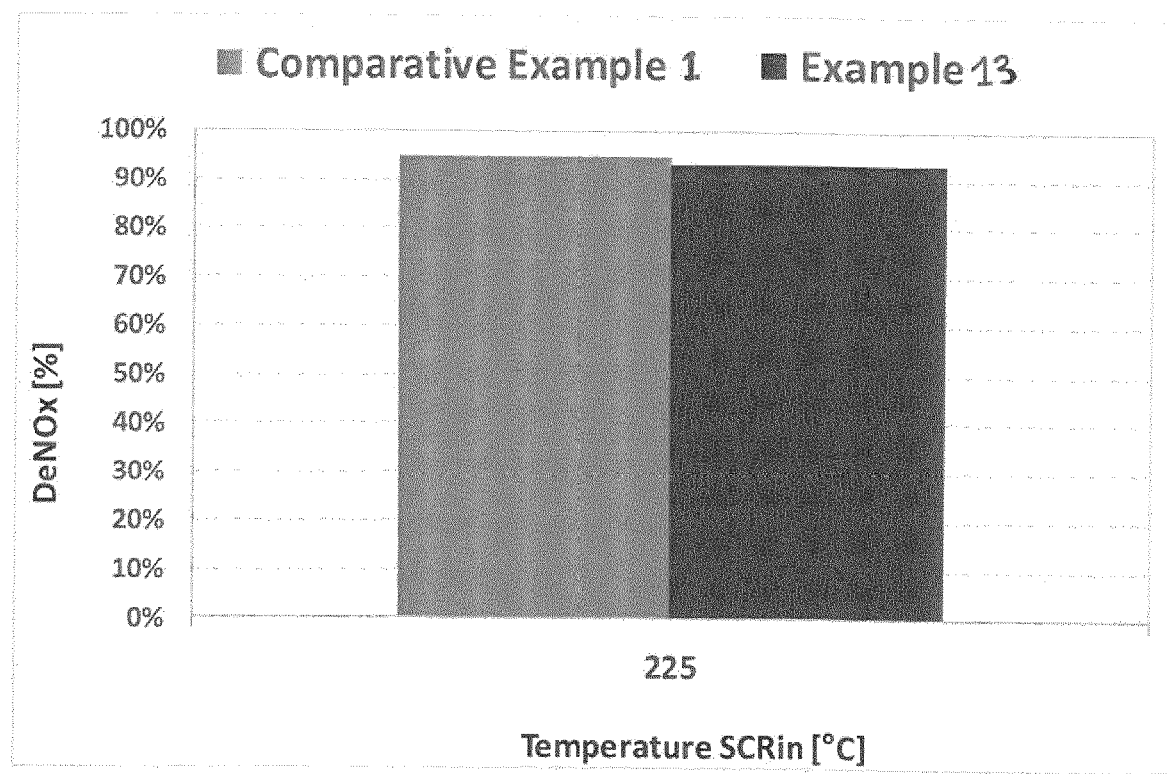
FIG. 13 shows the NOx conversion measured obtained by using the exhaust gas treatment systems of Example 13 and comparative Example 1 at low temperature, namely 225° C.
Figure 14:
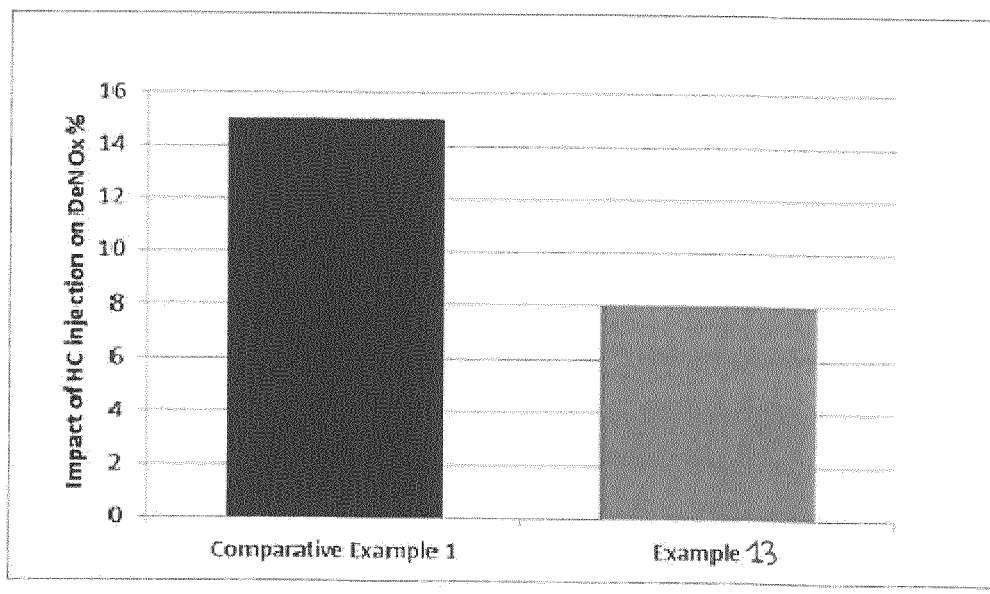
FIG. 14 shows the relative amount of reduced NOx measured at 203° C. after HC injection for the exhaust gas treatment system of Example 13 and the exhaust gas treatment system of comparative Example 1.
Figure 15:
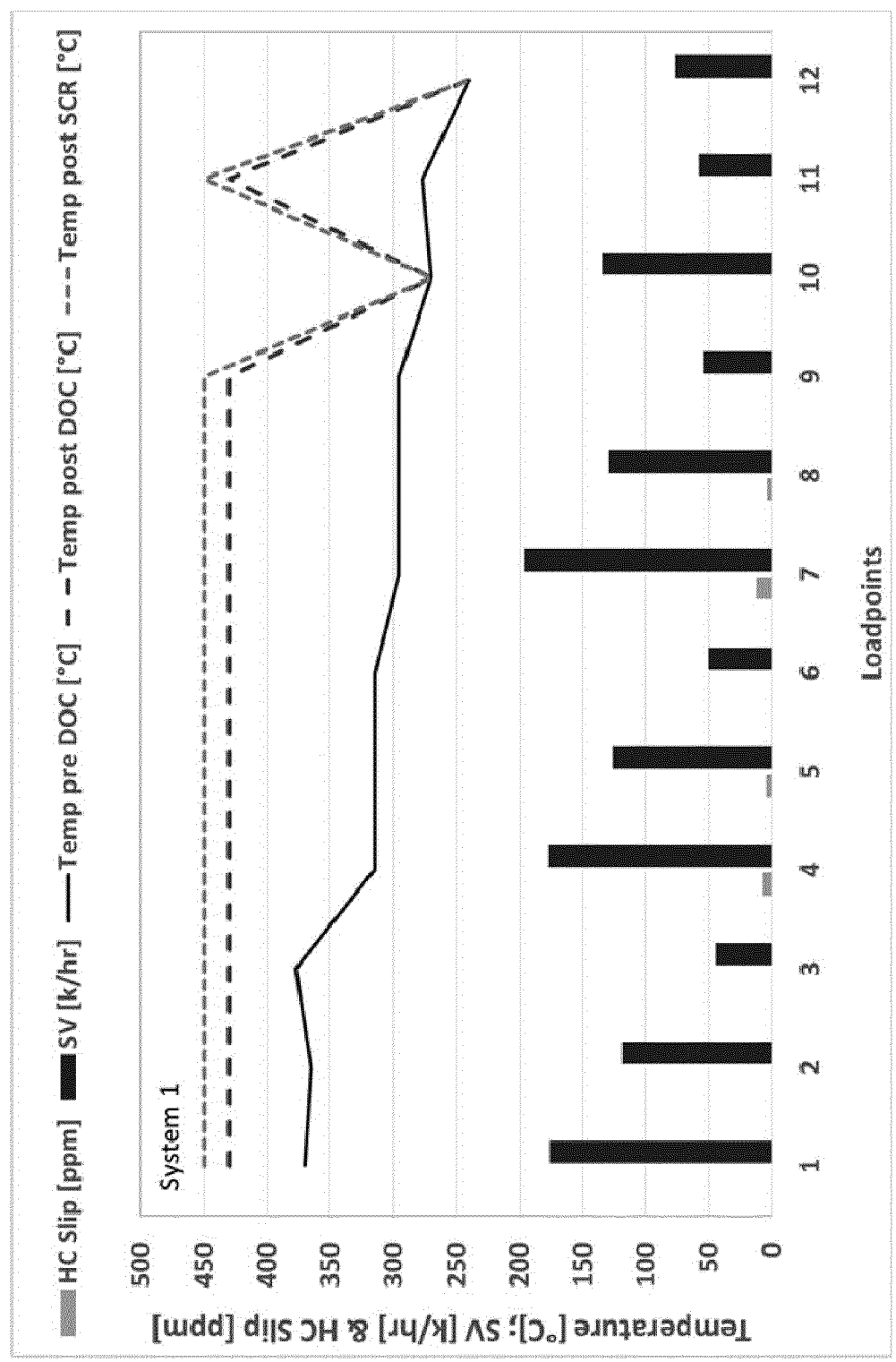
FIG. 15 shows the DOC outlet temperatures and the HC slip measured for an exhaust gas treatment system of the present invention (system 1) at different loadpoints 1 to 12.
Figure 16:
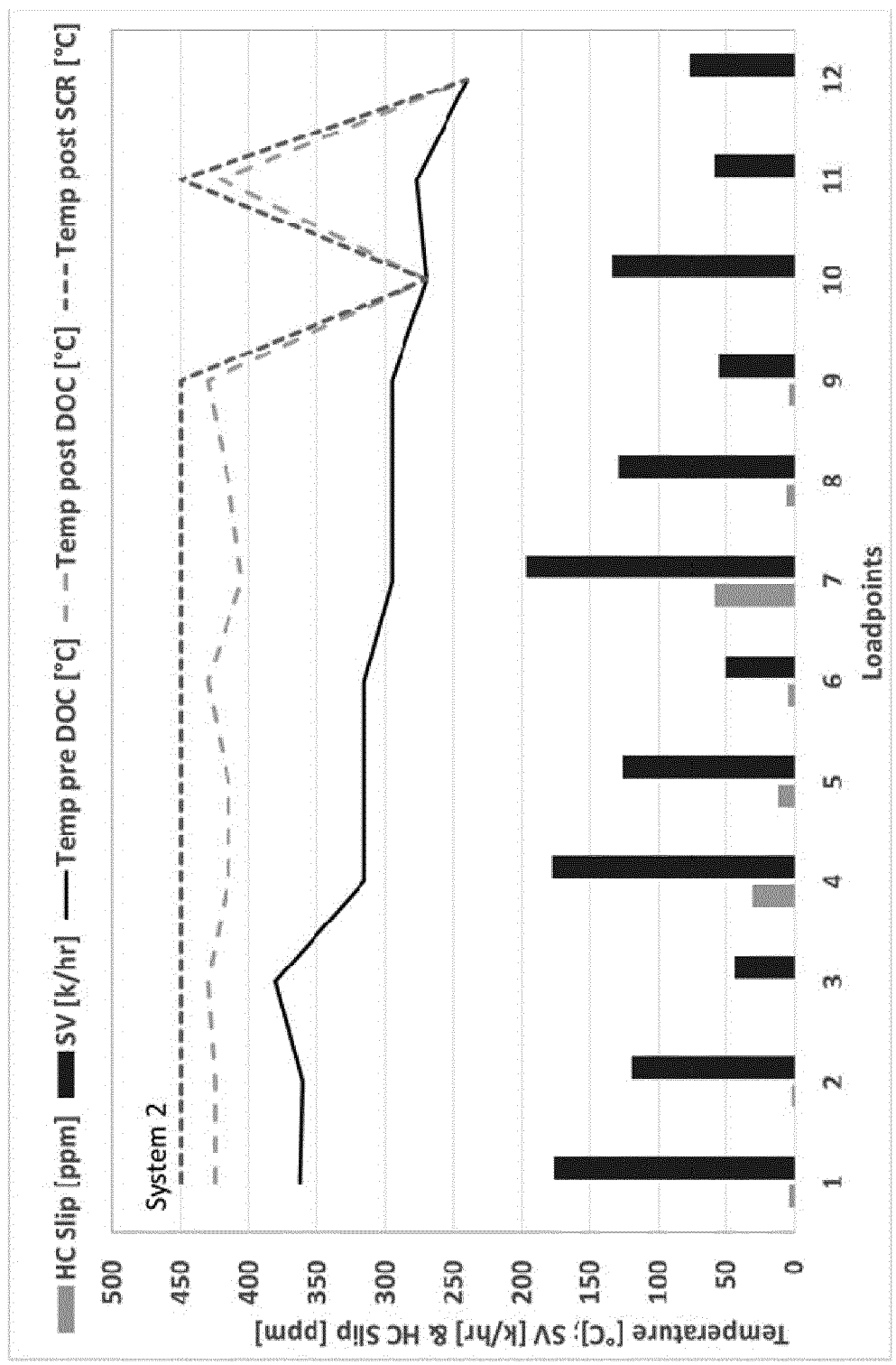
FIG. 16 shows the DOC outlet temperatures and the HC slip measured for an exhaust gas treatment system of the present invention (system 2) at different loadpoints 1 to 12.
Figure 17:
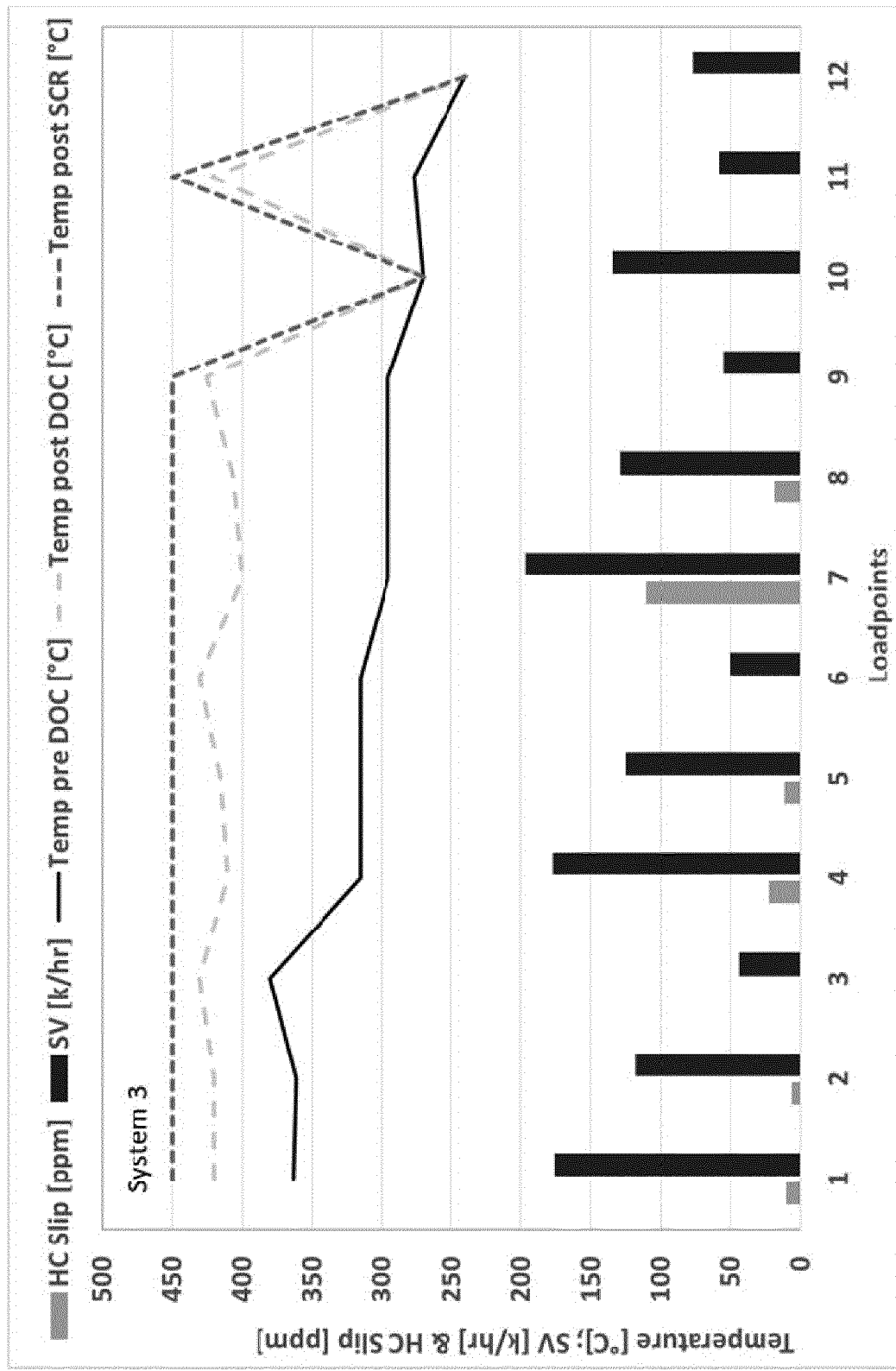
FIG. 17 shows the DOC outlet temperatures and the HC slip measured for an exhaust gas treatment system of the present invention (system 3) at different loadpoints 1 to 12.
Figure 18:
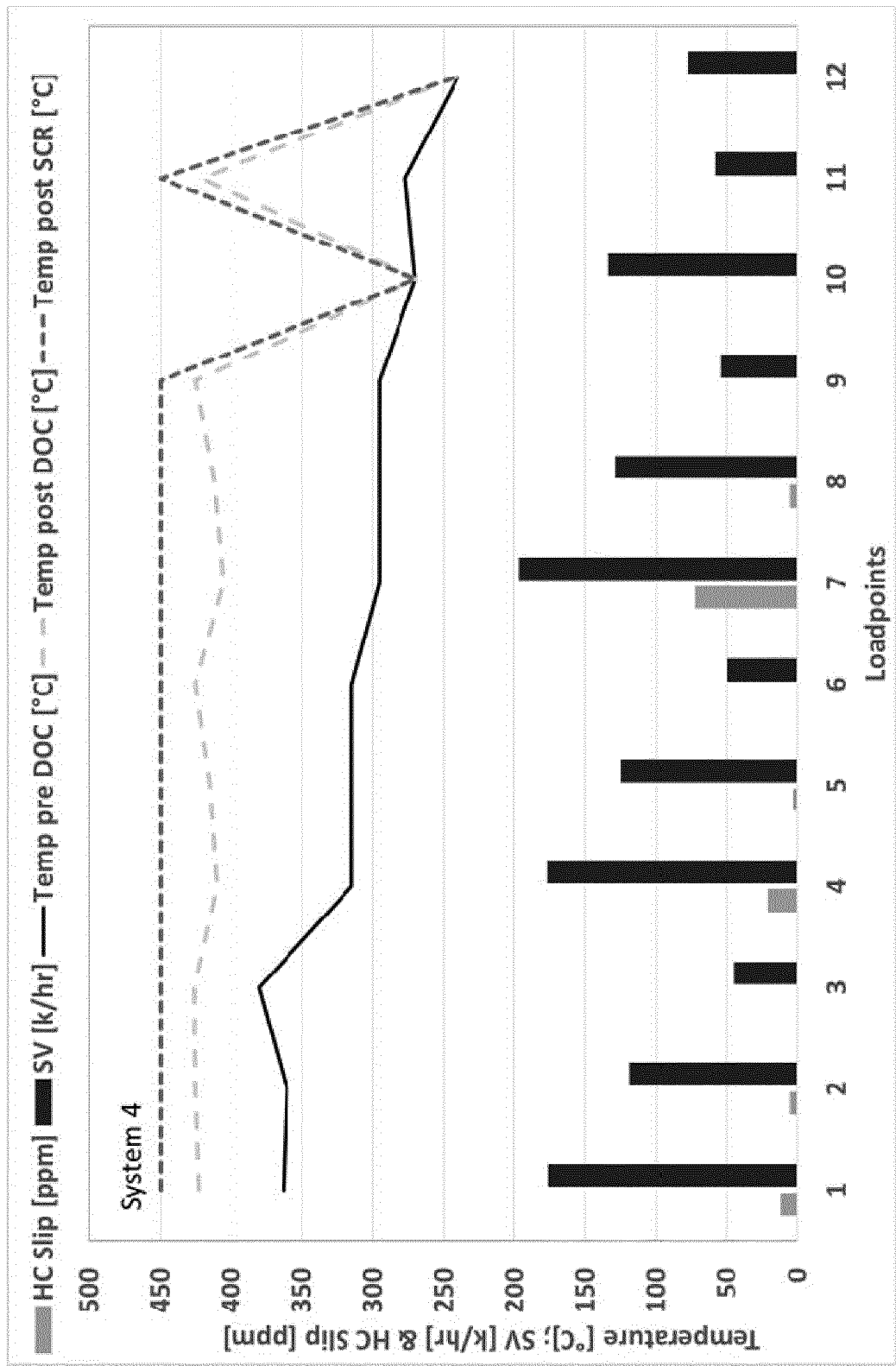
FIG. 18 shows the DOC outlet temperatures and the HC slip measured for an exhaust gas treatment system not according to the present invention (system 4) at different loadpoints 1 to 12.
Figure 19:
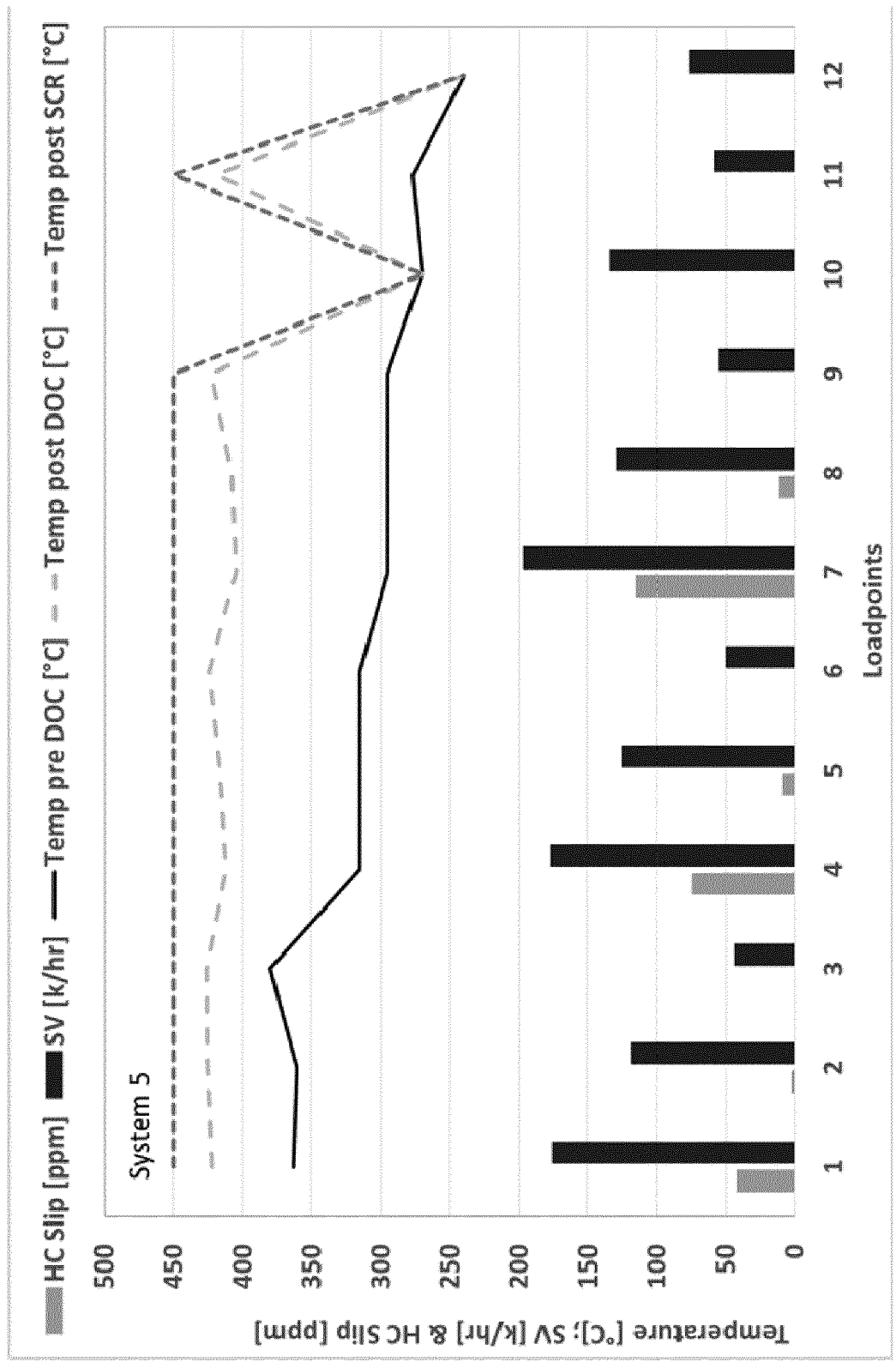
FIG. 19 shows the DOC outlet temperatures and the HC slip measured for an exhaust gas treatment system not according to the present invention (system 5) at different loadpoints 1 to 12.
Figure 20:
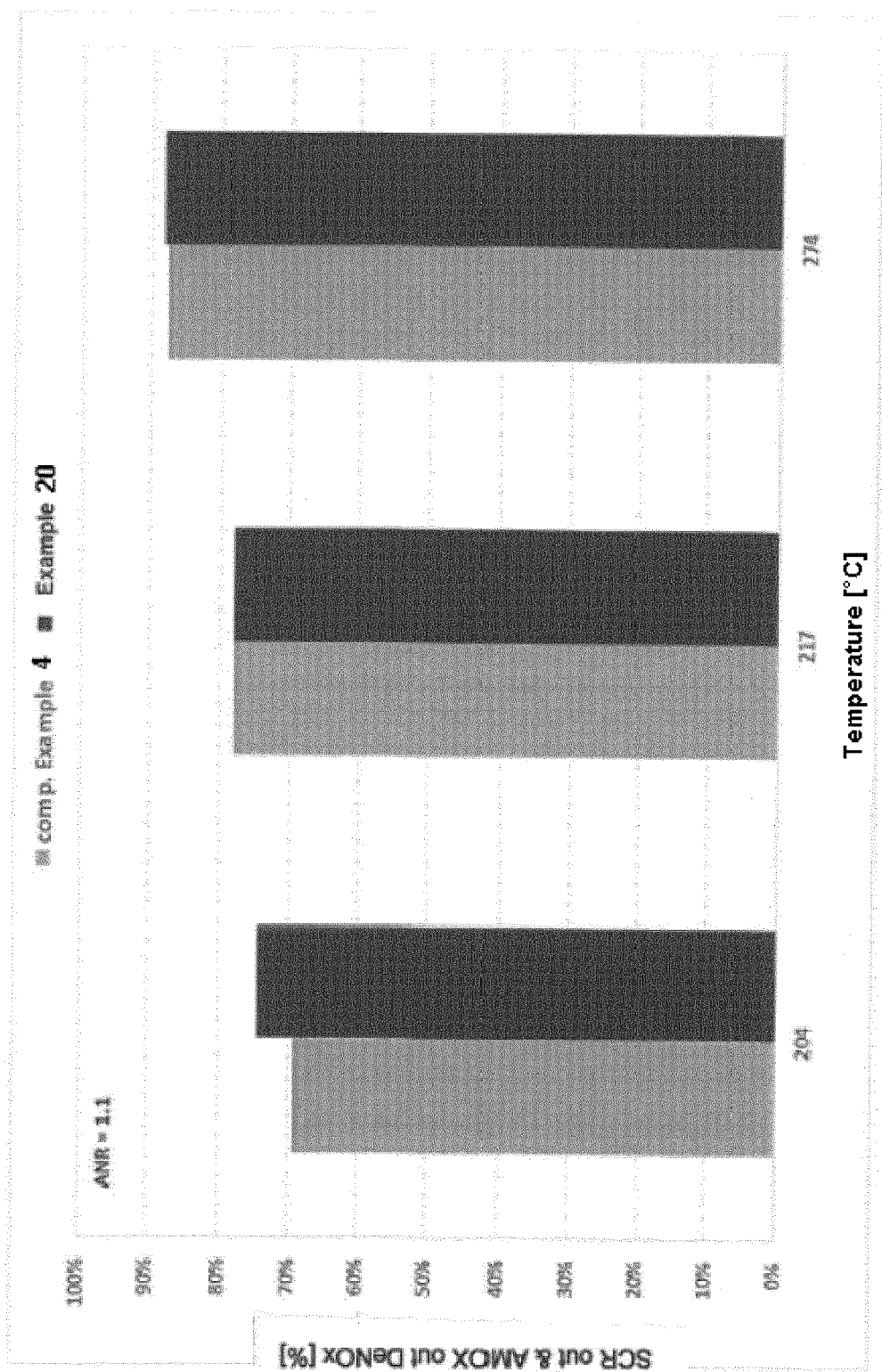
FIG. 20 shows the DeNOx for the exhaust gas treatment systems of Example 20 and of Comparative Example 4 at different temperatures, i.e. 204, 217 and 274° C.
Figure 21:
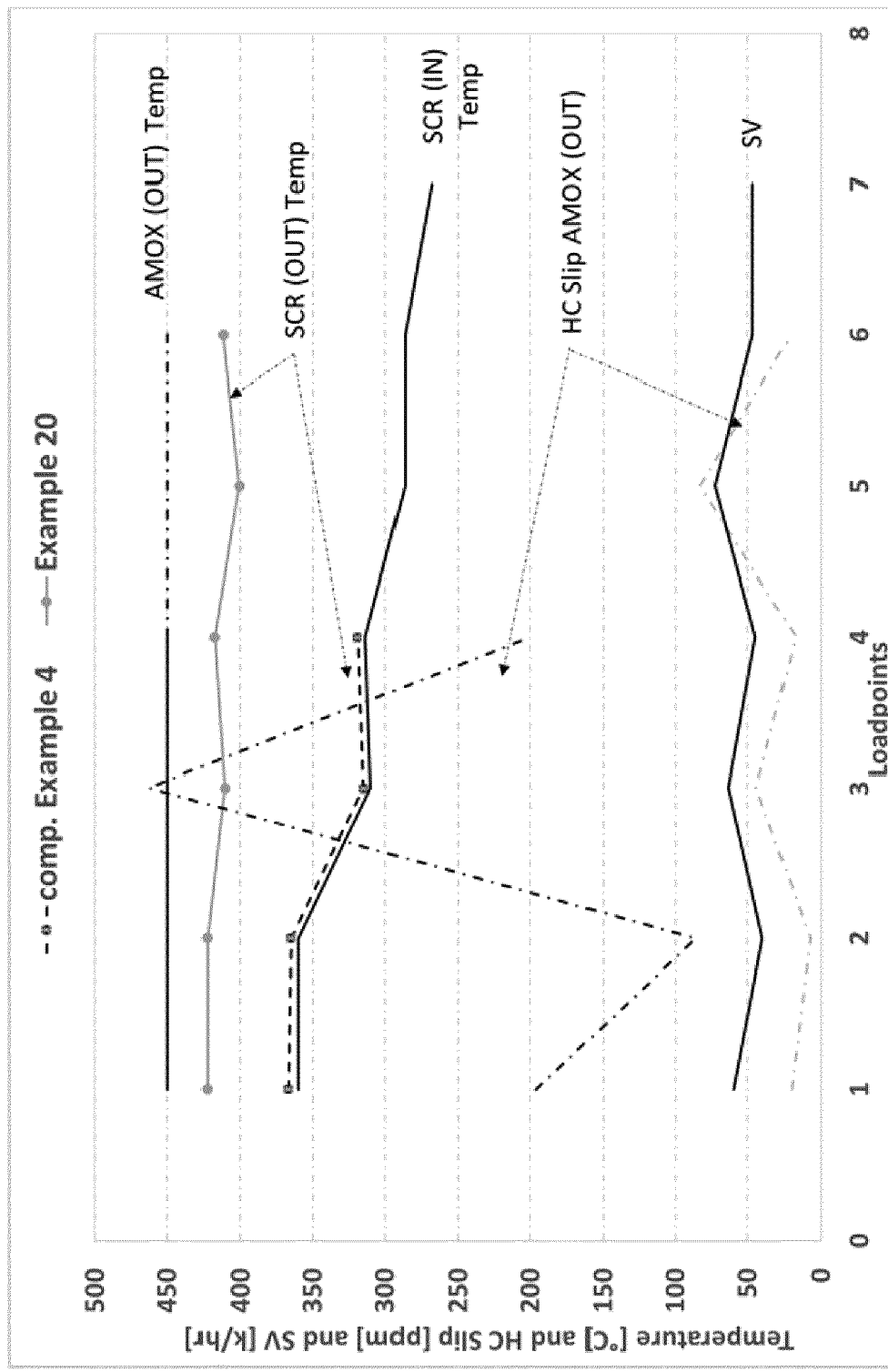
FIG. 21 shows the HC slip measured at the exit of the AMOX catalyst (HC slip AMOX(out)) and the SCR(out) temperatures for the exhaust gas treatment systems of Example 20 and the exhaust gas treatment system of Comparative Example 4 at different loadpoints 1 to 7.
Figure 22:
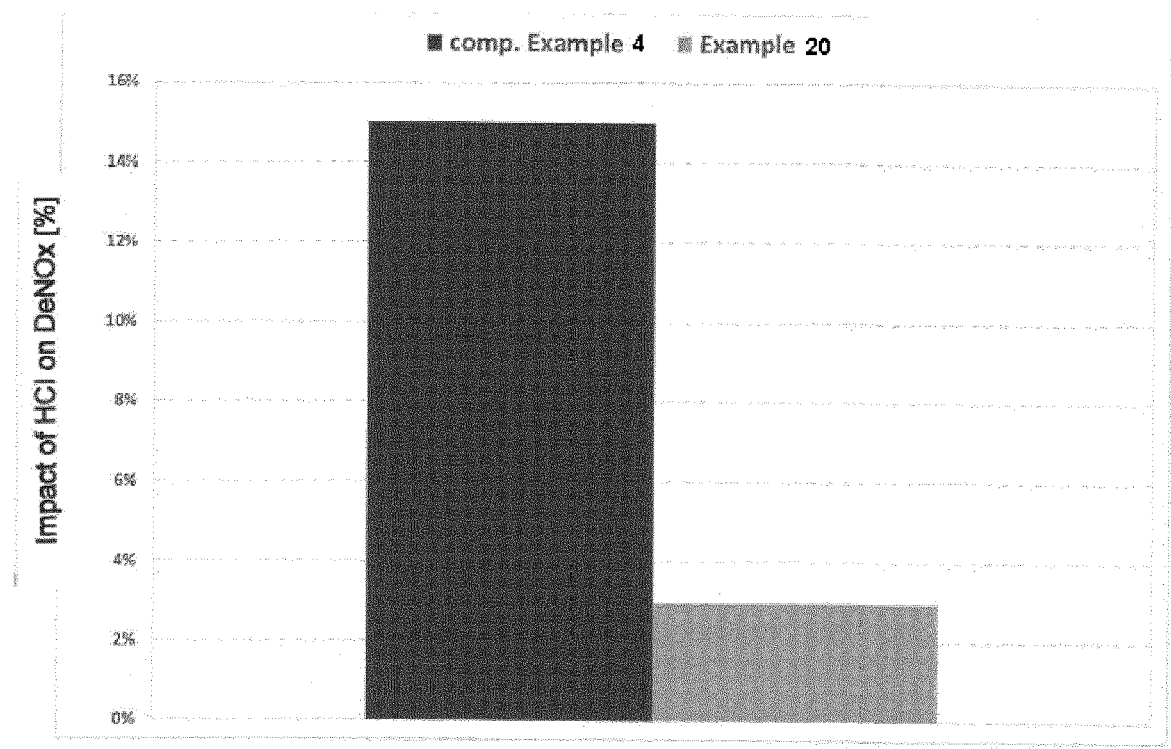
FIG. 22 shows the relative amount of reduced NOx measured at 203° C. after HC injection for the exhaust gas treatment system of Example 20 and the exhaust gas treatment system of Comparative Example 4
Figure 23:
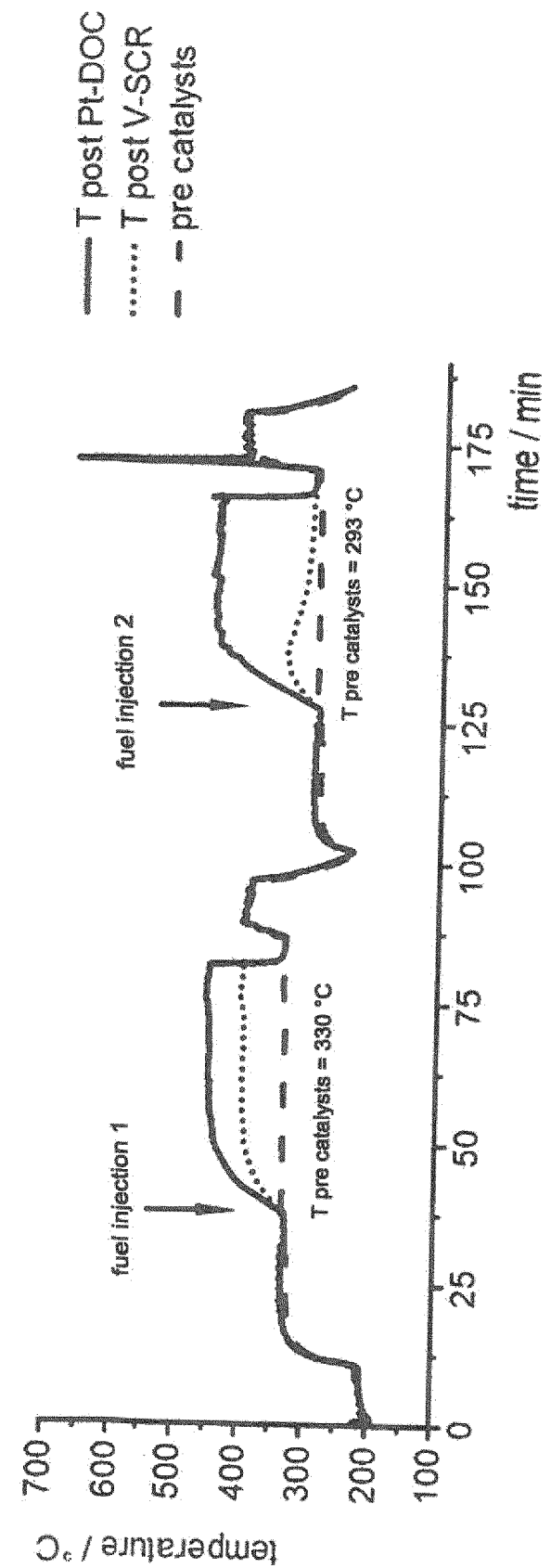
FIG. 23 shows the temperatures post SCR and post Pt-DOC for the exhaust gas treatment system of Comparative Example 5 at different temperatures pre catalyst.
Figure 24:
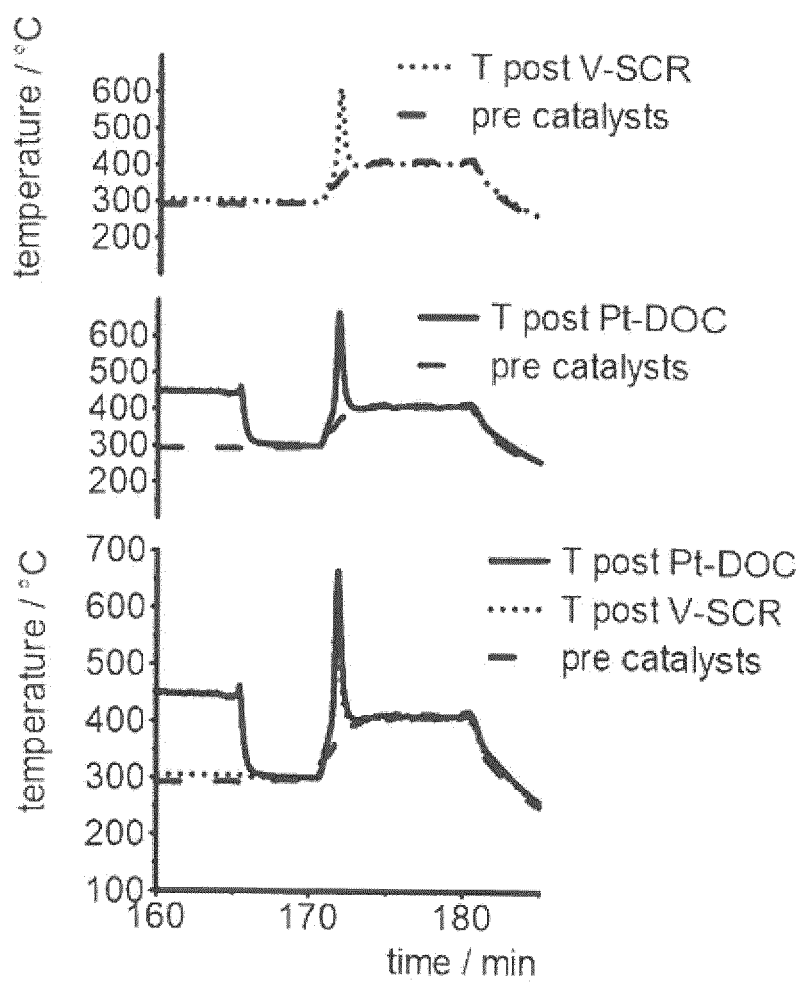
FIG. 24 shows enlargements of FIG. 23.
Figure 25:
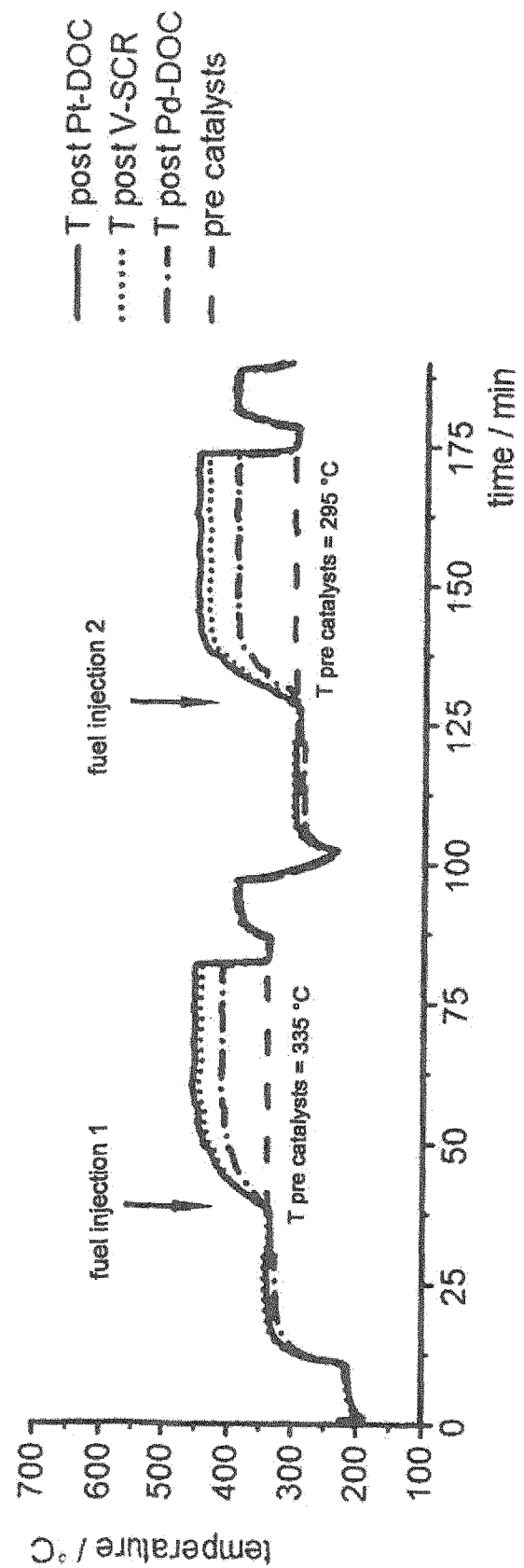
FIG. 25 shows the temperatures post SCR and post Pt-DOC for the exhaust gas treatment system of Example 21 at different temperatures pre catalyst.

US 2001/0049339
U.S. Pat. No. 9,480,976
U.S. Pat. No. 9,352,307
U.S. Pat. No. 9,321,009
U.S. Pat. No. 9,199,195
U.S. Pat. No. 9,138,732
U.S. Pat. No. 9,011,807
U.S. Pat. No. 8,715,618
U.S. Pat. No. 8,293,182
U.S. Pat. No. 8,119,088
U.S. Pat. No. 8,101,146
U.S. Pat. No. 7,220,692
U.S. Pat. No. 4,518,710
U.S. Pat. No. 5,137,855
U.S. Pat. No. 5,476,828
U.S. Pat. No. 8,685,882
U.S. Pat. No. 9,101,908
DE10 2015 015260 A1
DE 10 2015 0160 986 A1
WO 2015/130216 A1
U.S. Pat. No. 8,293,199 B2

The invention claimed is:

1. A catalytic article comprising:
a substrate having a catalyst composition disposed thereon, wherein the catalyst composition comprises a platinum group metal impregnated onto a porous support and a selective catalytic reduction catalyst;
wherein the catalyst composition is substantially free of platinum;
wherein the catalytic article is effective in the abatement of nitrogen oxides ($NO_x$) and hydrocarbons (HCs); and
wherein the catalyst composition consists of a single layer.

2. The catalytic article of claim 1, wherein the selective catalytic reduction catalyst comprises a mixed metal oxide component, wherein the mixed metal oxide component is selected from $FeTiO_3$, $FeAl_2O_3$, $MgTiO_3$, $MgAlO_3$, $MnO_x/TiO_2$, $CuTiO_3$, $CeZrO_2$, $TiZrO_2$, $V_2O_5/TiO_2$, and mixtures thereof.

3. The catalytic article of claim 1, wherein the platinum group metal impregnated onto a porous support is palladium impregnated onto zirconia and the selective catalytic reduction catalyst comprises one or more of a mixed metal oxide and a zeolite comprising one or more of Cu and Fe.

4. The catalytic article of claim 3, wherein the selective catalytic reduction catalyst comprises a zeolite comprising Cu.

5. An emission treatment system for treatment of an exhaust gas stream, the emission treatment system comprising:
an engine producing an exhaust gas stream;
the catalytic article according to claim 1 positioned downstream from the engine in fluid communication with the exhaust gas stream and adapted for the reduction of NOx and HCs within the exhaust stream to form a treated exhaust gas stream; and
an injector adapted for the addition of a reductant to the exhaust gas stream upstream of the catalytic article.

6. An exhaust gas treatment system for treating an exhaust gas stream exiting a diesel engine, said exhaust gas treatment system having an upstream end for introducing said exhaust gas stream into said exhaust gas treatment system, wherein said exhaust gas treatment system comprises
(i) a first catalyst having an inlet end and an outlet end and comprising a coating disposed on a substrate, wherein the coating comprises palladium supported on an oxidic material comprising zirconium and further comprises one or more of a vanadium oxide and a zeolitic material comprising one or more of copper and iron; or a first catalyst having an inlet end and an outlet end and being the catalytic article according to claim 1;
(ii) a second catalyst having an inlet end and an outlet end and comprising a coating disposed on a substrate, wherein the coating comprises a platinum group metal supported on an oxidic material and further comprises one or more of a vanadium oxide, a tungsten oxide and a zeolitic material comprising one or more of copper and iron;
wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;
wherein in the exhaust gas treatment system, the second catalyst according to (ii) is located downstream of the first catalyst according to (i) and wherein the inlet end of the second catalyst is arranged upstream of the outlet end of the second catalyst.

7. The exhaust gas treatment system of claim 6, wherein the coating of the first catalyst comprises palladium supported on an oxidic material comprising zirconium, wherein from 99 to 100 weight-% of the oxidic material consist of zirconium and oxygen and comprises a zeolitic material comprising one or more of copper and iron.

8. A catalyst for the selective catalytic reduction of NOx and for the oxidation of a hydrocarbon, comprising a single layer coating disposed on a substrate, wherein the coating comprises palladium supported on an oxidic material comprising zirconium, and further comprises a zeolitic material having a framework structure of the type CHA and comprising one or more of copper and iron,
wherein from 0 weight-% to 2 weight-% of the oxidic material consist of ceria and alumina.

9. The catalyst of claim 8, wherein from 90 to 100 weight-% of the oxidic material comprised in the coating consist of zirconium and oxygen.

10. The catalyst of claim 8, wherein the coating comprises a zeolitic material comprising one or more of copper and iron.

11. A method for preparing a catalyst comprising
(A) preparing a first mixture comprising palladium, an oxidic material comprising zirconium, and water,
(B) preparing a second mixture comprising a solvent and one or more of a vanadium oxide and a zeolitic material comprising one or more of copper and iron;
(C) mixing the first mixture obtained in (A) and the second mixture obtained in (B) obtaining a slurry;
(D) disposing the slurry obtained in (C) on a substrate, obtaining a slurry-treated substrate;
(E) optionally, drying the slurry-treated substrate obtained in (D), obtaining a substrate having a coating disposed thereon; and
(F) calcining the slurry-treated substrate obtained in (D) to obtain the catalyst, wherein the catalyst consists of a single layer.

12. An exhaust gas treatment system for treating an exhaust gas stream leaving a diesel engine, said exhaust gas treatment system having an upstream end for introducing said exhaust gas stream into said exhaust gas treatment system, wherein said exhaust gas treatment system comprises
(i) a first catalyst being a diesel oxidation (DOC) catalyst, having an inlet end and an outlet end and consisting of a coating and a substrate wherein the coating is disposed on internal walls of the substrate, wherein the substrate has an inlet end, an outlet end and a substrate length extending from the inlet end to the outlet end of the substrate and comprises a plurality of passages defined by the internal walls of the substrate, wherein the coating comprises palladium supported on an oxidic material comprising one or more of zirconium, silicon, aluminum and titanium, wherein from 99 weight-% to 100 weight-% of the coating of the first catalyst consist of palladium supported on an oxidic material comprising one or more of zirconium, silicon, aluminum and titanium;
(ii) a second catalyst having an inlet end and an outlet end and comprising a coating and a substrate wherein the coating is disposed on internal walls of the substrate, wherein the substrate has an inlet end, and outlet end and a substrate length extending from the inlet end to the outlet end of the substrate and comprises a plurality of passages defined by the internal walls of the substrate, wherein the coating of the second catalyst comprises a platinum group metal supported on an oxidic material and one or more of a vanadium oxide and a zeolitic material comprising one or more of copper and iron; or
a second catalyst having an inlet end and an outlet end and being the catalytic article according to claim 1;
wherein the first catalyst according to (i) is the first catalyst of the exhaust gas treatment system downstream of the upstream end of the exhaust gas treatment system and wherein the inlet end of the first catalyst is arranged upstream of the outlet end of the first catalyst;
wherein in the exhaust gas treatment system, the second catalyst according to (ii) is located downstream of the first catalyst according to (i) and wherein the inlet end of the second catalyst is arranged upstream of the outlet end of the second catalyst;
wherein the outlet end of the first catalyst according to (i) is in fluid communication with the inlet end of the second catalyst according to (ii) and wherein between the outlet end of the first catalyst according to (i) and the inlet end of the second catalyst according to (ii), no catalyst for treating the exhaust gas stream exiting the first catalyst is located in the exhaust gas treatment system.

13. The exhaust gas treatment system of claim 12, wherein the oxidic material comprised in the coating of the first catalyst according to (i) comprises one or more of zirconium and aluminum.

14. The exhaust gas treatment system of claim 12, wherein the coating of the first catalyst comprises palladium at a loading, calculated as elemental palladium, in the range of from 0.18 g/l to 3.53 g/l (5 to 100 g/ft$^3$).

15. The exhaust gas treatment system of claim 12, wherein the coating of the second catalyst comprises a zeolitic material comprising one or more of copper and iron, wherein the zeolitic material comprised in the coating of the second catalyst has a framework structure of the type AEI, GME, CHA, MFI, BEA, FAU, MOR or mixtures of two or more thereof; or
wherein the coating of the second catalyst according to (ii) comprises a vanadium oxide;
wherein the vanadium oxide optionally contains one or more of tungsten, iron and antimony.

16. The exhaust gas treatment system of claim 12, further comprising an ammonia oxidation catalyst located downstream of the second catalyst according to (ii), wherein the ammonia oxidation catalyst has an inlet end and an outlet end, wherein the outlet end of the second catalyst according to (ii) is in fluid communication with the inlet end of the ammonia oxidation catalyst and wherein between the outlet end of the second catalyst according to (ii) and the inlet end of the ammonia oxidation catalyst, no catalyst for treating the exhaust gas exiting the second catalyst is located in the exhaust gas treatment system.

17. A method for a simultaneous selective catalytic reduction of NOx, an oxidation of hydrocarbon, an oxidation of nitrogen monoxide and an oxidation of ammonia, comprising
(1) providing an exhaust gas stream from a diesel engine comprising one or more of NOx, ammonia, nitrogen monoxide and a hydrocarbon; and
(2) passing the exhaust gas stream provided in (1) through the exhaust gas system according to claim 6.

* * * * *